United States Patent
Henderson et al.

(10) Patent No.: US 9,254,759 B1
(45) Date of Patent: Feb. 9, 2016

(54) PROPULSION AND CONTROL FOR A MAGNETICALLY LIFTED VEHICLE

(71) Applicant: Arx Pax, LLC, Saratoga, CA (US)

(72) Inventors: D. Gregory Henderson, Saratoga, CA (US); Shauna Moran, Sunnyvale, CA (US); Mitchell Dougherty, Los Gatos, CA (US); Victor Espinoza, Los Gatos, CA (US); Robert William Melvin, Portland, OR (US); James Janicki, San Mateo, CA (US); David P Olynick, Albany, CA (US)

(73) Assignee: Arx Pax, LLC, Saratoga, CA (US)

( * ) Notice: Subject to any disclaimer, the term of this patent is extended or adjusted under 35 U.S.C. 154(b) by 0 days.

(21) Appl. No.: 14/737,444

(22) Filed: Jun. 11, 2015

Related U.S. Application Data

(63) Continuation-in-part of application No. 14/639,045, filed on Mar. 4, 2015, now Pat. No. 9,126,487, which is a continuation-in-part of application No. 14/069,359, filed on Oct. 31, 2013, now Pat. No. 9,148,077, application No. 14/737,444, which is a continuation-in-part of application No. 14/639,047, filed on Mar. 4, 2015, which is a continuation-in-part of application No. 14/069,359, filed on Oct. 31, 2013, now Pat. No. 9,148,077.

(60) Provisional application No. 62/066,891, filed on Oct. 21, 2014, provisional application No. 62/031,756, filed on Jul. 31, 2014, provisional application No. 61/977,045, filed on Apr. 8, 2014, provisional application No. 62/011,011, filed on Jun. 11, 2014, provisional application No. 61/799,695, filed on Mar. 15, 2013.

(51) Int. Cl.
*B60L 13/04* (2006.01)
*H02N 15/00* (2006.01)
*H02K 7/09* (2006.01)

(52) U.S. Cl.
CPC . *B60L 13/04* (2013.01); *H02K 7/09* (2013.01); *H02N 15/00* (2013.01)

(58) Field of Classification Search
CPC ............... H02K 7/09; H02N 15/00–15/04; F16C 32/04; B60L 13/04
USPC ............ 310/90.5, 103, 104; 104/281–283; 180/180
IPC .......................................... H02K 7/09
See application file for complete search history.

(56) References Cited

FOREIGN PATENT DOCUMENTS

JP          2012019618 A  *  1/2012

OTHER PUBLICATIONS

Machine Translation, Nishimura, JP 2012019618 A, Jan. 26, 2012.*

*Primary Examiner* — Thomas Truong
(74) *Attorney, Agent, or Firm* — Kwan & Olynick LLP

(57) ABSTRACT

Electromechanical systems using magnetic fields to induce eddy currents and generate lift are described. Magnet configurations which can be employed in the systems are illustrated. The magnet configuration can be used to generate lift and/or thrust. Lift and thrust predictions for various magnet configurations are provided. Arrangements of hover engines, which can employ the magnet configurations, and an associated guidance, navigation and control system, are described. Finally, a number of different applications, such as trains, elevators and printing, which utilize embodiments of the electromechanical systems described herein, are presented.

27 Claims, 73 Drawing Sheets

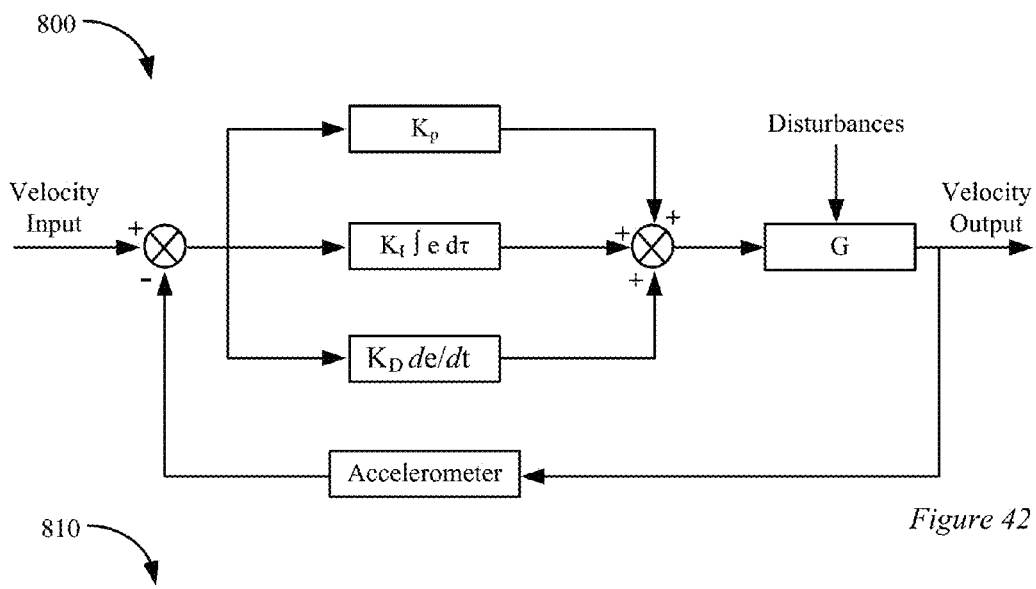
*Figure 42*
*Figure 43*
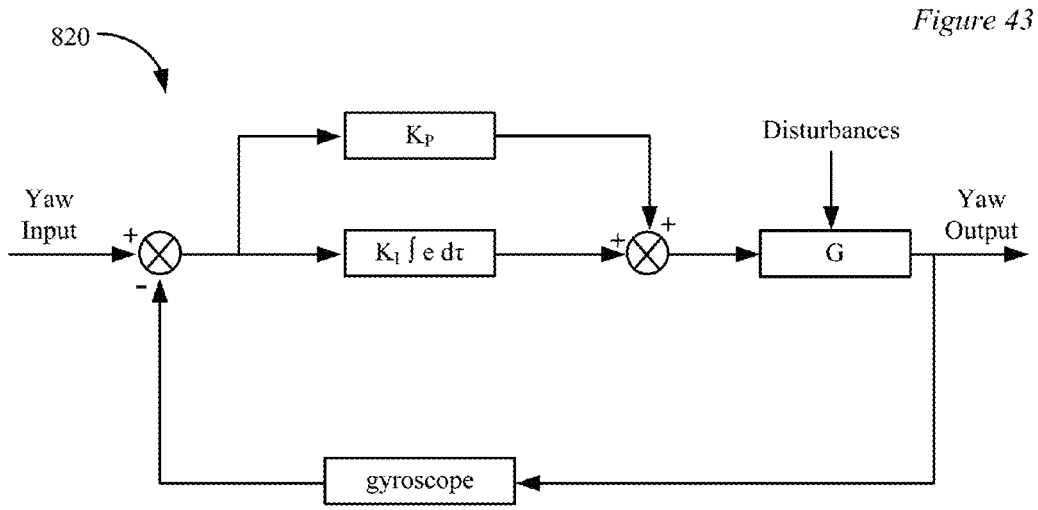
*Figure 44*

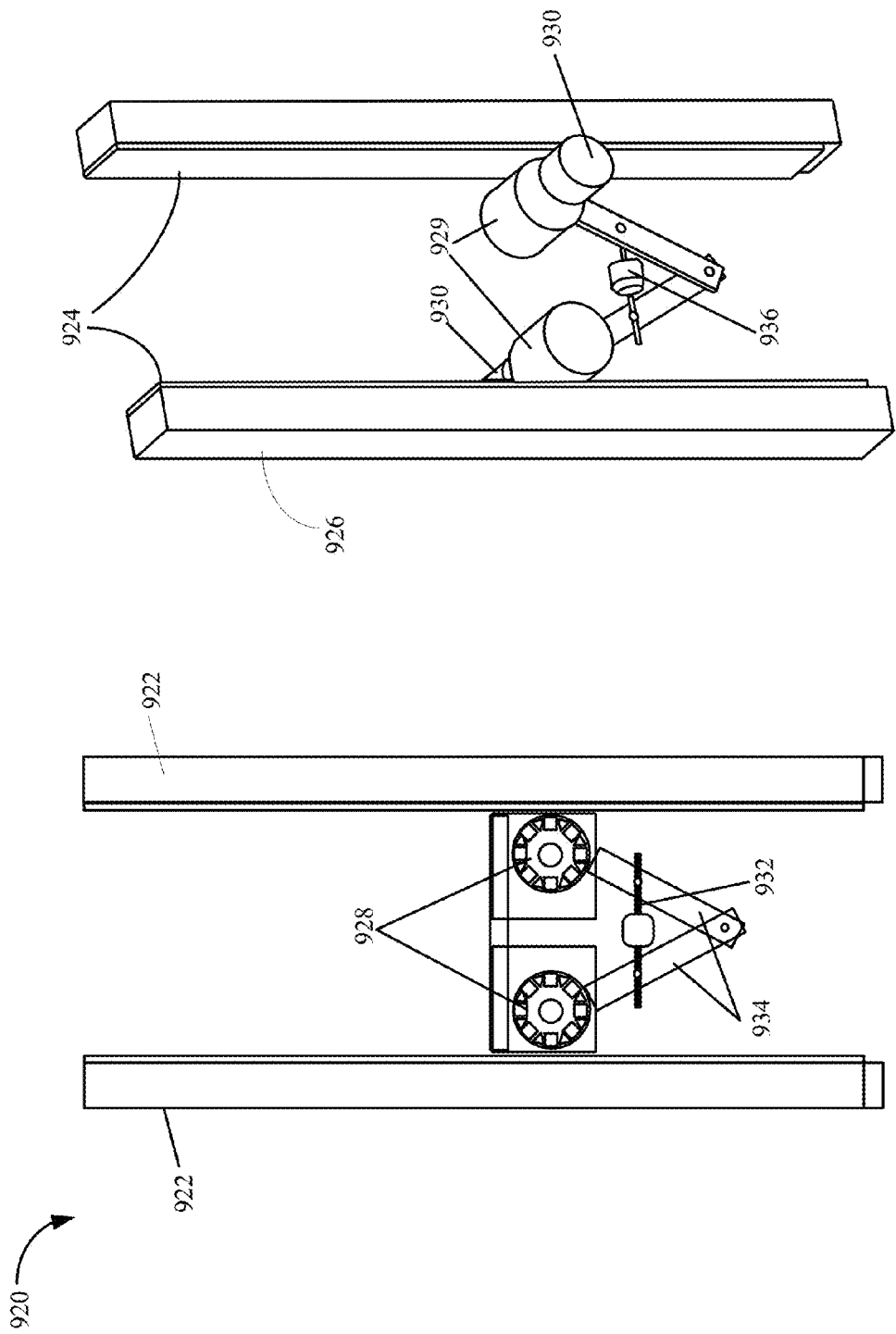

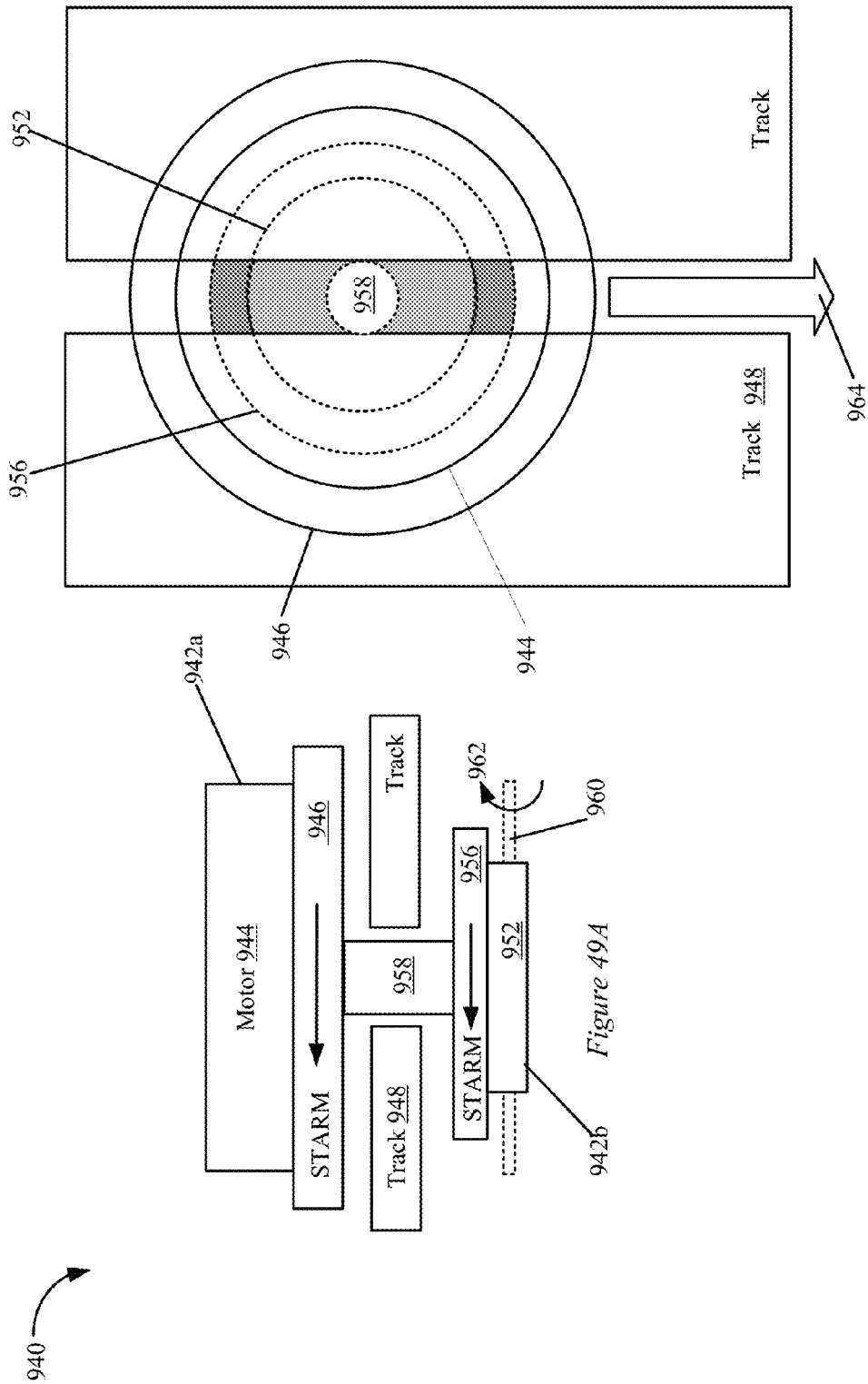

1540

1550

1552

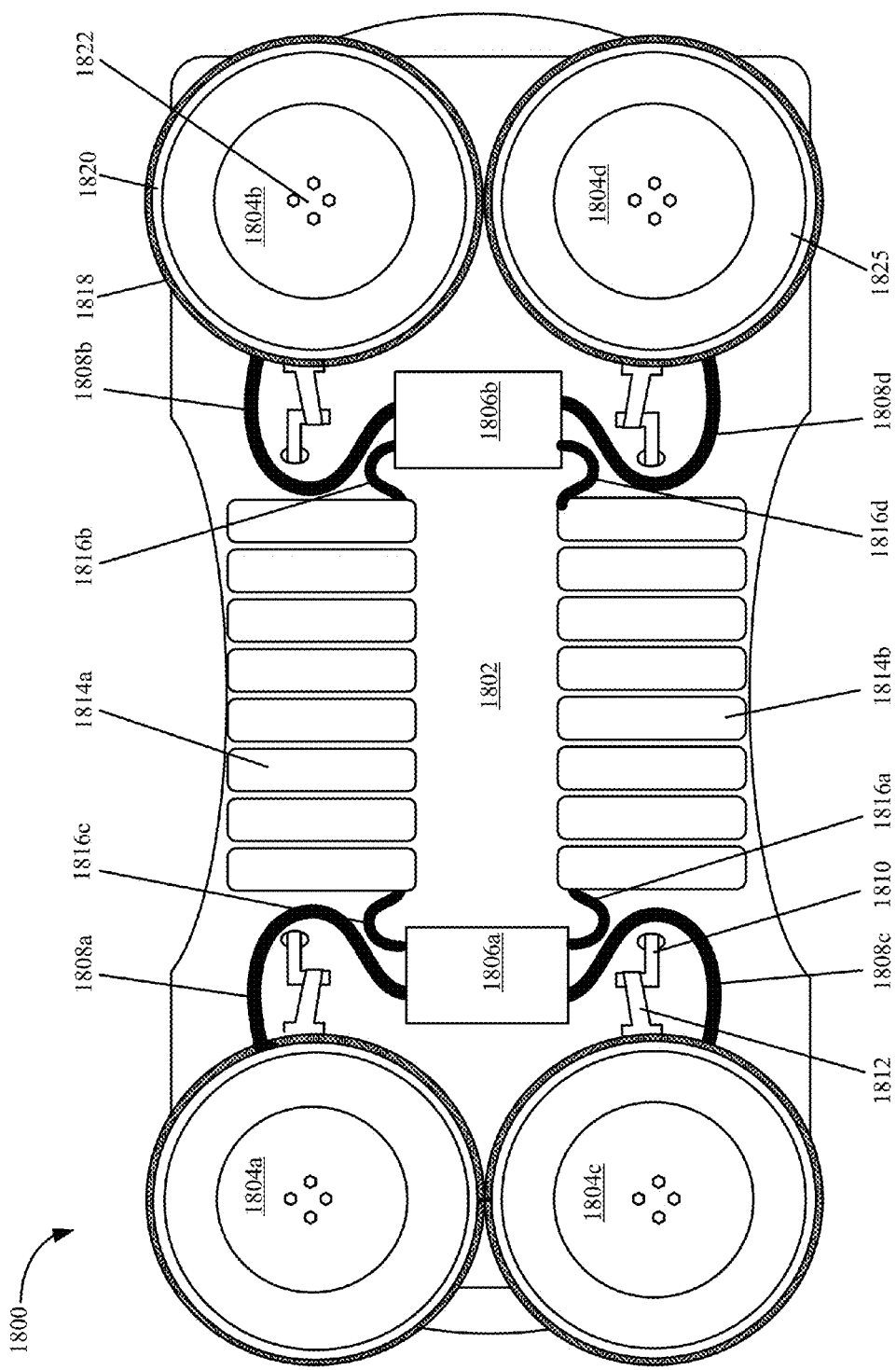

PROPULSION AND CONTROL FOR A MAGNETICALLY LIFTED VEHICLE

CROSS-REFERENCE TO RELATED APPLICATIONS

This patent application claims priority under 35 U.S.C. §119(e) to U.S. Provisional Patent Application No. 62/066,891, filed Oct. 21, 2014, entitled "Hoverboard," by Henderson et al, which is incorporated by reference in its entirety for all purposes herein. This patent application claims priority under 35 U.S.C. §119(e) to United States Provisional Patent Application No. 62/011,011, filed Jun. 11, 2014, entitled "Applications of Magnet Arrangements having a One-sided Magnetic Flux Distribution," by Henderson et al, which is incorporated by reference in its entirety for all purposes herein. This patent application claims priority under 35 U.S.C. §119(e) to United States Provisional Patent Application No. 62/031,756, filed Jul. 31, 2014, entitled "Propulsion and Control for a Magnetically Lifted Vehicle," by Henderson et al, which is incorporated by reference in its entirety for all purposes herein. This application claims priority under 35 U.S.C. §120 and is a continuation-in-part of U.S. patent application Ser. Nos. 14/639,045 and 14/639,047, each titled "Hoverboard" and each filed Mar. 4, 2015, by Henderson et al., each of which are incorporated by references and for all purposes. U.S. patent application Ser. Nos. 14/639,045 and 14/639,047, each claim priority to U.S. Provisional Applications 61/977,045, 62/066,891, 62/011,011 and 62/031,756 and each claim priority to and are a continuations in part of U.S. patent application Ser. No. 14/069,359, entitled "Magnetic Levitation of a Stationary or Moving Object," filed Oct. 31, 2013, by Henderson, which claims priority under 35 U.S.C. §119(e) to U.S. Provisional Patent Application Ser. No. 61/799,695, entitled "Stationary Magnetic Levitation" by Henderson, filed Mar. 15, 2013 each of which are incorporated by reference in their entirety and for all purposes

FIELD OF THE INVENTION

This invention generally relates to electromagnetic levitation systems, and more particularly to devices, which employ electromagnetic levitation.

BACKGROUND

It is well known that two permanent magnets will attract or repulse one another at close distances depending on how the poles of the magnets are aligned. When aligned with the gravitational force vector, magnetic repulsion can be used to counteract gravity and lift an object. For the purposes of lifting an object and then moving it from one location to another location, magnetic repulsion is either unstable or too stable. In particular, opposing magnets can either be aligned such that the object remains in place but then can't be easily be moved to another location or the magnets can be aligned such that the object is easily moveable but won't remain in place but not both.

Another magnetic repulsion effect is associated with generating a moving magnetic field near a conductive object. When a permanent magnet is moved near a conductive object, such as a metal object, eddy currents are established in the conductive object, which generate an opposing magnetic field. For example, when a permanent magnet is dropped through a copper pipe, an opposing magnetic field is generated which significantly slows the magnet as compared to a non-magnetic object dropped through the pipe. As another example, in some types of electric motors, current is supplied to coils which interact with magnets to move the magnets. The moving magnets interact with the coils to induce eddy currents in the coils which oppose the flow of current supplied to the coils.

Magnetic forces including magnetic lift are of interest in mechanical systems to potentially orientate and move objects relative to one another while limiting the physical contact between the objects. One method of generating magnetic lift involves an electromagnetic interaction between moving magnetic fields and induced eddy currents. This approach, using eddy currents, is relatively undeveloped. In view of the above, new methods and apparatus for generating magnetic lift using eddy currents are needed.

SUMMARY

Electromechanical systems using magnetic fields to induce eddy currents in a conductive substrate and generate lift are described. In particular, hover engines are described which rotate a configuration of magnets to induce eddy currents in a conductive substrate where the interaction between the magnets and the induced eddy currents are used to generate lift forces and/or propulsive forces. In one embodiment, to generate propulsive forces, mechanisms are provided which allow an orientation of the configuration of magnets relative to the conductive substrate. The mechanisms enable control of a direction and a magnitude of the propulsive forces.

A vehicle can include a guidance, navigation and control (GNC) system. The GNC system is configured to determine an orientation, position and velocity of a vehicle as a function of time. Based upon this information, the GNC system is configured to generate a guidance solution and implement the guidance solution. The implementation of the guidance solution can include controlling an orientation of the hover engines on a vehicle as a function of time.

In one embodiment, a vehicle with hover capabilities is provided. The vehicle can be generally characterized as including four hover engines, one or more speed controllers, a chassis, four actuators coupled to each of the four hover engines, a GNC system, an inertial measurement unit (IMU) and an on-board electric power source. The four hover engines, the four actuators, one or more speed controllers, the GNC system, the IMU and the on-board electric power source can be coupled to and enclosed within the chassis.

The IMU can be used to determine a position and an orientation of the hover engines. The IMU can utilize accelerometers and gyroscopes. Data measured from the accelerometers and gyroscopes can be sent to the GNC system.

Each of the hover engines can have an electric motor including a winding, a first set of permanent magnets and a first structure which holds the first permanent magnets. Within the motor, an electric current is applied to the winding to cause one of the winding or the first set of permanent magnets to rotate. The rotation of the winding or the first set of permanent magnets can generate a torque which is transferred to second structure, such as via a rotating shaft.

The second structure is configured to receive the rotational torque from the electric motor to rotate the second structure. The second structure can hold a second set of permanent magnets. The second set of permanent magnets are rotated to induce eddy currents in a substrate such that the induced eddy currents and the second set of permanent magnets interact to generate forces which cause the vehicle to hover above and/or translate from location to location along the substrate.

One or more speed controllers can be coupled to the four hover engines. The one or more speed controllers can be configured to control the current flowing to the motors, which controls the rotation rates of the motors. In a particular embodiment, four electronic speed controllers, one for each of the hover engines, can be used.

One or more actuators can be coupled to each of the hover engines. The actuators can be configured to receive commands from a guidance, navigation and control (GNC) system and in response to the commands generate forces which cause the hover engine to rotate relative to the chassis. In one embodiment, the hover engines are each rotated about a separate rotation axis. The hover engines can each independently rotatable relative to the chassis and one another.

The GNC system can be communicatively coupled to controllers, which control operation of the actuators, and an inertial measurement unit (IMU). The GNC system can be configured to receive sensor data from the IMU and generate a guidance solution. The guidance solution can include an orientation and velocity of the vehicle as a function of time. To implement the guidance solution, the GNC system can be configured to generate control commands and send the control commands to the actuators.

The vehicle can include an on-board electric power source that supplies the electric current to the hover engines, the actuators and the GNC system. In one embodiment, the on-board electric power source can be batteries, such as Lithium Polymer batteries. In another embodiment, a combustion motor can be used to turn a generator which outputs electricity.

The GNC system can be communicatively coupled to the one or more speed controllers and configured to communicate with the one or more speed controllers to control a rotation rate of each of the motors. The rotation rate of the motors can cause the second structures including the second set of permanent magnets to turn faster or slower. A faster or slower rate of rotation of the second structures can affect a magnitude of the lift and propulsive forces output from the hover engines.

In particular embodiments, the guidance solution can further include a hover height as a function of time where the GNC system is configured to control one or more of a tilt position of the four hover engines or a lift output of each of the four hover engines to control the hover height as the function of time. Also, the guidance solution can further include an acceleration rate as a function of time where the GNC system is configured to control one or more of a tilt position of the four hover engines to generate the acceleration rate as the function of time. Yet further, the guidance solution can includes an angle orientation of the vehicle as a function of time where the GNC system is configured to control one or more of a tilt position of each of the four hover engines or a lift output of each of the four hover engines to control the angle orientation of the vehicle as the function of time.

In other embodiments, GNC system is further configured to control the actuators to rotate the vehicle in place while the vehicle remains in approximately over a first position on the substrate. Further, the GNC system can be configured to simultaneously rotate and translate the vehicle. In one embodiment, the GNC system can control the vehicle to move up or down an inclined substrate or hold its position on the inclined substrate. While the vehicle is hovering in a stationary position, the GNC system can be configured to control the actuators to move the vehicle in a first linear direction and then to move the vehicle in a second linear direction perpendicular to the first linear direction without rotating the vehicle prior to the movement in the second linear direction.

In other embodiments, the GNC system can be configured to communicate, via a wired or wireless communication interface, with a mobile control unit. For example, the mobile control unit can be a smart phone. The GNC system can be configured to receive a directional input command from the mobile control unit and in response generate control commands for each of the actuators to implement to the directional input commands.

The four hover engines can each be configured to rotate around an axis where a rotation about the axis causes the hover engine to tilt relative to the chassis of the vehicle. In one embodiment, the first rotation axis of the first hover engine is orientated at an angle of ninety degrees relative to the second rotation axis of the second hover engine, the first rotation axis is orientated at an angle of ninety degrees relative to the third rotation axis of the third hover engine, the first rotation axis is parallel to the fourth rotation axis of the fourth hover engine and where the second rotation axis is parallel to the third rotation axis. In another embodiment, the first rotation axis of the first hover engine is orientated at an angle relative to the second rotation axis of the second hover engine, the first rotation axis is orientated at one hundred eighty degrees minus the angle relative to the third rotation axis of the third hover engine, the first rotation axis is parallel to the fourth rotation axis of the fourth hover engine and the second rotation axis is parallel to the third rotation axis.

The hover engines can each be configured to rotate through an angle range about their rotation axes. In one embodiment, the angle range is at least twenty degrees. In one embodiment, the same angle range can be used for all of the hover engines. In yet other embodiments, the same magnet configuration of the second set of permanent magnets, including a volume of magnets and a polarity arrangement pattern is used on each of the first, second, third and fourth hover engines, can be used.

In further embodiments, a fifth hover engine and a fifth actuator coupled to the chassis and configured to rotate the fifth hover engine relative to the chassis can be used. Alternatively, the fifth hover engine can be secured in a fixed orientation relative to the chassis. In some instances, the fifth hover engine can be configured to output more lift than either of the first hover engine, the second hover engine, the third hover engine or the fourth hover engine.

BRIEF DESCRIPTION OF THE DRAWINGS

The included drawings are for illustrative purposes and serve only to provide examples of possible structures and process steps for the disclosed inventive systems and methods. These drawings in no way limit any changes in form and detail that may be made to the invention by one skilled in the art without departing from the spirit and scope of the invention.

FIGS. 42 to 44 are illustrations of block diagrams and equations associated with a guidance, navigation and control system in accordance with the described embodiments.

FIGS. 48A to 49B are illustrations of systems which uses hover engines to move a payload along a vertical or horizontally oriented track in accordance with the described embodiments.

FIG. 87 is a plot of numerical predictions of lift and thrust versus height as a function of tilt angle for a circularly arranged magnet configuration.

FIG. 114 is a bottom view of a vehicle configuration includes four hover engines in accordance with the described embodiments.

DESCRIPTION OF THE PREFERRED EMBODIMENTS

Figure 1:
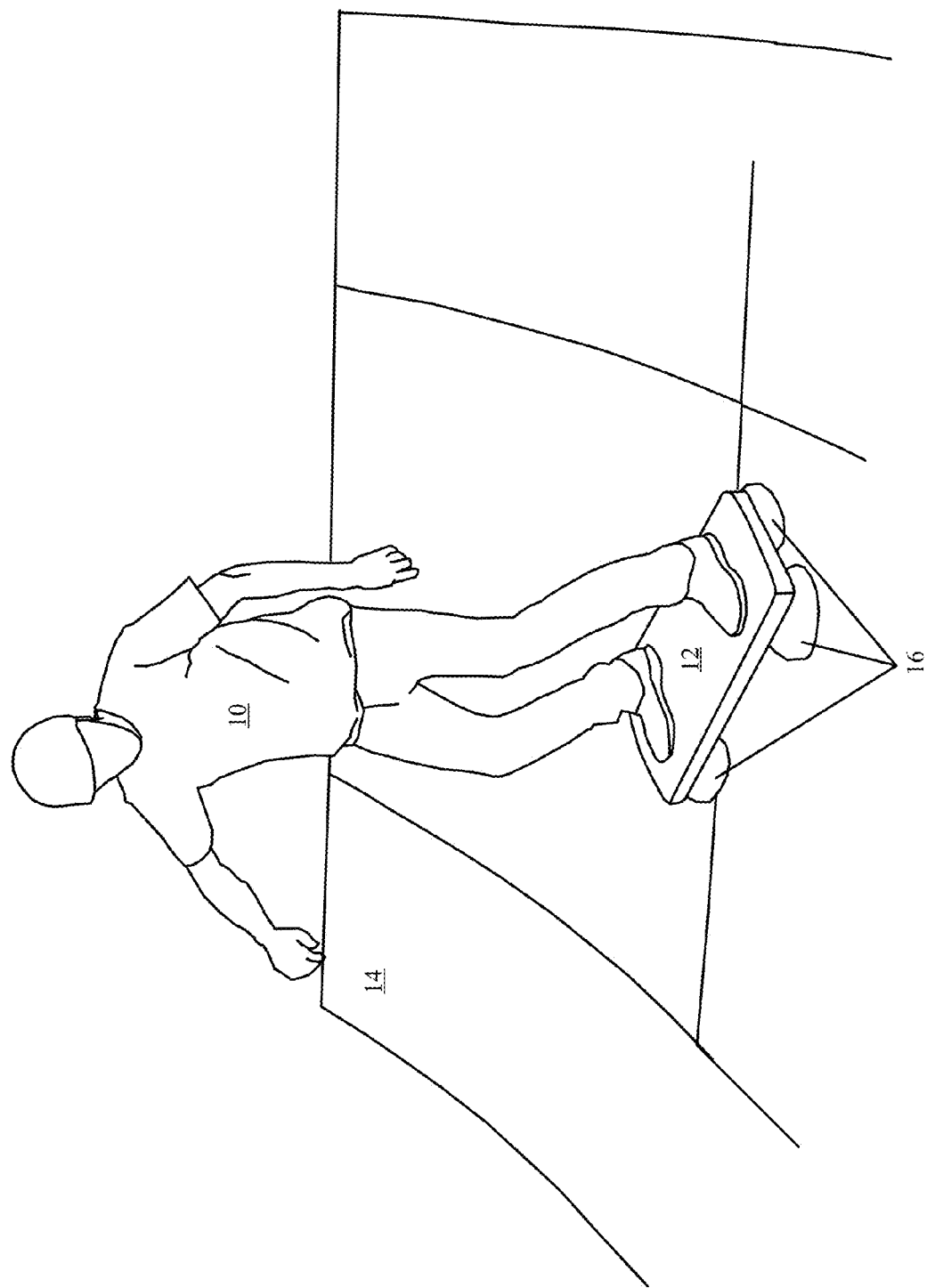
FIG. 1 is an illustration of a person riding a hoverboard in accordance with the described embodiments.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The various embodiments described herein are grouped into a number of different sections. In a first section, a titled, "Magnetic Lift System Overview," electromechanical systems which induce eddy currents to generate lift are generally described. FIGS. 1 to 4C are included in the section. In a second section, titled, "Hover Engine Configurations including Lift and Drag Control," various methods and apparatus for generating and controlling magnetic lift and drag are described. This section includes FIGS. 5A-20. In a third section, titled, "Track Configurations," some features of tracks, which can include a conductive substrate in which eddy currents are induced, are described. This section includes FIGS. 21-24.

Next, in a fourth section, titled, "Magnetic Lift and Propulsion," details involving propulsion of vehicles using hover engines are described. In particular, an orientation of one or more STARMs can be changed relative to a substrate to generate propulsive and/or control forces. This section includes FIGS. 25A-34B.

Next, in a fifth section, titled, "Vehicle Configurations and Navigation, Guidance and Control (NGC), arrangements of hover engines and then their actuation to provide movement are described. Next, Navigation, Guidance and Control (NGC) functions, which can be applied to magnetically lifted devices, are discussed. This section includes FIGS. 35 to 44.

In a fifth section, titled, "Applications," various applications, which utilize hover engines, are described. For example, this section includes 1) an application where a hover engine is used to drive and control a wheel, 2) a hybrid vehicle configured to hover or ride on wheels, 3) a room which provides signal isolation from an outside environment, 4) hover engines configured to move along a track, 5) launch assist for an aircraft, 6) a device which can be used to perform work on a ship, 7) train and track configuration and 8) printing. This section includes FIGS. 45A to 62B.

In a sixth section, titled, "Magnet Configurations and Performance Comparisons," various magnet configurations which can be used in hover engines are described. Lift predictions are generated for a number of the configurations and a comparison is made to experimental data. This section includes FIGS. 63-113.

Finally, in a seventh section, titled, "Flight Data," two vehicle configurations and test data measured during flight are described. The data is presented in two tables. The section includes FIG. 114.

Magnetic Lift System Overview

With respect to FIGS. 1 to 4C, some general examples and operating principles of a magnetic lift system are described. In particular, a hoverboard system configured to lift and propel a rider is discussed. The hoverboard system can include a hoverboard having hover engines and a substrate on which the hoverboard operates. The substrate can include a conductive portion in which eddy currents are induced. The electromagnetic interaction between the device which induces the eddy currents and the induced eddy currents can be used to generate electromagnetic lift and various translational and rotational control forces.

A hoverboard is one example of an electromechanical system which generates forces, such as lift, via an interaction between a moving magnetic field source (e.g., permanent magnets) and induced eddy currents. FIG. 1 is an illustration of a person 10 riding a hoverboard 12. In one embodiment, the hoverboard includes four hover engines, such as 16. The hover engines 16 generate a magnetic field which changes as function of time. The time varying magnetic field interacts with a conductive material in track 14 to form eddy currents. The eddy currents and their associated magnetic fields and the magnetic fields from the hover engine interact to generate forces, such as a lifting force or a propulsive force. Examples of eddy currents which can be generated are described with respect to FIGS. 2 and 3. Lift and drag associated with induced eddy currents is described with respect to FIGS.

4A-4C. Further details of magnet configurations, eddy current patterns, lift predictions and comparison to experimental data are described below with respect FIGS. 63 to 114.

In FIG. 1, the track 14 is formed from copper. In particular, three one eighth inch sheets of copper layered on top of one another are used. Other conductive materials and track configuration can be used. Thus, a track formed from copper sheets is described for the purposes of illustration only. Curved surfaces may be formed more easily using a number of layered thin sheets. For example, a half-pipe can be formed. In FIG. 1, a portion of a half-pipe is shown. The track 14 can include various sloped and flat surfaces and the example of half-pipe is provided for illustrative purposes only.

The thickness of the conductive material which is used can depend on the material properties of the conductive material, such as its current carrying capacity and the amount of magnetic lift which is desired. A particular hover engine, depending on such factors, as the strength of the output magnetic field, the rate of movement of the magnetic field and the distance of the hover engine from the surface of a track can induce stronger or weaker eddy currents in a particular track material. Different hover engines can be configured to generate different amounts of lifts and thus, induce stronger or weaker eddy currents.

The current density associated with induced eddy currents in the material can be a maximum at the surface and then can decrease with the distance from the surface. In one embodiment, the current density which is induced at the surface can be on the order of one to ten thousand amps per centimeter squared. As the conductive material becomes thinner, it can reach a thickness where the amount of current potentially induced by the hover engine is more than the conductive material can hold. At this point, the amount of magnetic lift output from the hover engine can drop relative to the amount of lift which would be potentially generated if the conductive material was thicker. This effect is discussed in more detail with respect to FIG. 4C.

As the thickness of the material increases, the induced currents become smaller and smaller with increasing distance from the surface. After a certain thickness is reached, additional material results in very little additional lift. For the hover engines used for the hoverboard 12, simulations indicated that using ½ inch of copper would not produce much more lift relative to using ⅜ inch of copper.

For the device shown in FIG. 1, simulations predicted that using only ⅛ inch sheet of copper would significantly lower the lift versus using a half inch of copper. Finite element analysis to solve Maxwell's equations was used. In particular, Ansys Maxwell (Ansys, Inc., Canonsburg, Pa.).

In various embodiments, the amount of copper which can be used varied depending on the application. For example, for a small scale model of a hoverboard configured to carry a doll, a ⅛ inch sheet of copper may be more than sufficient. As another example, a track with a thinner amount of conductive material can lead to less efficient lift generation as compared to track with a thicker amount of a more conductive material. However, the cost of the conductive material can be traded against the efficiency of lift generation.

A substrate 14 can include a portion which is configured to support induced eddy currents. In addition, it can include portions used to add mechanical support or stiffness, to provide cooling and/or to allow a track portions to be assembled. For example, pipes or fins can be provided which are configured to remove and/or move heat to a particular location. In another example, the substrate 14 can be formed as a plurality of tiles which are configured to interface with one another. In yet another example, the portion of the substrate 14 which is used to support the induced eddy currents may be relatively thin and additional materials may be added to provide structural support and stiffness.

In various embodiments, the portion of the substrate 14 used to support induced eddy currents may be relatively homogenous in that its properties are substantially homogeneous in depth and from location to location. For example, a solid sheet of metal, such as silver, copper or aluminum can be considered substantially homogenous in it's in depth properties and from location to location. As another example, a conductive composite material, such as a polymer or composite, can be used where the material properties on average are relatively homogeneous from location to location and in depth.

In other embodiments, the portion of the substrate 14 used to support the induced eddy currents can vary in depth but may be relatively homogeneous from location to location. For example, the portion of the substrate 14 which supports the eddy currents can be formed from a base material which is doped with another material. The amount of doping can vary in depth such that the material properties vary in depth.

In other embodiments, the portion of the substrate 14 which supports the eddy currents can be formed from layers of different materials. For example, an electric insulator may be used between layers of a conductive material, such as layers of copper insulated from one another. In another example, one or more layers of a ferromagnetic material can be used with one or more paramagnetic materials or diamagnetic materials.

In yet another example, the surface of the substrate 14 which supports the eddy currents can include a surface structure, such as raised or sunken dimples which effect induced eddy currents or some other material property. Thus, from location to location there may be slight variations in material properties but averaged over a particular area the material properties may be relatively homogeneous from location to location.

In one embodiment, the person can control the hoverboard 12 by shifting their weight and their position on the hoverboard. The shift in weight can change the orientation of one or more of the hover engines 16 relative to the surface of the track 14. The orientation can include a distance of each part of the hover engine from the track. The orientation of each hover engine, such as 16, relative to the surface of the track can result in forces parallel to the surface being generated.

The net force from the hover engines 16 can be used to propel the vehicle in a particular direction and control its spin. In addition, the individual may be able to lean down and push off the surface 14 to propel the hoverboard 12 in a particular direction or push and then jump onto to the hoverboard 12 to get it moving in a particular direction. Additional details of hoverboards are described in U.S. patent application Ser. Nos. 14/639,045 and 14/639,047, entitled, "Hoverboard," previously incorporated herein.

Figure 2:
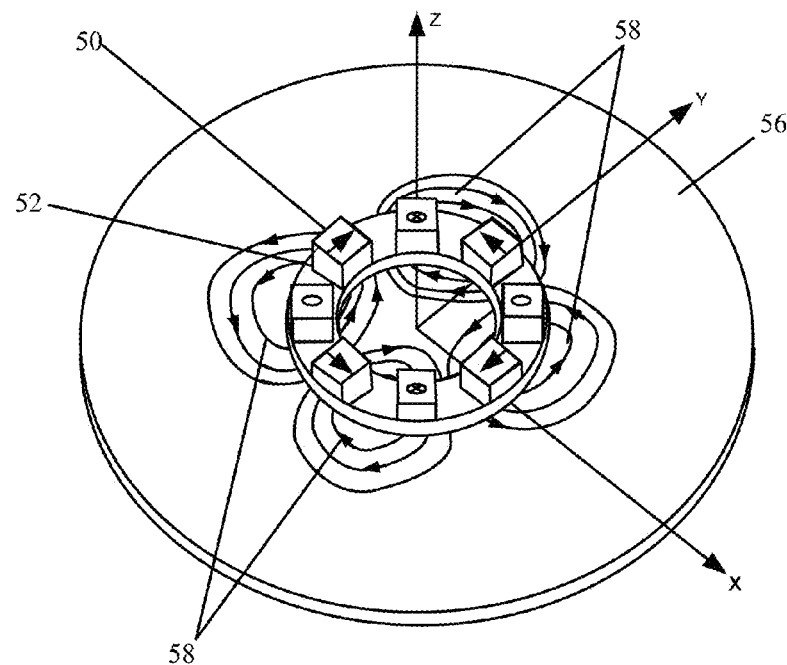
FIGS. 2 and 3 are illustrations of eddy currents generated on a conductive plate in response to arrangements of magnets rotated above the plates in accordance with the described embodiments.
Figure 3:
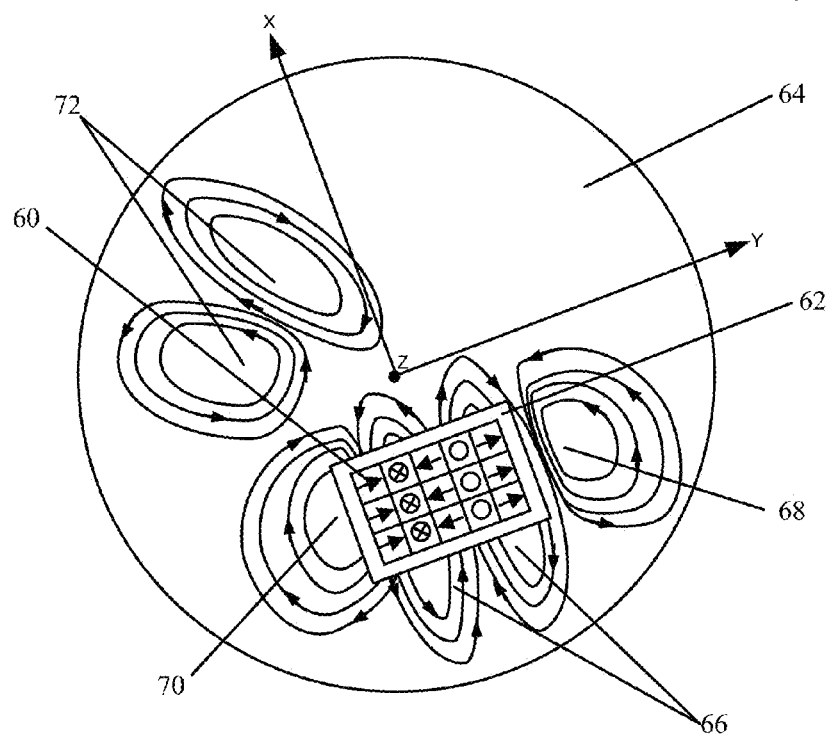

Next, a few examples of magnet arrangements, which can be used with a hover engine, are described with respect to FIGS. 2 and 3. FIGS. 2 and 3 are illustrations of eddy currents generated on a conductive plate in response to arrangements of magnets rotated above the plates. The conductive plate is the portion of the substrate which is configured to support induced eddy currents. The eddy currents and associated forces which are generated were simulated using Ansys Maxwell 3D (Canonsburg, Pa.). In each of the simulations, an arrangement of magnets is rotated at 1500 RPM at ½ inches height above copper plates 56 and 64, respectively. The copper plates are modeled as ½ inch thick. The plate is modeled as being homogeneous in depth and from location to location. The width and length of the plate is selected such that edge effects that can occur when a STARM induces eddy currents near the edge of the plate are minimal.

The magnets are one inch cube Neodymium alloy magnets of strength N50, similar magnets can be purchased via K and J magnetics (Pipersville, Pa.). The magnets weigh about 3.6 ounces each Magnets of different sizes, shapes and materials can be utilized and this example is provided for the purpose of illustration only.

In FIG. 2, eight one inched cube magnets, such as 50, are arranged with an inner edge about two inches from the z axis. The magnets are modeled as embedded in an aluminum frame 52. The arrow head indicates the north pole of the magnets. The polarities of four of the magnets are perpendicular to the z axis. The open circle indicates a north pole of a magnet and circle with an x indicates a south pole of a magnet. A polarity pattern involving four magnets is repeated twice.

In various embodiments, the polarity pattern of the magnets shown in the figure can be repeated one or more times. One or more magnets of different sizes and shapes can be used to form a volume of magnets which match a polarity direction associated with a polarity pattern. For example, two one half inch wide rectangular magnets with a total volume of one cubic inch or two triangular magnets with a total volume of one cubic inch can be aligned in the same direction to provide a polarity direction in a polarity pattern. In the polarity pattern, a magnets with a polarity direction different than an adjacent magnet may touch the adjacent magnet or may be separate from the adjacent magnet.

For a given number of magnets of a particular cubic size, the distance from the z axis of the face of the magnets can be adjusted such that the magnet's edges are touching or are a small distance apart. With this example using eight magnets, an octagon shape would be formed. A configuration of twenty one inch cube magnets arranged around a circle with the polarity pattern is described below. The inner edge of this arrangement of magnets is about 3.75 inches from the rotational axis.

When the magnets are brought together, the magnitude of the lift and drag which is generated per magnet can be increased relative to when the magnets are spaced farther apart. In one embodiment, trapezoidal shaped magnets can be utilized to allow the magnets to touch one another when arranged around a rotational axis. A different trapezoidal angle can be used to accommodate different total number of magnets, such as four magnets (90 degrees), eight magnets (45 degrees), etc.

A combination of rectangular and triangular shaped magnets can also be used for this purpose. For example, triangular magnets can be placed between the cubic magnets shown in FIG. 2. In one embodiment, the polarity pattern for groups of four trapezoidal magnets or combinations of rectangular and triangular magnets can be similar to what is shown in FIG. 2.

When the arrangement of eight magnets is rotated above the copper plate, eddy currents are induced in the copper. In the example of FIG. 2, the simulation indicates four circular eddy currents 56 are generated. The four eddy currents circle in alternating directions and are approximately centered beneath the circulating magnets.

An electromagnetic interaction occurs where the circulating eddy currents generate a magnetic field which repels the arrangement of magnets such that lifting forces and drag forces are generated. As described above, the center position of the eddy currents rotate as the magnets rotate (This rotation is different from the rotation of the circulating current which forms each eddy current). However, the eddy currents are not directly underneath the four magnets aligned with the z axis. Thus, the eddy currents can generate a magnetic field which attracts one of the poles of permanent magnets to which it is adjacent. The attractive force can act perpendicular to the lift to produce drag, which opposes a movement of the magnets. The drag can also be associated with a torque. The drag torque is overcome by an input torque supplied by a motor coupled to the arrangement of magnets.

In a simple example, a current circulating in a circular coil generates a magnetic field which looks like a magnetic field of a bar magnet where the orientation (north/south) depends on the direction of the current. The strength of the magnetic field which is generated depends on the area of the circular coil and the amount of current flowing through the coil. The coil constrains the locations where the current can flow.

In this example, there are not well defined circuits. Thus, one eddy current can interact with an adjacent eddy current. The interaction causes the magnitude of the current to increase at the interface between eddy currents such that magnitude of the current varies around circumference of each eddy current. Further, the current also varies in depth into the material with the greatest current per area occurring at the surface and then decreasing in depth in to the surface.

In addition, unlike circuits with a fixed position, the center of the eddy currents rotate as the magnets inducing the currents rotates. Unlike when a magnetic is moved linearly over a conductive material, separate eddy current forms in front of and behind the magnet. In this example, the four poles (magnets with north and south perpendicular to the surface of the plate) are close enough such that the eddy current formed in front of one pole merges with the eddy current formed behind the next adjacent pole. Thus, the number of eddy currents formed is equal to the number of poles which is four. In general, it was observed for this type of configuration that the number of eddy currents which formed was equal to the number of poles used in the magnet configuration.

Further, material interfaces can affect the induced eddy currents such that an amount of lift and drag which is generated is different near the interfaces as opposed to away from the interfaces. For example, a surface on which eddy currents are induced can have edges where the material which supports the induced eddy currents ends. Near the boundaries, when a STARM approaches an edge, the eddy currents tend to get compressed which affects the resultant lift and drag.

In another example, a surface can have interfaces through which there are discontinuities in the conductivity. For example, edges of two adjacent copper sheets used to form a surface may not touch, may partially touch or may be conductively insulated from one another. The discontinuous conductivity can lessen or prevent current from flowing across the interface which affects the lift and drag generated from the induced eddy currents.

In one embodiment, a substrate which supports induced eddy currents can be formed from a number of sheets which are stacked in layers, such ⅛ inch copper sheets stacked on top of one another. A discontinuity may be formed in one layer where two adjacent sheets meet, such as small gaps between the two sheets which reduce the current which flows from a first sheet to an adjacent second sheet. The gaps may allow for thermal expansion and simplify the assembly process. To lessen the effect of the discontinuity, adjacent edges between sheets can be staggered from layer to layer. Thus, the discontinuity at particular location may occur in one layer but not the other adjacent layers.

In some instances, a conductive paste can be used to improve the conductivity between sheets. In another embodiment, adjacent sheets can be soldered together. In yet another embodiment, flexible contacts, which can be compressed and then expand, can be used to allow current to flow between different sheets.

In FIG. 3, a three row by five column array of one inch cube magnets, such as 60, is rotated above a copper plate. The arrays could also be using a single magnet in each row. The magnets are modeled as surrounded by an aluminum frame 62. The magnets in this example are configured to touch one another. A magnet pattern for each row of five magnets is shown. In alternate embodiment, a five magnet pattern of open circle, left arrow (pointing to open circle), circle with an "x", right arrow (pointing away from circle with an x) and open circle can be used. This compares to the left arrow, circle with an "x", left arrow, open circle and right arrow pattern shown in the Figure.

The magnet pattern is the same for each row and the magnet polarity is the same for each column. In various embodiments, a magnet array can include one or more rows. For example, a magnet array including only one row of the pattern shown in FIG. 3 can be used.

Multiple arrays with one or more rows can be arranged on a rotating body, such that the rotating body is balanced. For example, magnet arrays of two, three, four, etc. arrays of the same number of magnets can be arranged on a rotating body. In another embodiment, two or more pairs of magnet arrays with a first number of magnets and two or more pairs of magnets arrays with a second number of magnets can be arranged opposite one another on a rotating body.

In the example of FIG. 3, two eddy currents, 66, are generated under the magnet array and two eddy currents 70 and 68 are formed ahead and behind the array. These eddy currents move with the array as the array rotates around the plate. As the array is moved over the plate 64, eddy currents, such as 72 spin off. The eddy currents 66, 68 and 70 generate magnetic fields which can cause magnetic lift and drag on the array. When two of these types of arrays placed close to one another, the simulations indicated that the eddy current induced from one array could merge with the eddy current induced from the other array. This effect diminished as the arrays were spaced farther apart.

In the examples of FIGS. 2 and 3, the simulations indicated that more lift force was generated per magnet in the configuration of FIG. 3 as compared to FIG. 2. Part of this result is attributed to the fact that a portion of the magnets in FIG. 3 is at a greater radius than the magnets in FIG. 2. For a constant RPM, a greater radius results in a greater speed of the magnet relative to the conductive plate which can result in more lift.

The lift per magnet can be total lift divided by the total magnet volume in cubic inches. For one inch cube magnets, the volume is one cubic inch. Thus, the total number of magnets is equal to the volume in cubic inches. Hence, the use of lift force per magnet in the previous paragraph. The use of total lift divided by the magnet volume of a magnet arrangement provides one means of comparing the lift efficiency of different magnet arrangements. However, as noted above, the speed of the magnet relative to the substrate, which is a function of radius and RPM, effects lift and hence may be important to consider when comparing magnet configurations.

In FIGS. 2 and 3, a portion of the magnet poles in the magnet polarity pattern are aligned such that the poles are parallel to an axis of rotation of the STARM (The poles labeled with "x" or "o" in the Figures). When the bottom of a STARM is parallel to a surface which supports the induced eddy currents, the portion of the magnet poles and the axis of rotation are approximately perpendicular to the surface.

In this configuration, to interact with a surface, a STARM can be rotated on its side, like a tire riding on a road, where the axis of rotation is approximately parallel to the surface. In particular embodiments, a mechanism, such as an actuator, can be provided which can dynamically rotates one or more of the magnet poles (again, "x" and "o" labeled magnets) during operation. For example, the magnet poles shown in FIGS. 2 and 3 may be rotatable such that they can be moved from an orientation where they are perpendicular to the surface as shown in FIGS. 2 and 3 to an orientation where they are parallel to the surface and back again. When the magnets are turned in this manner, the amount of lift and drag which are generated can be reduced. In additional embodiments, fixed magnet configurations can be utilized where the magnet poles shown in FIGS. 2 and 3 are rotated by some angle between zero and ninety degrees relative to their orientation in the FIGS. 2 and 3.

Figure 4A:
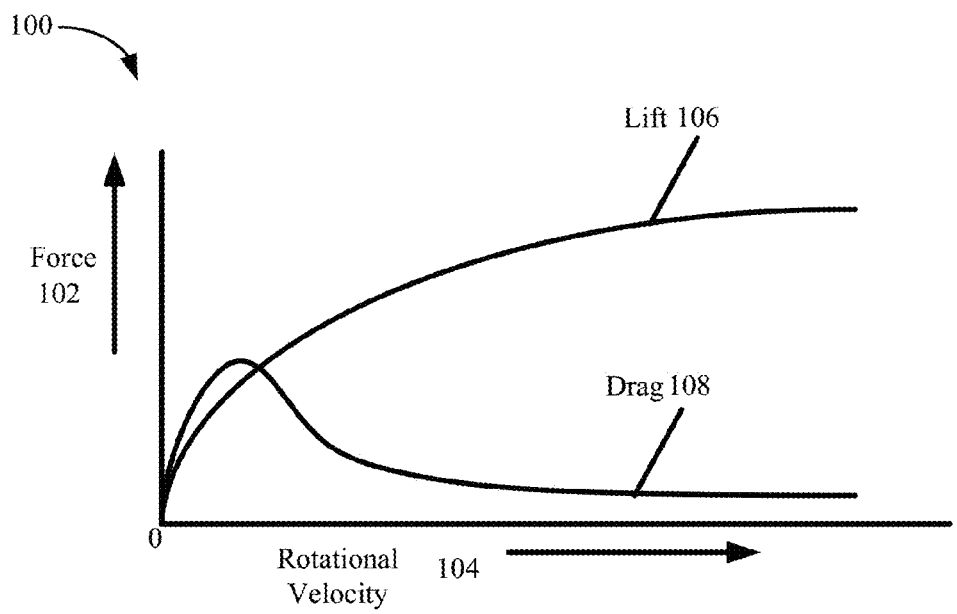
FIG. 4A is a plot of lift and drag curves associated with an arrangement of rotating magnets in accordance with the described embodiments.

FIG. 4A includes a plot 100 of lift 106 and drag 108 curves associated with an arrangement of rotating magnets in accordance with the described embodiments. The curves are force 102 versus rotational velocity 104. The curves can be determined via experimental measurements and/or simulations. It is noted the magnetic lift and drag is separate from any aerodynamic lift and drag which may be associated with the rotation of magnet arrangement associated with hover engine.

Although not shown, an amount of torque can be determined and plotted. As shown in FIG. 2, an array of magnets can be radially symmetric. In some instances, such as when a radially symmetric array is parallel to the conductive substrate, the net drag force may be zero. Nevertheless, a torque which opposes the rotation of the array is generated. The rotational input from a motor can be used to overcome the torque.

As shown in FIG. 4A, the magnetic drag increases as velocity increases, reaches a peak and then starts to decrease with velocity. Whereas, the magnetic lift increases with velocity. The velocity can be the velocity of the magnets relative to the surface which induces the eddy. When the magnets are rotating, this velocity is product of a distance from the axis of rotation times the angular velocity. The velocity can vary across a face of a magnet as distance from the axis of rotation varies across the face of the magnet.

In various simulations of a magnet configuration shown in FIG. 3, the most drag was observed to occur between 250 and 350 RPM. However, the amount of drag including its peak can depends on such variables as the size and the shape of the magnets, a distance of the magnets from the substrate in which the eddy currents are induced, a speed of the magnets relative to the substrate which changes as a function of radius and a thickness of the substrate and a strength of the magnets. Also, for an arrangement of a plurality of magnets, the arrangement of their poles and spacing relative to one another can affect both the lift and drag, which is generated. Thus, the value range is provided for the purposes of illustration only.

Figure 4B:
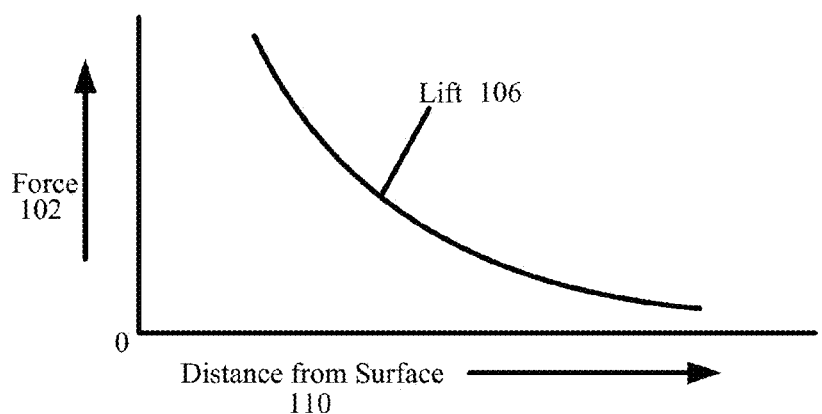
FIG. 4B is a plot of lift associated with an arrangement of rotating magnets as a function of distance from a conductive substrate in accordance with the described embodiments.

FIG. 4B is a plot of force 102 associated with an arrangement of rotating magnets as a function of distance 110 from a conductive substrate. In this example, a configuration of magnets similar to shown in FIG. 3 was simulated. The plot is based upon a number of simulations at a constant RPM. The lift appears to follow an exponential decay curve as the distance from the surface 110 increases.

Figure 4C:
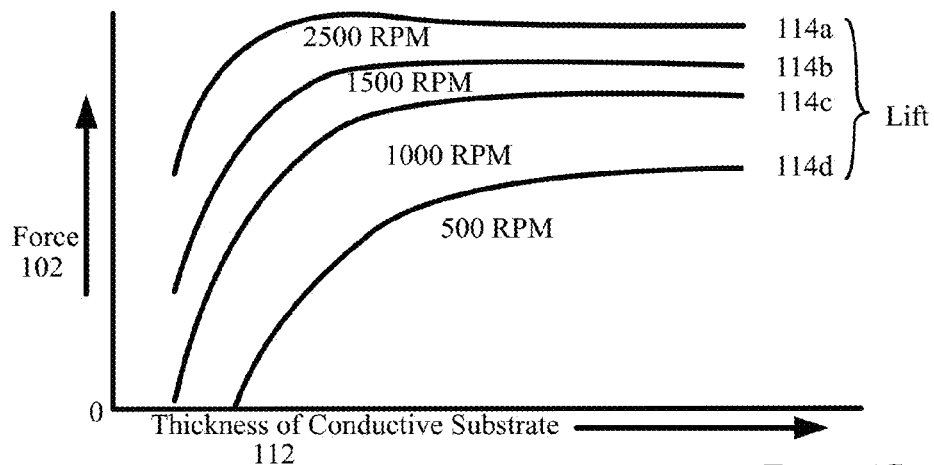
FIG. 4C is a plot of lift curves associated with an arrangement of rotating magnets as a function a thickness of a conductive substrate and RPM in accordance with the described embodiments.

FIG. 4C is a plot of lift curves associated with an arrangement of rotating magnets as a function a thickness of a conductive substrate and RPM. In this example, a configuration similar to what is shown in FIG. 3 was used. The conductive substrate is copper and thickness of the copper is varied between 0.05 and 0.5 inches in the simulation.

The simulations predicted that the amount of generated lift begins to decrease after a certain threshold thickness of copper is reached and is relatively constant above the threshold. The location of the threshold varies as a function of RPM. It may also vary according to the magnet configuration. In one simulation, negative lift was predicted, i.e., an attractive force was generated when the thickness was thin enough.

Hover Engine Configurations Including Lift and Drag Control

Figure 5A:
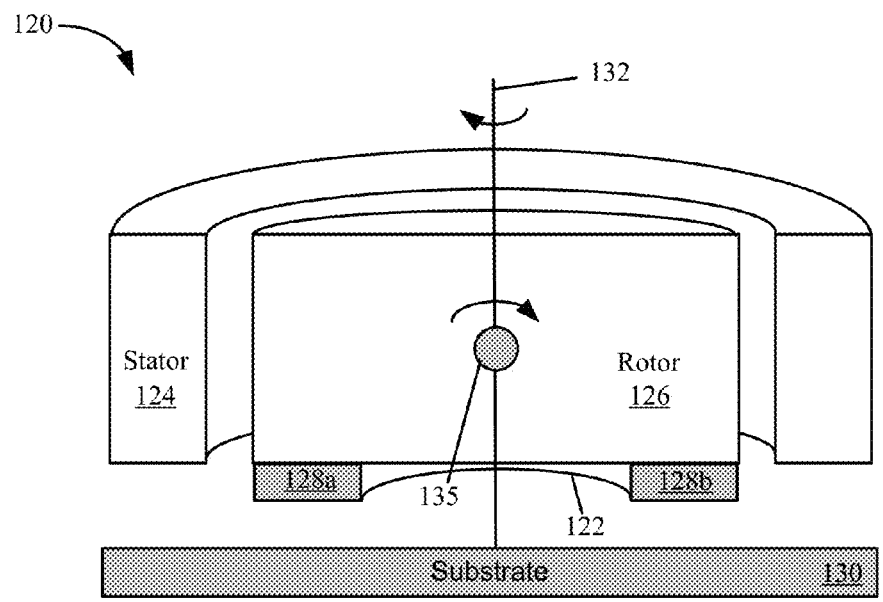
FIGS. 5A and 5B are diagrams illustrating hover engines in accordance with the described embodiments.

Next, details of hover engines are described with respect to FIGS. 5A-20. In particular, various methods and apparatus for generating and controlling magnetic lift and drag are described. In one embodiment, as shown in FIG. 5A, a STARM, such as 122, can be integrated with a motor to form a hover engine 120. A motor can include a stator 124 and rotor 126. In operation, a DC or AC current is applied to coils in the stator 124, which causes the rotor 126 to turn or a DC or AC current is applied to coils in the rotor 126 which causes the rotor to turn about axis 132. One of the stator 124 or the rotor 126 can include permanent magnets which interact with a magnetic field generated in response to the application of the AC or DC current to the coils.

A second set of permanent or electromagnets, such as 128a or 128b, can be coupled to the motor which are used to generate magnetic lift. The second set of magnets is not used to turn the motor. As described above, the second set of magnets, when coupled to the rotor, which is rotating, can generate a moving magnetic field, which induces an eddy current in a substrate 130. The eddy current can cause an opposing magnetic field which results in a lifting and drag force that acts upon the hover engine 120.

In the example of FIG. 5A, the rotor 126 is inside the stator 124. An arrangement of lift generating magnets is arranged on the bottom of the rotor 126. In alternate embodiments, the lift generating magnets can be arranged on the top and the bottom of the rotor. For example, this arrangement could allow a hover engine 120 to hover between two substrate sheets, which are flat or curved.

Figure 5B:
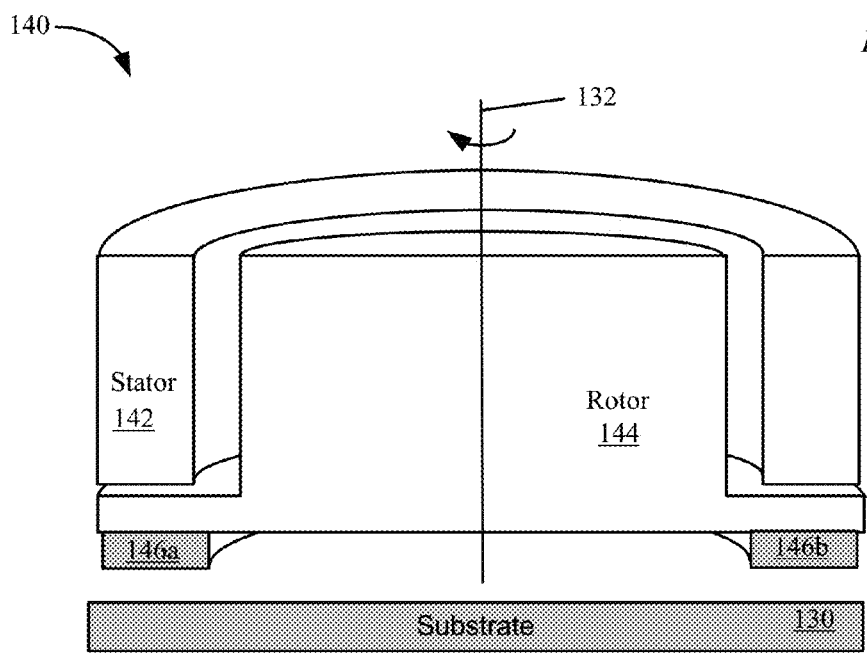

In FIG. 5A, the lift generating magnets, such as 128a and 128b, are inside the radius of the stator 124. In another embodiment, as shown in FIG. 5B, the hover engine 140 includes lift generating magnets, such as 146a and 146b, which are at approximately the same radius of the stator 142, as a portion of the rotor 144 extends below the stator 142. In general, arrangements of magnets can be located within the radius of the stator, at the same radius of the stator, outside the arrangement of the stator or combinations thereof.

In the example of FIG. 5A, the magnetic fields associated with the turning of the motor are orientated differently than the magnetic fields associated with generating magnetic lift. In particular, the magnetic fields associated with the stator 124 and the rotor 126 are configured to generally point toward one another to generate an efficient interaction which turns the rotor. Whereas, the magnetic fields associated with the lift generating magnets, such as 128a and 128b, will be generally directed toward the substrate to induce eddy currents in the substrate 130.

In particular embodiments, a mechanism can be provided, which changes an orientation of the lift generating magnets relative to the substrate 130, to introduce a tilt angle. For example, the stator 124, rotor 126 and lifting magnets, such as 128a and 128b, can be tilted as a unit about axis 135 using an actuator of some type. The change in the tilt angle of the lifting magnets relative to the substrate 130 can cause a force imbalance. The force imbalance can result in a propulsive force which can be used to propel a vehicle. For example, the propulsive force can be used to translate a vehicle along the substrate 130 in a desired direction.

In another embodiment, the STARM 122 and rotor 126 can be configured to tilt relative to both the stator 124 and the substrate 130. For example, the rotor 126 can be tilted around the axis of rotation 135, which is perpendicular to the page in FIG. 5A. The amount of tilt which is possible may depend on the clearance between the stator 124 and the rotor 126. In yet another embodiment, the stator 124 and the rotor 126 can be tilted as a unit and the rotor can also be changed relative to the stator, which also changes the tilt of the rotor relative to the substrate.

The maximum power requirements can occur during start up where the moment of inertia of the rotor needs to be overcome and the drag forces are highest on the STARM. In particular embodiments, apparatus and methods can be used which transfers a portion of the starting power requirements to another device and hence reduce the initial power requirements. Some examples associated with reducing the starting power requirements of a magnetic lifting vehicle are described as follows with respect to FIGS. 6, 7 and 8.

A vehicle can have an on-board power source 152, such as batteries storing electricity or fuel. The on-board power source 152 may power the vehicle while it is in flight. In one embodiment, the vehicle can include a supplemental power interface 150. The supplemental power interface can be used to provide power from an off-board power source when the hover engine including motor 154 and STARM 156 is being powered from rest. The off-board power source can also be used to charge the on-board source, such as on-board batteries. Thus, the use of the off-board power source may allow the lifetime of the on-board source to be increased.

During start-up, the off-board power source can be used instead of the on-board power source 152. After start, the off-board power source can be disconnected and the vehicle can switch to using the on-board power source. Thus, a switching mechanism can be provided which switches between the two sources of power (on-board and off-board). The switching mechanism can be a switch, which is manually operated. In another embodiment, an automatic switch can be coupled to a controller. The controller can include control logic which allows it to detect whether the vehicle is connected to the off-board power source and switch between the on-board power source 152 and the off-board power source. The controller may also be configured to place the on-board power source in a charging mode, such as when batteries are used.

In one embodiment, the outboard power source can have different characteristics than the on-board power source. For example, the outboard power source can have a larger voltage than the on-board power source. The larger voltage may be used to generate more torque from the motor during the starting process. Once hovering conditions are achieved, the torque requirements may drop and an on-board power source with a lower voltage output than the onboard source can be used.

Figure 6:
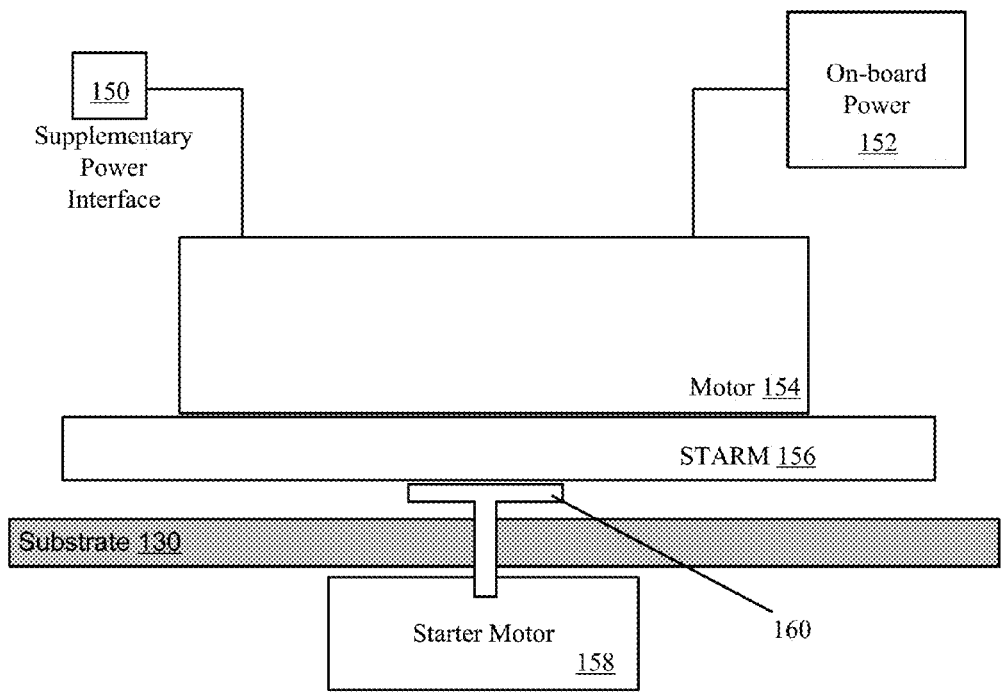
FIG. 6 is a block diagram illustrating a system with start assist in accordance with the described embodiments.

In another embodiment, an external starter motor 158 can be utilized. The external starter motor 158 can be used to supply a torque to the STARM 156 which gets it rotating to some initial rotational velocity. Then, the internal motor or motors, such as 154, can take over. In the example of FIG. 6, the starter motor 158 is located beneath the substrate 130 and includes a starter motor interface 160 which allows the starter motor to be coupled to the STARM 156 or some other portion of the hover engine. When the starter motor interface is engaged with the STARM, torque from the starter motor can be transferred to the STARM. During start-up, torque may or may not be supplied to the STARM by the on-board motor 154. When the starter interface is disengaged, the STARM 156 can receive torque from the on-board motor 154.

In one embodiment, the motor 154 can be coupled to the STARM 156 while it is being turned by the starter motor, such that it is also turned. Thus, the motor 154 may act as generator to charge the on-board power source 152. In another embodiment, a clutch mechanism may be used such that the on-board motor 154 is disengaged from the STARM 156 during start-up. Thus, the starter motor 158 may supply torque only to the STARM and not the STARM and motor. After start-up, the clutch mechanism can be used to reengage the STARM 156 to the motor 154.

Other examples of starter interfaces are possible and the example in FIG. 6 is provided for illustrative purposes only. For example, rotating wheels could be used which abut a side of the STARM and transfer angular momentum to the STARM when in contact with the STARM. In another example, the side of the STARM 156 can include teeth which are configured to interface with a rotating gear which meshes with the teeth on the side of the STARM 156.

Figure 7:
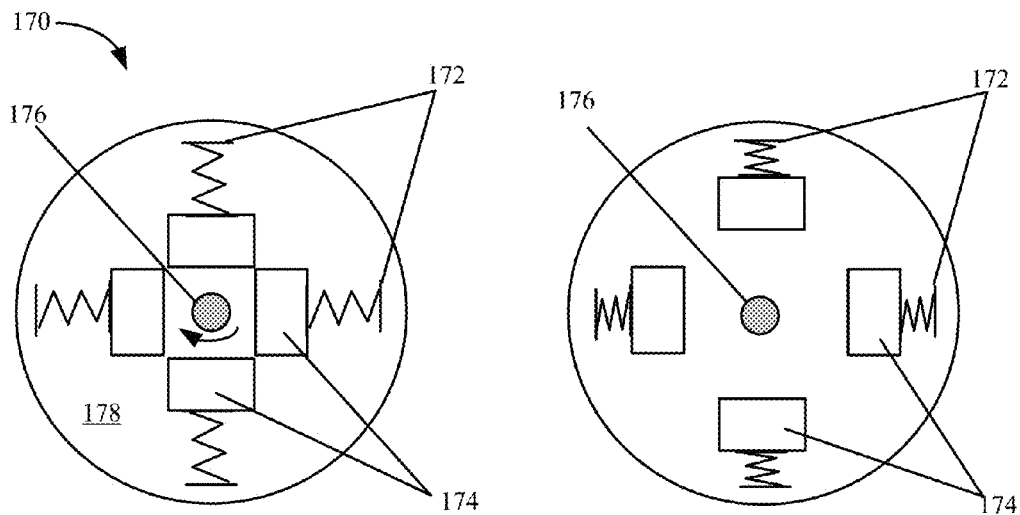
FIG. 7 is a top view of a STARM including magnets with dynamic positions in accordance with the described embodiments.

In some lifting magnet configurations, the amount of magnetic drag generated by a STARM can be less when the magnets are closer to the axis of rotation. The magnetic drag is associated with the resistance of the substrate to the moving magnetic fields and is separate from the moment of inertia associated with the STARM or aerodynamic drag acting on the STARM. As described above, after a rotational velocity is reached where peak magnetic drag occurs, the magnetic drag may decrease with increasing rotational velocity. As shown in FIG. 7, in one embodiment, all or a portion of the magnets, such as 174, in a magnet array on a STARM, such as 170, can be placed in a slot and coupled to a resistance mechanism, such as springs 172. The slot can be part of a support structure 178, which holds the magnets and springs. As the STARM 170 is spun up, the magnets can move within the slot away from the axis of rotation 176 in the center in the STARM.

The force profile for the resistance mechanism can be selected such that it is overcome in accordance with a particular velocity profile of the rotor. Thus, the radius of the magnets from the axis of rotation can be controlled as a function of velocity. Different force profiles for the resistance mechanisms can be selected to control the change in radius as a function of time. The peak drag can be affected by the radius at which the magnet arrays are located. In particular, the magnitude of the magnetic drag as a function of velocity may be smaller when the magnets are closer to the axis of rotation as compared to when the magnets are located father from the axis. Thus, using this approach, it may be possible to reduce the peak torque required to turn the STARM and effect the size of the motor which is required.

The amount of drag is also affected by the height of the magnets in the magnet array above the rotor. The magnetic drag for some STARM configurations, as described above, can increase, reach a peak and then decrease, as the rotational velocity is increased. In one embodiment, as shown in FIG. 8, the distance of the permanent magnets from the top of the substrate can be controlled as a function of rotational velocity.

Figure 8:
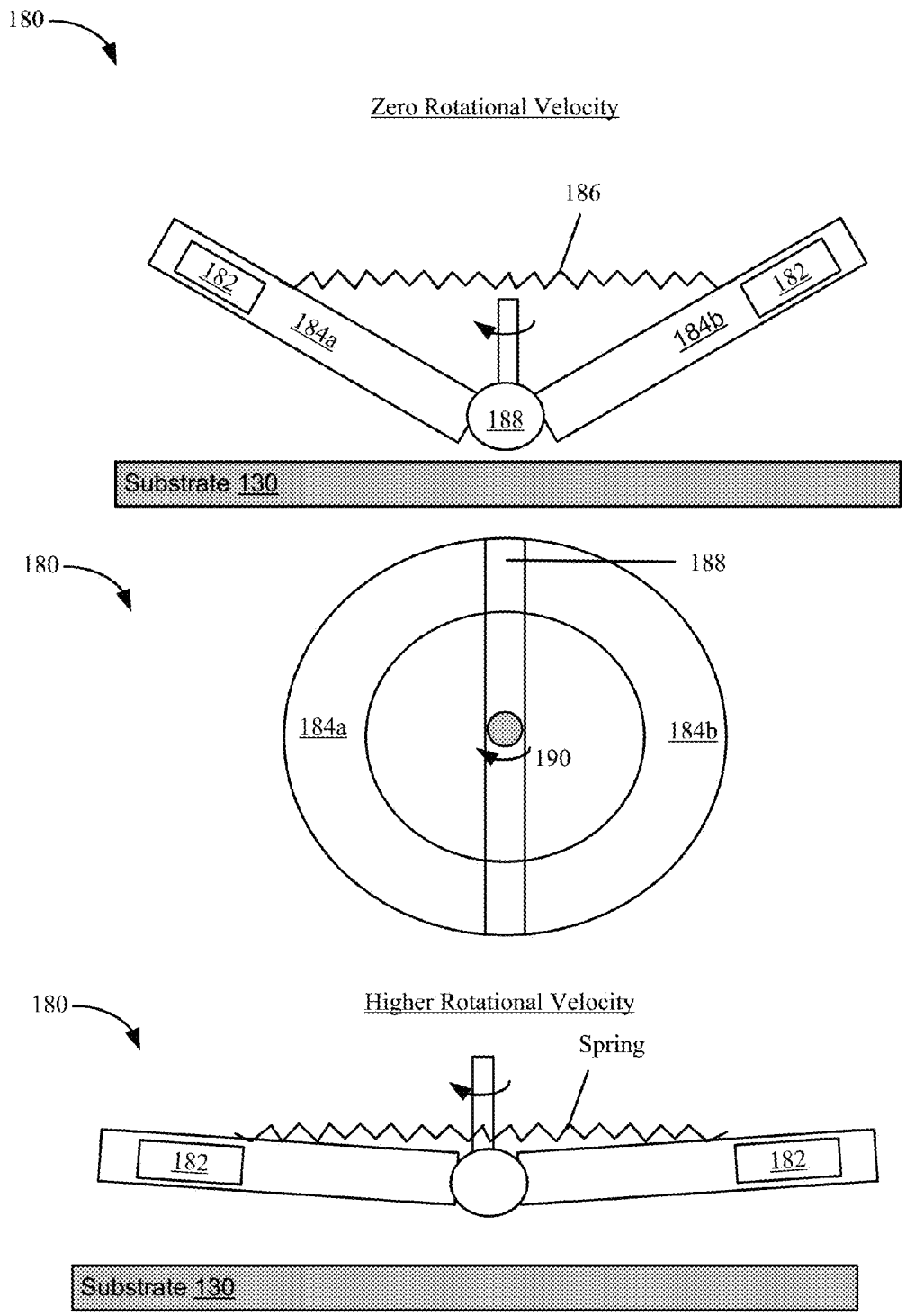
FIG. 8 is an illustration of a STARM with moveable components in accordance with the described embodiments.

In FIG. 8, the STARM 180 is hinged, such that initially the magnets 182 are at a first distance from the top of the substrate 130. In this example, the two hinged sides, 184a and 184b, are held together by a spring 186 or some other type of mechanism which generates a resistive force (e.g., an elastic band). The hinged sides rotate about hinge 188. As the rotational velocity increases as the STARM rotates about axis 190, the hinged sides, 184a and 184b, spread out, the spring or springs stretch and the magnets on the STARM 180 are brought closer to the substrate.

In particular embodiments, the force profile for the spring can be selected such that the STARM is not brought to its minimum distance from the surface, i.e., when it is flat or when the spring doesn't stretch any more, until the velocity of the STARM is above the peak velocity where maximum drag occurs. After the peak drag velocity, the drag can be decreasing as the rotational velocity increases. Thus, with this approach, the start-up energy of the magnetic lifting system may be reduced because the peak magnetic drag regime is bypassed by keeping the magnets on the STARM away from the surface of the substrate.

In the example of FIG. 8, the STARM 180 is hinged, such that it is divided into two portions. In other embodiments, the STARM can include petals, such three, four, five sections, etc., which lower as the velocity is increased. The petals don't necessarily have to be lowered at the same rate. For example, for a STARM with four petals, two opposing petals can be lowered at a first rate as a function of velocity and a second two opposing petals can be lowered at a second rate. The different rates can be generated by using different force retentions mechanisms, such as springs with different spring constants.

In the example in FIG. 7, a passive system is used where the portions of the STARM 180 spread out as the velocity increases and come back together as the velocity is decreased. In other embodiment, active mechanisms, such as one or more actuators can be used to control a height of a STARM from a top of substrate or, as in the example of FIG. 7, the radial distance of permanent magnet. In yet other embodiments, a combination of active and passive mechanisms can be used, such as springs and actuators.

In one embodiment, the actuators can be used to control the hinged sides of a STARM 180 as shown in FIG. 8. In another embodiment, the STARM 180 can be disk shaped where the shape of the disk is fixed. A mechanism can be provided which raises and lowers the STARM alone or the STARM and the motor relative to a surface of substrate. In another embodiment, mechanisms can be provided which raise an entire vehicle relative to a surface, such as a landing gear system. In yet another embodiment, where a hinged STARM is used, the one or more hinge mechanisms can be shaped to extend below a bottom surface of the STARM to act as a landing mechanism. For example, the portion which extends below the bottom surface can have rolling capabilities, which allows the STARM to roll along the ground in a start-up mode.

Figure 9:
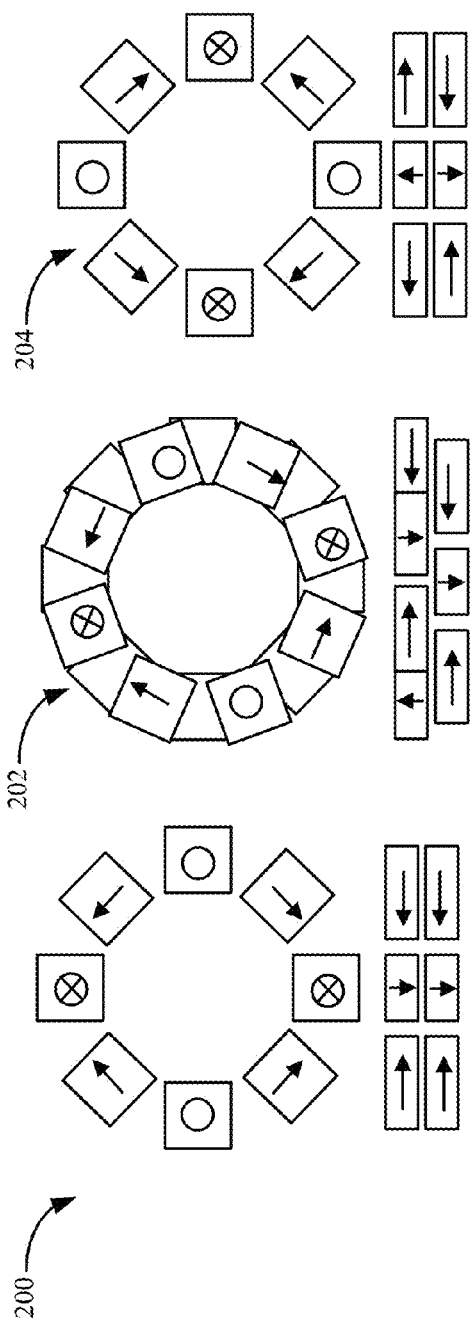
FIG. 9 is an illustration of a STARM with magnet sections which move relative to one another in accordance with the described embodiments.
Figure 10:
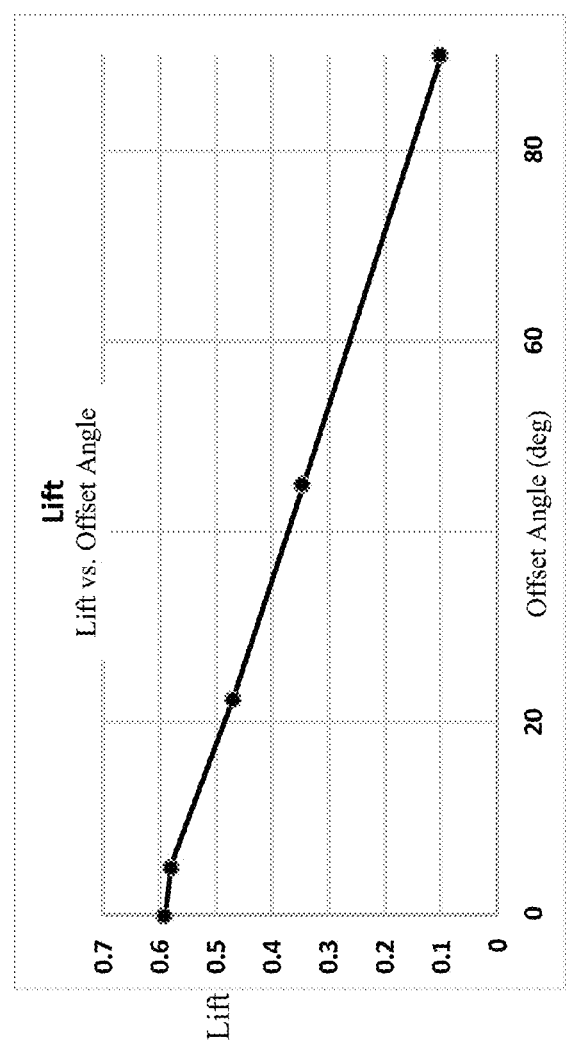
FIG. 10 is a plot of lift versus an offset angle of the magnet sections in FIG. 9 in accordance with the described embodiments.

Another method and apparatus for controlling an amount of lift and drag output from a hover engine is described with respect to FIGS. 9 and 10. In FIG. 9, a configuration of permanent magnets including two layers is provided. The polarities of the magnets are indicated in FIG. 9. In this example, a polarity pattern described with respect to FIG. 2 is used.

A STARM including the magnets can be configured to allow the first layer of magnets to rotate relative to one another. For example, the two layers and their associated support structure can be separated by a bearing system of some type. In this example, the magnets in the bottom layer can be placed closest to a substrate to induce eddy currents.

In a first position 200, the polarities of the magnets in each layer are aligned. In a second position 204, the polarities of the magnets in each layer are opposite one another. The mechanism holding the magnets can be designed to allow the two layers to rotate between position 200 and 204. An intermediary position 202 is shown where the two layers are rotated forty five degrees relative to one another.

A simulation was performed suing Ansys Maxwell where the two layers were rotated relative to another. The offset angle refers to the amount of rotation where zero degrees is associated with position 202 and ninety degrees is associated with position 204. The lift decreases as the offset angle is increased. The minimum value of lift occurs at ninety degrees.

The lift decreases because the eddy currents induced by the top layer interfere with the eddy currents induced from the bottom layer. The lift does not reach zero because the effect of the magnets decreases with the distance from the substrate. Thus, the bottom layer, which is closer to the surface, has more influence than the top layer which was farther away from the surface. In this example, the top and bottom layers included an equal mass of magnets. Hence, the bottom layer has more influence.

In alternate embodiments, the amount of magnet mass in each layer can be varied. For example, more magnet mass can be placed in the top layer relative to the bottom layer. The greater magnet mass in the top layer can be used to offset its greater distance from the surface as compared to the bottom layer. Thus, the lift can be driven closer to zero.

In operation, at low RPMs, a STARM can be started in position 204, such that a minimum amount of lift and drag are generated. Then, once a threshold RPM is reached, the magnets layers can be shifted from position 204 to position 202. This approach may lessen the peak amount of drag which a STARM with this configuration generates.

In some embodiments, a hover engine can be multiphasic. The lift and drag which are generated from the hover engine depend on the velocity of the output magnetic field. A multiphasic hover engine may be configured to output magnetic fields which move at different velocities over different regions of the device. Thus, the lift and drag characteristics can be varied from region to region of the STARM.

Figure 11:
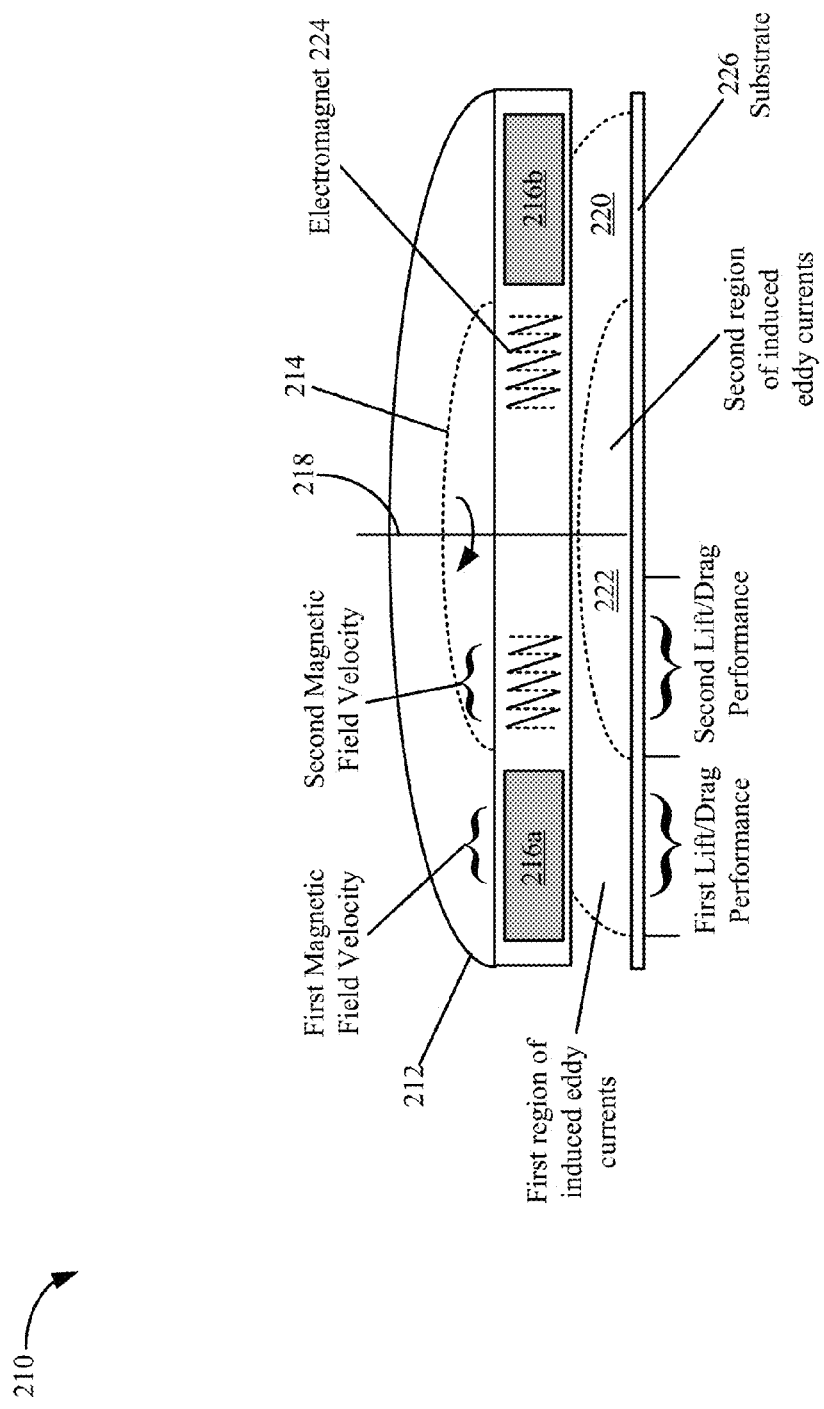
FIG. 11 is an illustration of a STARM with multiphasic capabilities in accordance with the described embodiments.

For example, as shown in FIG. 11, a STARM 210 includes in a first region 222 between the outer radius 212 and a first radius 214, which includes the permanent magnets, such as 216a and 216b. In the first region, the magnets and the magnetic fields are rotated at a first rate relative to axis 218. In a second region 222, between the first radius 214 and the axis of rotation 218, the magnetic fields are rotated at a second rate relative to the axis of rotation 218. More regions with different phases are possible and the example in FIG. 11, which shows just two regions, is shown for the purposes of illustration only.

A hover engine can include different mechanisms for rotating the magnetic fields in each region at different rates. For example, an outer disk including the permanent magnets and/or electromagnets and an inner disk including permanent magnets and/or electromagnets can be provided where hover engine can be configured to mechanically rotate the outer disk and inner disk at different rates. The outer and inner portions of the disk are necessarily mechanically decoupled from one another to allow for the different rotation rates.

In another embodiment, the disk can be a single piece configured to rotate at a single rate. Thus, the permanent magnets near the edge can rotate at the rate the disk rotates. However, in the inner region, the magnetic fields generated by the electromagnets, such as 224, can be configured to rotate at an effective rotation rate relative to the substrate which is different than the rotation rate of the disk. The different rotation rates can be generated by time varying the currents received by the electromagnets. Thus, relative to the substrate 226, the effective rotation rate of the magnetic fields generated by the electromagnets can be different than the rotation rate of the magnetic fields of the permanent magnets, which depends on the rotation rate of the disk. For example, the current to the electromagnets can be cycled in an opposite direction as the mechanical rotation of the disk, such that the velocity of the magnetic field generated by the electromagnets, relative to the substrate is less than the rotation rate of the magnetic field of the permanent magnets relative to the substrate. If the current to the electromagnets is cycled in the same direction as the rotating disk, then the velocity of the magnetic field from electromagnets relative to the substrate can be greater than that generated from the permanent magnets.

In other embodiments, the disk may not rotate at all. Instead, the current to the electromagnets can be cycled such that a magnetic field velocity is generated relative to the substrate. When two or more rows of electromagnets are provided at different radii from the axis of rotation, each row can be cycled at different rates to vary the lift and drag characteristics from region to region.

In one embodiment, the magnitude of the current sent to each electromagnet, which can be a coil with a number of turns, can be varied such that the current is greater on one half of the bottom surface of the disk as compared to the other half of the bottom surface of the disk (the bottom surface referring to the side which faces the substrate). In particular, when an electromagnet is located on a first half of the disk, a controller can be configured to apply more current to the electromagnet than when it is located on the second half of the disk. By varying the current in this manner, a force imbalance can be created which can be used for propulsion. In particular embodiment, the force imbalance can cause a greater drag on one side of the disk as opposed to the other side of the disk. The drag imbalance can result in the generation of a force which can be used to propel and possible control a direction of a vehicle. Details of navigation, guidance and control are described below.

In other embodiments, depending on the material used to fabricate STARM in FIG. 11, a tertiary magnetic field can be induced in the STARM from the magnetic field induced in the substrate. For example, the inner region of the STARM can be composed of non-ferromagnetic material, such as copper, or a combination of ferromagnetic and non-ferromagnetic materials, such as aluminum and cast iron or only a ferromagnetic material, such as iron. The electromagnets in the inner core can be controlled to generate a moving magnetic field which induces eddy currents in the substrate. The eddy currents induced in the substrate can induce eddy currents and/or alignment of magnetic fields in the STARM material which results in attractive force between the STARM and the substrate. This approach can be used in single phase device and the example above is provided for the purposes of illustration only.

Figure 12:
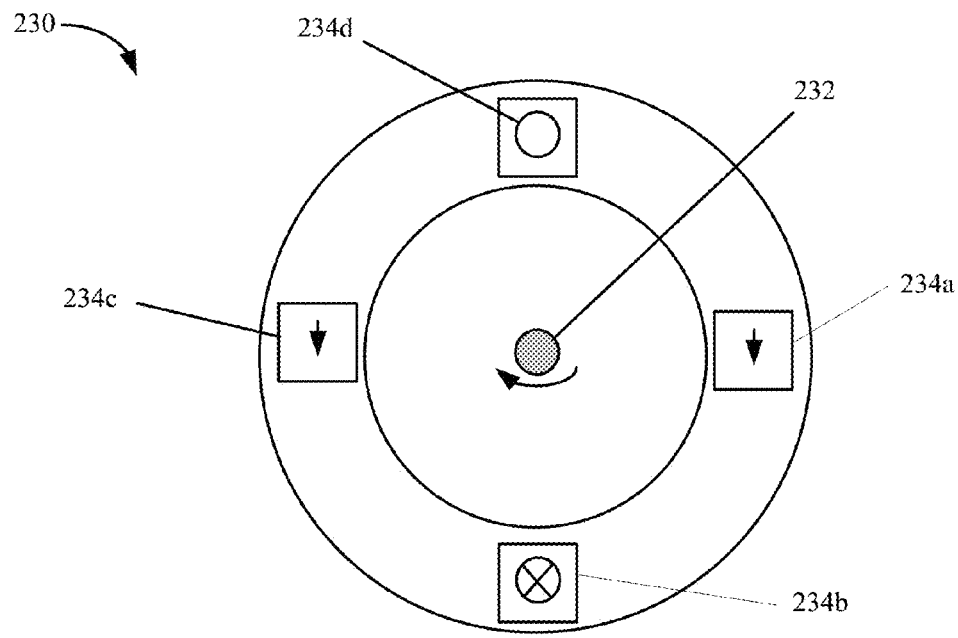
FIGS. 12 to 16 are illustrations of STARMs in accordance with the described embodiments.

FIG. 12 shows a top view of a STARM design 230 which may be used to generate magnetic lift. When used in a hover engine, the bottom side of the STARM designs would face the substrate. The STARM is configured to rotate about axis 232. In FIG. 12, four magnets, 234a, 234b, 234c and 234d, are shown, which can be permanent magnets or electromagnets. The magnetic field lines of all four magnets can all link together. This pattern can produce a STARM with a magnetic flux distribution which is greater on the bottom side of the STARM as compared to the other side of the STARM.

In FIG. 12, the arrows inside of magnets 234a and 234c point to the north pole of each magnet. The poles of two of the magnets are aligned approximately perpendicular to the axis of rotation and two of the magnets are aligned approximately parallel to the axis of rotation 232. The polarity of magnet 234b is aligned approximately parallel to the axis of rotation and is directed into to the page, i.e., the circle with an "x" is a south pole. Magnet 234d is directed out of the page, i.e., the open circle on the top of magnet 234d is a north pole. The directions of the magnets can be varied from being parallel to the axis of rotation and perpendicular to the axis of rotation and the example in FIG. 12 is provided for the purposes of illustration only.

The pattern of permanent magnets can be repeated multiple times at a given radius. For example, patterns of eight, twelve, sixteen permanent magnets can be used. In addition, a single pattern involving more than four magnets, such as five, six, seven, etc., can be used to generate a one-sided magnetic flux distribution. These patterns can also be repeated. In addition, at multi radii, different patterns of magnets can be arranged. For example, four magnets can be arranged at a first radius and eight magnets can be arranged at a second radius. The eight magnets can be two repetitions of the four magnet pattern or a unique pattern involving eight magnets.

A magnet field alignment region can refer to an area on a STARM with a common magnetic field alignment. Each magnetic field alignment region can be formed from one or more magnets. For example, in FIG. 12, the magnetic field alignment region associated with the circle with a cross bounded by the square can be associated with a first magnetic field alignment region. The first magnetic field alignment region can be formed from a single cubic magnet aligned in the indicated direction or multiple magnets aligned in the indicated direction. When multiple magnets are used in a magnetic field align region, the magnets can touch or may be space slightly parts.

The shape and area of each magnetic field alignment region can vary from region to region and don't have to be equal in area. In the example in FIG. 12, for cubic magnetic field alignment regions are formed from four cubic magnets. Thus, the magnetic field alignment regions appear square when viewed from the bottom of the STARM. In other embodiments, the shapes could be triangular, circular or a general polygon shape where the shape from magnetic alignment region to magnetic alignment region varies. For example, two square and two circular regions.

Figure 13:
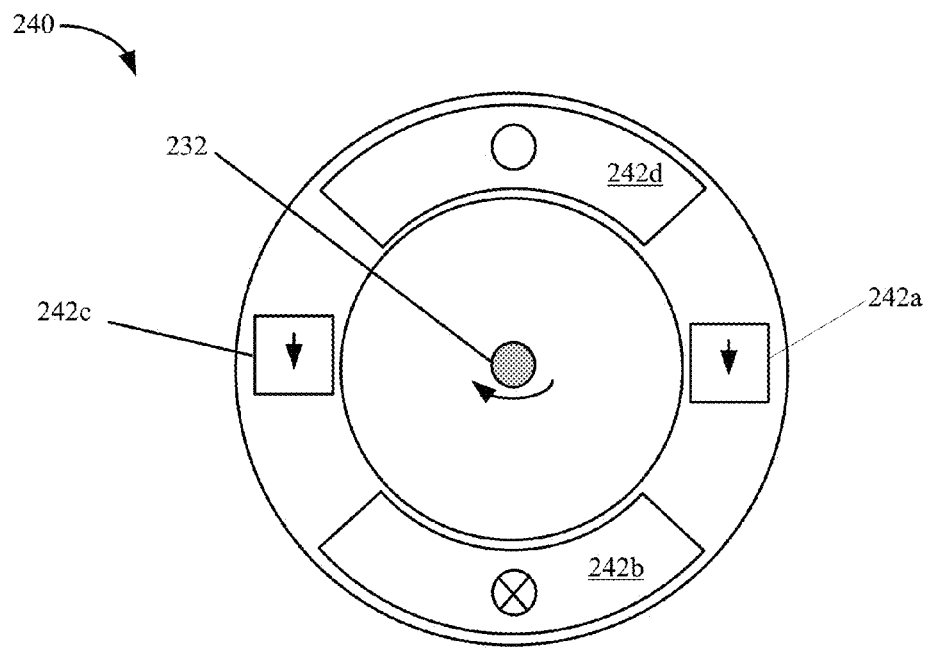

An example of a STARM 240 with different sized magnetic field alignment regions is shown FIG. 13. A first and a second magnetic field alignment region are formed from magnets 242a and 242c. Magnets 242a and 242c have a cubic cross section. A third and a fourth magnetic field alignment region are formed from magnets 242b and 242d. Magnets 242b and 242d have curved portions and a larger cross sectional area than magnets 242a and 242c.

Returning to FIG. 12, in general, the shapes and weight distribution of the magnets can be chosen such that the STARM is balanced for rotational purposes. Thus, in the example of FIG. 12, two opposite pairs of magnetic alignment regions may have the same shape and weight distribution. However, in some embodiments, the two opposite pairs of magnets can have different shapes and weight distributions if the STARM is balanced in some other manner. Thus, the magnet patterns don't have to symmetric.

In FIG. 12, the top cross section view is a square because of the way a cubic magnet is secured in the STARM 230. In other embodiments, the cross sectional can vary into the page and doesn't need to be constant. For example, the magnets can be tetrahedrally or pyramidally shaped and the cross section can vary in the direction of the axis of rotation into the STARM.

An alignment pattern of the magnetic field lines along a circumference of the STARM at a particular radial distance from the axis of rotation can be used to define a wavelength associated with a directional pattern of the magnetic field lines. It is believed the wavelength may affect the strength of the induced eddy currents and hence, the lift and drag, which results from the induced eddy currents. The wavelength can be increased or decreased by placing the magnetic field regions closer or father away from the axis of rotation.

In addition, the wavelength can be affected by repeating the pattern of magnetic field alignments region as shown in FIG. 12. For example, if the pattern of magnetic field alignment regions is repeated twice around a circumference at a particular radius, then the effective wavelength at the radius can be reduced in half. If the pattern of magnetic alignment regions is repeated three times around a circumference at a particular radius than the effective wavelength can be reduced by third. In various embodiments, the wavelength can be varied to adjust the lift and drag generation capabilities of the STARM as a function of rotational velocity.

Figure 14:
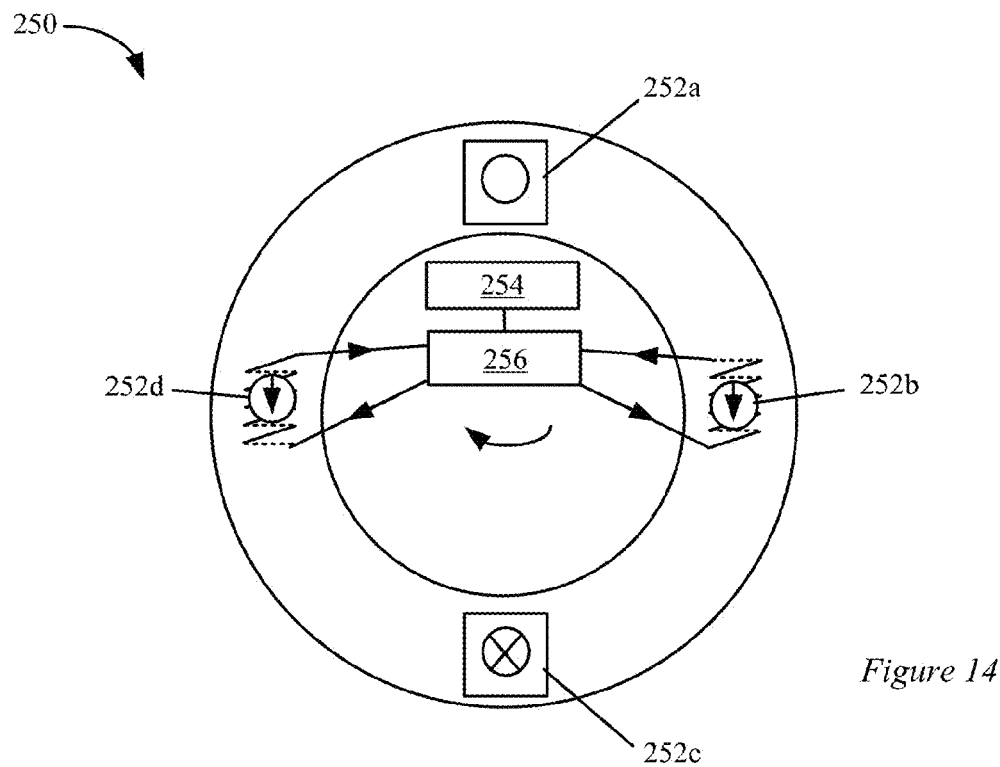

In FIG. 14, a hybrid STARM 250 is shown. The hybrid STARM 250 includes four magnetic alignment regions. Permanent magnets, 252a and 252c, are used to generate two magnetic field alignment regions and electromagnets, 252b and 252d, are used to generate two magnetic alignment regions. The directions of each of the four magnetic alignment regions are indicated in FIG. 14 and are similar to FIG. 12. The polarity pattern provides a strong side and a weak side. The strong side is the beneath the STARM 250. Thus, a conductive substrate would be placed below the STARM 250.

The two electromagnets, 252b and 252d, are coupled to a current source 256 and a controller 254. The controller 254 can be configured to control a magnitude of the current to each electromagnet and/or a direction of the current to each electromagnet. The direction of the current affects a subsequent polarity direction of a magnetic field which is generated. For example, by changing the direction of the current, the side of the STARM 250 with the stronger magnetic field can be flipped from one side to other side. By alternating the direction according to some pattern, the amount of time which is the strong side and the amount time which is the weak side of the STARM can be varied. This effect can be used to affect the magnitude of eddy currents which are induced in the substrate by the STARM 250 and hence the amount of magnetic lift and drag which are generated.

As an example, at start up, the current direction can be selected such that the strong side of the STARM 250 is away from the substrate, which minimizes drag. Once the STARM 250 reaches a particular threshold velocity, the current direction can be flipped such that the side of the STARM 250 with the strong magnetic field faces the STARM to start generating greater lift and/or more drag. Because the magnitude of the lift and drag varies a function of the rotational velocity, the STARM 250 can be controlled such that the strong side faces the substrate at a rotational velocity which is desirable for startup. For example, the STARM 250 can be spun-up with the weak side facing the substrate until past the peak drag rotational velocity and then can be flipped.

In another example, the current direction can be flipped repeatedly on the electromagnets where the interval between flips is controlled. Using this approach, the percentage of time at which the strong side of the STARM faces the substrate can be gradually increased. With this approach, it may be possible to spin the STARM at a constant velocity, such as a velocity at the motor operates most efficiently and then vary the lift and drag generated by the STARM by affecting the amount of time the strongest magnetic field faces the substrate.

It is noted that turning off the electromagnets can reduce the amount of lift and drag generated by the STARM as compared to when the STARM is actively controlled to have the strong side of the magnetic field facing towards the substrate. However, the amount of lift and drag, which is generated when the electromagnets are turned-off may be greater than if the STARM is actively controlled such that the strong side of the magnetic field generated by the STARM faces away from the substrate. Thus, in some embodiments, the electromagnets can be turned off to lessen the lift and drag which is generated. An advantage of this approach is that it requires no power. However, the lift and drag which are generated may be greater than if the electromagnets were actively controlled. Further, this feature can act as a fail safe mode in the situation where current is lost for some reason to the electromagnets during operation of the STARM.

In another embodiment, to reduce drag, a mechanism can be used which rotates the permanent magnets in place to point the magnetic poles in a different direction. For example, in FIG. 14, one or both of the permanent magnets, 252a and 252c, can be coupled to a mechanism which can rotate the magnetic poles from pointing perpendicular to the page to pointing tangential to the page (Also, angles in between). The change in orientation can change the amount of magnet lift and drag which are generated. Rotating one or more permanent magnet in place on a STARM is another mechanism which can be used to control a magnitude of the magnetic force which is generated.

Figure 15:
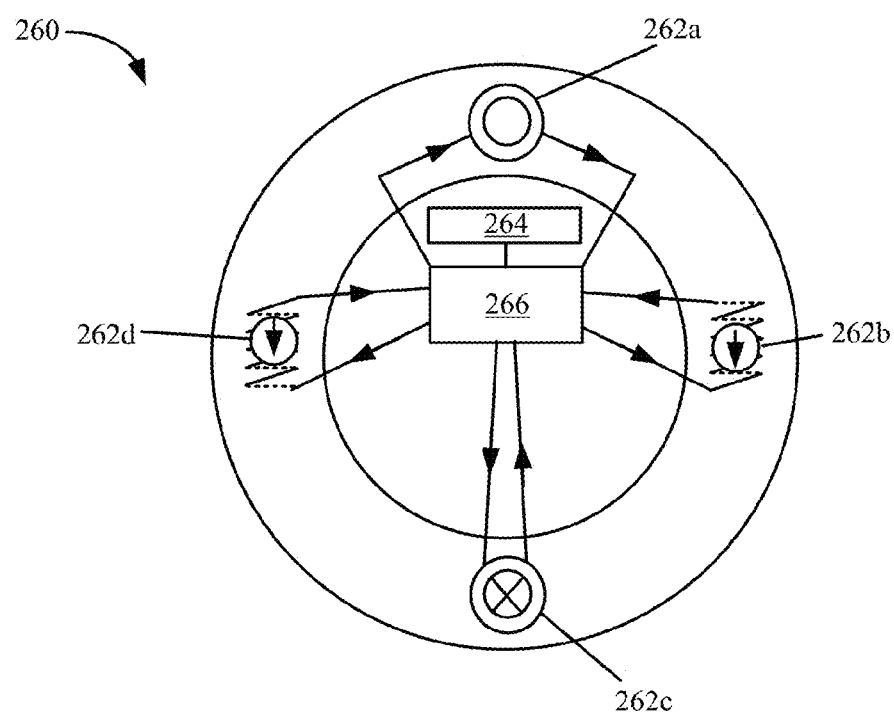

FIG. 15 shows one embodiment of an electromagnetic STARM 260. In this example, rather than rotating the STARM 260, using the controller 264, the current to the electromagnets can be cycled with some pattern to simulate the STARM rotating at some velocity. The current source 266 can be a battery or a generator. Thus, a motor used to turn the STARM 260 may not be required. When the STARM doesn't rotate, it doesn't have to be circular or balanced as in the case when the STARM rotates.

The current can be controlled to turn the STARM on and off Since a spin up is not required, the STARM can be started and operated at a desired lift to drag ratio. For example, the STARM can be started with an initial effective rotational velocity which is greater than the peak drag rotational velocity of an equivalent rotating STARM.

Further, since the electromagnets can be turned on and off, different alignment patterns of the magnets can be used rather than when permanent magnets are used and the example above is provided for the purpose of illustration only. In various embodiments, any of the magnetic polarity patterns described herein can be embodied using permanent magnets, electromagnets or a combination of permanent magnets and electromagnets. In addition, the direction of current can be changed. Thus, the direction of the magnetic polarities and associated magnetic field lines shown in FIG. 15 can be changed as a function of time.

Figure 16:
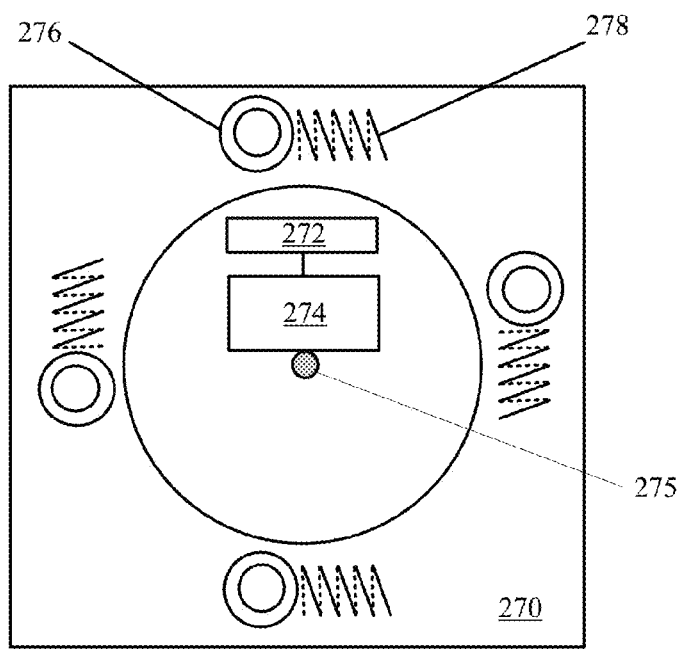

FIG. 16 shows an example of a STARM 270 with the capability to turn on and off the electromagnets and change a direction of the current. The STARM includes four pairs of electromagnets where each pair includes current loops arranged to generate a magnetic field parallel to axis of rotation and current loops arranged to generate a magnetic field perpendicular to the axis of rotation 275. For example, circuit 276 is configured to generate a magnetic polarity direction parallel to the axis of rotation and circuit 278 is configured to generate a magnetic polarity parallel to the axis of rotation. A controller 272 can be coupled to the eight current loops and a current source 274.

Using the controller 272, one current loop in each pair can be turned on at a time in a desired direction to produce the magnetic alignment pattern shown in FIGS. 12-15. Then, the pattern can be rotated clockwise or counter wise by turning on the appropriate electromagnet in each pair, such as 276 and 278, with the current in the appropriate direction. The rate the electromagnets are turned on and off and the rate the pattern is rotated can simulate the effect of a rotating STARM with permanent magnets in the alignment pattern shown in FIG. 12.

In this example, the STARM 270 is square shaped. Since the STARM doesn't have to rotate any shape can be utilized and a square is utilized for the purposes of illustration only. In the case where a STARM rotates, it doesn't necessarily have to be circular. For example, a non-circular shape which is rotational balanced can be used.

Other more complex patterns involving additional circuits are possible and this example is provided for the purposes of illustration only. For example, the pattern of pairs of electromagnets can be repeated at a given radius, such four, eight, twelve, etc. Further, patterns at different radii from the center can be repeated. For example, at a first radius, four pair electromagnets can be placed and at a second radius eight pair of electromagnets can be placed.

In yet other embodiments, the magnet polarities represented by the magnet coil orientations can be discretized into multiple coil loops aligned in the same direction to provide different magnetic field alignment regions. For example, rather than a coil loop normal to the page and one tangential to the page at each location one coil loop normal to the page and two coil loops tangential to the page can be used. In another example, two coil loops normal to the page and two coil loops tangential to the page can be used at each location. In addition, the number of coils in each coil loop and the diameter of each coil loop can vary from loop to loop. Different circuit configurations are possible and the example of coil loops is provided for the purposes of illustration only.

Figure 17A:
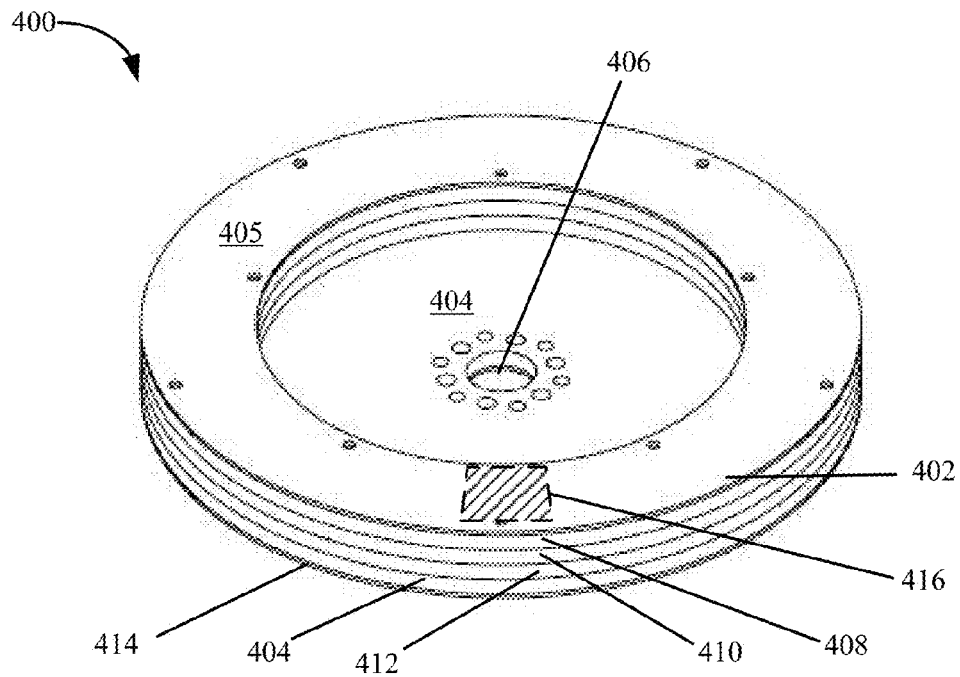
FIGS. 17A to 17C are illustrations of a hover engine in accordance with the described embodiments.
Figure 17B:
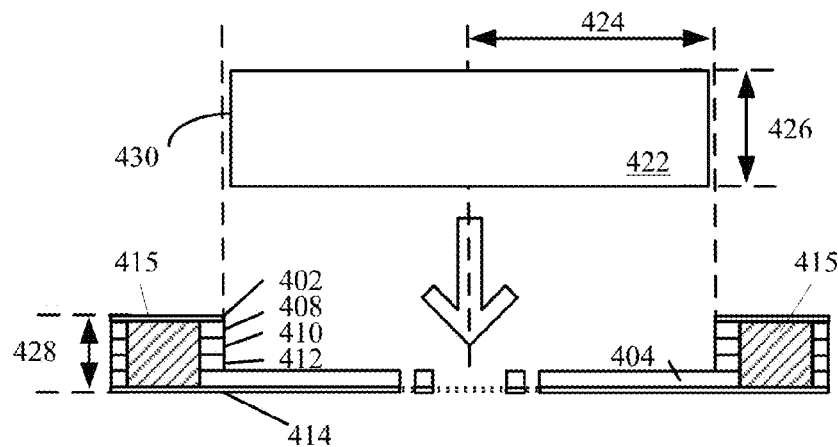
Figure 17C:
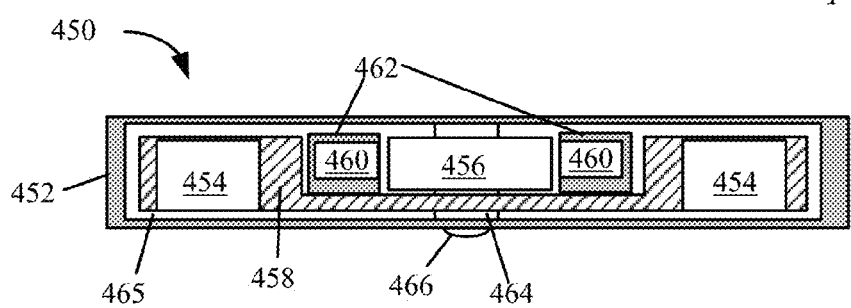

A more detailed description of a hover engine is described with respect to FIGS. 17A, 17B and 17C. FIG. 17A is a perspective view of a STARM 400. The STARM 400 is 10 inches in diameter. In various embodiments, the STARMs used on a device, such as a hoverboard can be between four and fourteen inches in diameter. However, for other devices, larger or smaller diameter STARMs may be used.

Generally, the size of the STARM will depend on the volume of magnets to be accommodated and the arrangement of magnets used. As will be described in more detail below different magnet configurations allow for and require different packaging schemes. The total volume of magnets which are used will depend on a desired maximum payload weight to be lifted and an operating height. Once, the total volume of magnets is determined, it can be distributed among one or more hover engines in selected configurations. Based upon the volume of magnets used in a hover engine and a selected magnet configuration, i.e., the distribution of the magnet volume on the STARM and polarity directions utilized, appropriate motors needed to rotate the STARM can be selected where a motor may turn one or more STARMs. As an example, the volume of magnets on a hoverboard, which can be distributed among one or more STARMS, can be between thirty and eighty cubic inches.

In general, various ratios of motors to STARMs can be utilized in a hover engine. For example, a hover engine can include one motor which turns one STARM. As another example, a hover engine can include one motor which drives two or more STARMs. In another example, a hover engine can include two motors which drive one STARM. In general, one or more motors can be paired with one or more STARMs where the number of motors can be less than equal to or greater than the number of STARMs. Thus, the example of a hover engine including one motor and one STARM is provide for the purposes of illustration only and is not meant to be limiting.

Returning to FIG. 17A, the STARM includes a raised outer ring 405. A distance from a bottom of the STARM 400 to a top of the outer ring is about 1.13 inches. This height allows one inch cubed magnets to be accommodated. In one embodiment, twenty one inch cube magnets are arranged within the outer ring. To accommodate more cubic magnets arranged in a circle, such as four more magnets to provide an additional repetition of the polarity pattern, a larger outer ring can be used. Using less cubic magnets, a smaller radius may be employed. Different shaped magnets and different polarity patterns can allow for different packaging schemes. Thus, this example, where the magnets are arranged in a ring is provided for the purposes of illustration only and is not meant to be limiting.

In one embodiment, the STARM 400 including the outer ring 405 can be formed from a number of layers, 402, 408, 410, 412, 404 and 414, from top to bottom, respectively. Layers 402 and 414 form a cover over the top and bottom portions of the magnets in the outer ring. In one embodiment, layers 402 and 408 are about 0.065 of an inch thick. In alternate embodiment, one or both of layers 402 and 408 can be eliminated. In one embodiment, the top and bottom layers can be formed from a material such as aluminum. In another embodiment, the top layer 402 can be formed from a material with magnetic properties, such as mu-metal, iron or nickel.

Layers 408, 410, 412, 404 each include twenty apertures to accommodate twenty magnets. More or less magnets and hence more or less apertures can be utilized and this example is provided for illustrative purposes only. The total thickness of the layers is one inch and each layer is 0.25 inch thick. In one embodiment, two layers are formed from polycarbonate plastic and two layers are formed from aluminum. The polycarbonate plastic can reduce weight. In various embodiments, the thickness of each layer, the material used for each layer and the number of layers can be varied. For example, different metals or types of plastics can be used. As another example, a single material can be used for each of the layers.

When the layers are aligned, the one inch cube magnets can be inserted through the layers. For different shaped or different size magnets, such as rectangular shaped magnets, trapezoidal shaped magnets or 1.5 cubic inch magnets, a different aperture shape or size can be used. In one embodiment, an adhesive can be used to secure the magnets in place, such as super glue. When secured, the bottoms of the magnets are approximately flush with the bottom of layer 404. This feature can maximize the height between the bottom of the magnets and the substrate when a vehicle using the STARM design 400 is hovering.

One or more layers can include apertures, such as 416, that allow fasteners to be inserted. The fasteners can secure the layers together. In another embodiment, an adhesive can be used to secure one or more of the layers to one another. In alternate embodiment, the layers 404, 408, 410 and 412 can be formed as a single piece.

FIG. 17B is a side view of STARM 420 with an embedded motor 422. The cross sections of two magnets, 415, are shown within the outer ring 405. The top of the magnets is flush with the outer top of layer 408 and the bottom of the magnets is flush with the bottom of layer 404. In various embodiments, the STARM 420 can be configured to receive magnets between 0.5 and 2.5 inches of height.

In one embodiment, the top of the magnets may extend above the top of the 408. Thus, the outer ring 405 may only extend partially up the sides of each magnet. This feature may allow the magnets to be secured in place while reducing weight.

In alternate embodiments, using different magnet configurations, the magnets may be positioned beneath the motor. Further, the motor doesn't necessarily have to be direction above the STARM 420. For example, a belt, gearing or some other torque transmission mechanism may be used to place the motor to the side of the STARM 420. Further, in some embodiments, a motor may drive multiple STARMs. In addition, the motor rotational axis and the axis of rotation of the STARM don't have to be parallel to one another. For example, the motor rotational access can be angled to the axis of rotation of the STARM, such as perpendicular to the axis of rotation. Then, a belt and/or gearing system can be used to transfer and change the direction of the torque output from the motor.

The inner radius 424 of the outer ring 405 is greater than a radius of the motor 422. Thus, the motor can be inserted within the outer ring and secured to layer 404 such that the STARM 420 can be rotated when the motor is operated. Thus, the outer ring extends along the side 430 of the motor. An advantage of mounting the motor in this manner is that the overall height profile of the hover engine may be reduced as compared to mounting the motor 422 at a height above the top of the outer ring.

In various embodiments, the height 428 height of the outer ring may be less than the height of the motor 426, such that the outer ring extends partially up the side 430 of the motor 422. In another embodiment, the height 428 of the outer ring 405 and the height of the motor can be approximately equal. In yet another embodiment, the height 428 of the outer ring can be greater than the height of the motor.

It may be desirable to increase the height 428 to accommodate taller magnets. Taller magnets may be used to increase the amount of magnetic lift which is generated when the magnets, such as 415 are at a greater distance from a substrate. The volume of a magnet including its height can affect the strength of the magnetic field at a particular distance which extends from a magnet.

In various embodiment, a trade-off can be made between the distributing the magnets over a greater height range or over a greater area on the bottom of the STARM. For given volume of magnets, the foot print on the bottom of the STARM can be reduced by using taller magnets. Reducing the foot print may allow a smaller radius STARM to be used. However, a height of the hover engine may be increased.

Alternatively, the volume of magnets can be spread out over a larger area to provide a larger foot print of magnets on the bottom of the STARM. The larger foot print allows the maximum height of the magnets to be reduced and possible the maximum height of the hover engine to be reduced. However, a larger foot print may require a STARM with a larger radius.

The motor, such as 422, used to rotate a STARM can be electric or combustion based. In general, any type of motor which outputs a suitable amount of torque can be used. An electric motor requires a power source, such as battery or a fuel cell, to supply electricity. A combustion motor requires a fuel which is combusted to operate the motor. Battery types include but are not limited to batteries with a lithium or zinc anode, such as lithium ion, lithium polymer or a zinc-air system.

An electric motor can be configured to output torque about a rotational axis. The electric motor can include a configuration of wire windings and a configuration of permanent magnets. Current is provided through the windings to generate a magnetic field which varies as a function of time. The magnetic field from the windings interacts with magnetic field from the permanent magnets to generate a rotational torque. AC or DC motors can be utilized, such as an induction motor or a DC brushless motor.

In various embodiments, the windings can be configured to rotate while the magnets remain stationary or the magnets can be configured to rotate while the windings remain stationary. An interface, such as a shaft, can be provided which couples the rotating portion of the motor to the STARM 400. In FIG. 26A, the STARM 400 is configured to interface with the motor at 406.

The non-rotating portion of the motor 422 can be integrated into a motor housing which surrounds the magnets and the windings. The motor housing can include an interface which enables it to be attached to one more structures associated with a device. In another embodiment, non-rotating portion of the motor can include an interface which allows it to be directly attached to one or more structures associated with the magnetically lifted device.

In a particular embodiment, the core of the motor 422 can be stationary where both the magnets associated with the motor and the magnets associated with the STARM rotate around the stationary core. One non-rotating support structure can extend from the core which allows the motor and STARM to be coupled to the device. A second non-rotating support structure can extend from the core which provides support to a portion of a shroud which is interposed between a bottom of STARM and the substrate which supports the induced eddy currents (see FIG. 17C). Various shroud configurations which can be utilized are described in U.S. Ser. Nos. 14/639,045 and 14/639,047, which are previously incorporated herein.

The arrangement of magnets in the motor 422 can include poles which are substantially perpendicular to the axis of rotation of the motor (often referred to as a concentric electric motor) or can include poles which are substantially parallel to the axis of rotation of the motor (often referred to as an axial electric motor). In one embodiment, a winding configuration, such as the winding configuration associated with an axial motor, can be used to induce eddy currents in a substrate. In these embodiments, there are no rotating parts and the STARM and the magnets associated with an electric motor are eliminated. As part of a hover engine, the windings can be tilted relative to a device to generate control forces in a manner previously described above.

In yet another embodiment, the magnets associated with the motor 422 can be removed and a motor winding can be designed which interacts directly with the magnets in the STARM. For example, a winding can be placed above magnets 415 to interact with the magnetic flux above the magnets or a winding can be placed around the outside of magnets 415 or around the inside of magnets 415. A current applied to the winding to cause the STARM to rotate. As described above, rotation of the STARM can cause eddy currents to be induced in a portion of a substrate.

As an example, the motor 422 can include an outer ring configured to rotate. The STARM 400 can mounted be to the outer ring of the motor 422 instead of to a shaft extending from the center of the motor. This type of motor design can be referred to as an outboard design. This feature may allow the portion of layers 404 and 412 within the inner radius 424 of the outer ring 405 to be removed such that the bottom of the motor is closer to the bottom of the outer ring 405. One advantage of this approach is that the overall height of the STARM 420 and motor 422 may be reduced.

In a particular embodiment, the outer ring 430 of the motor and the outer ring 405 of the STARM may be formed as an integrated unit. For example, the outer ring of the motor 422 can have a layer extending outwards from the side 430. The layer extending from the side 430 can include a number of apertures through which magnets can be inserted. Optionally, one or more layers with apertures, such as 408, 410 and 412, can be placed over the magnets.

In general, in a hover engine, the support structures associated with the STARM, the stator of the motor, the shroud and housing can be integrated with one another. For example, an enclosure for the motor and STARM can include an integrated shroud. In another example, the structure forming the rotor for the motor can be integrated with the structure for the STARM. In another example, all or a portion of the structure forming the stator of the motor can be integrated with a housing and/or shroud associated with the hover engine.

FIG. 17C is a side view of a hover engine 450 having a STARM 465 integrated with a motor in accordance. The hover engine 450 includes a stationary core 456 with windings configured to interact with magnets 460 to rotate the magnets. The core is attached to the support structure 464. The support structure 464 can provide a first interface to attach the hover engine to a hover board. In addition, the support structure 464 can be coupled to a housing 452 which surrounds both motor and the STARM 465. The support structure 464 may be used to help maintain a gap between the bottom of the STARM 465 and the housing 452.

In one embodiment, a small protuberance 466 may be provided at the end of support structure 464. The small protuberance 466 can be formed from a metal or a material with a low friction coating, such as a Teflon coated material. The small protuberance can provide a small stand-off distance when the hover engine is near the ground, such as during take-off and landing. It can help prevent the STARM 465 from impinging the ground. In particular embodiments, the protuberance 466 can be coupled to a portion of the hover engine which rotates or a portion which remains static during operation.

The STARM 465 includes a structure 458 surrounds the magnets 454. As described above, the structure 462 surrounding magnets 460 and the structure 458 surrounding magnets 454 can be formed as a single piece. The magnets 454 and 460 may be shaped differently and have different sizes relative to one another.

In various embodiments, bearings (not shown) can be provided between the support structure 464 and the structure 458 to allow the STARM 465 to rotate about the stationary core. In lieu of or in addition to bearings between the STARM structure 458 and the support structure 464, bearings can be provided at one or more locations between the housing 452 and the structure 458. For example, bearings may be placed between the bottom of the STARM 465 and the housing 452 to help maintain the spacing between the housing 452 and the STARM 465 on the bottom of the STARM. In another example, a bearing may be placed between the side of the STARM and the side of the housing 452 to maintain the spacing between the inner side of the housing 452 and the side of the STARM.

In one embodiment, the height of the hover engine can be less than three inches. In another embodiment, the height of the hover engine can be less than two inches. In yet another embodiment, the height of the hover engine can be less than one inch. The magnets are packaged between a top and a bottom height of the hover engine. Thus, in each of these examples, the maximum height of the magnets will be at most the same as the height of the hover engine. Typically, the maximum height of the magnets will be less than the height of the hover engine.

Figure 18:
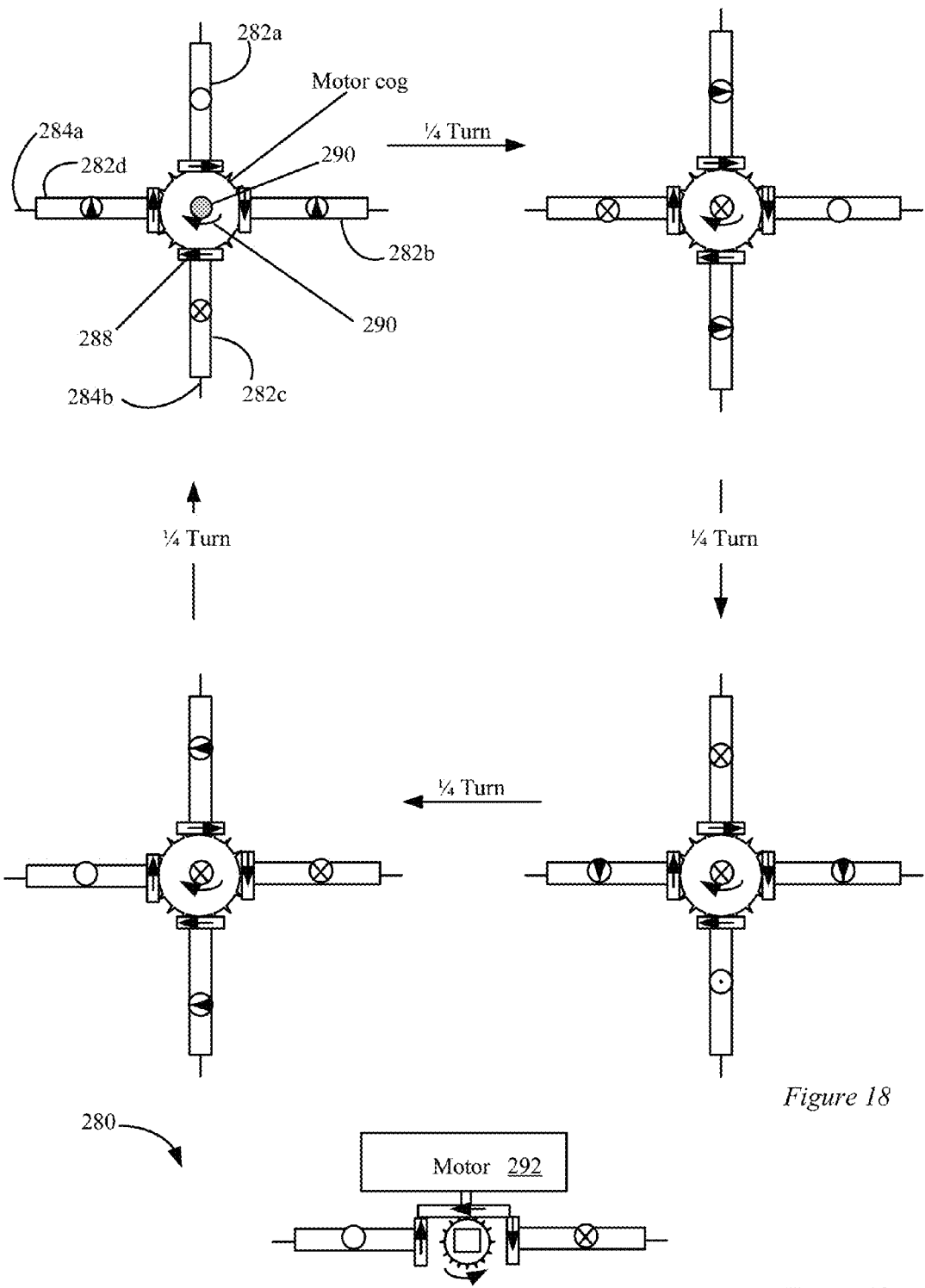
FIGS. 18 to 20 are illustrations of a STARM configuration with multiple sections of rotatable magnets with the described embodiments.
Figure 19:
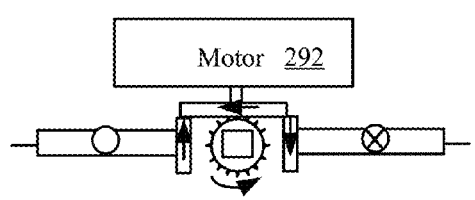
Figure 20:
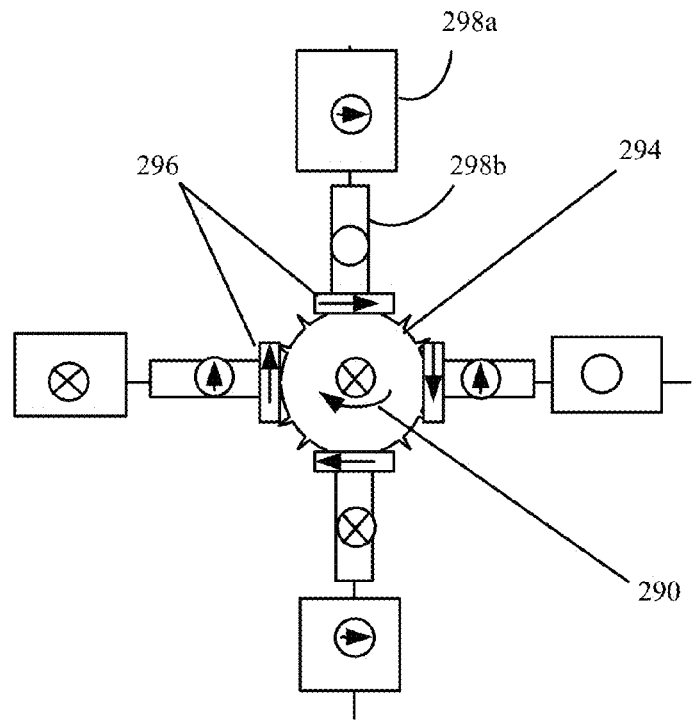

In FIGS. 18, 19 and 20, an alternate hover engine design 280 is shown. In this embodiment, four permanent magnets, 282*a*, 282*b*, 282*c* and 282*d*, are each rotated around a separate rotation arm with rotation axes, such as 284*a* and 284*b*, which is perpendicular to the axis of rotation 290 of the motor 292. The direction of rotation of each magnet of the four magnets around their respective axes is illustrated in FIGS. 18 and 19.

In particular, the lines with arrows indicate a direction of rotation, e.g., 288, of each of the magnets. In this example, the magnets rotate counter clock-wise. The circles with the arrows, "x", or blank represent the polarity directions of magnets, 282*a*, 282*b*, 282*c* and 282*d*. The magnets are orientated, such as that a one-side flux magnetic flux distribution is generated as previously described above.

As the magnets rotate in unison, the orientation of the magnetic poles change, such that the one side flux distribution appears to rotate in a clockwise direction, i.e., the direction the motor is rotating 290. A reverse in a direction of the motor would cause the one sided flux distribution to move in the opposite direction. The change in the magnetic flux distribution as a function of time can cause an interaction with a conductive substrate to generate magnetic lift. Further, as described above, the motor and the rotating magnets can be tilted relative to a conductive substrate to generate propulsive forces.

In one embodiment, the magnets are coupled to the motor 292 via a gear system to transfer the rotational movement of the motor to each of the four magnets via the four rotation arms coupled to the motor. The four rotation arms can each include an axel which is coupled to a support structure in some manner (not shown). The support structure can include rotational bearings.

The magnets are shown as boxed shaped. However, different shaped magnets, such as cylindrical shaped magnets can be used. In addition, more than four rotational arms along which permanent magnets are arranged can be used.

The length of each magnet can vary from rotation arm to rotation arm. Further, the shape of each magnet can vary along each rotation arm. Also, the moment of inertia of the magnets can vary along each of the rotation arms. For example, more magnet mass can be concentrated at different locations along the rotation arms.

In one embodiment, while maintaining the one side flux distributions, the magnet polarities can vary along each of the rotation arms. For example, the magnets shown in FIG. 18 can be split into two parts along each of the rotation arms. Then, on each rotation arm, one of the two magnets can be rotated by some amount around the rotation arm relative to the other magnet, such that the north and south poles on each of the two magnets on each rotation arm are no longer aligned. In operation, two regions of one side flux distributions are generated where the poles appear to rotate. However, in each region, the magnetic poles are offset relative to one another. The amount of offset depends on how far the magnets are rotated relative to one another.

An example of configuration where the magnet polarities vary along the rotation arm is shown in FIG. 20. On each rotation arm, two permanent magnets, such as 298*a* and 298*b*, are shown. In this example, magnet 298*a* has a larger mass than magnet 298*b* and has a different polarity direction. A motor (not shown) transfers torque to cog 294. Cog 294 turns in a clockwise direction 290 to turn gears, such as 296, in a counter clockwise direction as indicated by the arrows.

Track Configurations

Next, a few examples of track configurations are described with respect to FIGS. 21-24. As described above, a hover engine induces eddy currents in a conductive substrate. The material properties of the conductive substrate affect the properties of the eddy currents which are generated. When a conductive substrate is utilized in a track which is assembled in segments. Depending on how the track is assembled, the conductive properties can change at the interface between the segments. The change in conductive properties can affect how much lift and drag are output from a hover engine when the hover engine passes over the interface. At the edge of track, the eddy currents can also be affected by the limited area, i.e., the eddy currents can't extend beyond the edge of the track. Thus, again, the lift and drag which are output from a hover engine can change as it approaches and interface.

Figure 21:
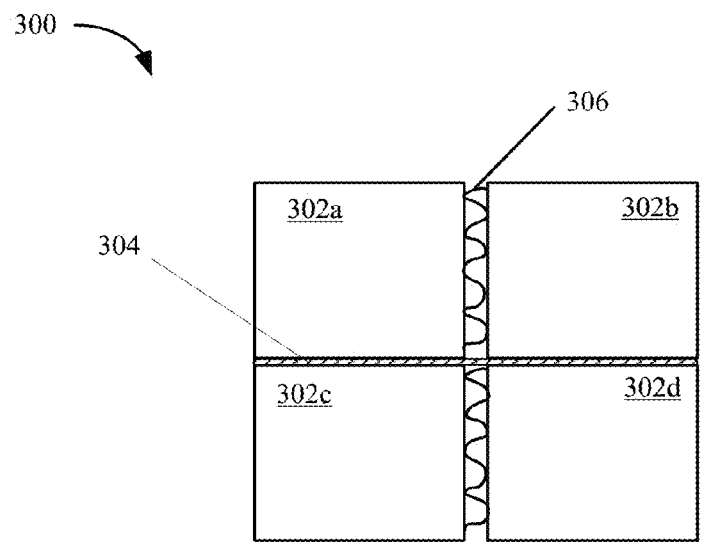
FIGS. 21 to 24 are illustrations of track configurations in accordance with the described embodiments.

Track segment interfaces are described with respect to FIG. 21. In FIG. 20, a track 300 including four segments, 302*a*, 302*b*, 302*c* and 302*d* is shown. The segments can be formed from a conductive material, such as but not limited to copper.

In one embodiment, the track pieces may be simply pushed together and held in contact with one another via a mechanical system. In another embodiment, the pieces may be electrically insulated from one another. Thus, current may not flow from segment to segment.

In yet another embodiment, a conductor, such as a metallic strip can be used between the segments. For example, a flexible conductive strip 306 is used as a contact between the two segments 302. The conductive strip 306 includes ridges. When the two segments are pushed together, the conductive strip 306 can flatten to increase the contact area provided by the strip.

The conductive strip can be incorporated in a frame (not shown). The frame can include interlocking pieces that allow two segments to be mechanically joined. In a further embodiment, a conductive paste 304 or adhesive can be used at the interface. The conductive paste can be used alone or combination with other methods, such as the conductive strip 306.

Figure 22:
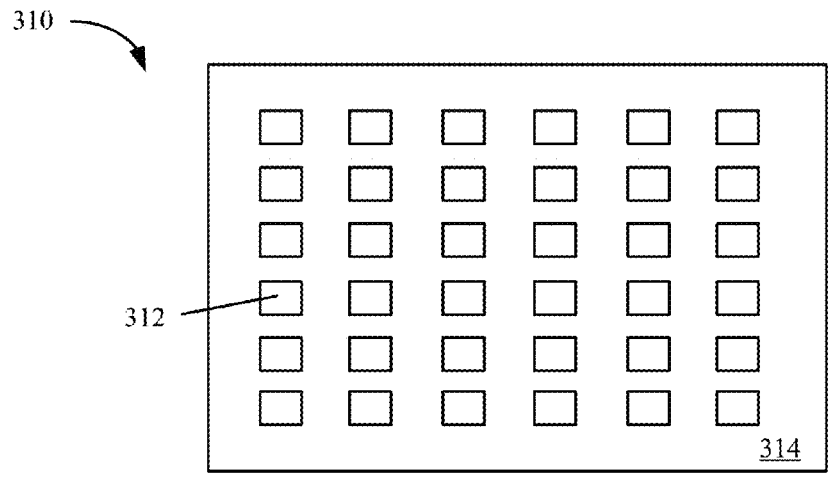

In one embodiment, a track can have holes. In FIG. 22, a track 310 with square holes is shown. The holes can be formed by removing material, such as stamping out holes in a copper sheet. In another example, the conductive strips, such as metal strips can be interleaved to form the track 310.

Rather than being holes which pass all the way through the substrate 314, a portion of material may be removed, such as to form square recesses. Further, track can be formed in the layers where the layers may have different degrees of solidity. For example, a top layer of a track can be formed from a solid sheet while one or more layers below the top layer can have apertures, such as stamped holes or via use of a wire mesh.

A track 310 with holes can reduce the ability of eddy currents to flow through the track. In simulations, it was predicted that holes can change the amount of lift and drag output from a hover engine. In particular, less lift and more drag was generated from a hover engine operating over a solid track as compared to a track with holes.

One advantage of forming a track with holes can be a reduction in an amount of conductor which is needed. Further, a track with holes might be used to bring a hover vehicle to rest. The amount of material which is removed can be increased from a first position to a second position. As a vehicle travels from the first position to the second position, the lift can decrease and the hover height of the vehicle will be decreased until the vehicle is brought to rest on the top surface of the track. In another embodiment, the track can be thinned from the first position to the second position. During this maneuver, the hover engine can operate at a constant condition, such as at a constant RPM. This approach may be used as an alternate or in conjunction with changing the RPMs of the hover engine to bring it to rest.

Figure 23:
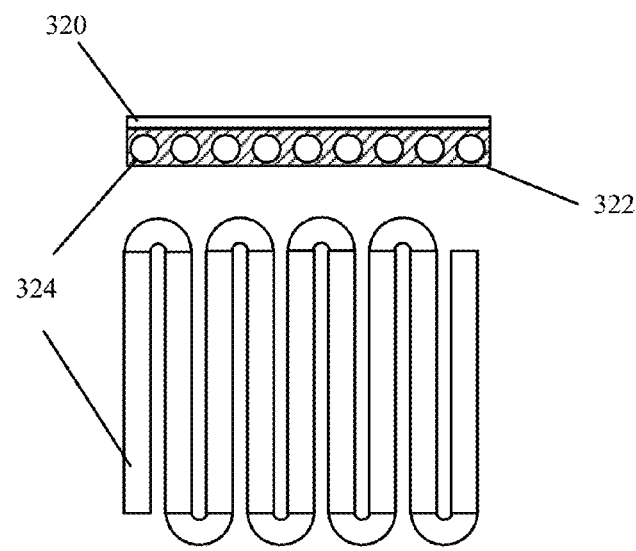

Heat can be generated as a result of the resistance of a conductor to the flow of electrons induced by a hover engine. In some embodiments, a track configuration can include integrated cooling mechanisms. For example, as shown in FIG. 23, pipes 324 can be placed below the conductive substrate 320 in some medium 322, such as concrete, dirt or gravel. The pipes can be configured to carry a fluid or a gas which carries away heat generated in the conductive substrate. The pipes 324 can be made from a conductive material, such as copper. In this instance, eddy currents can be induced in the pipes which can affect the magnetic forces acting on the vehicle. In other embodiment, plastic or some other material can be used to form the pipes.

Figure 24:
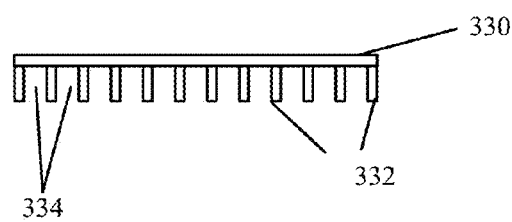

As another example, as shown in FIG. 24, cooling fins 322 are provided beneath the conductive substrate 330. The cooling fins 332 can be configured to carry away heat from the conductive substrate. In one embodiment, the heat can be radiated into air gaps 334 between the fins. In some embodiments, a forced air system can be used to move air through the air gaps to cool the fins. In another embodiment, water can be circulated between the gaps of the cooling fins to carry away heat from the cooling fins. The cooling fins will be generally be formed from a thermally conductive material, which may be the same or different than the material used for the conductive substrate 330.

Magnetic Lift and Propulsion

Next, some details involving propulsion of a vehicle including one or more STARMs are described with respect to FIGS. 25A-34B. In particular embodiments, an orientation of one or more STARMs relative to a substrate can be used to generate propulsive and/or control forces. Other mechanisms of propulsion are possible, alone or in combination with controlling the STARM orientation to generate propulsive and directional control forces. Thus, these examples are provided for the purpose of illustration only and are not meant to be limiting.

Figure 25A:
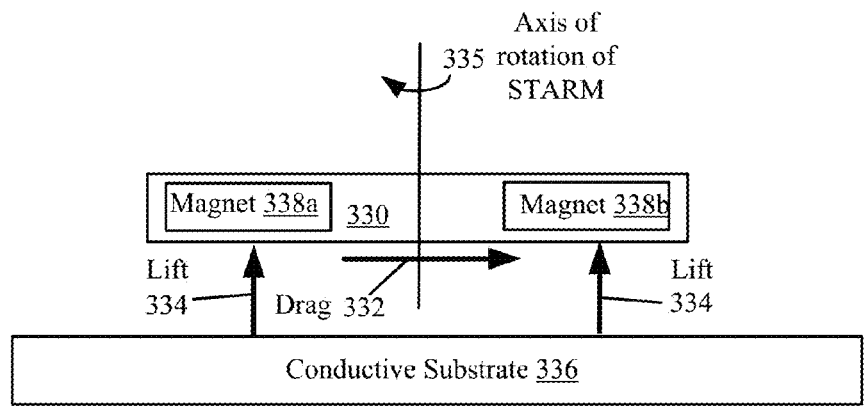
FIGS. 25A, 25B, 26 and 27 are illustrations of STARMs tilted relative to a conductive substrate and associated forces which are generated in accordance with the described embodiments.

In FIG. 25A, a STARM 330 is shown in a neutral position. The STARM includes magnets, such as 338a and 338b. In the neutral position, the lifting forces 334 on average over time are equal across the bottom surface of the STARM 330. Further, the net drag forces 332 acting on the STARM 330 are balanced (While rotating, the STARM generates a magnetic field which is moved through the conductive substrate 336. The eddy currents formed in the substrate as a result of the moving magnetic field resist this movement, which can act as a drag force 332 on the STARM 330). With imbalances due to lift and drag balanced, the STARM 330 will substantially remain in place of over the conductive substrate.

Small imbalances may exist, which cause the STARM to move in one direction or another. For example, local variations in material properties in the conductive substrate 336 can cause small force imbalances. As another example, the dynamic vibration of the STARM 330, such as from adding or removing loads can cause small force imbalances. However, unless the small force imbalances are biased in a particular direction, the STARM will remain relatively in the same location (i.e., it might move around a particular location in some manner).

If the rotational momentum is not balanced, the STARM may rotate in place. A vehicle can include multiple STARMs which are counter rotating to balance the rotational forces. Further, as will be described below in more detail, the orientation of a STARM can be controlled to generate a moment around a center of mass of a vehicle, which allows the rotation of a vehicle to be controlled.

Figure 25B:
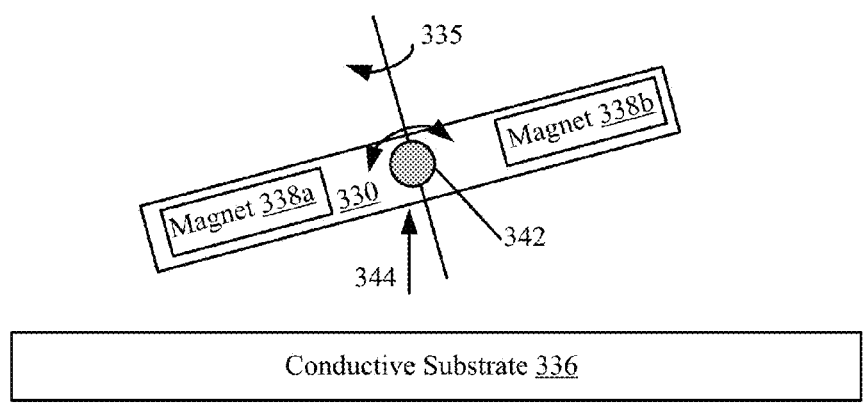

FIG. 25B shows the STARM 330 in a tilted position. The STARM 330 has been rotated around an axis 342 which is perpendicular to the axis of rotation 335 of the STARM 330. When the STARM 330 is tilted, more drag is generated on the side of the STARM 330 closest to the substrate 336. As is described in more detail below, the drag typically increases when the magnets are brought closer to the substrate. The drag imbalance on the different sides of the STARM causes a thrust to be generated mostly in the direction of the tilt axis 342, i.e., into or out of the page. For some magnet and system configurations, the lift 344 can remain relatively constant or even increase as a function of tilt angle, i.e., lift 344 can be greater than lift 334. The amount of thrust may increase when the tilt angle is first increased. The amount of tilt which is possible can be limited to prevent the STARM 330 form hitting the substrate 336.

Figure 26:
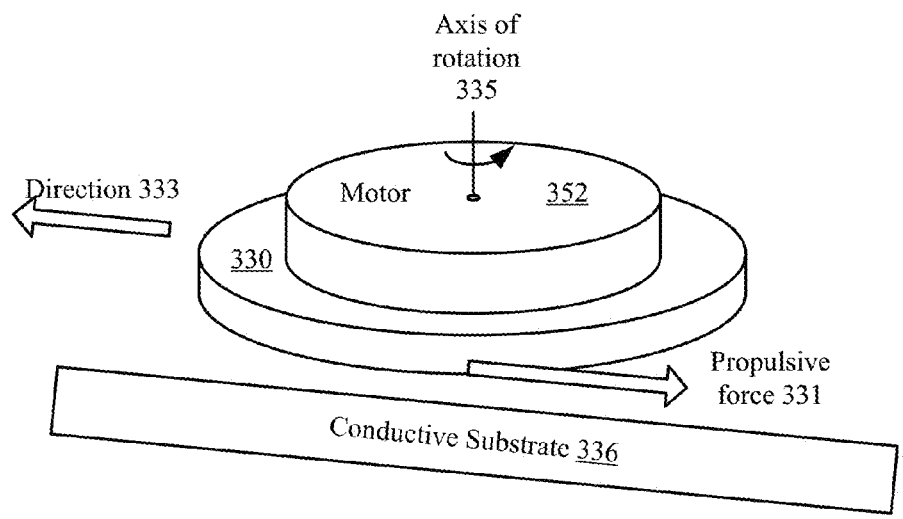

FIG. 26 shows an example of a hover engine including a STARM 330 and motor 352 climbing an inclined substrate 336. The hover engine is tilted to generate a propulsive force 331 which moves the hover engine in direction 333 up the included surface. In one embodiment, the magnitude of the propulsive force 331 can be sufficient for a hover engine to lift a payload in a vertical direction. For example, the conductive substrate 336 can be aligned vertically and the hover engine can be configured to climb vertically and carry its weight and a payload up the wall.

Various mechanisms may be used to keep the hover engine close to the vertical surface. For example, the hover can be held in place relative to the vertical surface using a track of some type. In another example, a mechanism can be used which pulls the hover engine towards the vertical surface can be used. As described above, hover engines can be configured to generate an attractive force which can be used to keep the hover engines close to a vertical surface when it is climbing. More details of track configurations for horizontal motion and vertical climbing are described in the section titled "Applications."

Figure 27:
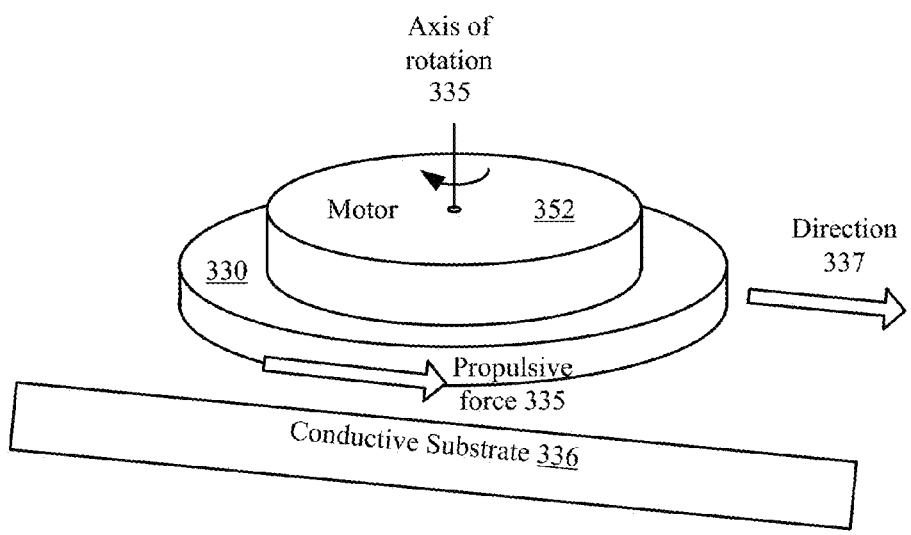

FIG. 27 shows an example of a hover engine braking as it descends down an incline. In FIG. 27, the hover engine, which includes motor 352 and STARM 330, is moving down a sloped substrate in direction 337. The hover engine is outputting a propulsive force 335 which is pushing the hover engine up the incline opposite the direction of movement 337. The braking force slows the descent of the hover engine down the inclined substrate. In a particular embodiment, a hover engine can be configured to output a sufficient force to allow it to hold its position on an inclined surface, i.e., the force output from the hover engine balances the gravitational forces. In general, hover engines can be configured to output forces in a direction of movement for propulsion or opposite the direction of movement for braking.

Figure 28:
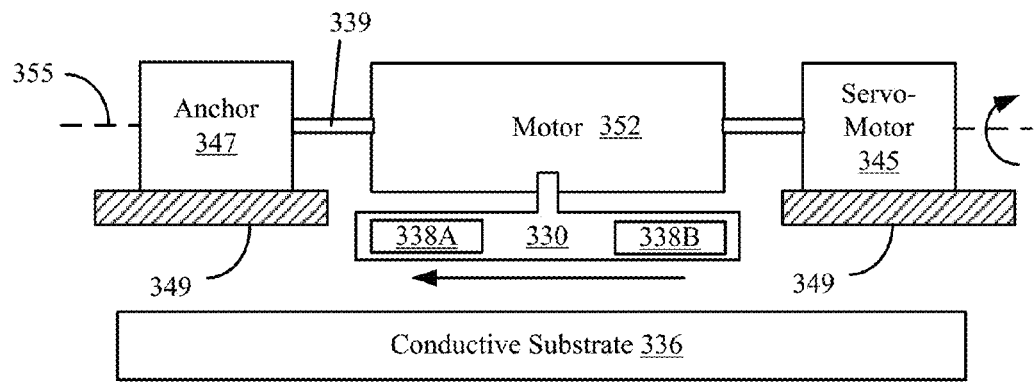
FIG. 28 is an illustration of a hover engine configured to tilt in accordance with the described embodiments.

Additional details of hover engine configurations which generate propulsive forces via a change in orientation of its STARM relative to a conductive substrate are described as follows. As mentioned above, actuators can provide orientation control in a hover engine. In FIG. 28, a servo-motor 345 which is part of an actuator can be configured to rotate hover engine including a motor 352 and STARM 330 configuration about an axis 355. In this embodiment, the motor 352 is coupled to member 339. Member 339 is coupled to an anchor 347 on end and the servo motor 345.

The servomotor 345 provides a force which causes the motor 352 and STARM 330 to tilt as unit. In one embodiment, the servomotor 345 can be configured to output a torque which rotates member 339. In another embodiment, the servomotor can be configured to outputs a linear force. The linear force can be used to push against a lever arm coupled to the member 339 which converts the linear force into a torque that rotates member 339. In one embodiment, the STARM 330 and/or motor 352 can be tilted plus and minus some angle from horizontal, such as plus and minus ten degrees. This configuration allows a force to be generated in a first direction and a direction opposite the first direction depending on the direction the motor and STARM are rotated about axis 355.

The horizontal position is referenced as a tilt angle of zero when the STARM 330 is approximately parallel to the support structures 349. Thus, the tilt angle can be referenced to a reference frame associated with a device using the hover engine. This reference frame accounts for the situation where the device is tilted relative to the substrate 336. Thus, the tilt angle of the STARM 330 relative to the substrate 336 is a combination of the tilt angle of the STARM 330 relative to the device and the tilt angle of the device relative to the substrate 336. In various embodiments, a magnetically lifted device can have one or more sensors for detecting one or more of a tilt angle of the STARM 330 (as well as the hover engine) relative to the device, a tilt angle of the device relative to the substrate 336 and a tilt angle of the STARM 330 relative to the substrate 336.

As an example, a first sensor can be used to detect a tilt angle of the STARM 330 relative to the device, a second sensor can be used to detect a tilt angle of the device relative to a conductive substrate 336 and a third sensor can be used to detect a tilt angle of the STARM 330 relative to the substrate 336. In one embodiment, a magnetically lifted device can have sensors placed at various locations which are used to determine a distance from the location to the conductive substrate. Using the known placement locations of the sensors and the determined distances, an orientation of the device relative to the substrate can be estimated. As an example, the sensors may emit an electromagnetic or acoustic signal towards a surface and detect a reflected signal to determine a distance to the surface.

In yet another embodiment, the STARM can be configured to rotate in only one direction from the horizontal, such as from zero to twenty degrees. In this configuration, the STARM may only generate force in one direction where the amount of force which is generated can vary according to the amount the STARM is tilted relative to the surface. Again, the propulsive force which is output from the hover engine will depend on the orientation of the magnets, such as 338A and 338B, relative to the conductive substrate 336. Thus, to output a desired propulsive force, the overall orientation of the STARM relative to the surface may be considered and not just how much the STARM has been tilted relative to the device to which it is mounted. In other embodiments, such as when the device is not expected to tilt much relative to the conductive substrate in operation, this effect may be ignored by the control system.

In yet another embodiment, the actuator 345 can be configured to rotate the STARM through a greater angle in one direction about axis 355 as opposed to the other direction. For example, the actuator 345 can be configured to rotate the STARM between a maximum of plus fifteen degrees past horizontal and minus five degrees past horizontal. Thus, the maximum amount of force which can be generated in one direction may be greater than the maximum amount of force which can be generated in the opposite direction.

Figure 29:
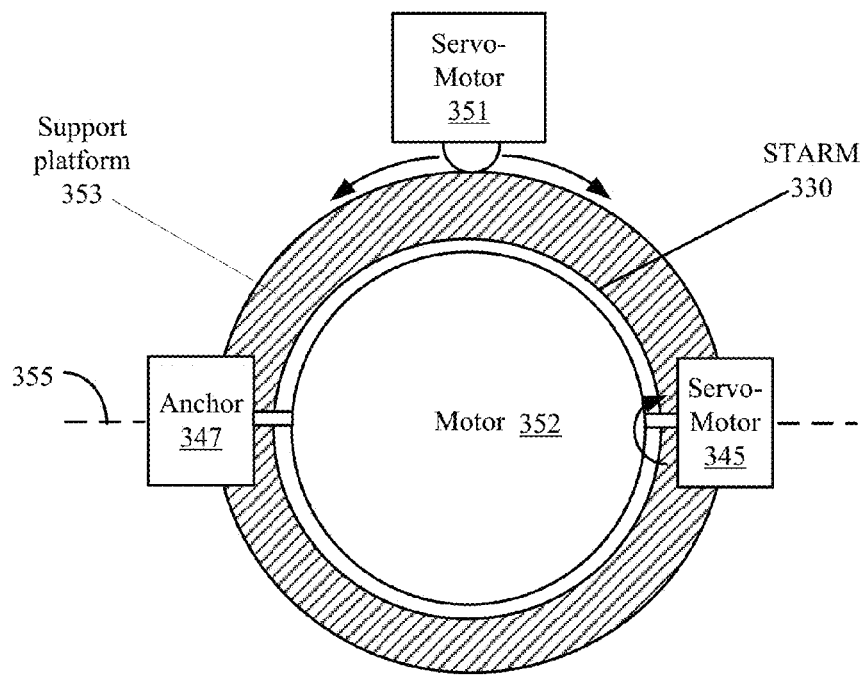
FIG. 29 is an illustration of hover engine configured to tilt and rotate in accordance with the described embodiments.

Next a few embodiments of STARMs with multiple degree of freedom control are described. In FIG. 29, a design similar to FIG. 28 is shown. The design includes a STARM 330 and motor 352 coupled to a first actuator 345. The first actuator 345 can be controlled to rotate the motor 352 and STARM 330 through some angle about a first axis 335. The STARM, motor and first actuator are coupled to a support platform 353. The support platform 353 can be coupled to the support frame of a magnetically lifted device.

A servo motor 351 is provided which can rotate the support platform 353. A rotation of the support platform changes a direction of the first axis 355 around which the motor and STARM are rotated by the first actuator. Since the propulsive force resulting from tilting the STARM 330 may be substantially aligned with the first axis 355, a change in the direction of the first axis 355 can change the direction in which the propulsive force acts. Thus, the support platform 353 may be rotated to change the direction of force generated by the hover engine including STARM 330 and hence steer a device including the hover engine in a different direction.

Figure 30A:
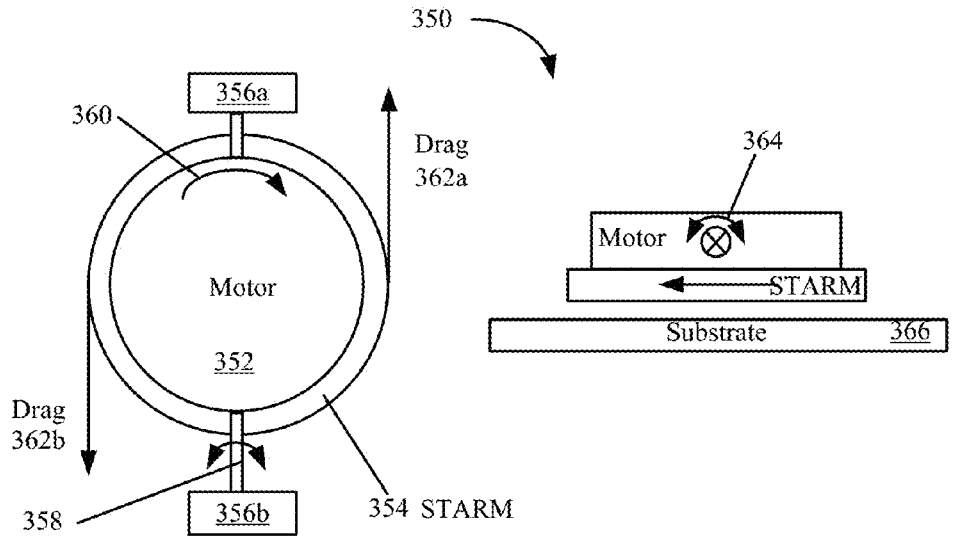
FIG. 30A to 30C are illustrations force imbalances resulting from tilting a hover engine in accordance with the described embodiments.
Figure 30B:
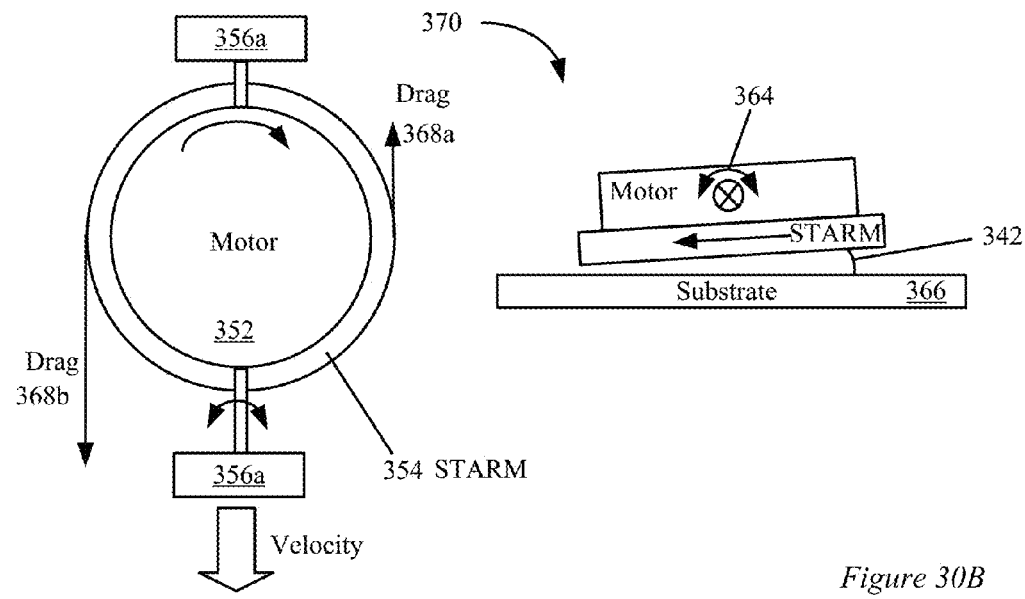
Figure 30C:
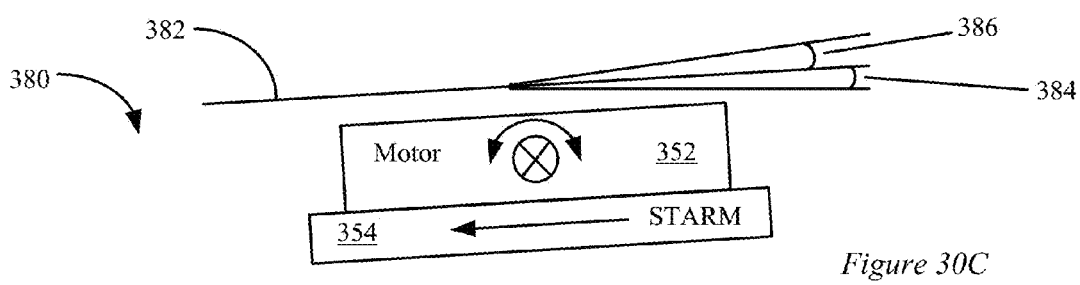

FIGS. 30A, 30B and 30C are block diagrams which are used to discuss more details associated with hovering and propulsive effects from rotating arrangements of magnets used in a hover engine. In FIG. 30A, a hover engine includes a motor 352 is coupled to a STARM 354. The STARM 354 is coupled to the motor 352 and the motor 352 is coupled to a rotatable member 358. The rotatable member 358 is coupled to anchors 356a and 356b. The combination of the rotatable member 358 and the anchors 356a and 356b can be configured to constrain a range of rotation of the rotatable member. For example, the rotatable member 358 may be allowed to rotate through some angle range 364 around its axis.

The rotatable member 358 can be configured to receive and input torque from some mechanism. For example, in one embodiment, a mechanical linkage can be provided which allows a user to supply a force. The force can be converted into torque which causes the rotatable member 358 and hence the motor 352 and the STARM 354 to rotate.

In another embodiment, an actuator can be used to supply the torque to rotate rotatable member 358. An actuation of the actuator can cause the motor 352 and STARM 354 to tilt relative to the substrate 366. The actuator can include a servo motor which receives control commands from a controller. In one embodiment, the actuator can include its own controller which receives control commands from a separate processor, which is part of the control system.

In yet another embodiment, a hover engine can be configured to receive an input force from a user and can include an actuator. The actuator can be used to change a position of the STARM, such as returning it to a designated position after a user has tilted it. In another operation mode, the actuator can be used to provide automatic control around some tilt position initiated by user via an input force.

It yet another embodiment, the actuator can be used to provide automatic controls which may be used to correct a control input from a user. For example, if the control system detects the magnetically lifted device is an unstable position as a result of a user input, the control system can control one or more STARMs to prevent this event from happening. A magnetic lifting device, such as hoverboard, can include one or more on-board sensors used to make these corrections.

A magnetically lifted device may also include one or more weight sensors for determining a weight distribution of a payload. The weight distribution associated with the device and payload can affect the response of the device in response a command to change an orientation of the device via some mechanism, such as a tiltable hover engine. For example, the weight distribution associated with a payload can affect the magnitude of rotational moments. Thus, knowledge of the weight distribution may be used to more finely tune the commands used to control the orientation of the STARM, such as selecting which STARM to actuate and an amount to actuate it.

When the STARM 354 and motor 352 are rotating, a rotation of the rotatable member 358 changes the angular momentum of the STARM and the motor. It can also change the magnetic forces acting on the STARM 354 as the magnetic forces vary with the distance of the magnets in the STARM 354 from the substrate 366. Therefore, the amount of torque needed to rotate the member 358 can depend on the moment of inertia associated with the STARM 354 and motor 352, how fast the STARM 354 and motor 362 are spinning and the height of the STARM 354 above the substrate 366. The height of the STARM above the substrate can depend on 1) its rotational velocity, which affects how much lift is generated, and 2) a payload weight and 3) how the payload weight is distributed on the device. The height of the STARM above the substrate can vary for different portions of the STARM and from STARM to STARM when a device includes multiple STARMs.

In the example of FIG. 30A, the STARM 354 is approximately parallel to the substrate 366. The magnetic drag, such as 362a and 362b, opposes the rotation of the STARM 354. The motor 352 is configured to rotate in the clockwise direction 360. Thus, the drag torque is in the counter clockwise direction. Power is supplied to the motor 352 to overcome the drag torque.

When the STARM is parallel to the substrate 366, the magnetic drag is balanced on all sides of the STARM 354. Thus, there is no net translational force resulting from the magnetic drag. As is described with respect to FIG. 25B, a net translational force is generated when the STARM 354 and its associated magnets is tilted relative to the substrate.

In FIG. 30B, the STARM 354 is in a titled position 370. Thus, one side of the side of STARM 354 is closer to the substrate 366 and one side of the STARM 354 is farther away from the substrate 366. The magnetic interaction between the magnets in the STARM 354 and substrate decreases as a distance between the magnets in the STARM and substrate 366 increases (As shown in the Figures below, the magnitude of the interactions vary non-linearly with the distance from the substrate.) Thus, in tilted position 370, the drag force 368b is increased on one side of the STARM 354 and the drag force 368a is reduced on the opposite side of the STARM 354 as shown in FIG. 30B. The drag force imbalance creates traction, which causes a translational force to be generated approximately in the direction of the axis of rotation of the rotational member 358.

When the STARM 354 is initially tilted, the translational force can result in an acceleration of the STARM 124 in the indicated direction and hence change in velocity in the indicated direction. In particular embodiments, with one or more STARMs configured to generate translational forces, a device can be configured to climb. In another embodiment, the device may be configured to maintain its position on a slope while hovering such that the gravitational forces acting on the device are balanced by the translational forces generated by the device and its associated hover engines.

A configuration and operational mode where a position of a device, such as a hoverboard, is maintained on a sloped substrate may be used as part of a virtual reality system where a user wears a virtual reality headset. Via the headset, the user may only see images generated by the headset or may see images generated by the headset in conjunction with the local surrounding visible to the user. A virtual reality headset may be used to generate images of a user moving through some terrain, likes a snowy slope, while the hovering device on which the user is riding moves side to side and forward and back on the sloped substrate. The sloped substrate may provide the user with the feeling of moving on a tilted slope while the virtual reality images may provide the visual imagery associated with movement. Fans may be used to add an additional sensation of movement (e.g., the feeling of wind on the user's skin).

The device can have sufficient propulsive ability to allow it to hold its position on the slope against the force of gravity. For example, the device can be moved side to side while it maintains its position on the slope. Further, the device may be able to move downwards on the slope and then climb upwards on the slope against gravity. In some instance, the climbing can be done while the device's orientation remains relatively unchanged, i.e., the device doesn't have to be turned around to climb. This maneuver can be accomplished by changing an orientation of the hover engines relative to the substrate which supports the induced eddy currents. These control functions will be discussed in more detail as follows.

Returning to FIGS. 30A and 30B the amount of tilt in a particular direction can affect the amount of force imbalance and hence the magnitude of the acceleration. Because the magnetic drag is function of the distance of the magnets from the substrate, the magnetic drag increases on the side closer to substrate and decreases on the side father away from the substrate. As the magnetic forces vary non-linearly with the distance of the magnets from the surface, the amount of translational forces which are generated may vary non-linearly with the tilt position of the STARM.

After a STARM 354 (or both the STARM 354 and motor 352) has been rotated via member 358 in a counter clockwise direction and the STARM has started translating in a first direction, an input torque can be provided which tilts the STARM in a clockwise direction to reduce the amount of translational force which is generated by the STARM. When the STARM is tilted past the horizontal in the clockwise direction, the STARM may generate a translational force which is in an opposite direction of the first direction. The translational force opposing the direction of motion can slow the STARM and bring it to rest. If desired, the translational force can be applied such that the hoverboard stops and then the STARM can begin to translate in an opposite direction.

FIG. 30C is a side view of a hover engine 380 coupled to a tilt mechanism in a tilt position. The hover engine includes a motor 352 and a STARM 354 which can be positioned over the substrate 366 as shown in FIGS. 25A and 25B. In one embodiment, the mechanism can include a minimum tilt off set angle 384. The minimum tilt off set angle 384 in this example is between the horizontal and line 382. The tilt range angle 386 is the angle amount through which the hover engine may rotate starting at the minimum tilt off set angle 384. The tilt mechanism can include one or more structures which constrain the motion of the tilt mechanism to the tilt angle range.

When the minimum tilt off set angle 384 is zero and the STARM 354 is parallel to the substrate 366, the STARM 354 may not generate a net translation force. A device to which a STARM is coupled can be tilted. Therefore, the angle of the STARM relative to the substrate can depend on the orientation of the STARM relative to some reference system associated with the device and the orientation of the device relative to the substrate where both orientations can change as a function of time. Thus, in some instances, a translation force can be generated even when the minimum tilt off-set is zero. When the minimum tilt off set angle is greater than zero, the STARM may generate a net translational force at its minimum position in a particular direction. When the minimum tilt off set angle is less than zero, then during the tilt angle range the magnitude of the force may be go to zero and the direction of the force which is generated can also change.

In some embodiments, the net minimum force generated by one hover engine can be balanced in some manner via translational forces associated with other hover engines. For example, as shown, two hover engines can be tilted to generate forces in opposite directions to cancel one another. Thus, although the net force for a single hover engine may be greater than zero at its minimum tilt off set angle position, it can be balanced by forces generated from another STARM such that the net force acting on the device is zero.

The forces which are generated from a tilted STARM can vary non-linearly with angle of the hover engine relative to the substrate. Thus, the change in force which is generated as a function of a change in angle can vary non-linearly. By utilizing, a minimum tilt angle offset, the hover engine can be configured to output more or less force in response to a change in a tilt angle over a selected tilt angle range. In this manner, the control characteristics of the device can be adjusted.

In one embodiment, the tilt mechanisms can include an adjustable tilt off set mechanism that allows the minimum tilt off set angle to be manually set. For example, a rotatable member with a protuberance can be provided where the protuberance is configured to impinge on a screw at one end of its range of rotation. As the screw is unscrewed, the range of rotation of the rotatable member can be decreased and the minimum tilt off set angle can be increased and vice versa. Using the adjustable tilt off set mechanism, a user or operator may be able to manually adjust the handling characteristics of the device.

Next, with respect to FIGS. 31A, 31B, 32A and 33B some details of apparatus and method which allow a hover engine with tilt capabilities to be operated and integrated into a magnetically lifted device are described. In addition, some methods and apparatus for providing the force which is used to tilt the hover engine are described. With respect to FIGS. 33A, 33B, 34A and 34B, some alternates methods which may allow a propulsive force to be generated without tilting the hover engine including the STARM relative to the device are described.

Figure 31A:
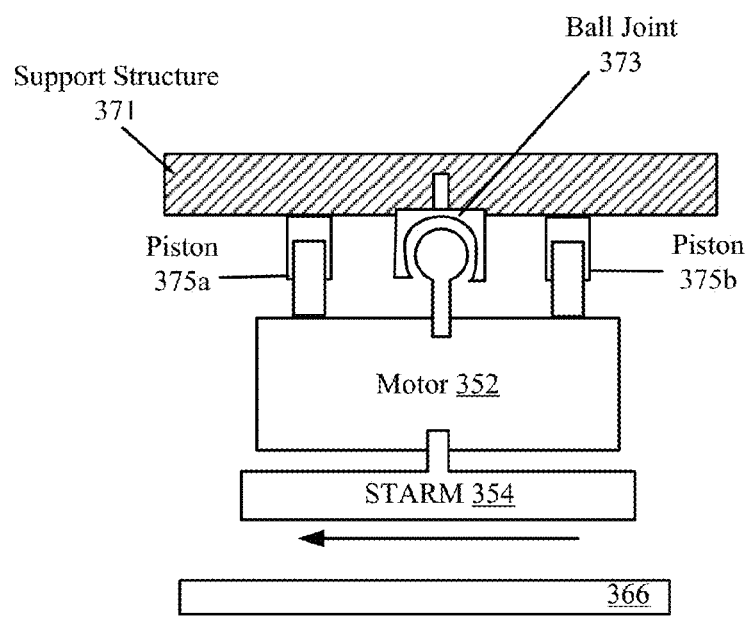
FIGS. 31A to 32B are illustrations of orientation control mechanisms for a hover engine in accordance with the described embodiments.

Next, another example of a STARM which can be tilted through multiple degrees of freedom is described. In FIG. 31A, hover engine including a STARM 354 coupled to a motor 352 is shown. The hover engine is coupled to a support structure 371 via a ball joint 373. Two pistons, 375a and 375b, are shown which are coupled to the hover engine and the support structure 371. The pistons, 375a and 375b, can be used to push the hover engine downward and change a tilt angle of the STARM 354 relative to a substrate 366. A plurality of different pistons can be used to tilt the motor in a plurality of different directions. Other types of actuators can be used which generate a downward force on the hover engine to tilt the STARM 354 and the example of a piston for the purposes of illustration only.

Figure 31B:
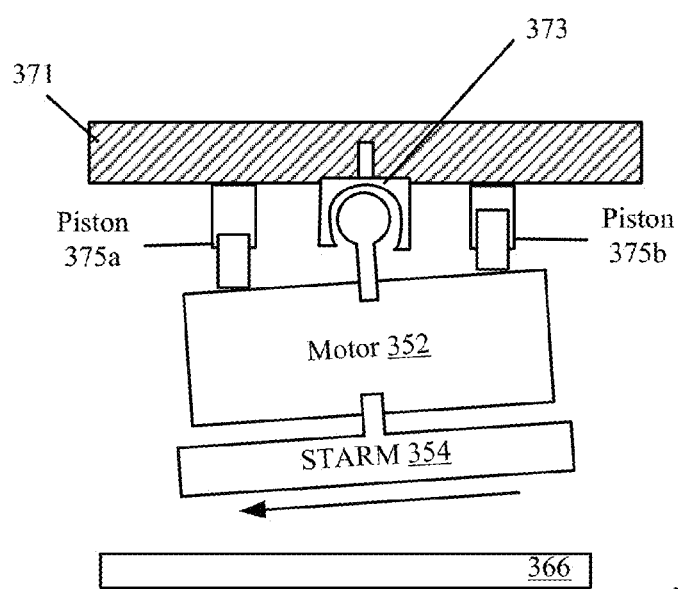

In FIG. 31B, a first piston 375A is shown extended downwards, which tilts the motor 352 and STARM 355 downwards on one side. To bring the motor 352 back to a horizontal position, the second piston 375b can be extended downwards which causes the first piston to shorten 375a. To tilt the motor 352 and STARM 354 in the opposite direction, the second piston 375b can be extended a greater amount, which forces the first piston to shorten 375a. In various embodiments, multiple pairs of pistons can be used to tilt the motor in different directions and change a direction in which a force is generated as a result of tilting the STARM. The pistons can be coupled to the motor and/or the support structure via an appropriate joining mechanism which may possess some rotational degrees of freedom.

Figure 32A:
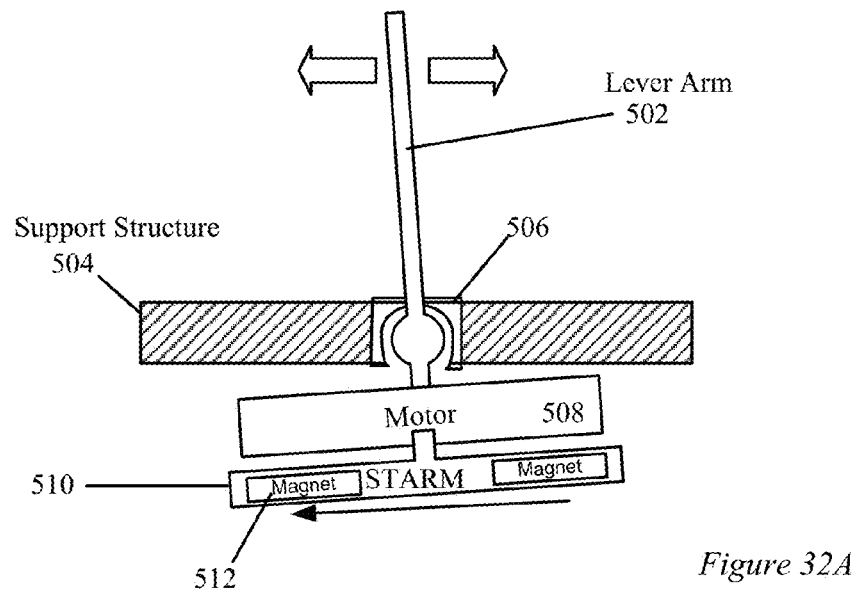

In FIG. 32A, a lever arm 502 is coupled to a motor/STARM via a ball joint 506. When hovering, a movement of the lever arm 502 from side to side can cause the STARM 510, which includes an arrangement of magnets 512, to tilt relative to a conductive surface such that a vehicle including the hover engine moves forward and backward. The amount of side to side tilt can affect the speed at which a vehicle moves in these directions. A movement from front to back can cause the STARM 510 to tilt such that the vehicle moves either left or right. A combination of a left or right movement and a front or back movement of the lever 502 can tilt the STARM such that the vehicle moves in various directions along different lines. A change in the lever direction as a function of time can change the direction vector of the force which is generated as a function of time and hence the vehicle can move along an approximately curved path.

In various embodiments, a mechanical linkage can be used which causes one or more hover engines to be tilted in response to a movement of the lever arm 502. For example, two hover engines can be coupled to a common rotational member such that both hover engines are rotated in response to a torque applied to the rotational member. In addition, digital controls can be used where a movement of the lever arm 502 is detected by one or more sensors. The sensor data can be received in an on-board processor. Based such factors, as an amount movement, a direction of movement and a rate of movement of the lever arm 502 and other factors, such as a current orientation and direction of motion of the vehicle, the on-board processor can generate one or more commands. The commands can be sent to one or more actuators via wired or wireless communications. The actuators can include logic devices (e.g., controllers) which enable communications with the on-board processor and interpreting of commands from on-board processor.

The one or more actuators can be coupled to a single hover engine or a plurality of different hover engines. In response to receiving the commands, the actuator controller can cause the actuator of output a force or a torque. The force or torque can cause the hover engine to change its position in some manner, such as but not limited to a tilt position.

In some embodiments, the on-board processor can send commands, which cause a rotation rate of a STARM associated with a hover engine to go to a particular RPM value. The motor commands, which can be received by motor 508, can be generated in conjunction with the actuator commands. The RPM value can affect the amount of force which is generated from the hover engine after its position has been changed. The motor 508 can include one or more controllers for 1) communicating with the on-board processor (wired or wirelessly), 2) processing the commands received from the on-board processor and 3) generating commands to control mechanisms associated with the motor which are used to implement the command, such as an amount of power delivered to the motor.

Figure 32B:
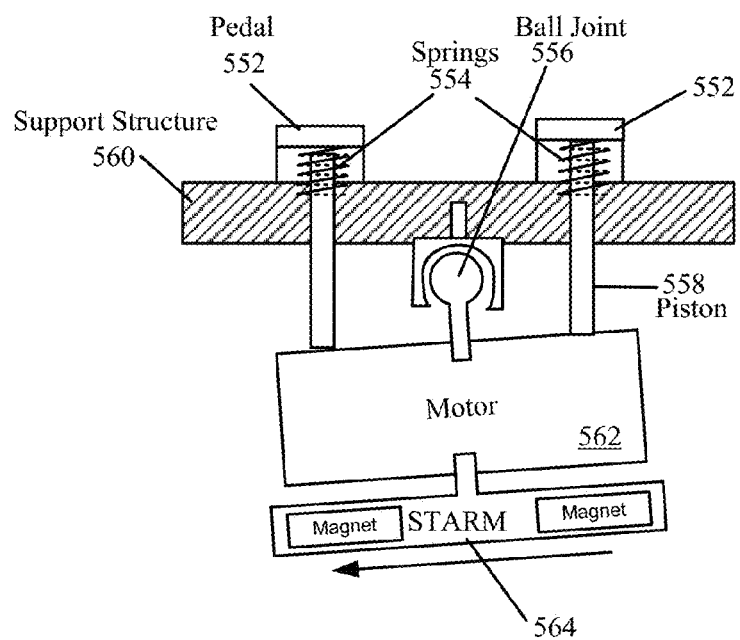

FIG. 32B shows foot pedals, 552, which can be used to tilt hover engine including a motor 562 and a STARM 564. When one foot pedal, 552, is pressed downwards, the STARM 564 can generate a force, perpendicular to the page, which can cause the vehicle to move forward. When the other foot pedal is pressed downwards, the STARM 564 can generate a force, which can cause the vehicle to move backwards. The amount each pedal is depressed can be used to control a speed of the vehicle in a particular direction. When a first pedal is pressed to move the vehicle in one direction, removing pressure from the first pedal and applying pressure to the second pedal can act as a brake to slow the vehicle.

A mechanism is provided with each foot pedal which generates a restoring force. It can also be used to affect how much force needs to be applied to a pedal to move the pedal. Further, the mechanism can limit how far the pedal can move. In FIG. 32B, the mechanism is represented as a spring. The mechanism can generate a force which is approximately linear and/or non-linear with the amount of displacement of the foot pedal. In particular embodiments, one or more mechanisms which generate a restoring force can also be used with the lever arm shown in FIG. 32A. Again, as described above, one or more foot pedals can be used as part of a digital control system.

Next, with respect to FIGS. 33A, 33B, 34A and 34B, some alternate embodiments of hover engine configurations which can be used to generate a propulsive force are described. In particular, apparatus and method are described which allow the propulsive force to be generated without tilting the hover engine relative to the magnetically lifted device and/or the conductive substrate. These embodiments may be used in lieu of or in combination with the methods and apparatus described above which utilize tilting of a STARM to change its orientation relative to the conductive substrate.

Figure 33B:
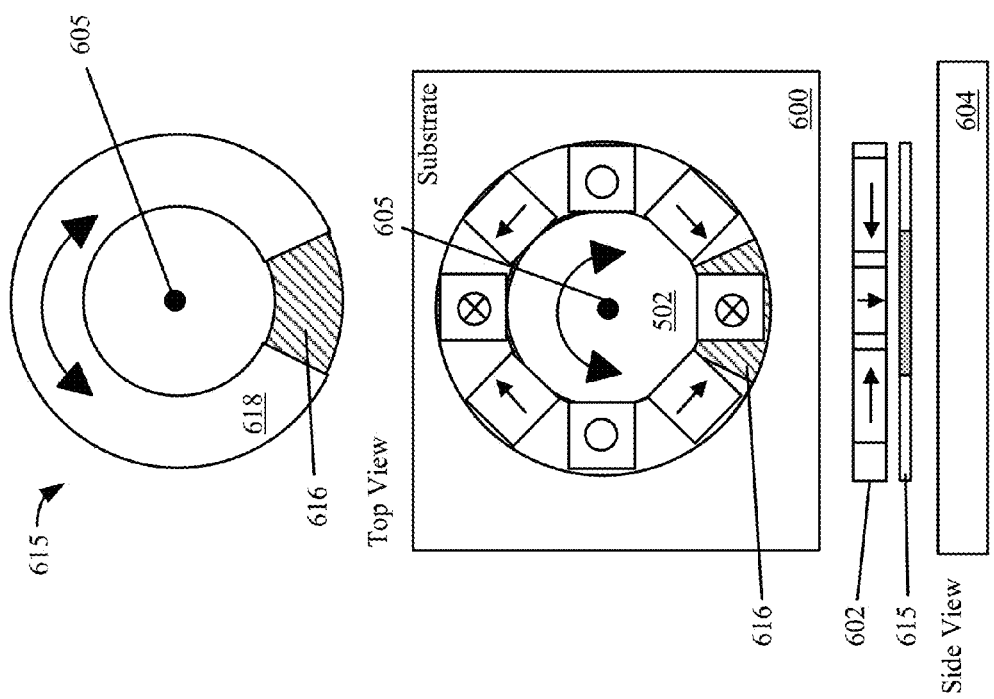
FIGS. 33A and 33B are illustrations of mechanisms interposed between a STARM and a conductive substrate which redirect magnetic fields associated with the STARM to generate propulsive forces in accordance with the described embodiments.
Figure 33A:
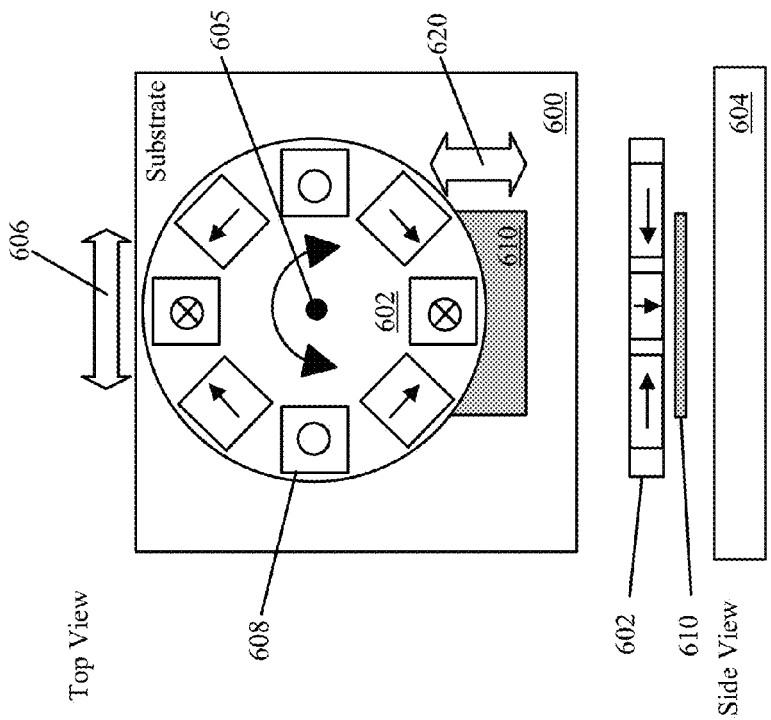

In FIGS. 33A and 33B, a STARM 602, which may be a component of a hover engine, is configured to rotate about axis 605 above a substrate 604. The STARM 602 can be configured to rotate in a clockwise or a counter clockwise direction. The STARM 602 includes eight polarity regions. In this example, the eight polarity regions are provided by permanent magnets with a square cross section, such as magnet 608.

In FIG. 33A, a component 610 is positioned between the STARM 602 and the substrate 604. The component 610 can be formed from a material with a high magnetic permeability, such as but not limited to, Metglas (Metglas, Inc. Conway, S.C.), iron, mu-metal, Nanoperm (Magnetic GmbH), electrical steel, ferritic stainless steel, Martensitic stainless steel, carbon steel, and cobalt. A mechanism can be provided which allows the slid from a position underneath the STARM 602 to a position that is no longer between the STARM 602 and the substrate. The mechanism can include an actuator that moves component 610 from a first position to a second position. In one embodiment, the component 610 can be moved in directions 620. The component 610 doesn't rotate with the STARM.

As an example, the component 610 can be coupled to structural members. The structural members can be attached to the component 610 on one end and engage a track on the other end. The track may allow the structural members and component 610 to move along the track to change a position of component 610 relative to the STARM. In one embodiment, the structural members and component 610 may be formed as a single piece.

When the STARM 602 is rotated above the substrate 604, the interposition of the component 610 can weaken the eddy currents formed in the substrate beneath it as compared to areas of the substrate beneath the STARM without component 610. This effect creates a drag imbalance which can cause a translational force, such as 606, to be generated.

The amount of force which is generated can be varied by covering a greater or lesser portion of the magnets on the bottom of the STARM. In a particular embodiment, a pair of components 610 can be used on opposite sides of the STARM. The pair of components can be independently actuated and controlled to be interposed between the STARM and substrate to change a direction and magnitude of the control forces which are output from a hover engine.

The drag reduction using component 610 differs from tilting the STARM, as previously described. When a STARM is tilted, the drag is increased on one side of the STARM as compared to the other STARM. Further, for some magnetic configurations, the net lift may also be increased. In the embodiment of FIG. 33A, the drag is lessened on one side. In addition, the lift is also lessened.

In FIG. 33B, a disk 615 is mounted beneath the STARM 602. The disk 615 doesn't rotate with the STARM 602. The disk 615 includes a first portion with a high magnetic permeability 616 and a second portion 616 with a magnetic permeability close to that of air (i.e., a relative permeability of one). Thus, the second portion 618 has little effect on the eddy currents which are formed in the substrate 604.

When the STARM 602 is rotated above the substrate 604, the first portion 616 weakens the eddy currents beneath it. This effect creates a drag imbalance which causes a thrust to be generated. In one embodiment, the disk 615 can be rotatable to allow it to be changed from a first position to a second position. As an example, the disk can include extensions which interface with a track, such as a track or groove integrated into the shroud. The disk and extensions can interface with the track such that the position of the disk can be changed.

The thrust direction depends on the position of the component 516. Thus, the disk can be actively rotated to change the thrust direction resulting from the interposition of component 616 between the STARM 600 and the substrate 504. In one embodiment, a vehicle can include a mechanism, such as an actuator, that is configured to rotate the disk 615 in responses to command from a controller. The controller can control the actuator to different positions and change the direction of the thrust which is generated. This mechanism can be utilized in a control system to move a vehicle from location to location.

When the STARM 602 is rotating, the disk 615 always causes a thrust to be generated. To allow a vehicle to remaining hovering at a particular location, some other force generating mechanism can be utilized which cancels this thrust. For example, two hover engines with disks, such as 615, can be utilized. The disks in the two hover engines can be rotated such that the thrust outputs cancel (opposite directions), partially cancel or are aligned with one another (same direction).

Figure 34B:
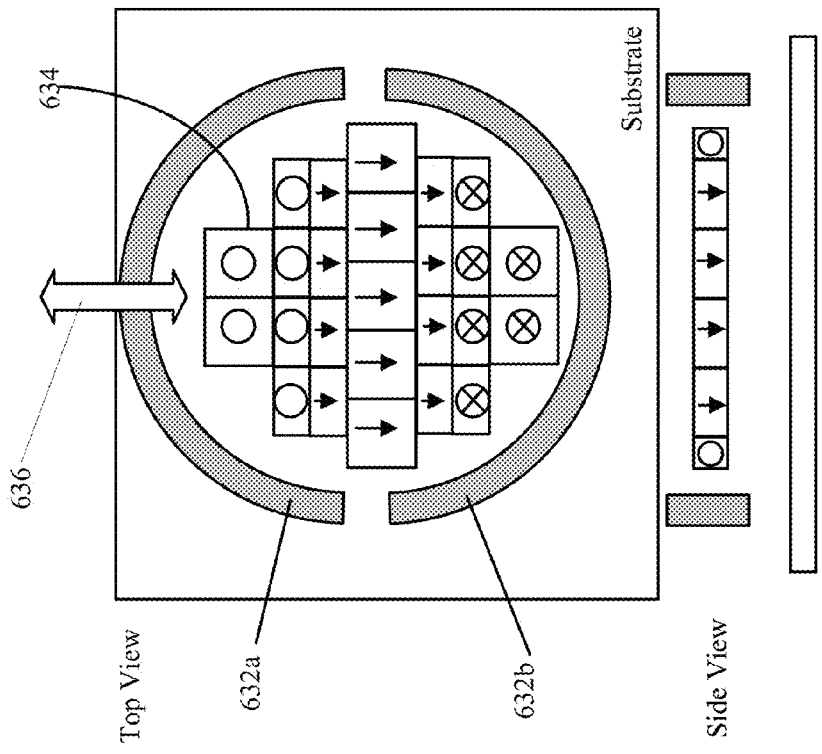
FIGS. 34A and 34B are illustrations of mechanisms adjacent to a STARM and a conductive substrate, which redirect magnetic fields associated with the STARM, to generate propulsive forces in accordance with the described embodiments.
Figure 34A:
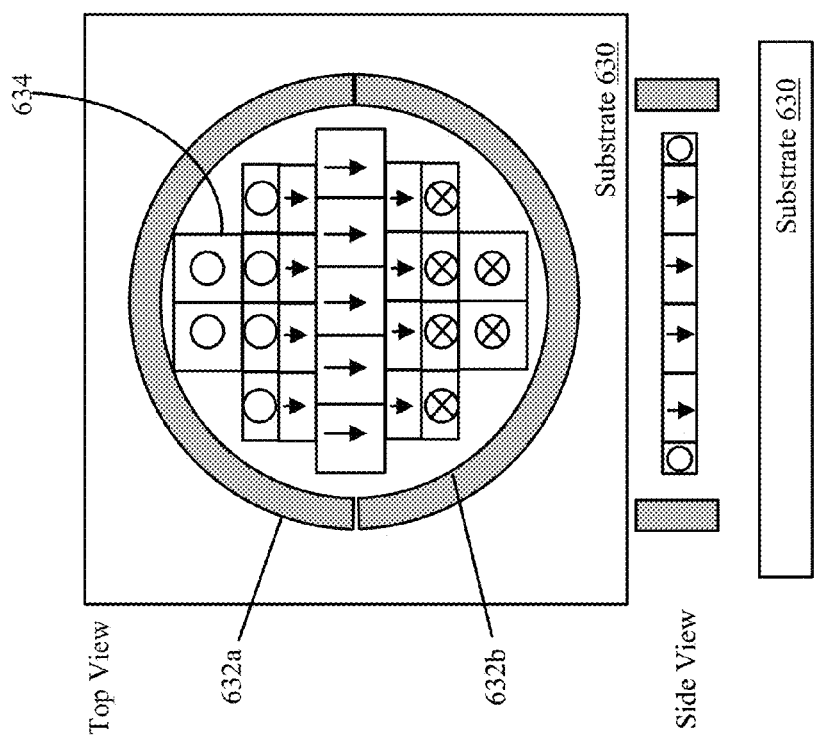

In FIG. 34A, a magnet configuration 634, which can be used on a STARM, is shown. The STARM can be a component of a hover engine. Thus, the magnet configuration 634 can be rotated above a substrate 630 to generate lift. The magnet configuration is surrounded by a ring of material, 632a and 632b, such as the materials described above with respect to component 610, in FIG. 33A. The ring of material is not coupled to the STARM including magnet configuration 634 such that it doesn't rotate with the STARM. Thus, it can be moved independently of the STARM.

The magnet configuration 634 includes two poles with north and south polarities respectively and then a region between the two poles with magnets which point from the first pole to the second pole. The region between the poles is at a radial distance from the axis of rotation which is less than the poles. The axis of rotation is in the center of the magnet configuration.

The magnetic field generated from the magnet configuration 634 can be affected by its proximity to the ring of material 632a and 632b. In particular, for this magnet configuration, the ring of material 632a and 632b was predicted to enhance the lift. In one embodiment, one or both of sections, 632a and 632b, can be coupled to mechanisms which allow the distance between sections 632a and 632b to be varied.

For example, in FIG. 34B, only section 632a is configured to move closer or farther away from the magnets in a horizontal plane. When 632a is moved away from the magnets, a drag imbalance is created. The drag imbalance can generate a propulsive force in one direction. The distance of section 632a from the magnets can be adjusted to change a magnitude of the propulsive force.

When both sections 632a and 632b are configured to move, then a propulsive force can be generated in either direction. Further, by moving both sections 632a and 632b away from the magnet configuration simultaneously the amount of lift and drag generated from the hover engine can be controlled. For example, both sections 632a and 632b can be moved away from the magnets simultaneously to lower the lift and drag and closer towards the magnets to raise the lift and drag. When the distance one or the other of sections 632a and 632b are different a propulsive force can be generated.

Vehicle Configurations and Navigation, Guidance and Control (NGC)

Next, with respect to FIGS. 35 to 44, various configurations of magnetically lifted devices including multiple hover engines are described. In particular, arrangements of hover engines and then their actuation to provide movement are described. Next, Navigation, Guidance and Control (NGC) functions, which can be applied to magnetically lifted devices, such as those shown in FIGS. 35-41 are discussed with respect to FIGS. 42, 43 and 44.

Figure 35:
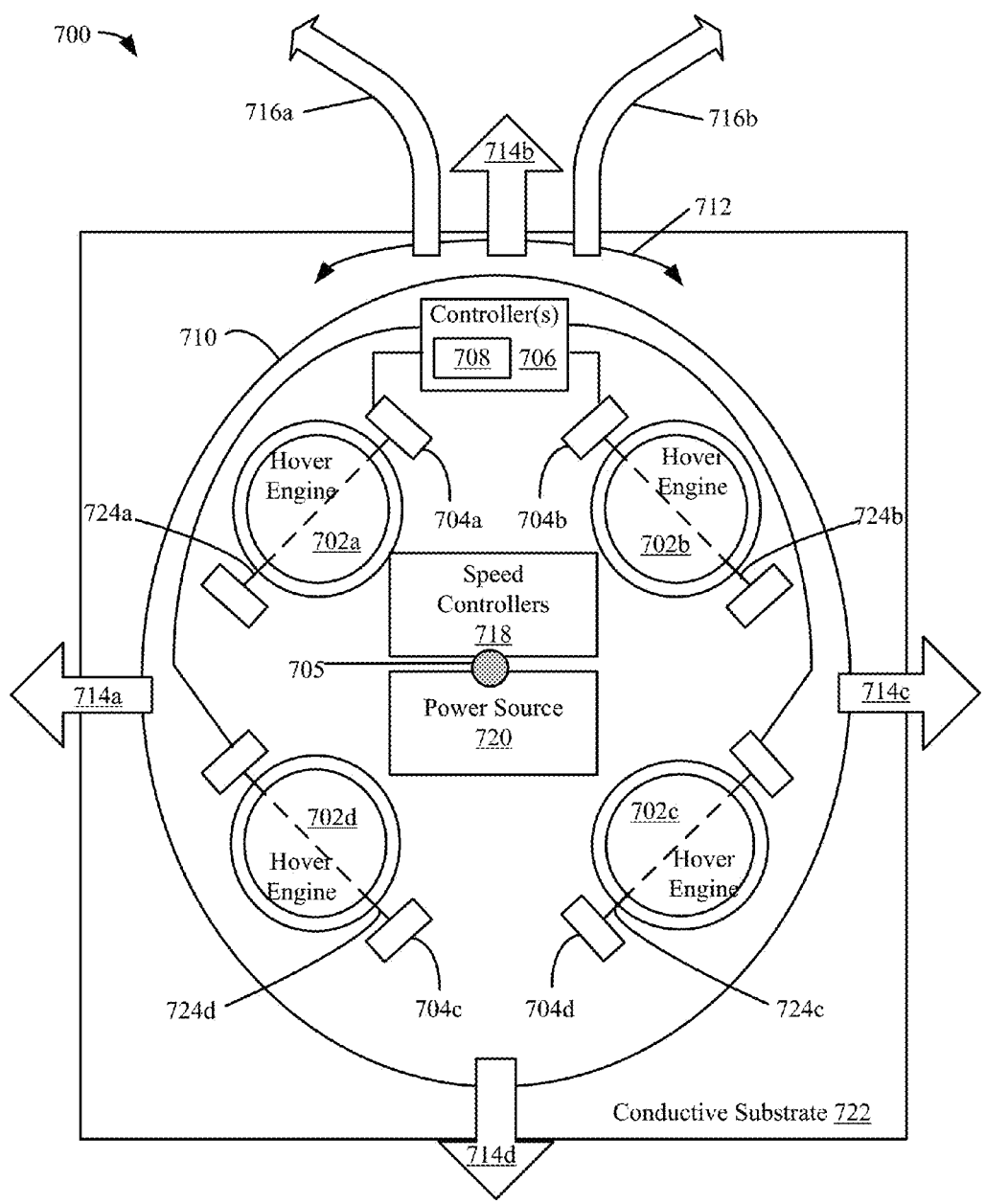
FIG. 35 is an illustration of a magnetically lifted device with four tiltable STARMs in accordance with the described embodiments.

FIG. 35 shows a top view of a vehicle 700 configured to operate over a conductive substrate 722. The vehicle 700 includes four hover engines, 702a, 702b, 702c and 702d. Each hover engine includes a STARM and a motor and a mechanism which enables a propulsive force to be output from each hover engine. In one embodiment, each of the hover engines 702a, 702b, 702c and 702b can be tilted around an axis, such as 724a, 724b, 724c, 724d, via control of an actuator. In particular embodiments, the hover engines can each be individually actuated so that the direction and amount of the tilt angle as a function of time can be individually changed for each of the four engines.

In alternate embodiments, two or more hover engines can be controlled as a unit. For example, two or more hover engines can be mechanically coupled to a single actuator. The single actuator can move both hover engines simultaneously. In another example, the two or more hover engines can be digitally coupled such that the two or more hover engines are always moved together simultaneously, i.e., a movement of one hover engine specifies some specific movement of another hover engine, such as both being tilted in the same manner. When independently controlled, the movement of one hover engine can affect the movements of other engines, such as to implement GNC functions. However, a second hover engine may not be always constrained to a specific control movement in response to the movement a first hover engine as in the case when two hover engines are controlled digitally and/or mechanically controlled as unit.

The actuators associated with each hover engine can be coupled to one or more controllers 706 and an IMU 708 (Inertial Measurement Unit). The actuators can each also have a separate controller which responds to commands from the controller 706. The controller 706 can also be coupled to a power source 720 and one or more speed controllers 718. The one or more speed controllers 718 can be mechanical speed controller or electronic speed controllers. The power source can be on-board or off-board. The hover engines are secured via a housing and associated support structure 710.

The center of mass of the vehicle is indicated by the circle 705. The center of mass affects the moments generated when each of the four hover engines are actuated. In particular embodiments, the vehicle can include a mechanism which allows the center of mass to be adjusted in flight, such as a mechanism for moving a mass from one location to another. For example, in an airplane, fuel can be moved from one tank to another to affect the center of mass characteristics.

An IMU 708 works by detecting the current rate of acceleration using one or more accelerometers, and detects changes in rotational attributes like pitch, roll and yaw using one or more gyroscopes. It may also include a magnetometer, to assist calibrate against orientation drift. Inertial navigation systems can contain IMUs which have angular and linear accelerometers (for changes in position). Some IMUs can include a gyroscopic element (for maintaining an absolute angular reference).

Angular accelerometers can measure how the vehicle is rotating in space. Generally, there is at least one sensor for each of the three axes: pitch (nose up and down), yaw (nose left and right) and roll (clockwise or counter-clockwise from the cockpit). Linear accelerometers can measure non-gravitational accelerations of the vehicle. Since the can move in three axes (up & down, left & right, forward & back), there can be a linear accelerometer for each axis.

A processor can continually calculate the vehicle's current position. First, for each of the six degrees of freedom (x, y, z and θx, θy and θz), the sensed acceleration can be integrated over time, together with an estimate of gravity, to calculate the current velocity. Then, the velocity can be integrated to calculate the current position. These quantities can be utilized in the GNC system.

Returning to FIG. 35, as described above, the forces generated from changing a tilt of a rotating STARM relative to the substrate 722 are directed primarily along the tilt axes when the vehicle is parallel to the substrate 722. For example, a tilt of hover engine 702a can generate a force which is primarily parallel to axis 724a.

With the tilt axes arranged at an angle to one another as shown in FIG. 35, a combination of STARMs can be actuated to generate a net linear force in any desired direction. Further, the STARMs can be actuated in combination to cancel moments or if desired induce a desired rotation in a particular direction. In addition, different combinations of STARMs can be actuated as a function of time to generate a curved path in a desired direction(s) as a function of time. Yet further, a combination of STARMs can be actuated so that the vehicle moves along linear or curved path and rotates around an axis while moving along the path.

The tilt control can be used alone or in combination with rotational velocity control of each hover engine. The translational and lifting forces which are generated can vary as a function of the rotational velocity and a hover height. A rotational speed of a hover engine can be varied relative to other hover engines or in combination with other hover engines to change the magnitude of lifting and drag forces which are output from the one or more hover engines. For example, the rotational velocity control may be used to counter imbalances in forces, such as resulting from a shifting center of mass. For an electric motor, the one or more controllers 706 can control the speed controllers 718 to change the rotational velocity of a hover engine.

In the example of FIG. 35, angles can be defined relative to the tilt axes. For example, the angle between tilt axis 724a and 724b is approximately ninety degrees. The angle between tilt axis 724a and 724c is approximately ninety degrees and the angle between tilt axis 724a and tilt axis 724c is 180 degrees.

In one embodiment, the tilt axes of the hover engines opposite one another can be parallel to one another, i.e., an angle of one hundred eighty degrees. However, the angle between the tilt axes of the hover engines adjacent to one another don't have to be equal. In particular, the angle between tilt axes 724a and 724b can be a first angle and the angle between tilt axes 724a and 724c can be one hundred eighty degrees minus the first angle where the first angle is between zero and one hundred eighty degrees. For example, the angle between tilt axes 724a and 724b can be ten degrees and the angle between tilt axes 724a and 724c can be one hundred seventy degrees. In general, the angles between all of the tilt axes, 724a, 724b, 724c and 724d can be different from one another.

In FIG. 35, the hover engines can be tilted to generate various movements, such as left, 714a, right 714b, forward 714b and back 714b. Further, the hover engines can be tilted as a function of time to cause the vehicle 700 to follow a curved path, such as 716a and 716b. In addition, the hover engines can be tilted to cause the vehicle 700 to rotate in place in a clockwise or counterclockwise rotation 712. For example, without rotating, the vehicle 700 can be controlled to move in a first straight line for a first distance, and then move in a second straight line perpendicular to the first straight line for a second distance. Then, the vehicle 700 can rotate in place.

A vehicle with a configuration similar to vehicle 700 was constructed. The vehicle cylindrically shaped with a diameter of 14.5 inches and a height of 2.125 inches. The vehicle weighed 12.84 pounds unloaded. Tests were performed where the vehicle carried more than twenty five pounds of payload beyond its unloaded weight.

Four hover engines are used. Each hover engine includes a STARM which is 4.25 inches in diameter. Sixteen ½ inch cube magnets are arranged in each STARM in a circular pattern. The arrangement is similar to the configuration shown in FIG. 63 which employs twenty magnets. N52 strength Neodymium magnets are used.

One motor is used to turn each STARM. The motors were Himax 6310-0250 outrunners. The motors each weigh 235 grams. The optimum working range for the motors is 20 to 35 Amps with a max current of 48 Amps. The motors are cylindrically shaped with a length of 32 mm and a diameter of about 63 mm. The motor power is about 600 Watts and the motor constant, $K_v$, is about 250.

Electronic speed controllers were used for each motor. In particular, Phoenix Edge electronic speed controller (Edge Lite 50, Castle Creations, Inc. Olathe, Kans.) were used. The speed controllers are coupled to batteries. In this embodiment, two VENOM 50C 4S 5000MAH 14.8 Volt lithium polymer battery packs are used (Atom& RC, Rathdrum, Id.)

Four Hitec servos were used (HS-645MG Ultra Torque, Hitec RCD USA, Inc. Poway, Calif.) as actuators. The servos put out a maximum torque of 133 oz-in and operate between 4.8 and 6V. Depending on the size of the hover engine which is acutated, different servos with varying torque output capabilities may be used and this example is provided for illustrative purposes only.

In addition, one actuator is shown per motor. In alternate embodiments, a single actuator can be used to tilt more than one hover engine. In yet other embodiments, a plurality of actuators can be used to change an orientation of a STARM and/or motor. In further, embodiments, one or more actuators in combination with an input force provided from a user can be used to change an orientation of a STARM and/or motor.

The servos are used to tilt a motor and a STARM in unison. The control system is configured to independently tilt each hover engine including the motor and STARM. In a particular embodiment, the motor and STARM are configured to tilt through a range of −10 to 10 degrees. Ranges, which are greater or small than this interval can be used and this example is provided for the purposes of illustration only.

In one embodiment, the same tilt range can be implemented for each hover engine. In other embodiments, the tilt range can vary from hover engine to hover engine. For example, a first hover engine can be tilted between a range of −15 to −15 degrees and a second hover engine can be tilted between −5 and 10 degrees.

A Hobbyking KK2.1.5 Multi-rotor LCD Flight Control Board with 6050MPU and an Atmel 644PA was used for control purposes. The board is 50 mm×50 mm×12 mm and weighs 21 grams. The input voltage is 4.8-6V. The gyro/accelerometer is a 6050MPU InvenSense, Inc (San Jose, Calif.). It has a MEMS 3-axis gyroscope and a 3-axis accelerometer on the same silicon die together with an onboard Digital Motion Processor™ (DMP™) capable of processing complex 9-axis Motion/Fusion algorithms.

The vehicle was able to climb up sloped surfaces. In a test on a flat track, an acceleration of 5.4 ft/sec$^2$ was measured, which is about 0.17 g's. The acceleration depends on the thrust force which is output, the overall weight of the vehicle, the tilt angle of the STARMs and the STARM magnet configuration. Thus, this example is provided for the purposes of illustration only.

In particular embodiments, a vehicle can be controlled via a mobile control unit. The mobile control unit can be coupled to a vehicle via a wireless or wired communication link. The mobile control unit can include one or more input mechanisms, such as control sticks, a touch screen, sliders, etc.

The mobile control can receive inputs from the input mechanisms and then send information, such as commands, to the vehicle. A command could be move right, move in some direction or rotate in place. The GNC system on the vehicle can receive the command, interpret it and then in response generate one or more additional commands involving controlling the actuators and/or hover engines to implement the commands. For examples, one or more of the actuators on the vehicle can be controlled to implement a received movement or rotation command.

In one embodiment, the mobile control unit can be a smart phone, with a touch screen interface. An application executed on the smart phone can generate an interface on the touch screen which is used to input control commands. In addition, the application can be configured to output information about the vehicle's performance to a display, such as speed, orientation, motor RPM, flight time remaining, etc. The smart phone can be configured to communicate with the vehicle via a wireless communication interface, such as but not limited to Bluetooth.

In another embodiment, a hand-held control unit, such as one used to control a quad copter or radio controlled car can be used. Hand-held control units can include multiple channels, a channel switch, a digital display, an antenna, control sticks, trims and an on/off switch. One example is a Spektrum DX6i DSMX 6-Channel transmitter (Horizon Hobby, Inc., Champaign, Ill.). Next, some details of tilting a STARM to control a vehicle are described.

Figure 36A:
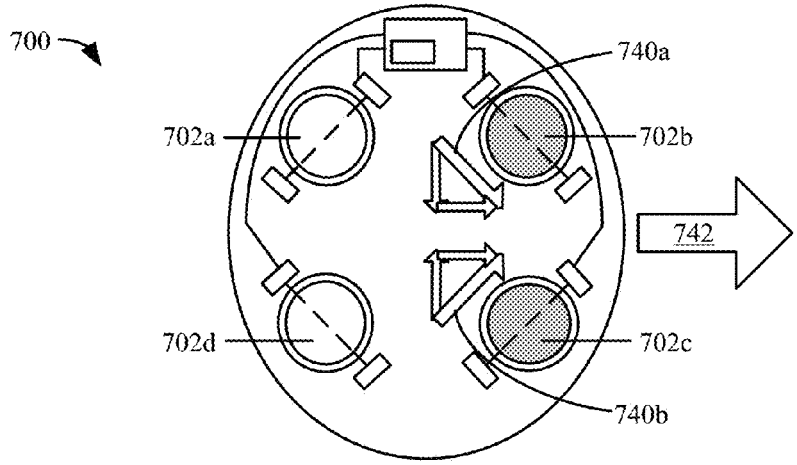
FIGS. 36A to 36C are illustrations of a magnetically lifted device with four tiltable STARMs tilted in various configurations in accordance with the described embodiments.
Figure 36B:
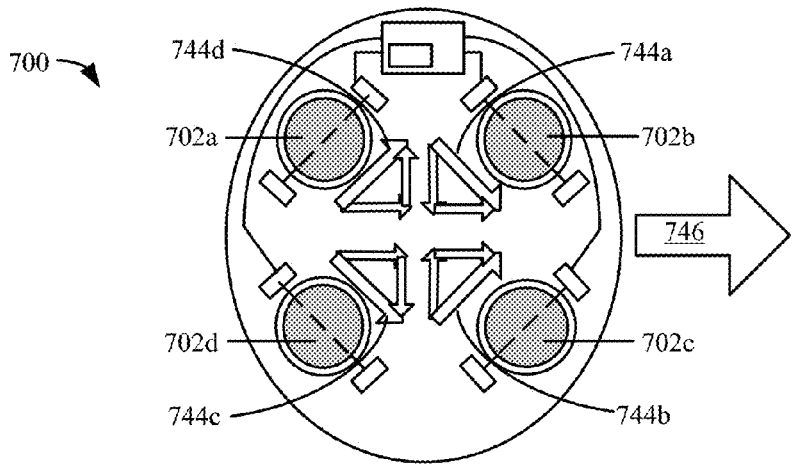
Figure 36C:
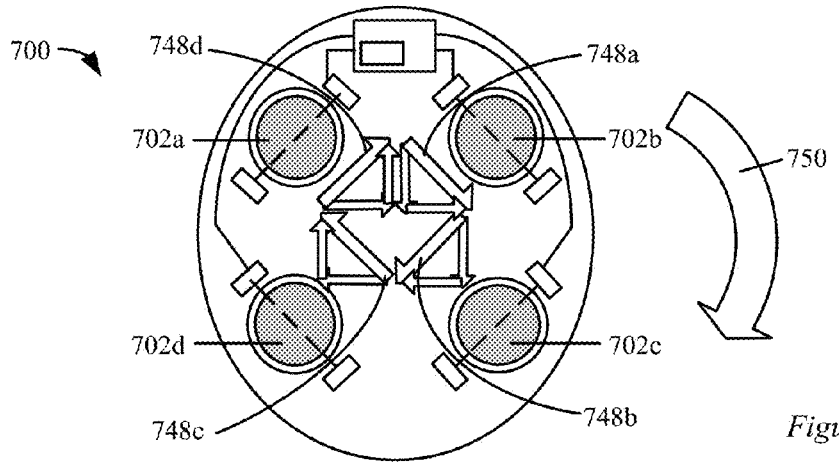

FIGS. 36A, 36B and 36C, show some examples of actuating different combination of hover engines to produce a movement or rotation. In FIG. 36a, two hover engines 702b and 702c, which are shaded, are actuated to produce a net rightward force 742 which can move the vehicle to the right 742. The direction of the net force generated by each of the two hover engines is shown by the adjacent arrows, 740a and

740*b*. Hover engine 702*b* generates a net force 740*a* with a downward and rightward force component. Hover engine 702*c* generates a net force 740*b* which is upwards and to the right.

The upward and downward translational forces cancel when the two hover engines are actuated to generate the same magnitude of force which results from the eddy currents induced in the substrate. The rightward force component are additive and produce a net translational force to the right. When the two hover engines are an equal distance from the center of mass of the vehicle, the moments generated from the two hover engines cancel one another and thus rotational stability can be maintained.

The hover engines, even when identical, may not be actuated the same amount. For example, the vehicle 700 can be tilted such that one of hover engine 702*b* and 702*c* is closer to the substrate. The distance of the hover engine to the substrates affects the force output from the hover engine as a result of its tilt. Hence, different tilt angles may be required to balance the forces output from each hover engine.

Further, when the vehicle 700 is loaded, the center of mass can shift depending on how the weight of the payload is distributed. Thus, the center of mass can shift from the unloaded state to the loaded state and the two hover engines may no longer be an equal distance from the center of mass of the vehicle. In this instance, when a pair of hover engines each generates the same amount of net force, a net moment may be present because the two hover engines are different distances from the center of mass. Thus, the combination of hover engines which are used and the amount of actuation of each hover engine may have to be adjusted to account for the shifting center mass due to payload shifts or the overall orientation of the vehicle 700 relative to the substrate over which it is operating.

The magnitude of the effects resulting from changes in the center of mass will depend on how much the center of mass shifts from the loaded to unloaded state. Further, in some instances, the center of mass can shift during operation if the payload is allowed to move during operation or if the payload is being lessened. For example, if a fuel is consumed during operation of the vehicle, the center of mass of the vehicle may change due to the fuel being consumed. As another example, if one or more persons is riding on a vehicle and can move around, the center of mass may change. Thus, in particular embodiments, the center of mass may be changing dynamically during operation and the GNC system can be configured to account for the shifts in the center of mass of the vehicle when maintaining rotational and translational control.

In FIG. 36B, a net rightward movement is generated using four hover engines. In this example, all four hover engines, 702*a*, 702*b*, 702*c* and 702*d* are actuated to generate a net force 746 in the rightward direction. In general, the hover engines can be actuated to generate a net translational force which is substantially in the rightward direction. In particular, the hover engines are actuated to cancel translational forces in other than rightward directions. Further, hover engines can be actuated such that the net moment acting on the vehicle is zero. As described above, to rotate the vehicle, a net moment can be generated which rotates the vehicle in a clockwise or counter-clockwise direction.

In FIG. 36C, the four hover engines, 702*a*, 702*b*, 702*c* and 702*d*, are shown actuated in a manner which causes a net moment in the clockwise direction. The translational forces associated with the four hover engines cancel one another. Thus, the vehicle can rotate in place.

In the example of FIGS. 36*a*, 36*b* and 36*c*, all four hover engines' tilt axes are orientated about the edges of a rectangle. This configuration allows the vehicle to move upward/downward or left/right on the page with equal ease. In other embodiments, the hover engines tilt axes can be located around the perimeter of a parallelogram. Thus, the hover engine may more easily generate a translational forces in particular directions, such as left/right on the page versus up/down on the page. Further, in some embodiments, as described above, mechanisms can be provided which allow the direction of a tilt axes to be changed on the fly (e.g., see FIG. 29). Thus, it may be possible to change the configuration of the hover engine tilt axes on the fly.

In the example of FIGS. 36A, 36B and 36C, the force vector generated by each hover engine is assumed to be an equal distance from the center of mass of the vehicle. In other embodiments, the hover engines can be different distances from the center of mass of the vehicle. For example, a pair of two hover engines can each be a first distance from the center of mass and a second pair of hover engines can each be a second distance from the center of mass.

Further, even when the hover engines are the same distance from the center of mass the hover engines can be configured to output different levels of propulsive forces. For instance, one hover engine may use a greater volume of magnets than another hover engine to output more force. In another example, the rotational velocities of two identical hover engines can be different, which can cause the hover engines to output different levels of propulsive forces relative to one another. In one embodiment, multiple hover engines used on a vehicle can be identical and operated at a similar rotational velocity so that they each output a similar amount of force.

In general, when a plurality of actuatable hover engines are used, each hover engine can be positioned at a different distance from the center of mass or combinations of hover engines may be positioned at the same distance from the center of mass. Further, the size of each hover engine, the magnet configurations used on each hover engine and the resultant force output by each hover can vary from hover engine to hover engine on a vehicle. Although, combinations of hover engines within the plurality of hover engines can be selected with equal force generating capabilities. A GNC system can be designed which accounts differences in hover engine placement location on a vehicle and force generation capabilities which differ between hover engines. In addition, the GNC system can be configured to account for dynamic loading and dynamic orientation changes of a vehicle, which affect the forces and moments output from each hover engine.

In the examples above, the STARMs which are part the hover engines are configured to generate lift, propulsive and rotational forces. In other embodiments, it may be desirable to specialize the hover engines. For example, a first hover engine can be configured to primarily generate lift and may be not actuatable for generating propulsive forces. Then, additional hover engines can be configured to generate some portion of the lift and can be actuatable to generate propulsive and rotational forces as well which can be used to control and direct a vehicle. Some magnet configurations may be more suitable for generating propulsive forces as compared to lifting forces. Hence, when multiple hover engines are used on a vehicle, the magnet configurations may be varied between the hover engines.

Figure 37:
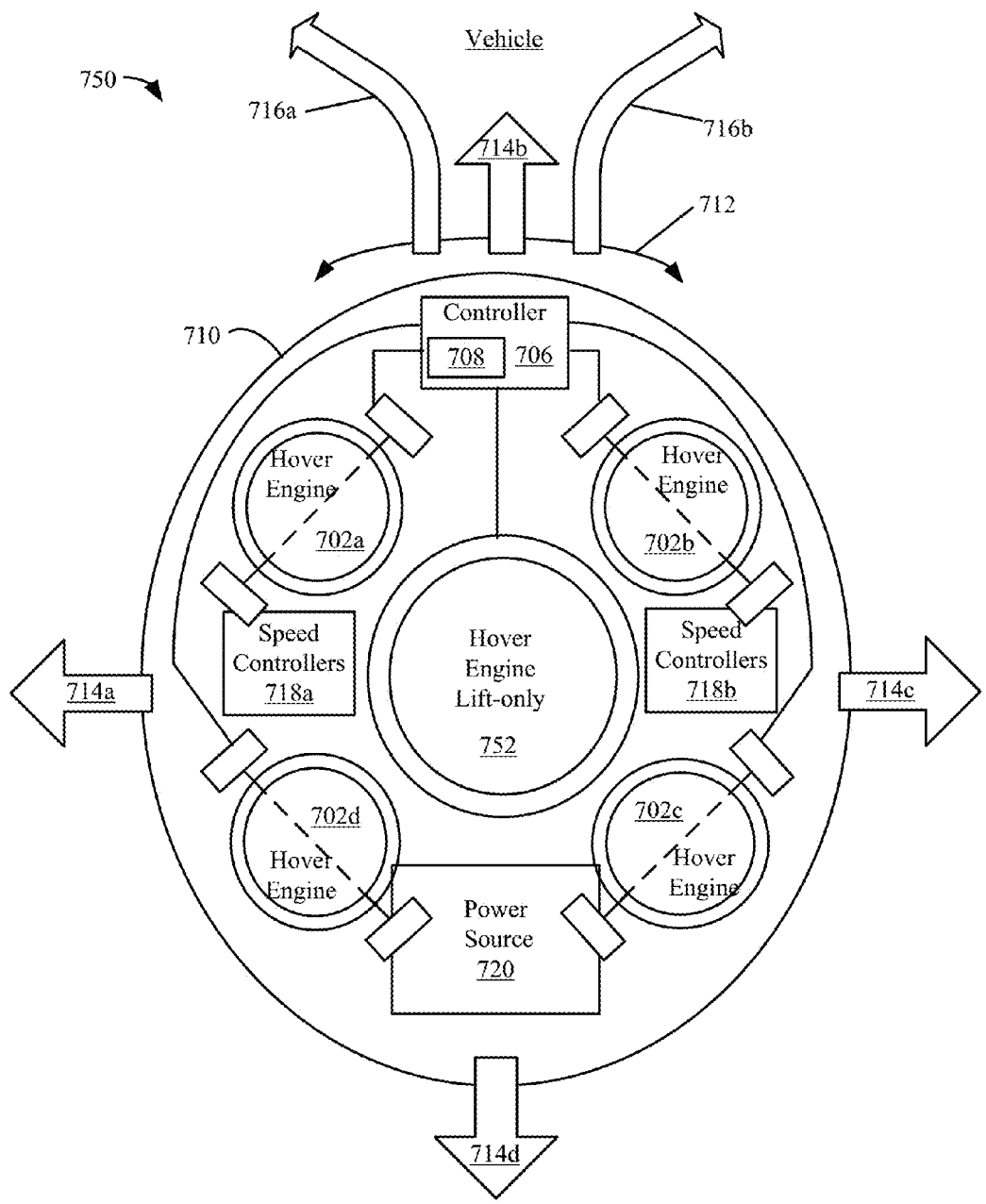
FIG. 37 is an illustration of a magnetically lifted device with four tiltable STARMs and one fixed STARM in accordance with the described embodiments.

FIG. 37 shows an example of vehicle 750 with five hover engines. Four of the hover engines are configured in the manner described above with respect to FIG. 35. However, a fifth hover engine 752 located in the center of the vehicle is configured to generate lift only and is non-actuatable whereas four hover engines, similar to what was previously described, can be actuated to generate the propulsive, rotational and control forces.

In particular embodiments, the four hover engines, 702a, 702b, 702c and 702d, may not be able to hover the vehicle alone. For example, in one embodiment, the four STARMs may not be able to hover an unloaded vehicle and may require some lift to be generated from the lift-only engine. In another embodiment, four STARMs may be able to hover the vehicle while it is unloaded. However, if the vehicle carries some amount of payload, then operating the lift only hover engine may be needed.

In one embodiment, the height above the surface of the bottom of the magnets in the propulsive hover engines and height above the surface of the bottom of the magnets in the lift only hover engine can be offset from one another when the STARMs in the propulsive hover engines and the lift only hover engines are parallel to the surface. For example, the height of the bottom of the magnets in the propulsive STARMs can be positioned at a distance farther away from the surface than the height of the bottom of the magnets in the lifting STARM. The amount of force needed to tilt a STARM in a hover engine relative to the surface can increase as the STARM gets closer to the surface. The amount of force increases because magnetic forces are generated non-linearly and increase the closer the magnets are to the surface. Thus, by keeping the propulsive STARMs farther away from the surface than the lifting STARMs during operation, it may be possible to utilize less force to tilt the propulsive STARMs. STARMs with less magnet volume on the propulsive STARMs as compared to the lifting STARMs can also lessen the force output from the propulsive STARMs and hence require less force to tilt than the lifting STARMs.

In one embodiment, a mechanism can be provided, separate from the tilt mechanism, which can be used to control a distance of a hover engine, such as the propulsive STARM from the surface. For example, the mechanism can be configured to move the hover engine in the vertical direction closer or farther away from the surface. This capability can also be used when the vehicle is first started. For example, while at rest, the bottom of the vehicle can rest on the ground and the hover engines can be pulled up into the vehicle enclosure. Then, the hover engines can be started. After the hover engines reach a certain velocity the hover engines can be moved relative to the vehicle such that the hover engines are closer to a bottom of the vehicle.

Since the propulsive hover engines may not be needed to carry the full lift load, in some embodiments, it may be possible to use smaller propulsive and control STARMs than if the control and propulsive STARMs are also used to carry the entire lift load. One advantage of using this approach is that if the control and propulsive STARM can be made smaller (e.g., a smaller radius and moment of inertia), the amount of force used to actuate the STARMs can be smaller. Thus, it may be possible to use smaller, lighter and less expensive actuators.

Another advantage of using hover engines specialized for lift or control is that the operating conditions of the hover engine used to generate lift most efficiently can be different than the operating conditions used to generate the propulsive and control forces most efficiently. Thus, when some of the hover engines are used primarily for lift only, these hover engines may be operated at different conditions as compared to the hover engines configured to generate control forces. For example, to generate relatively more propulsive forces, a control hover engine can be operated at a rotational velocity which is near peak drag, i.e., a lower lift to drag ratio as compared to a higher rotational velocity. In contrast, a lift-only hover engine may be operated at a higher rotational velocity to minimize drag and maximize lift because, as described above, after peak drag the drag force on a hover engine can decrease and the lift to drag ration can increase as the rotational velocity increases.

Figure 38:
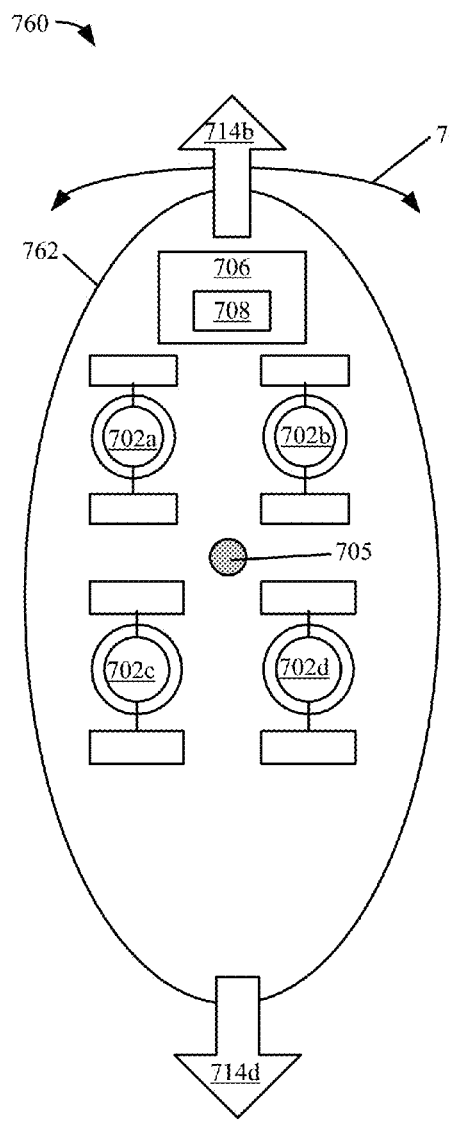
FIGS. 38 and 39 are illustrations of magnetically lifted devices with four tiltable STARMs in accordance with the described embodiments.

Figures show 38 and 39 shows two additional hover engine configurations for vehicles 760 and 760. In FIG. 38, the tilt axes of all four hover engines are aligned parallel to one another. Thus, the vehicle 760 is configured only move in the upward and downward direction. The net forces from the STARMs are along the direction of the tilt axes. Thus, it is not possible to generate a lateral force.

The hover engines, 702a, 702b, 702c and 702d, are distributed about the center of mass 705. Thus, a force generated by the hover engines can be used to generate moments in the clockwise or counter clockwise directions. These moments can be used to rotate the vehicle in directions 766. Hence, the vehicle 706 can be moved from position to position and rotated in place.

Figure 39:
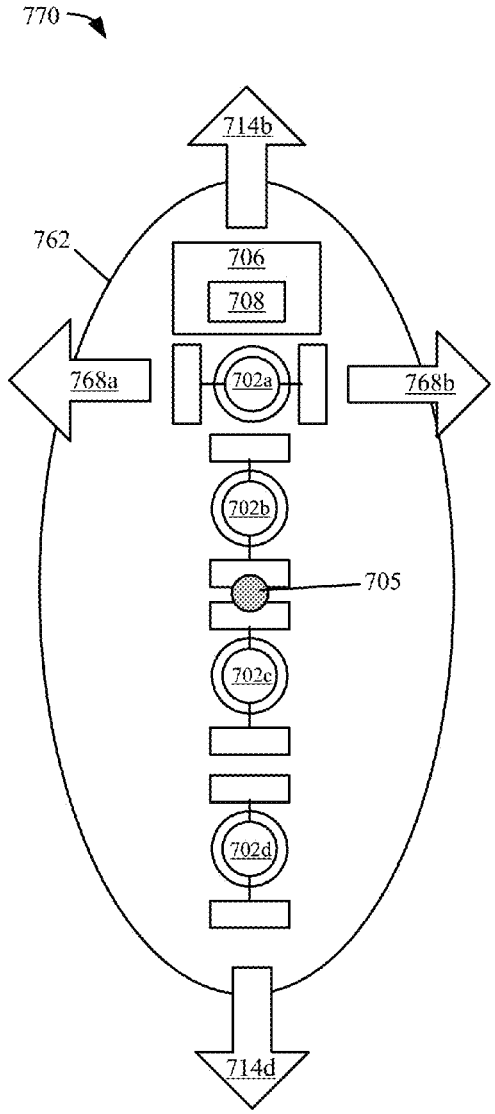

In contrast, in FIG. 39, three hover engines, 702b, 702c, 702d, are orientated with their tilt axes parallel to one another and a fourth hover engine 702a, has a tilt axis which perpendicular to the other three hover engines. The hover engine 702a is located a distance from the center of mass 705. Thus, hover engine 702a can be used to generate lateral forces which can steer the vehicle 770 in directions 768a and 768b. The bottom three hover engines can be used to generate a propulsive force in the upward or downward direction 714a and 714b.

However, hover engines 702b, 702c and 702d, tilt axes and force output go through the center of mass 705. Thus, in this configuration, the moment arm is zero. Hence, these hover engines are not able to generate moments.

Figure 40:
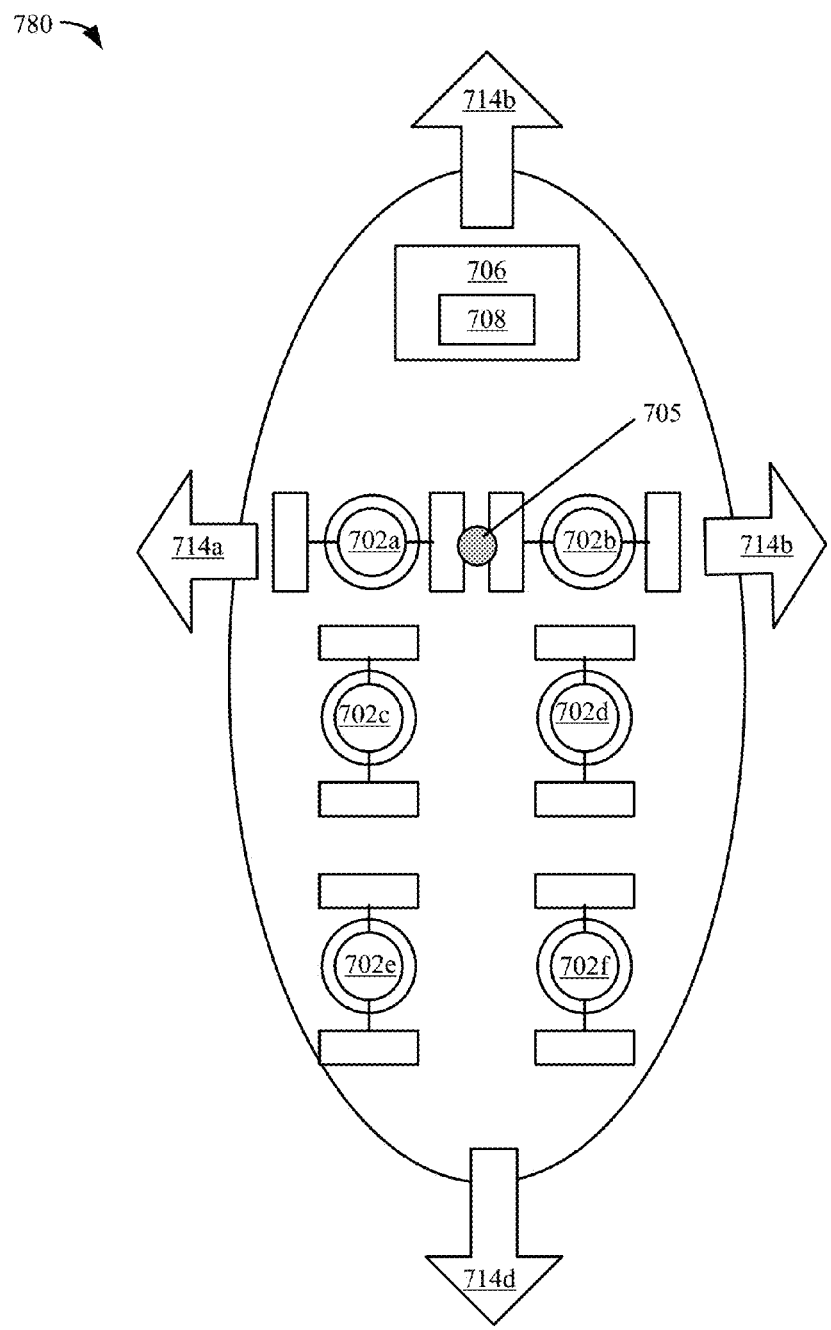
FIG. 40 is an illustration of a magnetically lifted device with six tiltable STARMs in accordance with the described embodiments.

Another hover engine configuration on a vehicle 780 is shown in FIG. 40. In this configuration, two columns each with three hover engines are provided. A First column includes hover engines 702a, 702c and 702e and a second column includes hover engine 702b, 702d and 702E In each column, the tilt axis of the first hover engine at the top, 702a and 702b, is perpendicular to the tilt axes of the bottom two hover engines in the column. In this configuration, the hover engines at the top of each column can provide steering forces in direction 714a and 714b. The bottom two hover engines in each column can generate propulsive forces in the forward or back direction, 714b and 714d.

In this configuration, the force output from hover engines 702a and 702b is through the center of mass 705. Thus, these hover engines can be used to generate a moment about the center of mass. However, the bottom two hover engines are a distance from the center of mass 705. Thus, a net moment can be produced. The moments can be used as a steering force alone or in combination with the steering forces provided by hover engines 702a and 702b.

Figure 41:
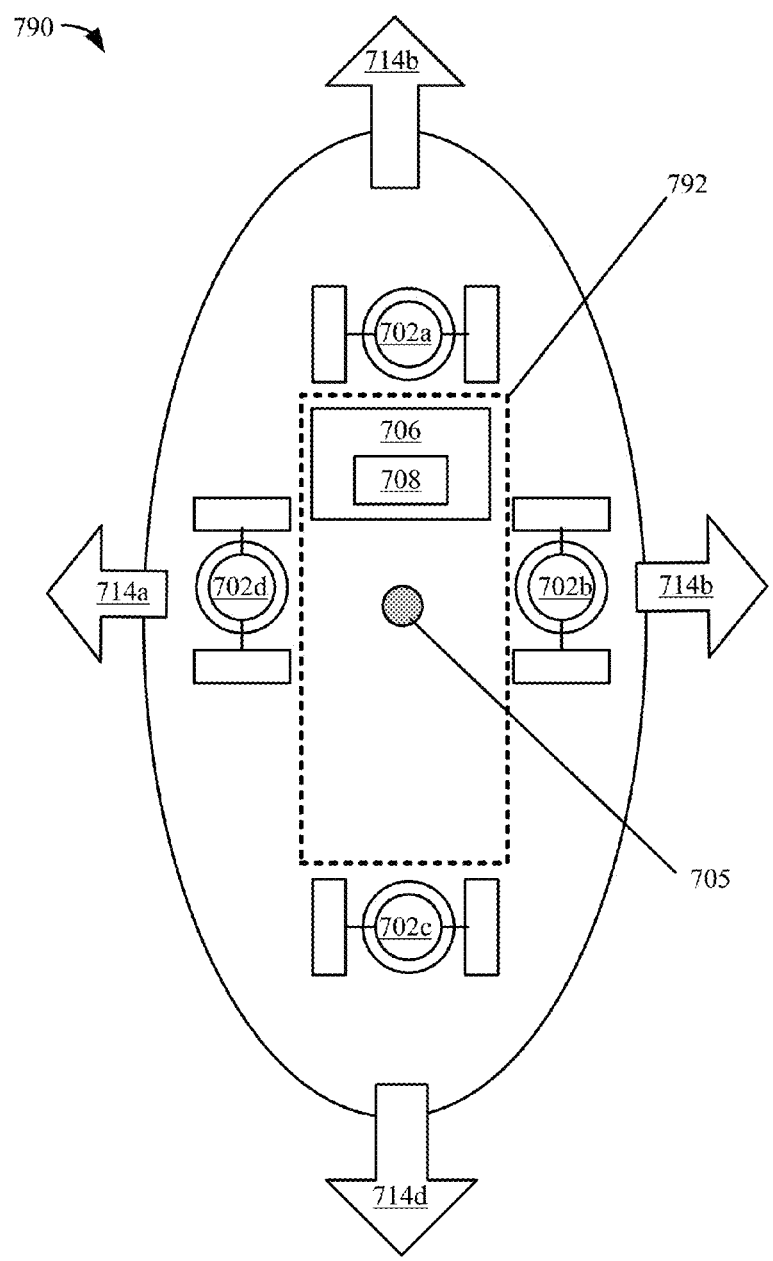
FIG. 41 is an illustration of a magnetically lifted device with four tiltable STARMs arranged around a rectangle in accordance with the described embodiments.

In FIG. 41, yet another hover engine configuration for a vehicle 790 is shown. In this example, four hover engines are arranged around the edge of a rectangle where the tilt axis of each hover engine, 702a, 702b, 702c and 702d, is parallel to an adjacent side of the rectangle. Thus, two pairs of hover engines, (702a and 702c), (702b and 702d), are provided where the tilt axes of the first pair of hover engines is perpendicular to the tilt axes of a second pair of hover engines. Again, the tilt axes in each pair are parallel to one another.

In this example, the distances of one pair of the hover engines, (702b and 702d), is closer to the center of mass 705 of the vehicle 790 than the other pair of hover engines, (702a and 702c). Thus, one pair of the hover engines have a different moment arm than the other pair of hover engines. Hence, the range of moments generated from the two pairs of hover engines may be different. In various embodiments, the NGC system can be configured to account for the location of the center of the mass of the vehicle relative to each of the hover engines when control forces are generated.

Next, the NGC system, which can be used to control a hover engine configuration to move a magnetically lifted vehicle, is described. First, each of the functions of navigation, guidance and control (NGC) are briefly discussed. These functions can be incorporated as logic for an NGC system implemented as circuitry on a magnetically lifted device. For example, the NGC system can be a component of the controller 706 in the previous figures.

First, navigation is figuring out where you are and how you are oriented relative to a defined reference frame. For example, where you are could be in your car in the driveway, and your orientation is trunk of the car towards the curb. In this example, the reference frame is a flat earth.

Second, guidance involves figuring out a path to take. In particular, guidance is figuring out how to get where you want to go based on where you are. Guidance comes after navigation, because if you don't know where you are, it is difficult to figure out which way to go. Guidance has potentially a very large number of solutions. However rules and constraints can be imposed to limit the solution size.

As an example, you know you are in your driveway with your backside towards the curb. How do you get to the store? A rule can be imposed that you have to follow the predefined system of roadways. This limits your guidance options. You might also include rules about obeying speed limits and stop signs. This shrinks the solution space further. You may also have vehicle limitations. For example, a four cylinder Corolla might not have the same acceleration capability as a Ferrari. This notion can be applied to different configurations of hover engines which can have different performance characteristics.

When the rules and limitations are combined, a guidance solution that defines orientation, velocity, and acceleration as functions of time can be obtained. In the guidance space, there can be flexibility to impose or relax the rules to achieve the performance which is desired. For instance, per the example above, when one is trying to reach a destination very quickly for some reason, one may choose to ignore speed limits for some period of time.

Control is getting the vehicle to perform as the guidance solution asks it to perform. This means accelerating, decelerating, maintaining velocity, etc. so that the vehicle follows the guidance solution as closely a desired. In the current example, the driver is the control system. Thus, he or she monitors the speed and acceleration and can make minute adjustments to maintain the desired conditions. In the examples above, the NGC system can make adjustments to the tilt angles of the hover engines to maintain the desired conditions.

Thus, the combination of navigation, guidance, and control allows a magnetically lifted vehicle to be moved in a desired way. As disturbances do enter the system, it may be important to regularly update the navigation, guidance, and control solutions. A system updated in this manner can form a closed loop system. The closed loop system may allow for more accurate motion of the vehicle under GNC.

In alternate embodiments, an open-loop controller, also called a non-feedback controller, can be used. An open-loop controller is a type of controller that computes its input into a system using only the current state and its model of the system. A characteristic of the open-loop controller is that it does not use feedback to determine if its output has achieved the desired goal of the input. Thus, the system does not observe the output of the processes that it is controlling.

For a magnetically lifted vehicle, the GNC can include combinations of 1) velocity control, 2) waypoint management, 3) acceleration/de-acceleration curves (profiles), 4) velocity profiles, 5) free path, which combines acceleration/de-acceleration profiles and velocity en route and 6) navigation. Navigation can include utilizing one or more of a) dead reckoning, b) an indoor positioning system, c) retro-reflectors, d) infrared, e) magnetics, f) RFID, g) Bluetooth, f) ultrasound and g) GPS. An indoor positioning system (IPS) is a solution to locate objects inside a building, such as a magnetically lifted vehicle, using radio waves, magnetic fields, acoustic signals, or other sensory information collected by appropriate sensors. Various types of sensors sensitive to different types of energies can be used in a navigation solution. Thus, these examples are provided for the purpose of description and are not meant to be limiting.

A method of GNC can involve establishing acceleration/de-acceleration profiles (curves, limits, etc.), which may include establishing velocity acceleration/de-acceleration profiles (curves, etc.). Next, a route can be created. The route can be converted into x and y path points on a surface.

In one embodiment, waypoints can be added. Typically, start and end are waypoints by default. What happens at waypoints (null, stop, specific velocity, etc.) can be defined. Path segments can be defined by waypoints.

Next, the orientation for each path segment (relative to velocity direction, relative to fixed point, spinning profile, etc.) can be defined. With the path segments defined, the GNC system can maneuver the vehicle along each path segment according to user defined velocity/acceleration profiles and orientations. Finally, the current position (x, y) of the vehicle can be monitored relative to a preplanned route with regular navigation updates. As the vehicle moves, a current position and desired position can be compared based upon the sensor data. Then, the system can be configured to correct for errors.

In some embodiments, the hover height of a vehicle can be controlled. Thus, the system can be configured to determine a height profile of a vehicle along a path segment. Then, while the vehicle is maneuvered along the path segment, the system can receive sensor data which is used to determine a height of the vehicle. The system can be configured to compare the measured height from the desired height and then correct for errors.

Next, an embodiment of a GNC system used to control the vehicle described with the respect to FIGS. 42, 43 and 44 is discussed. In this example, a wireless controller is used to control the vehicle. The wireless controller can generate input signals in response to user commands.

A proportional-integral-derivative controller (PID controller) is a control loop feedback mechanism (controller) often used in industrial control systems. A PID controller can calculate an error value as the difference between a measured process variable and a desired set point. The controller can attempt to minimize the error by adjusting the process through use of a manipulated variable.

The translational motion control for the vehicle can use a PID control system for lateral acceleration control. Two lateral acceleration inputs can be received from the user via the wireless controller. These inputs can be fed into their own individual PID control loops, as diagrammed below in FIG. 42.

Inside the control loop, the input can be differenced with the acceleration output feedback measured by the accelerometer. The resulting difference is the error. The error can be fed into the PID controller, which can have three components, the proportional control, the integral control, and the differential control.

The proportional element multiplies the error by a proportional gain, $K_P$. The integral element computes the sum of the errors over time, and multiplies this by the integral gain, $K_I$. The differential control differences the current input with the previous input, and multiples this difference by the differential gain, $K_D$. The proportional, integral, and differential elements are then summed and sent to the mixing logic as shown in equation 810 of FIG. 43.

The outputs from the mixing logic are sent into the plant, G. The resulting translational acceleration is the output from the plant. The vehicle's translational acceleration is measured by the accelerometers. This measured acceleration is fed back to the beginning of the PID control loop.

The spin control for the vehicle can use a PI (Proportional-Integral) control system for yaw speed control, as shown in the block diagram in FIG. 44. A yaw acceleration input is received from the user via an RC controller. This yaw input can be differenced with the yaw output feedback measured by the gyroscope. The resulting difference is the error. This error can be fed into the PI controller, which has two components, the proportional control and the integral control. The proportional element multiplies the error by a proportional gain, $K_P$.

Applications

Next, a number of different of applications which can utilize hover engines are described with respect to FIGS. 45A-62B. In particular, with respect to FIGS. 45A and 45B, an application where a hover engine is used to drive and control a wheel and/or harvest energy from the rotation of a wheel is described. With respect to FIGS. 46A to 46B, a hybrid vehicle configured to hover or ride on wheels is discussed. With respect to FIGS. 47A and 47B, an application where hover engines are used to provide signal isolation is described. With respect to FIGS. 48A to 54, applications which use hover engines configured to move along a track are described. In particular, applications involving moving a payload in a vertical direction are discussed With respect to FIG. 55, an application where hover engines are used to provide launch assist for an aircraft is discussed. With respect to FIG. 56, an application which can be used to perform work on a ship is described. With respect to FIG. 57, an application where hover engines are used to manipulate a liquid material is discussed. With respect to FIGS. 58 to 60C, train and track configuration which employ hover engines are described. Finally, with respect to FIGS. 61A to 62B an application which employs a magnetically lifted vehicle to deposit materials, such as a part of a printing process, is discussed.

Figure 45A:
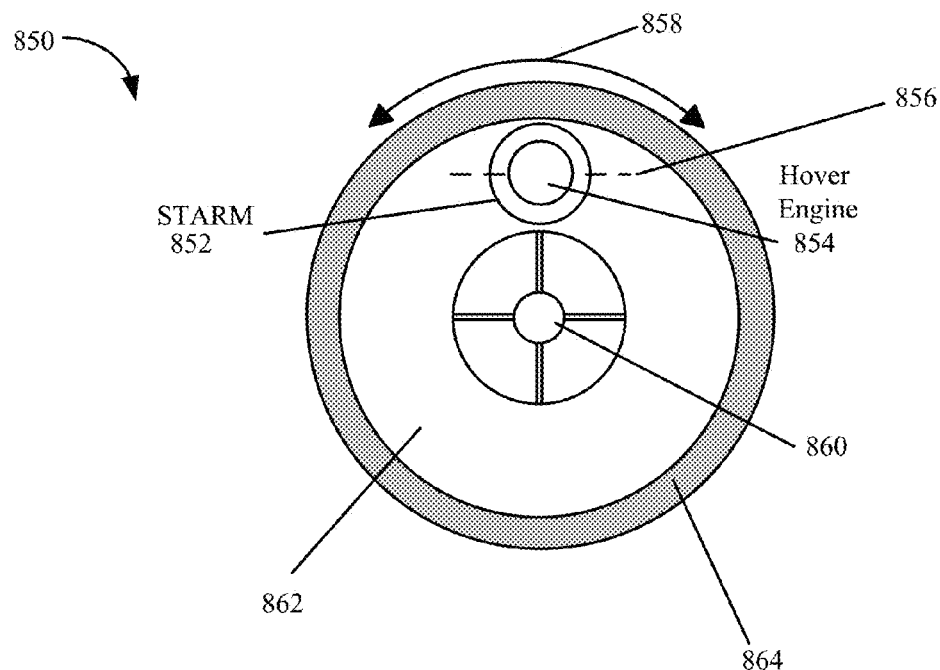
FIGS. 45A and 45B are illustrations of hover engines used to control rotation of a wheel in accordance with the described embodiments.
Figure 45B:
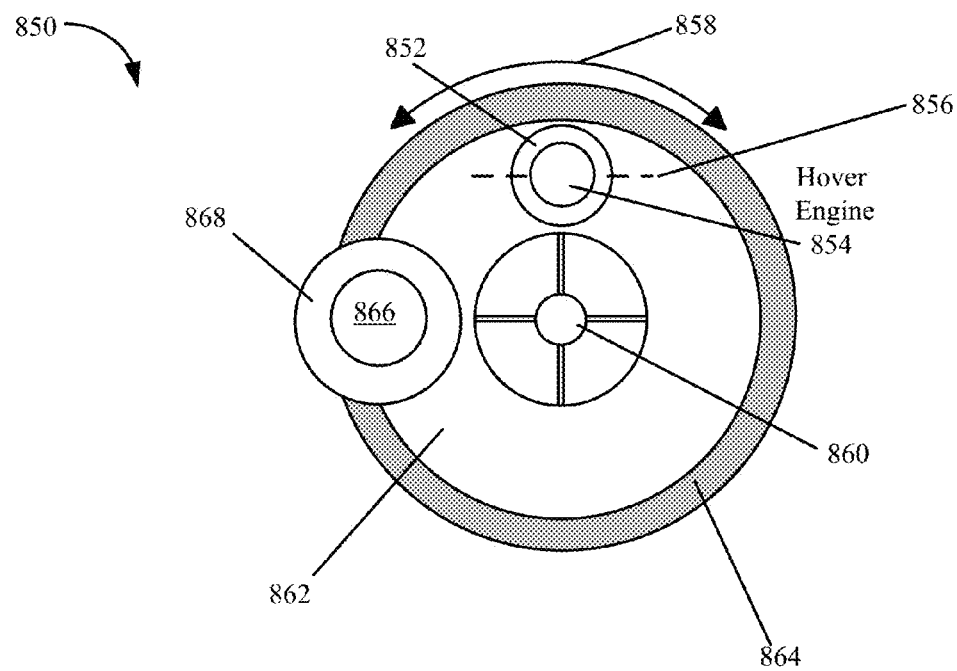

In FIGS. 45A and 45B, hover engines, such as 854 and 856, are used is used to turn a wheel 850. The wheel includes an inner portion including a conductive mass 862 and an outer portion 864. In one embodiment, the wheel 850 can be used on a road and the outer portion can be formed from materials used for automobile tires. The conductive mass 862 is shaped like a washer. The wheel is shown as circularly shaped. However, other shapes are possible and the example is provided for illustrated purposes only. For example, the hover engines in FIGS. 44 and 45 might be used to rotate a horizontally mounted rectangular tray.

The wheel 850 is coupled to an axel 860 around which it rotates. The wheel can be arranged to be at an angle relative to a surface, such as vertically or horizontally relative to the surface (see e.g., FIGS. 46A and 46B). In one embodiment, the wheel can be arranged vertically, such that it rolls along the surface. In a particular embodiment, the axel can be coupled to a second wheel.

The hover engines, 854 and 866, each include a motor and a STARM, such as 852 and 868. The STARMs 852 and 868 can include a volume of magnets with a particular polarity pattern. In one embodiment, an actuator can be configured to rotate the hover engine 854 about a first axis 856. The hover engine 854, when powered by the motor, can be configured to rotate about a second axis which is approximately perpendicular to the first axis 856.

When the hover engine 854 is operating in a neutral position such that the bottom of the STARM 852 is parallel to the top surface of the conductive mass 862, the hover engine 854 may not generate a propulsive force which can turn wheel 850. When the hover engine 854 is rotated about the first axis 856 by the actuator in a first direction, a propulsive force can be generated which causes the wheel 850 to rotate in a clockwise direction. When the hover engine is rotated about the axis 856 by the actuator in a direction opposite the first direction, a force can be generated which causes the wheel 850 to rotate in a counter clockwise direction. Thus, the wheel 850 can configured to rotate in directions 858.

The hover engine 852 can generate a propulsive force, which rotates the wheel 850, when power is supplied to the motor which turns the STARM 852. In another embodiment, power can be turned off to the motor. Then, when the wheel 850 turns, it can cause the STARM 852 to turn, which turns the motor. The rotation of the motor can cause power to be generated, such as electricity. This power can be stored, such as in batteries or a capacitor. Subsequently, the energy stored to the batteries or a capacitor can be used to drive the motor in the hover engine.

In FIG. 45, a hover engine 866, which partially overlaps the conductive substrate 862 of the wheel 850, is shown. Hover engine 866 is larger than the 854. In particular, the diameter of STARM 868 is larger than the diameter of STARM 852. The STARM 868 may or may not include a greater volume of magnets than STARM 852.

The partial overlap of hover engine 866 over the conductive mass 864 creates a force imbalance which can be used to transfer power to the wheel 850. In this example, hover engine 866 may not be tilted to change the direction of the force which is transferred. In particular it can be fixed at some angle, including zero (horizontal), relative to the conductive mass 862. In one embodiment, the distance from the bottom of STARM 868 to the top of the conductive mass 864 can be fixed. In another embodiment, a mechanism can be provided which moves the hover engine and the bottom of STARM 868 closer or farther away from the top surface of the conductive mass 862.

In FIG. 45, the rotational direction of the STARM 868 can be changed to change the direction of the force output from the hover engine. Thus, the direction the wheel rotates can be changed. In one embodiment, a mechanism can be provided which allows the amount of overlap between the STARM 868 and the conductive substrate 862 of the wheel to be adjusted. In particular, the mechanism can be configured to move the hover engine closer to the axel 860 or farther away from the axel 860. This interaction can change the magnitude of the forces which are transferred to the wheel from the hover engine.

Using these approaches, the hover engines can act as a transmission transferring some its rotation energy to the wheel 850 without touching the wheel. The amount of torque which is transferred from the hover engine 854 to the wheel 850 can be varied depending on how much the hover engine 854 is tilted about axis 856 relative to the wheel. Further, the propulsive forces output from hover engines 856 or 866 are a function of the rotational velocity of their respective STARMs. Thus, the rotational velocity of the STARM alone or in conjunction with tilting the hover engine can be used to control how much torque is transferred to the wheel 859.

In other embodiments, the hover engines, 854 and 866, can be controlled to generate a force which is in the opposite the direction of rotation of the wheel to slow the rotation of the wheel 850. In addition, as described above, when the motor is unpowered, as part of a regenerative braking, the interaction between the conductive mass 862 and the STARM in the hover engine can cause the STARM to turn such that the motor is turned. The turning of the motor can be used to generate power, such as to recharge batteries which power the motor or can be used for other purposes. The amount of interaction between the STARM and the wheel can be controlled by varying the angle between the STARM and the wheel using an actuator as described above.

As described above, the height of the hover engines relative to the wheel 850 can be adjusted to change the amount of interaction between the STARM of the hover engine and the wheel. Forces between a STARM and the conductive substrate vary with height. Thus, height control can be used to change the amount of force transferred from a STARM to a conductive substrate or vice versa.

As an example, the hover engine can be coupled to an actuated lever arm which allows it to move closer and farther away from the conductive substrate of the wheel. This motion can be implemented separately from the tilt motion. The hover engine can also be tilted when placed at a new height. Thus, the distance of the STARM from the conductive substrate and the angle of the STARM relative to the conductive substrate can be varied. In one embodiment, a first actuator can be used to move the STARM closer or farther away from a conductive substrate and a second actuator can be used to change a tilt angle of the STARM relative to the conductive substrate. The first and second actuator can include controllers which are configured to communicate with a vehicle controller.

In various embodiments, multiple STARMs with or without individual motors can be coupled to the wheel. For example, four STARMs each with an individual motor can be coupled to the wheel 850 such that each of the STARMs can generate a force for turning the wheel. The four STARMs can be individually controlled using a controller which sends a control signal to each of the four actuators such that the torque applied by each STARM varies from STARM to STARM. For example, a first of the four STARMs can be tilted by an actuator to a first angle relative to the conductive mass of the wheel and a second of the four STARMs can be tilted by an actuator to a second angle relative to the conductive mass which is different than the first angle. Further, as described above, a controller can be configured to control can change the rotational velocities of each of the STARMs to also change the amount of torque which is generated.

Figure 46A:
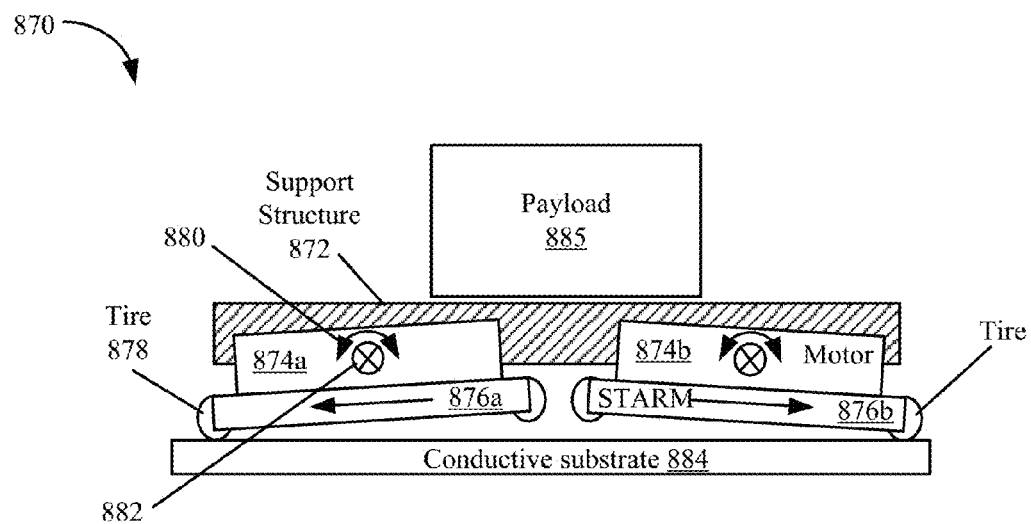
FIGS. 46A to 46B are illustrations a hybrid vehicle with hovering capabilities in accordance with the described embodiments.
Figure 46B:
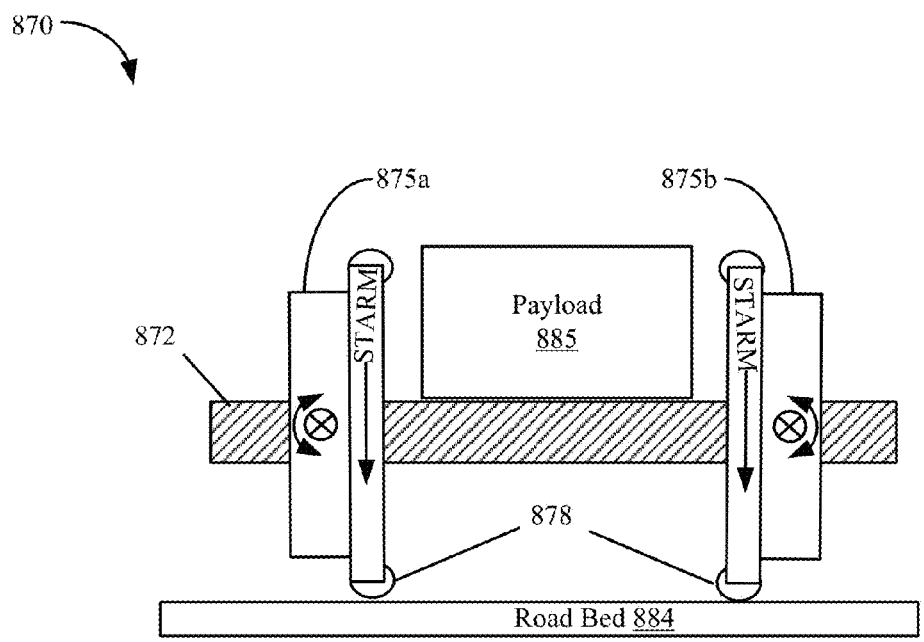

Next, a hybrid vehicle 870, which can hover above a surface or roll along a surface is described with respect to FIGS. 46A and 46B. The vehicle includes a plurality of hover engines, such as 875a and 875b. For example, two, three, four, five, etc. hover engines can be utilized in a hybrid vehicle. The hover engines each include a motor and STARM. For example, hover engine 875a includes motor 874a and STARM 876a. Whereas, hover engine 875b includes motor 874b and STARM 876b.

The hover engines, 875a and 875b, are coupled to a support structure 872. The support structure can support a payload 885. For example, in an automobile like device. The payload 885 can be a passenger cabin and passengers.

Mechanisms are provided which allows the hover engines to be rotated 880 about an axis 878. In one embodiment, the hover engines can be rotated through an angle of ninety degrees. At zero degrees, the STARMs can be approximately parallel to the conductive substrate 884. At ninety degrees, the STARMs are perpendicular to the surface as shown in FIG. 46B.

The range of rotation doesn't have to be between zero and ninety. For example, the hover engines can be configured to rotate between ten and thirty degrees or between zero and fifteen degrees. Further, the range of rotation doesn't have to be the same for all of the hover engines on one vehicle. Thus, the range shown in FIGS. 46A and 46B is for the purposes of illustration only.

A tire 878 is placed around the outer edge of each STARM, 876a and 876b. The tire can be formed from materials, such as rubber, used in car and bike tires. In operation, the tires can touch the substrate 884 all or a portion of the time. Thus, a propulsive force can be generated as a result of the magnets of the STARM interacting with the substrate 884 and the friction between the tire and the substrate 884. Further, the hover engines can be operated to generate enough lift such that the vehicle 870 begins to hover at which point the tire may no longer touch the substrate and the propulsive forces may be generated solely by the magnetic interactions or some other propulsive means (e.g., thrust from propeller or a jet).

In addition, the hybrid vehicle 870 may be utilized on different types of surfaces. For example, in FIG. 46A, it is shown over a conductive substrate 884. While over the conductive substrate, the lift and/or propulsion can be generated from the hover engines. In FIG. 46B, the vehicle 870 is operated over a road bed 884. While over the conductive substrate, the motors in the hover engines can rotate the tires to generate propulsion. However, the hover engines will not generate lift as a result of magnetic interactions which produce eddy currents.

Figure 47A:
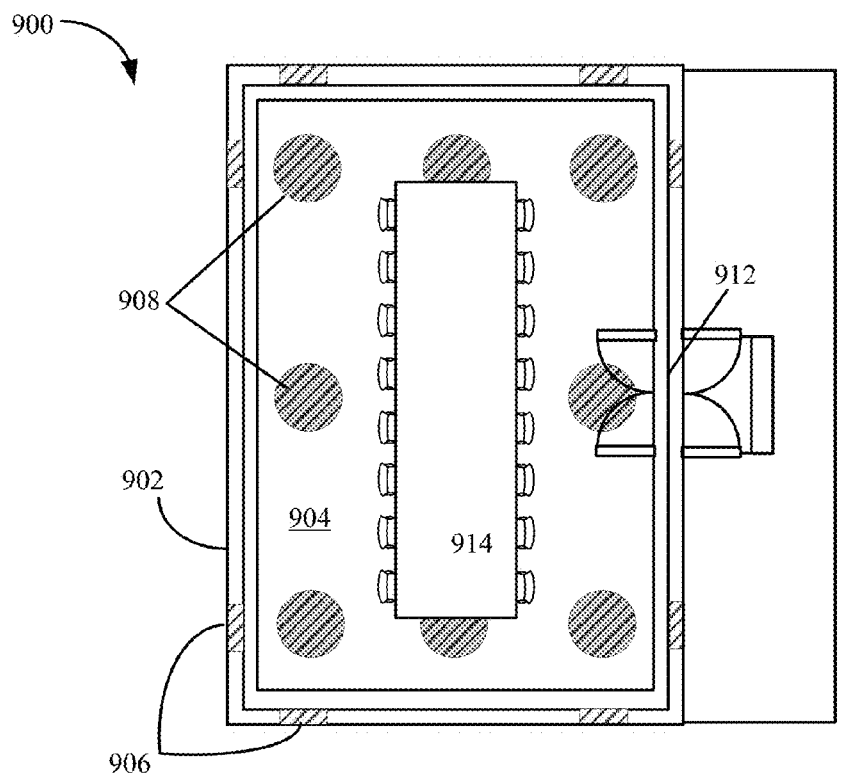
FIGS. 47A to 47B are illustrations of system including a room, which employs hover engines to perform signal isolation, in accordance with the described embodiments.
Figure 47B:
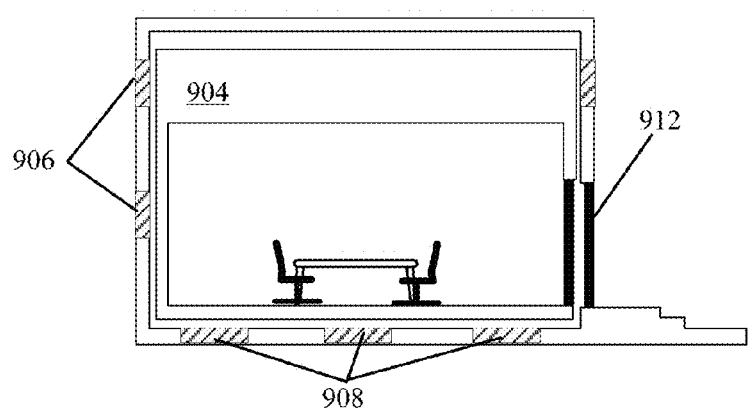

Next, a room which provides signal isolation capabilities is described with respect to FIGS. 47A and 47B. In signal isolation, signals generated in a space, such as vibrational or electromagnetic signals, can be isolated from their surrounding environment. In FIGS. 47A and 47B, a top and a side view of a room 904 hovered within a surrounding enclosure 902. The magnetic lifting devices, such as 906 and 908 are configured to raise the room 904 and keep the sides of the room from impacting a surrounding enclosure 902. When the room is used as a meeting space. Furniture, such as 914, can be placed in the room.

In one embodiment, the space between the hovered room and the surrounding enclosure can be evacuated. As a meeting space, an air supply would be provided to room 904. To allow for evacuation, an airlock, such as 912, can be provided as an entrance to the room. The room can also be electromagnetically isolated, such as wrapped in a faraday cage.

The magnetic levitation can decouple energy signals generated within the isolated space from leaking out and keep energy signals, such as vibrations from outside the space from penetrating into the isolated space. In one embodiment, this type of system can be used for secure communications. Some methods of spying on communications involve detecting vibrations, which result when people talk, the signal isolation can keep these communications from leaking outward and being detected.

Next, some device configurations which can be used in carrying a payload along a track are described with respect to FIGS. 48A and 48B. The track can be configured to allow a payload to be moved horizontally, vertically, and angles between horizontal and vertical. The track can involve combinations of straight and/or curved elements.

In FIG. 48A, STARMs 928 are shown where magnets are arranged along sides of cylinders. The magnetic fields extend outward to interact with a conductive substrate 924. The conductive substrate 924 is part of a track 922, which includes the substrate 924 and a support structure 926. The STARMs are rotated by motors 930. The interaction of the magnetic fields from the magnets in the STARMs with the substrate 924 can generated eddy currents which cause a force in the vertical direction as well as tangential to the surface. The tangential force can keep the STARMs 928 from contacting the substrate.

In this example, the poles of the magnets can be approximately perpendicular to the curved portion of the cylinder which forms the STARM. This approach differs from the example described above where the poles are perpendicular to a flat portion of the cylinder. A disadvantage of the approach in FIGS. 46A and 46B, as compared to the approach previously described, is that only a small portion of the magnets is near the conductive substrate at any one time. In addition, the portion is limited by the radius of curvature. Thus, in the following Figures alternate designs are discussed which allow for a greater portion of the magnet volume to be placed closer to the conductive substrate at any one time.

The one or more STARMs 928 can be mechanically coupled to one another and a payload. In some embodiments, the one or more STARMs may generate sufficient vertical forces to allow a payload to be raised vertically. During descent, the STARMs 928 can operate to slow a descent of the payload.

The tracks on which the STARMs 928 operate can be located in the interior of structure, such as the interior of the building or the exterior of a structure, such as along the outer surface of a building. In the interior of a building, the STARMs may be configured to act as an elevator for carrying cargo and passengers. In an elevator configuration, the use of STARMs may eliminate the need for long support cables used with traditional elevators.

On the exterior of the building, the STARMs can be coupled to a track. The STARMs can be used to lift equipment and/or a person for doing maintenance, such as window washing. Further, the STARMs on the exterior of building might be used as part of an emergency descent mechanism. For example, a STARM can include a hook which can be coupled to a harness worn by a person. The STARM can be configured to passively and/or actively generate a braking force which allows the descent of a person coupled to the STARM to be slowed. A passive system may not require a motor coupled to the STARM. An active system can use a motor coupled to the STARM to increase the braking forces generated by the STARM as a payload descends.

In the FIGS. 48A and 48B, a tensioning mechanism is shown between STARMs 928. The tensioning mechanism includes support rods 934, a tensioning bar 932 and an actuator 936. The actuator 936 can be configured to actuate the tensioning bar 932 to change the distance between the STARMs 228.

The lifting forces, perpendicular to the surface of the substrate 924, generated by the STARMs can cause the STARM move away from the surface of the substrate. Since the forces generated by the STARMs can be a function of the distance of the STARM from the surface of the substrate 924, the ascent/descent forces generated by the STARM can be reduced when the STARM moves away from the surface. The tensioning mechanism can generate a counter force, which keeps the STARMs close to the surface. Thus, the ascent/descent forces are not reduced as a result of the forces perpendicular to the surface generated by the STARM which would otherwise move the STARM away from the surface.

FIGS. 49A and 49B show an example of a magnetic lift system 940. The magnetic lift system 940 which can be used to transport a payload in a horizontal direction. The track 948 can be horizontal or sloped allowing the payload to be transported in a horizontal direction as well as raised vertically. In different embodiments, the payload can be secured above the device including the hover engines, 942*a* and 942*b*, or can be suspended below the device.

In the configuration of FIGS. 49A and 49B, the track 948 includes a slot. A first hover engine 942*a*, which includes a STARM 946 coupled to a motor 944 is positioned above the track 948. A second hover engine 942*b*, which includes a STARM 956 coupled to a motor 952, is suspended beneath the track 948. The first hover engine 942*a* is coupled to the second hover engine via member 958.

In one embodiment, the track 948 can be formed from contiguous conductive material, such as a copper or aluminum plate. In other embodiment, the track 948 can include an insulator, such as an insulator sandwiched between two pieces of aluminum to form a top track and a lower track. In one embodiment, the insulator can be an electrical insulator which prevents eddy currents generated from STARM 946 from interacting with eddy currents generated from STARM 956. In another embodiment, the top portion of the track and the bottom portion of the track can be sufficiently spaced such that the top STARM 946 has a minimal effect on a bottom portion of the track and the bottom STARM 956 has a minimal effect on a top portion of the track.

In one embodiment, the first hover engine, 942*a*, above the track is configured to generate only lift, such as the lift needed to hover the carrier vehicle including the two hover engines, 942*a* and 942*b*, and a payload against the force of gravity. The second hover engine 942*b* can be configured to only generate propulsive forces. Thus, the second STARM 956 may be smaller and use less magnet volume than the first STARM 946.

In alternate embodiments, the first and second STARMs can be powered by a single motor or separate motors can be used to power each of the STARMs. In an alternate embodiment, a single STARM, which can be actuated, can be used to generate both lift and propulsive forces and the second STARM may not be used.

The second hover engine 942*b* can be configured to rotate 962 about axis 960 to change the orientation of STARM 946 relative to the bottom of the track 948. The forces used to change the orientation of the STARM 946 can be provided from an actuator. To allow for the change in orientation of STARM 946, a joint (not shown) with one or more rotational degrees of freedom can be provided between the hover engine 942*b* and the member 958.

In operation, the hover engine 942*a* can be operated to generate sufficient lift to hover the carrier vehicle and a payload. The hover engine 942*b* can be operated to generate forces, which push the STARM 956 away from the track and pull the carrier vehicle downwards. Thus, the two STARMs, 946 and 956, can be kept vertically centered between the tracks 948. As described above, the bottom hover engine 942*b* can be coupled to an actuator which can tilt the STARM 956 relative to the bottom of the track. The bottom STARM can be titled in one direction to accelerate the carrier vehicle in a particular direction, such as 964, along the track, decelerate the carrier vehicle and bring it to a stop or move it in the opposite direction.

Figure 50:
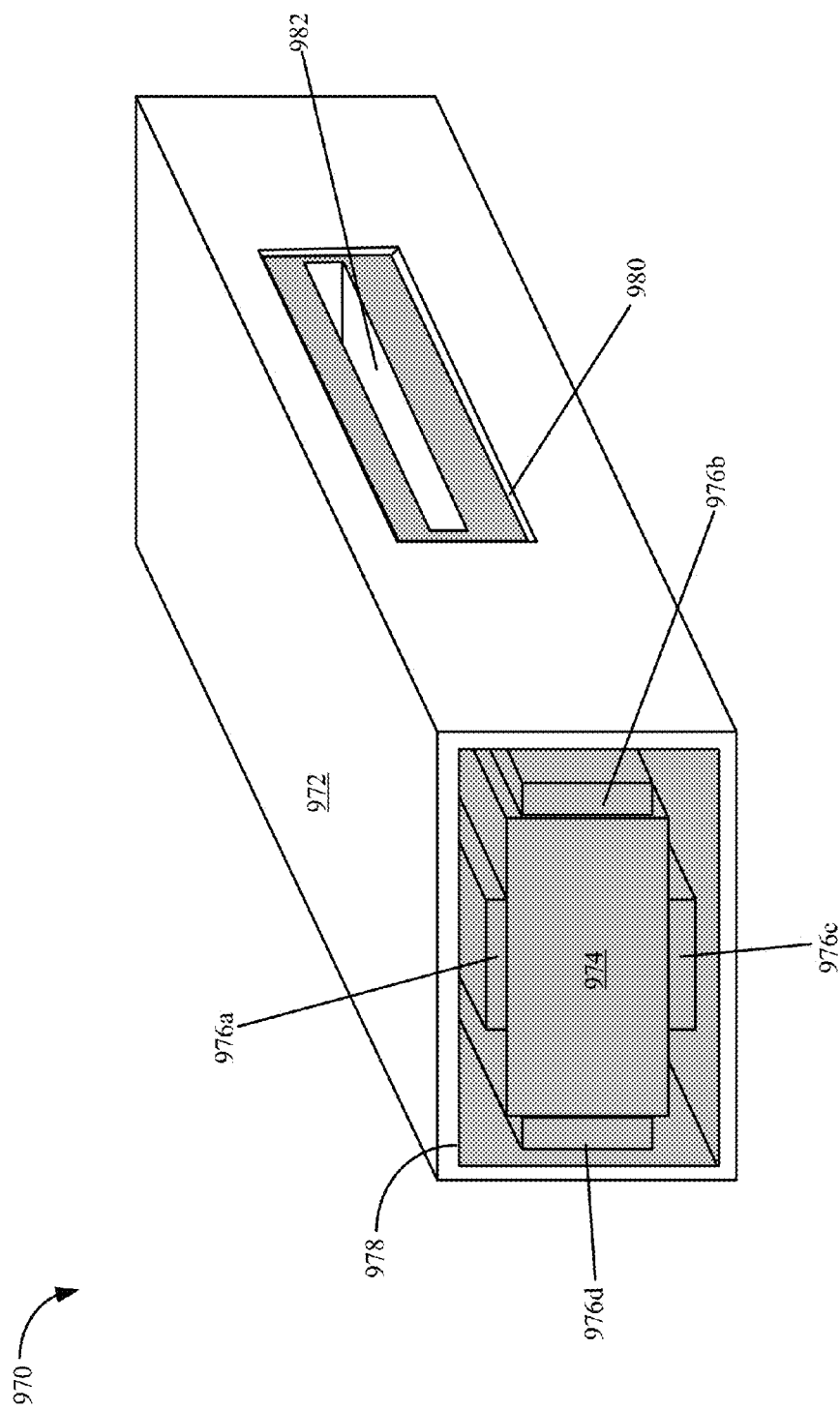
FIG. 50 is an illustration of a system with a magnetically lifted device configured to move within a track enclosure in accordance with the described embodiments.

In FIG. 50, a hover-capable carrier vehicle 974 is shown positioned inside a track enclosure 972. A track enclosure, such as 9742, can include conductive substrates on multiple sides. In this example, the track enclosure includes conductive substrates on four sides. The carrier vehicle 974 includes hover engines in four rows, 976a, 976b, 976c and 976c. The hover engines are each configured to interact with the conductive substrates on the four sides of the enclosure 972 to position and propel the carrier vehicle within the enclosure.

The cross section 978 of the enclosure 972 is shown as rectangular with straight edges. In various embodiments, the cross section shape can vary. For example, a triangular cross section can be used. In general, a polygon with "n" sides, n is greater than three, can be used. In various embodiments, one or more sides of the cross section can be curved. In a particular embodiment, a circular or ovular cross section can be used. The cross section doesn't need to remain constant and can vary along the length of the track enclosure.

In a particular embodiment, a portion of a track enclosure can be completely enclosed to allow a pressure which is greater than or less than the pressure of the environment surrounding the enclosure can be maintained. For example, a relative vacuum can be maintained in the enclosure. In other embodiments. The enclosure can only partially enclose the carrier vehicle 974. For example, a top of the enclosure 972 may be open to form a trough.

The number of locations where the hover engines can interact with the enclosure can vary. The number of locations can vary according to the cross sectional shape. For example, for a triangular cross section or a trough cross section, interactions between the hover engines may occur over three sides of the track. As another example, when a circular cross section is used, six strips of conductive substrate may be employed to allow interactions at six locations around the substrate.

The locations where interactions on the inner side of a track enclosure may not be continuous. For example, in FIG. 50, the track enclosure 980 includes a cut out portion 980. Prior to the cut out portion and after the cut out portion, the track enclosure is continuous around the cross section. The cut out portion 980 allows a payload to be placed in the payload section 982 of the carrier vehicle 974 or removed from the payload section 982.

In various embodiments, the carrier vehicle can include mechanisms, such as a tray coupled to an arm, which can be extended and retracted. In another embodiment, the carrier vehicle can include an arm with a mechanism configured to grab a payload. The mechanism can be configured such that it extends from and retracts into the payload section 982.

In operation, a payload can be placed on the arm and tray mechanism. When the arm is extended the payload can be extended from the payload section where it can be removed by another device. Further, an empty arm and tray can be extended through cut out section 980 from the payload section. Then, a payload can be placed on the arm and tray. The arm and tray can be retracted such that the arm, tray and payload enter the payload section 980. Then, the carrier vehicle and the payload can be moved to another section of the track enclosure.

Figure 51A:
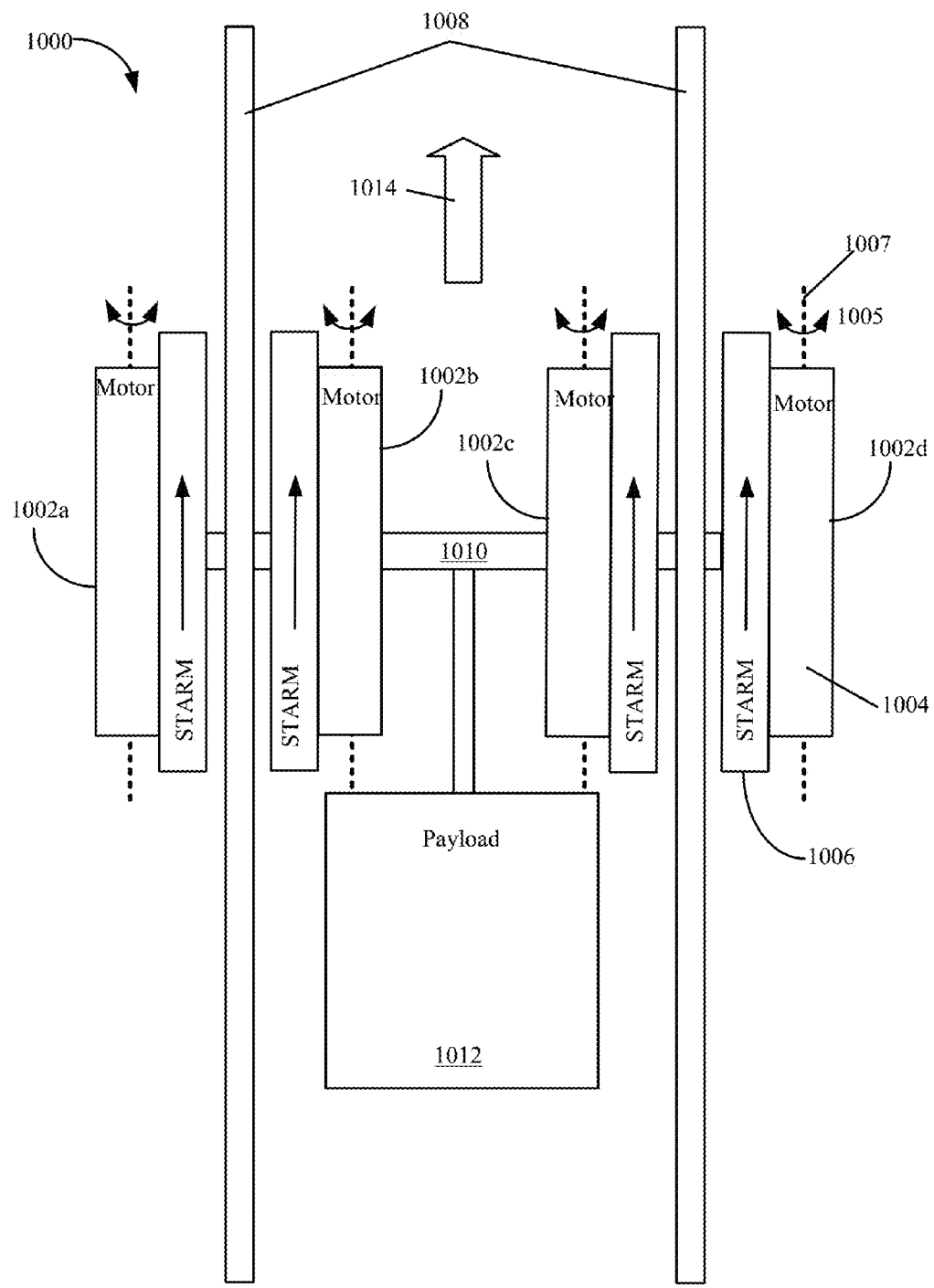
FIGS. 51A to 54 are illustrations of systems with hover engines configured to move along a track in accordance with the described embodiments.

FIG. 51A shows a vertical transport system 1000 using two slotted tracks 1008 like the slotted track 948 shown in FIGS. 49A and 49B. Four hover engines 1002a, 1002b, 1002c and 1002d are positioned on either side of the two tracks. The four hover engines are mechanically coupled to each other and a payload 1012 via members 1010. The four hove engines are arranged in a vertical orientation for climbing in direction 1014.

The tracks 1008 include a conductive mass on either side which can interact with the hover engines. In one embodiment, the tracks can be formed from a conductive mass, such as formed from aluminum. The hover engines each include a motor and a STARM, such as 1004 and 1006. In this example, each of the hover engines is configured to rotate about an axis. For instance, hover engine 1002d can rotate in either direction 1005 about axis 1007. In alternate embodiments, one or more of the hover engines can be mounted in a fixed orientation such that it doesn't rotate.

In the configuration of FIG. 51A, each of the hover engines is coupled to an actuator. The actuators can be configured to tilt the bottom of the STARM relative to the track such that an ascent or descent force is generated. The ascent forces can be used to raise the carrier vehicle including the four STARMs and the payload 1012.

Figure 51B:
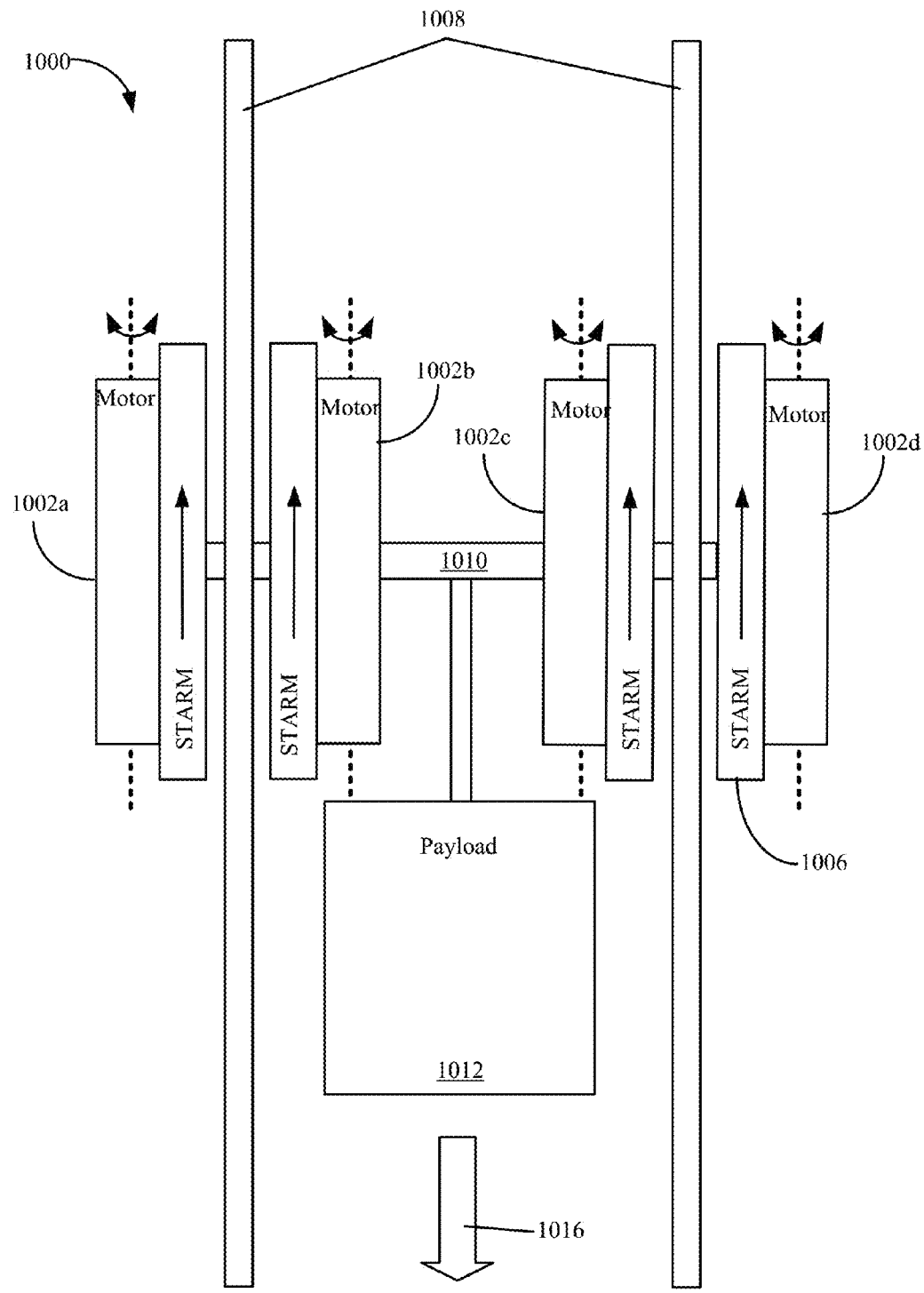

FIG. 51B shows the configuration 100 of FIG. 51A in a descent mode. In descent, the STARMs, such as 1006, can be tilted to actively generate a braking force which opposes gravity. Thus, the payload can be lowered at some desired velocity. In a fail safe mode, such as when the one of the motors fails, the STARMs can still passively generate eddy currents in the substrate portion of the track 1008. In particular, a descent 1016 of the carrier vehicle can cause the STARMs to rotate without input from the motor. The rotation of the STARMs can generate eddy currents which slow the vehicle. Further, the rotation of the STARMs can generate power which may be used to power one or more of the motors or some other emergency system. Of course, other breaking mechanisms, such as a friction brake, which can engage with the substrate during an emergency, may also be used as part of a fail-safe braking mode.

Figure 52:
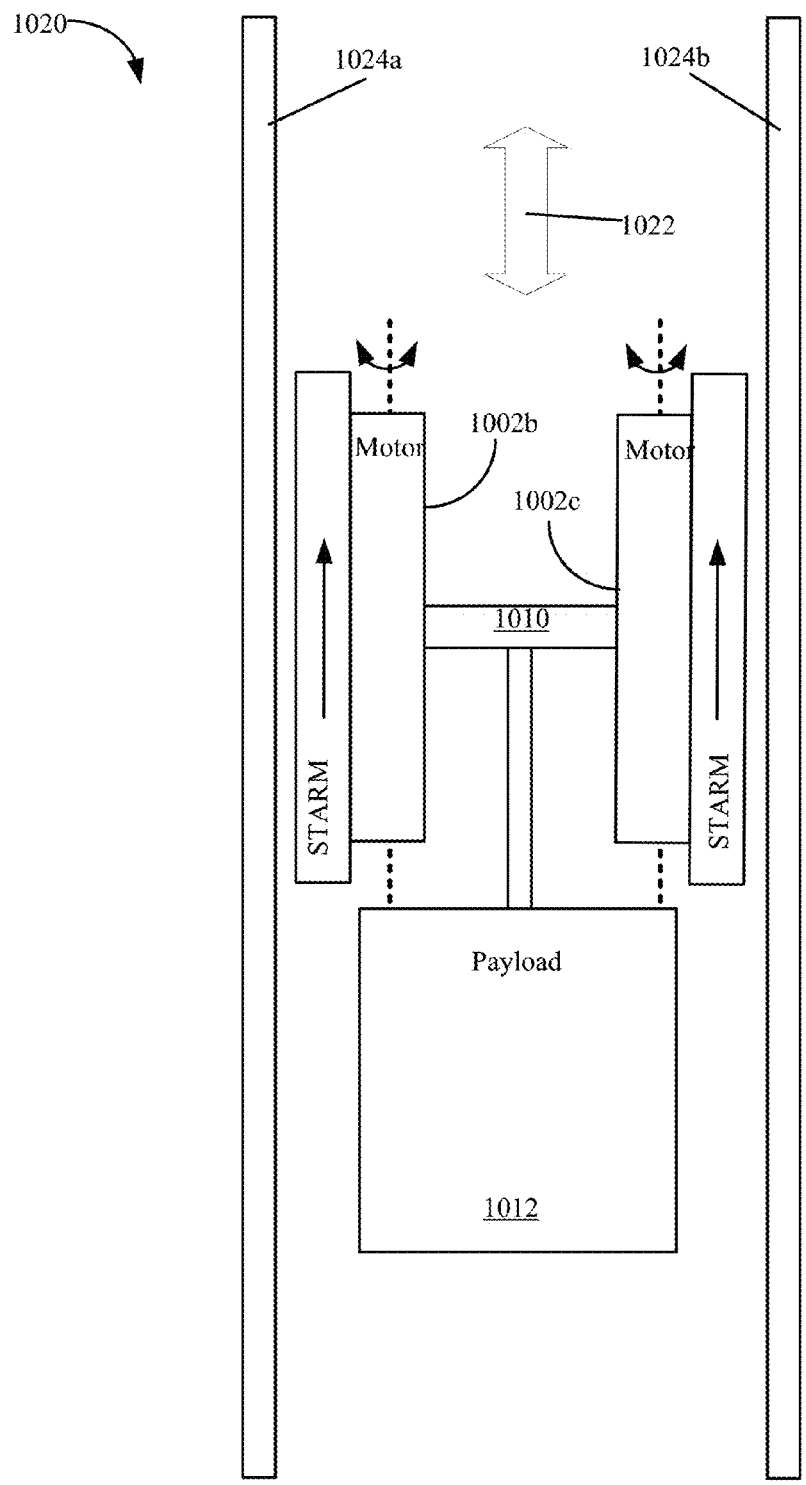

FIG. 52 illustrates an alternate embodiment which uses solid tracks 1024a and 1024b rather than slotted tracks as shown in FIGS. 51A and 51B. In FIG. 52, the two hover engines, each including a STARM and motor, are mechanically coupled, via structure 1010, to one another and a payload 1012. Each of the STARMs can include a volume and configuration of magnets, which generate a force which is perpendicular to the top surface of the tracks 1024a and 1024b. The opposing forces can position and center the carrier vehicle between the two tracks. Each of the STARMs can be actuated to generate an ascent force to lift the carrier vehicle and the payload or slow the carrier vehicle and the payload on descent.

In the examples above, a rotating STARM is tilted to generate a force imbalance on one half of the STARM or the other half of the STARM. Depending on which way the STARM is tilted, a net force is generated with acts along the tilt axis. An advantage of this approach is the STARM can rotate in a single direction while the propulsive force generated by the STARM can be changed in both magnitude and direction.

Figure 53A:
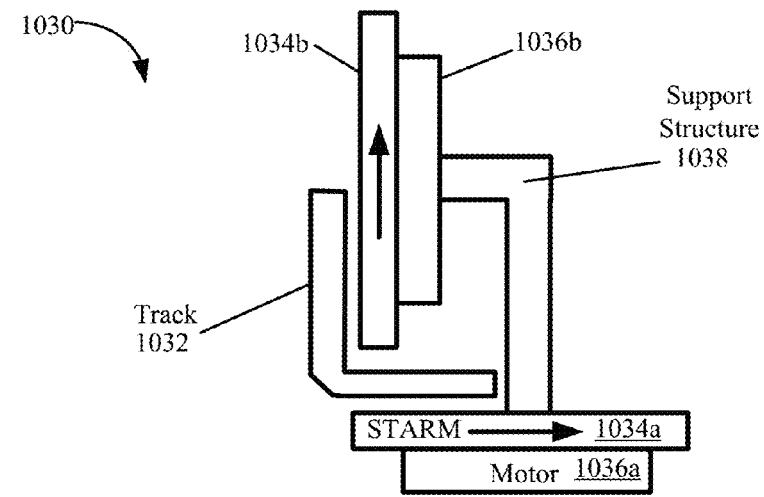
Figure 53B:
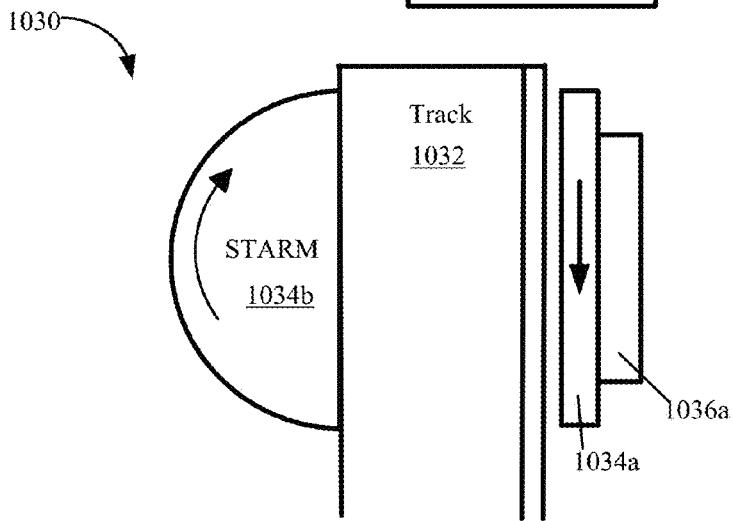

FIGS. 53a and 53b show a track transport system 1030 including a first hover engine having a STARM 1034a and a motor 1036a and a second hover engine having a motor 1036b and a STARM 1034b. The first and second hover engines are mechanically coupled to one another via support structure 1038.

In FIG. 53A, the two STARMs are positioned adjacent to a track 1032 which includes two sections. The two sections can be orientated at an angle relative to one another. In the example of FIGS. 53A and 53B, the two track sections are orientated at ninety degrees to one another. The angle is for the purposes of illustration only as the two portions could be orientated at a different angle, such as 45 degrees. Further, the two sections of the tracks are shown as being joined to one another in a contiguous manner. In other embodiments, two separate track sections can be used.

Each of the two track sections includes a conductive substrate. The conductive substrate interacts with the STARMs in the hover engines. In FIGS. 53A and 53B, a force imbalance is created because only a portion of the STARM is positioned over the track 1032. In particular, half of each of the STARMs, 1034a and 1034b are positioned over the track. In other embodiments a different fraction (up to 100%) of the STARM can be positioned above the track, such as ¼, ⅓, ⅔, ¾, etc., and the example of ½ is described for the purposes of illustration only.

Further, when multiple STARMs are utilized, the portion of each of the STARMs which is positioned above the track can vary from STARM to STARM. For example, half of STARM 1034a can be positioned facing the track 1032 while two thirds of STARM 1034b can be positioned facing the track. In addition, a mechanism can be provided which allows a position of one or more of the STARMs relative to the track to be adjusted. Thus, the fraction of the STARM facing the track may be adjustable. In various embodiments, the mechanism can be used to move the STARM relative to the track, to move the track relative to the STARM or combinations thereof.

When each of the first and second hover engines is turned on, the STARMs can start generating magnetic drag. The magnetic drag acts on only the portion of the STARM facing the track. Thus, a force imbalance is created which can propel the STARM along the track and thus, a carrier vehicle attached to the STARM can be propelled along the track. The STARM starts moving in a particular direction as soon as sufficient propulsive force is generated. The amount of propulsive force may depend on the rate at which the STARM is rotated, the magnet configuration which is used, the volume of magnets used and the distance of the magnets on the STARM from the track 1032.

The direction of the force which is generated depends on the direction the STARM is rotated. Thus, to change the direction of the force, the direction of rotation of the STARM is changed. To change the magnitude of the force, the rotation rate of the STARM can be modified. In addition, a mechanism may be provided which allows the distance of the STARM from the track to be adjusted. This approach differs from the one above in that the direction of the propulsive forces output from the hover engine can be reversed while the STARM rotates in a single direction. Further, the magnitude of the forces generated by a tiltable hover engine can be varied without necessarily changing the rotational speed of the STARM. In some embodiments, both the tilt angle and the rotational velocity of the STARM, alone or in combination with each other, can be used to change the magnitude of the propulsive forces output from the hover engine.

The approach shown in FIGS. 53A and 53B may generate more net propulsive force as compared to the approach where the STARM is tilted. When the STARM is tilted opposing forces are generated on either side of the STARM. However, more force is generated on one side than the other side to create a net force. By not placing a portion of the STARM above the track, the opposing forces on the portion of the STARM not above the track are eliminated. Hence, more net propulsive force may be generated.

The tiltable STARM allows for a neutral position where forces generated on either side of the STARM are balanced and no propulsive are generated. In example of FIGS. 53a and 53b, two STARMs rotating in different directions can generate opposing forces to arrive at a neutral position where no propulsive are generated. Thus, one STARM acts as a brake to other STARM. In an alternate embodiment, a mechanical brake might be used to tether one or more STARMs at a fixed location, such as a mechanical brake which can be coupled to the track. In particular, the propulsive STARMs, as shown in FIGS. 53a and 53b, can be spun up but then held in place by the mechanical brake. When the brake is released, the carrier vehicle including the STARM can begin to move.

Figure 54:
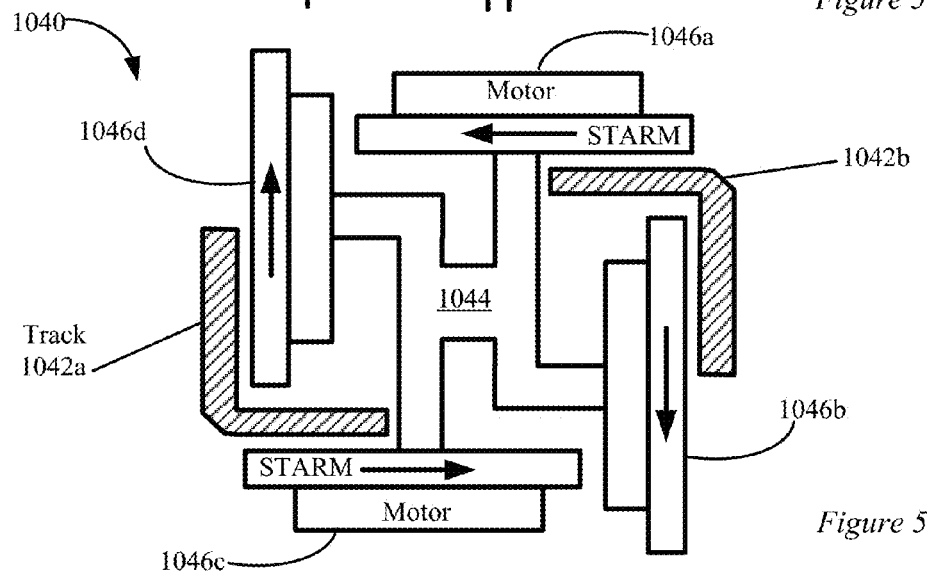

FIG. 54 shows four hover engines, 1046a, 1046b, 1046c and 1046d, each arranged in the manner shown in FIGS. 53A and 53B, i.e., where only a portion of the STARM is facing the conductive substrate at any one time. In one embodiment, the track can be arranged vertically. However, the track can also be arranged horizontally or at some angle between horizontal and vertical. The four hover engines are coupled to one another via a support structure 1044. The four hover engines are arranged to generate opposing forces perpendicular to the surfaces of the two tracks, 1042a and 1042b, which keep the carrier vehicle centered between the tracks.

Figure 55:
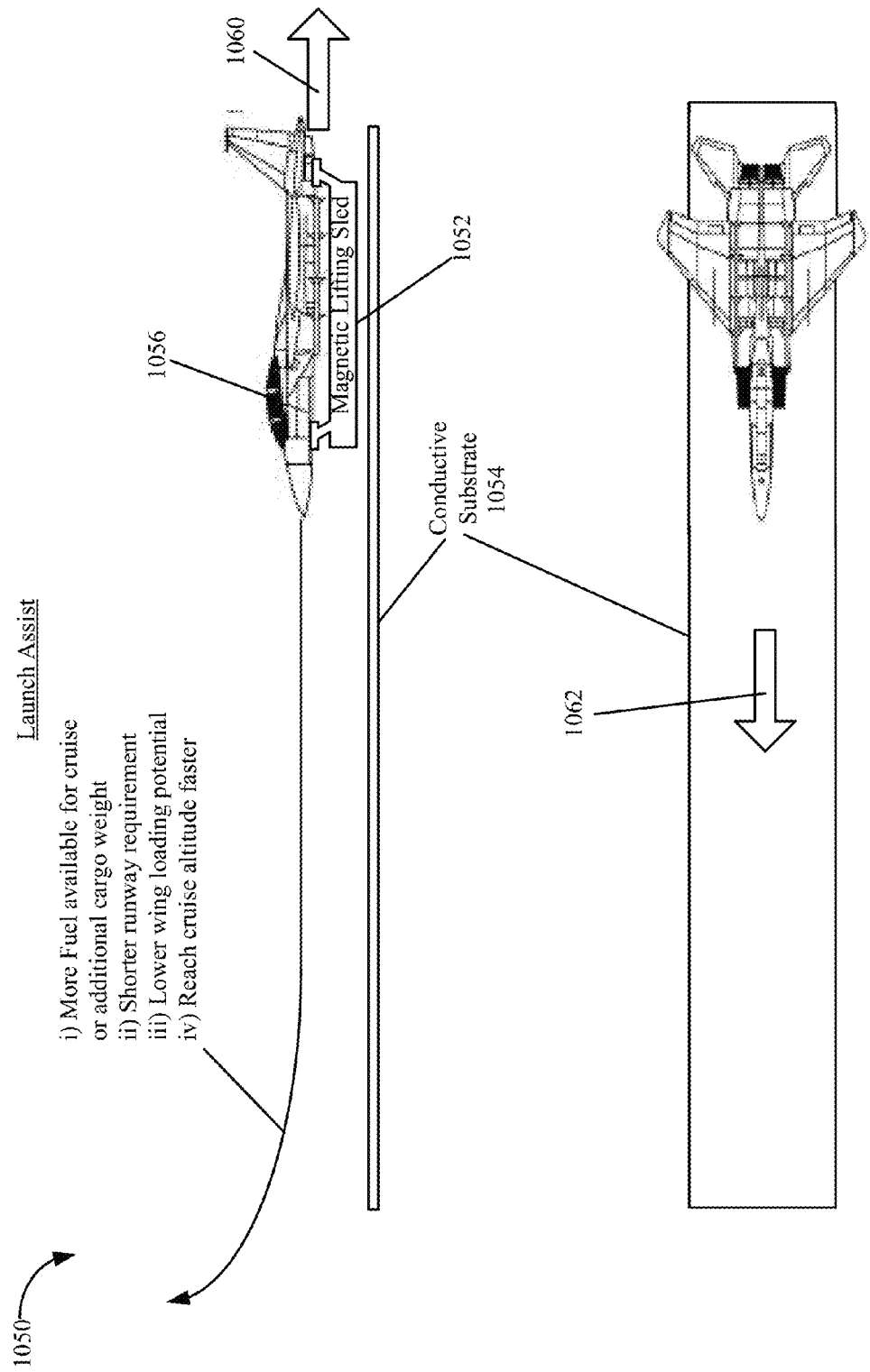
FIG. 55 is an illustration of a system with a sled configured to magnetically lift an airplane in accordance with the described embodiments.

FIG. 55 shows an example of a system 1050 for launch assist using a magnetic lifting sled 1052. An airplane, such as 1056, experiences the greatest wing loading at take-off when it has the maximum payload. The maximum payload has a strong effect on the needed wing area, associated structural requirements, runway length and engine size. If the energy costs associated with take-off can be reduced, it may be possible to launch on a shorter runway, extend the range of the vehicle, carry a greater payload, reduce the wing size of the vehicle and reduce environmental noise as a higher altitude can be reached more quickly.

One method of reducing energy costs associated with take-off can be the use of a magnetic lifting sled 1052. The magnetic lifting sled can be used to eliminate the friction of the tires on the runway during take-off With an existing plane, such as 1056, the sled can be mounted under the plane. The lifting sled 1052 can be activated to lift the plane off the ground. The lifting sled operates over conductive substrate 1054.

The plane 1056 can use its engines to power down the runway without having to overcome the rolling friction of the tires. In FIG. 55, the thrust output 1060 propels the plane 1056 forward 1062. Thus, the plane may be able to accelerate more quickly, reach a higher take-off speed and reach cruise velocity and altitude faster than if the lifting sled were not in place. In addition, if desired, the sled 1052 can also generate forces which accelerate the airplane in the manners described herein.

Figure 56:
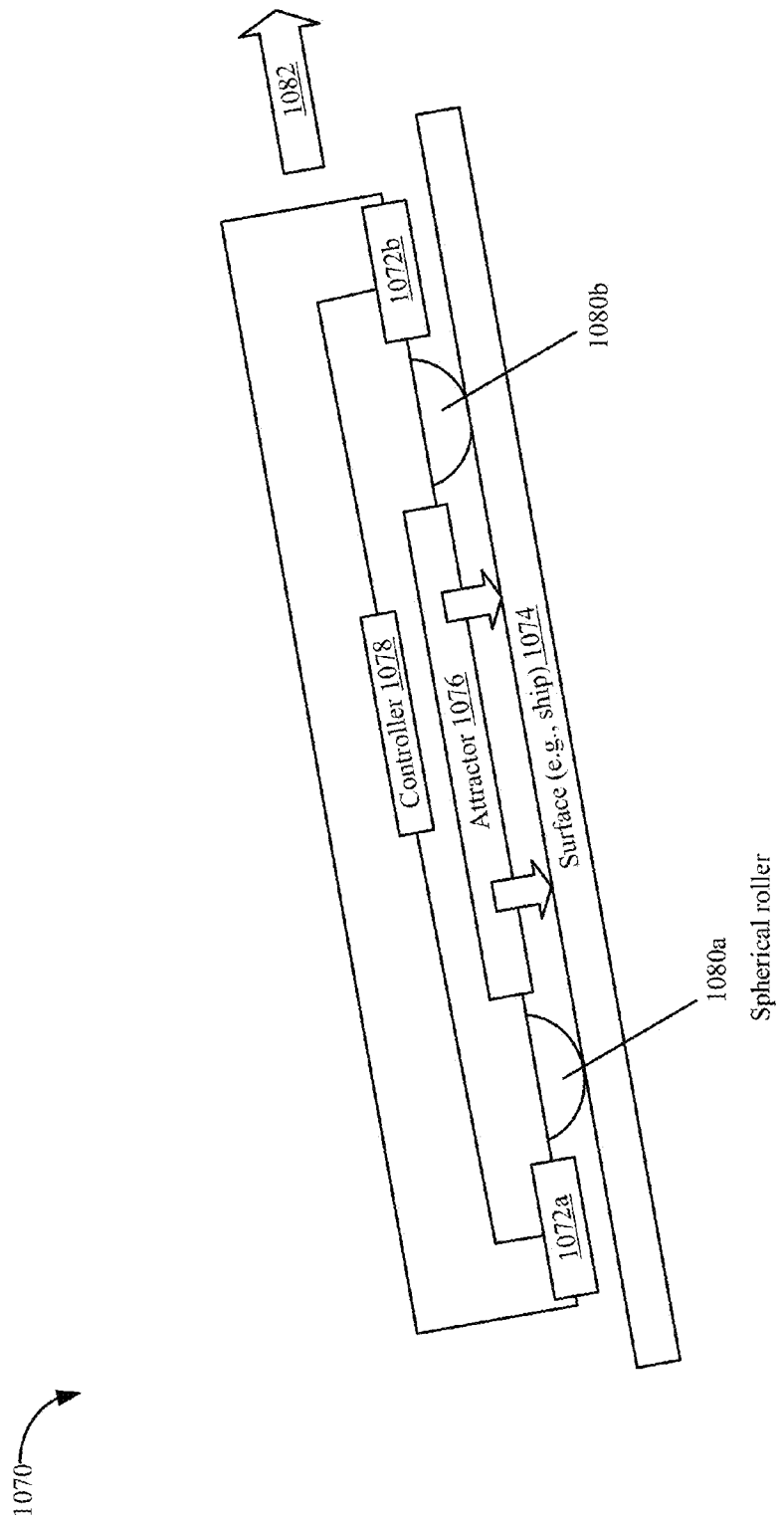
FIG. 56 is an illustration of a system which uses hover engines to propel a vehicle with rollers along a surface in accordance with the described embodiments.

Next, a vehicle which induces eddy currents to generate an attractive effect is described with respect to FIG. 56. The vehicle 1070 can include an attractor mechanism 1076 which pulls the vehicle towards a surface of a vehicle. For example, permanent magnets can be used to pull a vehicle towards a ferromagnetic surface, such as a hull of a ship. In another embodiment, as described above, a hover engine can be configured and operated which induce eddy currents to generate an attractive force which pulls the vehicle 1070 towards a conductive surface, such as a paramagnetic surface or a ferromagnetic surface.

As an example, the vehicle might be used to move over the surface of an airplane or other type of vehicle with an aluminum skin. In yet another example, the vehicle might be operated within a pipe where the hover engines propel the vehicle within a pipe. The pipe can be considered a track enclosure as was described above with respect to FIG. 50. In a further example, the vehicle might be operated on the outside of a pipe.

The vehicle 1070 can have wheels, such as spherical rollers 1080a and 1080b, which allow the vehicle to roll along the surface 1074. One or more hover engines, such as 1072a and 1072b, can be used to generate propulsive forces for moving the vehicle from location to location, such as direction 1082. Further, the hover engines may generate some lift which can be used to control the net attractive force which is output. Further, the lift can be used to operate in a hover mode if desirable.

The vehicle 1070 can include sensors for inspecting the surface and tools for performing maintenance and repair. In one embodiment, the vehicle can be water proof to allow it work under water. In another embodiment, eddy currents induced from the hover engines in the surface 1074 can be used to detect cracks and other flaws in the surface. To enable this type of inspection, the vehicle can include probes which extend from the vehicle to contact the surface 1074. The probes can be used to perform conductivity measurements between two or more points. A change in the conductivity between two measurement points can indicate the presence of a crack.

As an example, on a naval ship, the vehicle 1070 can include tools for removing barnacles from the hull. In another embodiment, the vehicle 1070 can include a tool, such as a welding tool for repairing a crack in the hull. In yet another embodiment, the vehicle can use eddy currents generated by the STARMs to detect for cracks or defects in the hull as cracks and defects can interfere with the flow of current through the hull. In a further embodiment, the vehicle can include paint and a nozzle for painting a surface.

Figure 57:
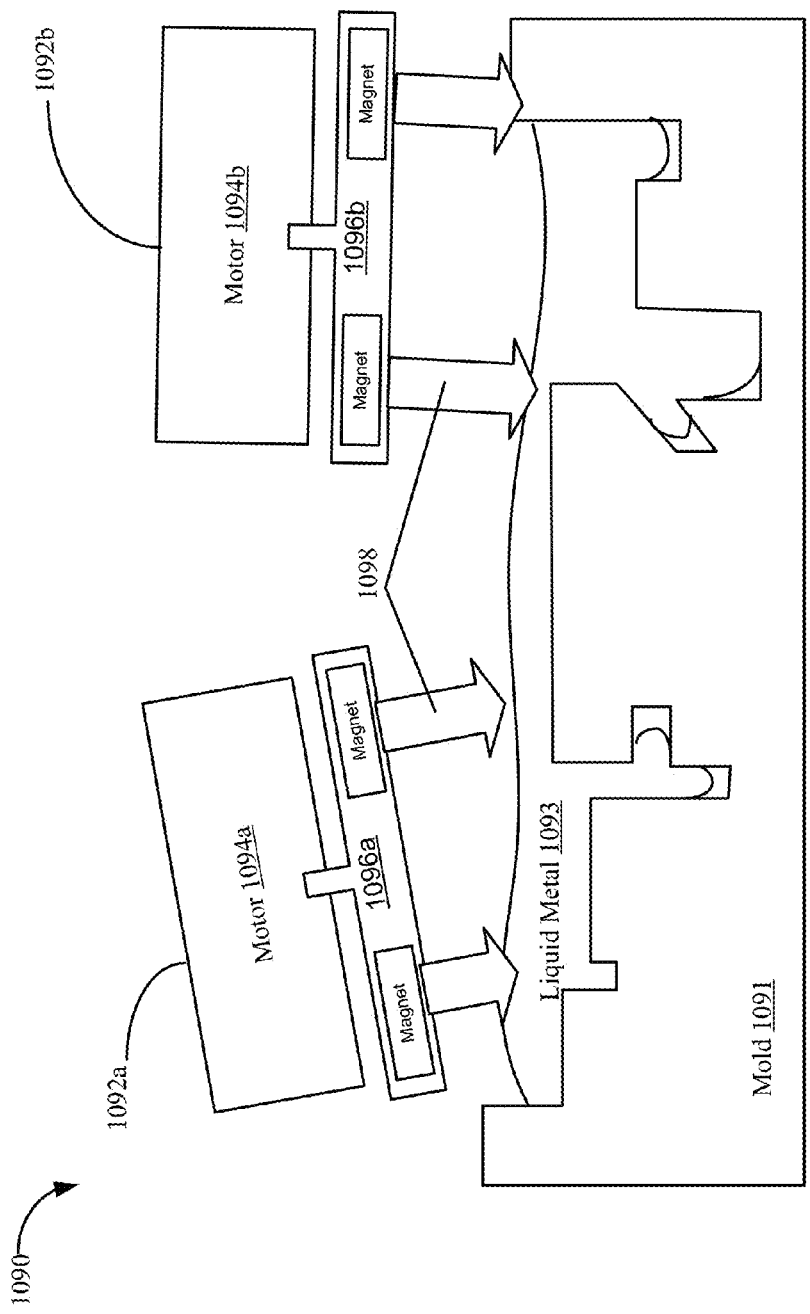
FIG. 57 is an illustration of a system which uses hover engines to manipulate a liquid in accordance with the described embodiments.

Next, an example of fluid manipulation using a hover engine is described with respect to FIG. 57. Aluminum is a material that is being used in more and more applications, such as from tablet casings to airplanes. As described above, an eddy current can be induced in a non-ferromagnetic material, such as Aluminum. In the embodiments above, the eddy currents generate a magnetic field, which can be used to generate lift. In another embodiment, rather than lifting a vehicle, the magnetic forces which are generated can be used to push a liquid. In a microgravity environment, the magnetic lift might be used to push to a hover engine and an associated vehicle away from a surface.

For example, as shown in FIG. 57, one or more hover engines, 1096a and 1096b, can be used to move a liquid metal 1093 around, such as a liquid aluminum. The hover engines may be used to emit a force 1098, which pushes against the liquid metal 1098 such it is forced into a complex geometry associated with a mold 1091. This technique may allow more complex shapes to be molded than would otherwise be possible.

Figure 58:
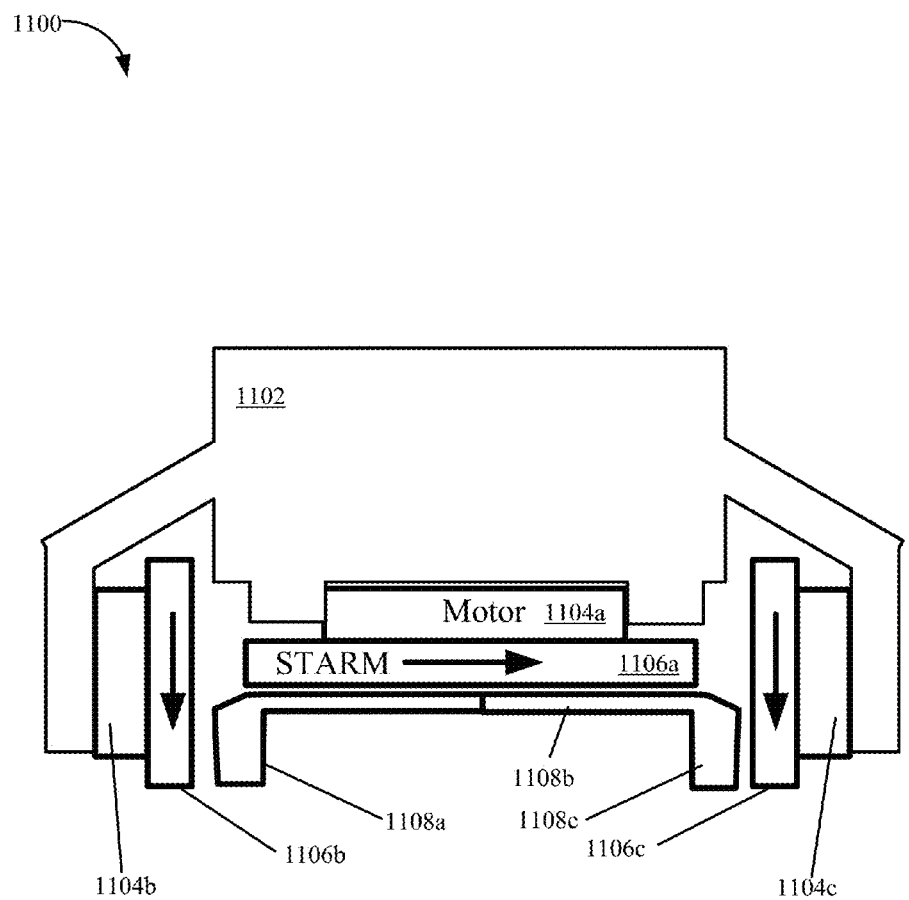
FIGS. 58 to 60C are illustrations of a hover locomotive and track configurations in accordance with the described embodiments.

Next, some train and track configuration are described with respect to FIGS. 58 to 60C. In FIG. 58, a cross section of a hover locomotive 1100 and a track is shown. The hover locomotive operates with a track including vertical portions, 1108a and 1108b, and a horizontal portion 1108b. Three hover engines aligned horizontal and vertically are shown. More hover engines can be utilized and this example is provided for illustrative purpose only.

The hover locomotive 1100 utilizes a first hover engine, which includes a first STARM 1106a and a first motor 1104a. The first hover engine is positioned above a horizontal portion 1108b of the track, such that the bottom of STARM 1106a is facing the top of the horizontal portion 1108b. In this example, the first hover engine is configured to generate lift only and doesn't generate propulsive forces. In other embodiments, the first hover engine can be configured to generate propulsive forces.

Two hover engines including motors, 1104b and 1104c, and STARMs, 1106b and 1106c, are shown on either side of the locomotive 1102. These hover engines are mounted vertically where only a portion of each STARM is positioned adjacent to the track. These two STARMs are configured to generate propulsive forces. The two vertical STARMs, 1106b and 1106c, each include a magnet configuration which generates a force normal to the adjacent vertical portions, 1108a and 1108c, of the track. The normal forces can be used to keep the locomotive centered on the track.

In the example above, the two vertical hover engines are adjacent to a vertical track. Thus, these two hover engines don't generate lift, which counteracts the force of gravity. However, the two hover generate lift in the sense there is a force generated which pushes the hover engine away from the track in a direction which perpendicular to the track. In other embodiments, the two hover engines and/or the adjacent track can be angled in some manner to generate both lifting forces and propulsive forces.

The two outside hover engines may only generate lift from a portion of the STARMs at any one time because only a portion of the STARMs is above the track at a particular time. Thus, the two outside STARMs, 1106b and 1106c, may not be as efficient for generating lift as compared to STARMs which are fully positioned above the track, such as the horizontal STARM 1106a shown in FIG. 58.

Multiple outside STARMs can be used in series to generate propulsive forces. Further, multiple horizontal STARMs with different configurations can be used to generate the lift. For example, in FIG. 58, two horizontally mounted hover engines which are counter rotating and side by side may be used to generate lift rather than the single hover engine which is shown.

In other embodiments, a track configuration can be varied along its length at different locations to generate to generate propulsive forces. For example, in FIGS. 59A, 59B and 59C, three track configurations, 1110a, 1110b and 1110c, are shown. In each of FIGS. 59A, 59B and 59C, a cross section of a carriage 1112 coupled to two hover engines, 1114a and 1114b is shown. In one embodiment, the hover engines are mounted in a fixed position relative to carriage 1112 and are not configured to tilt. In other embodiment, the hover engines 1114a and 1114b can be configured to tilt.

During acceleration mode 1110a, the track including portions 1116a and 1116b is spread out such that the two hover engines 1114a and 1114b are centered over the track in the manner shown, such that only a portion of the STARMs in the hover engines are above the track. When positioned in this way, a propulsive force is generated and the carriage 1112 can be accelerated.

Figure 59A:
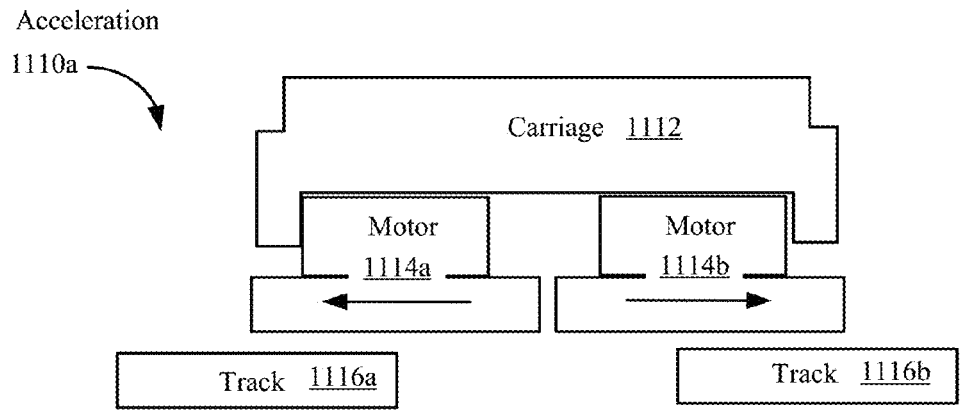
Figure 59B:
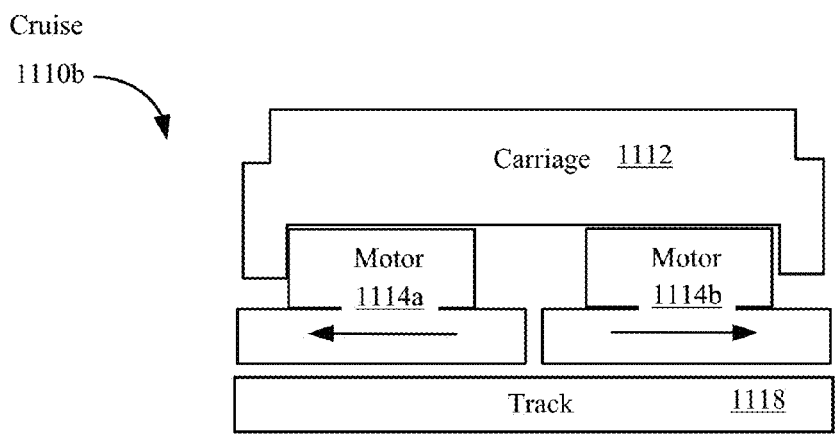
Figure 59C:
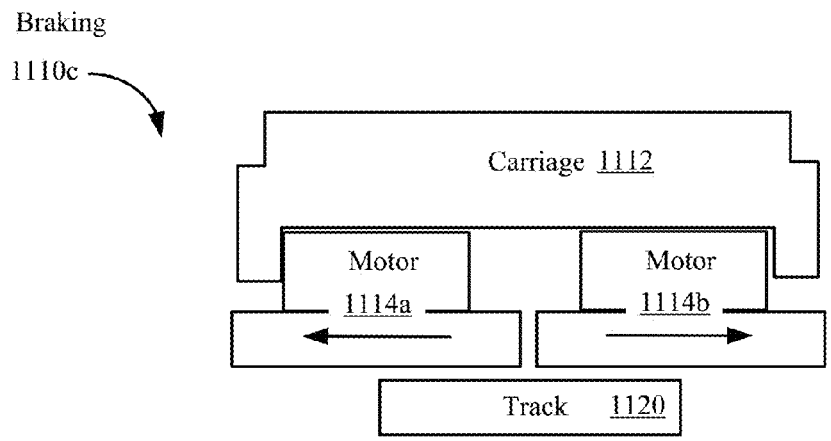

In a cruise environment 1110b as shown in FIG. 59B, such as after the carriage has been accelerated above a cruise velocity, the tracks 1116a and 1116b can be merged together to form track 1118. In this configuration, the hover engines 1114a and 1114b may no longer generate propulsive forces in their interaction with the track but still generate lift because there are no longer force imbalances acting on the STARMs.

In this example, after reaching a cruise velocity, it may not be necessary to rotate the STARMs in the hover engines 1114a and 1114b. The STARM can be stopped in a position where the magnet configuration generates lift as a result of the linear velocity between the track and the magnet configuration. Then, the vehicle can cruise in this position.

If the hover engines are both rotating and translating relative to a surface and the translational speed relative to the rotational speed is significant, then a propulsive force can be generated. The propulsive force is generated because on one side of the STARM the translational velocity adds to the net relative velocity of the magnets relative to the surface and the other side of the STARM the translation velocity subtracts from the net relativity velocity. Thus, more lift and drag can be created on one side of the STARM relative to the other side of the STARM. The force imbalance can generate a propulsive force. For a vehicle configure to translate freely over a surface, such as described above, with respect to FIGS. 35-40. The control system can be configured to actuate hover engines to balance out these forces while it is translating.

In a braking mode 1110c, the track 1120 is narrowed as compared to the track 1118. In this configuration, the hover engines 1114a generate a force in the opposite direction as shown for acceleration. This force can be used to slow the carriage 1112. In the example above, the rotational direction or angle of the STARMs relative to the track don't have to be changed to generate the propulsive forces. In other embodiments, rotational control of the STARMs and/or tilt control of the STARMs can be used in conjunction with the different track configurations to enable propulsion of a vehicle.

Figure 60A:
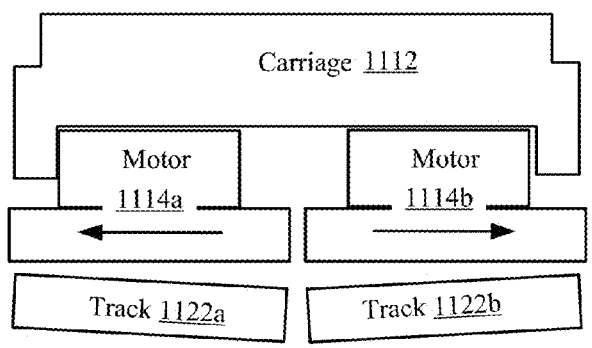
Figure 60B:
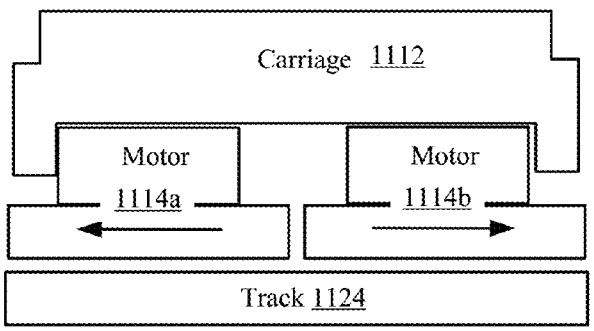
Figure 60C:
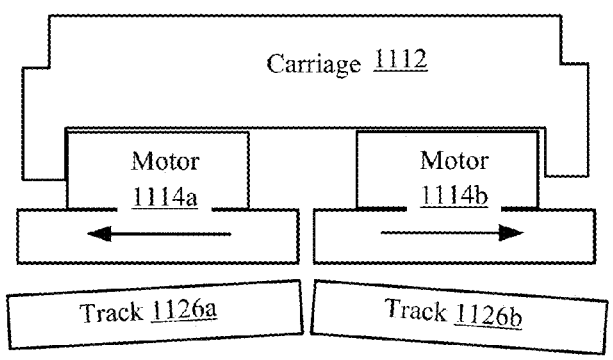

Another example of using track configurations to generate propulsive forces is shown in FIGS. 60A, 60B and 60C. In an acceleration mode 1120a, the track, 1120a and 1120b, is tilted in a first direction relative to the STARMs in hover engines 1114a and 1114b, to accelerate the vehicle including the carriage 1112 and hover engines 1114a and 1114b, in a first direction. In a cruise mode 1120a, the track 1124 is level and the interactions between the hover engines and the track don't contribute significantly to propulsion. Unless, as described above, the STARMs are rotating and the translational velocity relative to the rotation rate of the STARM is significant.

In a braking mode 1120c, the track, 1126a and 1126b, is tilted in an opposite direction as compared to the acceleration mode Thus, the vehicle is slowed if it is moving in the direction associated with the acceleration mode. Again, in this embodiment, the STARMs can be in a fixed position and thus, don't actuate.

A tilt of the track in one direction or another generates thrust or braking depending on a rotation direction of the STARMs in the hove engines. Thus, the tilt directions in 1120a and 1120C can be reversed in some instances. As another example, the track components can always be tilted in the same direction but the spin directions of the STARMs can be changed to produce braking or acceleration.

In the examples above described with respect to FIGS. 59A-60C, the track configuration can be fixed. Thus, for example, the tilt angle of the track can't be changed once it is installed. In other embodiment, a track can be designed with variable surface properties. For example, a track section can be designed such that portions can be tilted in different directions to provide either the acceleration or braking properties along the same section of track.

In alternate embodiments, more than two hover engines can be utilized across the carriage, such as three, four, five or six hover engines or a single hover engine with multiple STARMs. Thus, the track patterns in FIGS. 59A to 60C can be repeated in the horizontal direction to utilize the multiple hover engines. Further, the track patterns in FIGS. 59A and 60C can be combined. For example, when four STARMs are used in the horizontal direction, two track portions can be aligned with the two outer STARMs in the manner of FIG. 59A (acceleration) and two track portions can be aligned with the two inner STARMs as shown in FIG. 60A (acceleration). In another example, when four STARMs are used in the horizontal direction, two track portions can be aligned in the manner shown in FIG. 60A (acceleration) with the two outer STARMs and the two inner STARMs can be aligned in the manner shown in FIG. 60B (cruise).

Next, magnetic lifting devices, which can be used to print or perform other tasks, are described with respect to FIGS. 61A, 61B, 62A and 62B. In a free printing system 1140, magnetic lifting devices, such as 1144 and 1148, can hover over a first material 1114 and deposit one or more second materials 1150 at various locations. The first material 1144 can rest on a conductive substrate 1142. The devices 1144 and 1148 can include hover engines which generate lift and propulsive forces as a result of interactions with the conductive substrate 1142.

For example, the first material 1144 can be a piece of paper and the one or more second materials 1150 can be inks. In another example, the first material 1144 can be a canvas and the one or more second materials 1150 can be various paint colors. In yet another example, the second material 1150 can be an etchant and the first material 1144 can be something which is etched by the etchant. Thus, locations where the second material is deposited can cause it and the first material to be removed when exposed to another material, as in the manner which semiconductor layers are formed. In yet another example, the second material 1150 can be polymer which bonds to the first material 11144 and itself to allow multiple layers to be deposited and a 3-D structure to be formed, like in 3-D printing.

In general, the magnetic lifting devices, 1146 and 1148, can be configured to carry and dispense solid materials, such as a powder, a liquid material, a gas or combinations. The dispensed material can bond with and/or interact with the material on which it is placed. For example, an ink can be dispensed, which both bonds and is absorbed into a receiving medium, such as paper.

When a magnetically lifted device is operated over a conductive substrate, heat can be generated. The time over a particular location as well as the operating conditions of the hover engine, such as its rotation rate and distance from the surface, can affect how much heat is transferred to the surface. In a particular embodiment, the magnetically lifted device can be configured to cure a material, which it has deposited, by heating the surface below it for some amount of the time.

In one embodiment, the magnetically lifted devices can include temperature sensors, which enable it to detect a temperature of a material below it. These temperature readings can be used to control a curing process. For example, the devices, can linger over a particular location until a temperature measurement indicates the surface has reached a particular temperature at which point, the devices 1146 and 1148 can be moved to another location.

A single magnetic lifting device or multiple magnetic lifting devices can be configured to deposit multiple layers of material at a particular location. Two layers can be configured to interact with one another in some manner. For example, the materials in two layers can be configured to mix together to produce a particular color. As another example, the materials in two layers can be configured to react with another, such as via some type of chemical reaction.

Figure 61A:
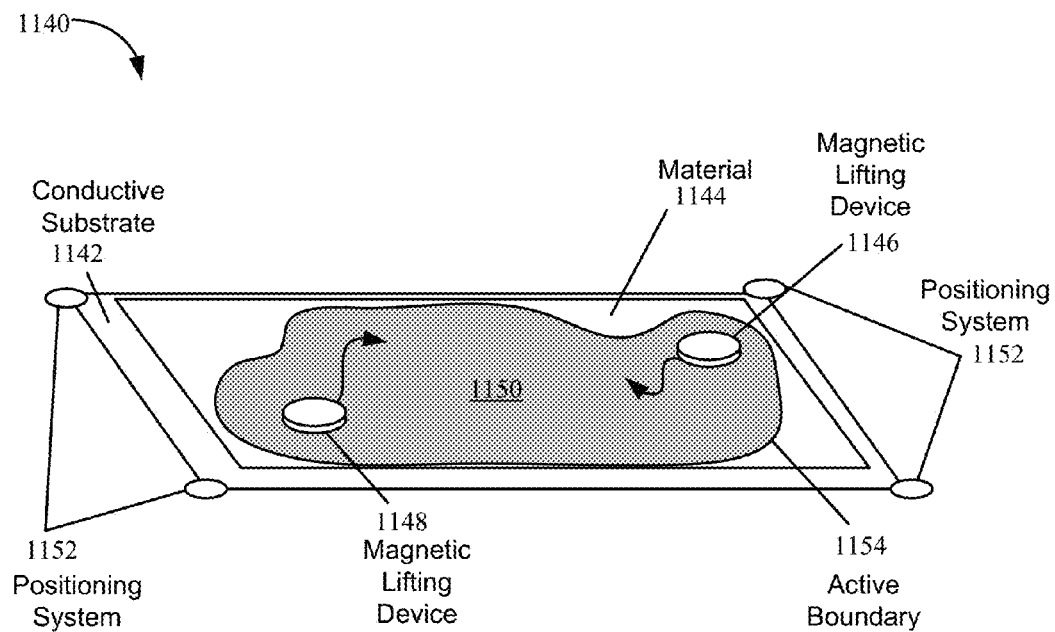
FIGS. 61A to 62B are illustrations of a system which employs hovering vehicles to deposit material to a surface in accordance with the described embodiments.

As shown in FIG. 61A, one or more magnetic lifting devices can be configured to translate from position to position, rotate in place and/or translate and rotate simultaneously to deposit a material at various locations. The path the magnetic lifting device travels can vary each time it is used. For example, if the magnetic lifting device was depositing black ink at various locations on paper to form a picture, then the path magnetic lifting device travels can vary from picture depending on its composition and where the black ink is needed. One aspect of the system can be a program which determines an optimum travel path for a magnetic lifting device based upon the locations were a material needs to be deposited. This approach differs from traditional printing systems where a print head is constrained to traverse across a paper from row to row and deposit material at various locations as needed along each row.

Multiple magnetic lifting devices can deposit material in parallel where each magnetic lifting device can deposit the same or a different material. For example, a first and a second magnetic lifting device can be configured to carry black paint where the first magnetic lifting device starts from a first corner and a second magnetic lifting device starts from a second corner. The first and the second magnetic lifting devices can then deposit the black paint at various locations such that each device generates a portion of the image.

In another example, a first magnetic lifting device can be configured to deposit a first color material, a second magnetic lifting device can be configured to deposit a second color material and a third magnetic lifting device can be configured to deposit a third color material. A starting position can be determined for each magnetic lifting device and then each device can follow a path and deposit material in a particular pattern. The system can be configured to generate the three paths such that the magnetic lifting devices don't collide with one another during as they each follow their proscribed routes.

Different magnetic lifting devices can be configured to deposit a first material on a receiving medium at various scales. For example, a first system can be configured to print on sheets of paper from book size up to the size of a desk or a conference table. In another example, a second system can be configured to print a billboard sized image. Thus, the magnetic lifting devices may be scaled to different sizes depending on how much material needs to be deposited and the area which needs to be covered for a particular application. The receiving medium on which material is deposited can be nearly any shape including curved and straight edges. Thus, in FIG. 61a, as examples, a rectangular shaped receiving material 1144 and a general polygon shaped deposited material 1150 are shown. Further, the system 1140 can be configured to account for different orientations of the receiving medium. Thus, it may be able to print on a rectangular receiving medium which is placed in any orientation on a horizontal surface.

The magnetic lifting devices, such as 1146 and 1148, can include mechanisms for determining its position. For example, a positioning system can include radio transmitters which are placed at known locations and a radio receiver on each magnetic lifting device. In FIG. 61A, four radio transmitters, 1152, are shown. The magnetic lifting devices can receive the radio signals from each transmitter and then determine its position using triangulation. This information can be used as part of the GNC system as described previously.

The receiving medium, which receives the material deposited from the magnetic lifting device, can be positioned relative to the radio transmitters, such that material from the magnetic lifting devices is deposited in the desired locations. Using the position data, a starting location and path to follow can be generated for the magnetic lifting devices where a precise location of the magnetic lifting device can be known at a particular time along a desired path.

Other positioning mechanisms can be utilized. For example, a receiving medium can be marked with a grid with unique identifiers where an optical sensor on the magnetic lifting device is configured to detect the unique identifiers. Then, a logic device on the magnetic lifting device or a remote device in communication with the magnetic lifting devices can be configured to determine its position based upon the detected data and make corrections to the magnetic lifting device's position over time.

In one embodiment, the positioning system can be portable and self-calibrating. For example, in an application involving a large area, positioning beacons can be placed and then the system can be configured to calibrate its position relative to the beacons. In one embodiment, a sensor can be placed on the receiving medium or a sensor, such as camera, can be used to detect a position of the receiving medium so that the position of the receiving medium relative to the position beacons or other positioning sensors can be verified.

Figure 61B:
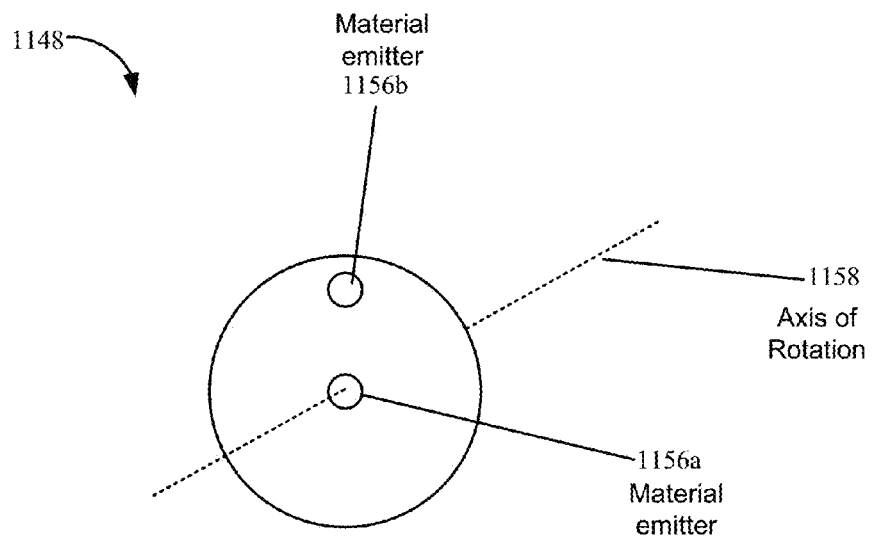

FIG. 61B, shows the bottom side of a magnetic lifting device 1148. The magnetic lifting device 1148 includes a first material emitter 1156a positioned near an axis of rotation 1158 and a second material emitter 1156b at a radial distance from the axis of rotation. If the vehicle can translate and rotate simultaneously, then first material emitter 1156a can deposit material at a first location while the vehicle is rotated to allow the second material emitter 1156b to deposit material in an arc centered on the first location.

In general, the magnetic lifting devices, such as 1146a and 1146b, can include mechanisms for generating lift (e.g., rotors and a motor), a power interface to an external power source or an internal power source, a material reservoir, a mechanism for dispensing the material, one or more sensors for detecting the magnetic lifting devices current position, a control system for controlling a translational position and/or a rotational orientation of the magnetic lifting device via a propulsion system of some type and a propulsion system. In one embodiment, rotational elements on the magnetic lifting device can be configured to tilt in some manner to act a propulsion system. In one embodiment, the magnetic lifting device can have four such rotational elements as previously described above.

Figure 62A:
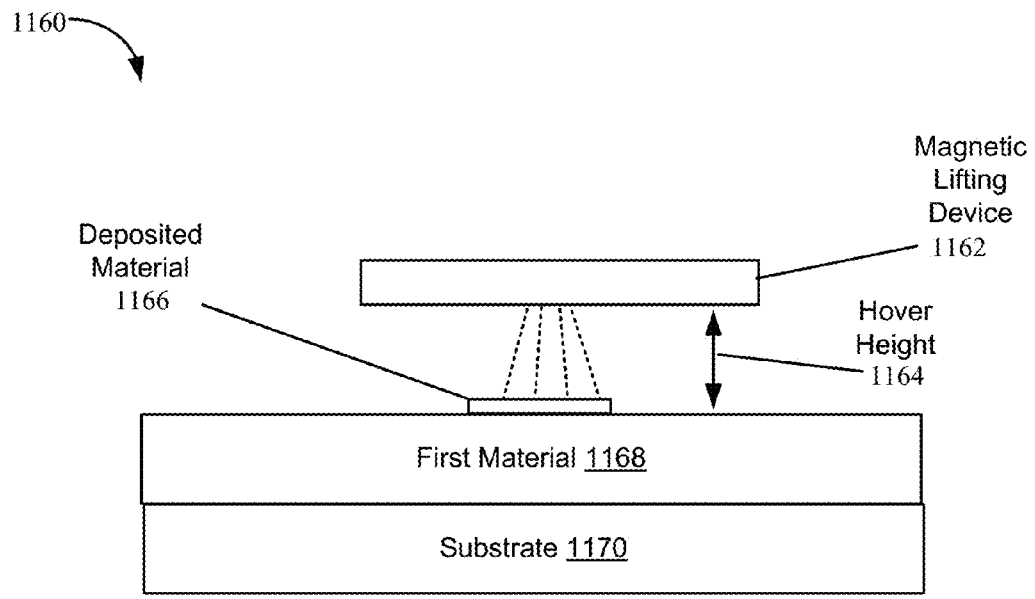

In FIG. 62A, a system 1160, including a first material 1168, i.e., the receiving medium placed over a conductive substrate 1170, is shown. In 1160, the magnetic lifting device 1162 generates magnetic lift using the conductive substrate 1170. In one embodiment, the conductive substrate 1170 can be a metal table top where the first material is placed on the metal table top. In another embodiment, the conductive substrate 1170 and the first material 1168 don't have to be in contact with one another. For example, a wood surface, such as wood surface on a desk can have a conductive substrate 1170 beneath the wood surface. The first material can then be placed on the wood desk and then the magnetic lifting devices can hover over it and deposit material at various locations using the metal substrate to generate lift. As an example, a piece of paper or multiple pieces of paper can be placed on the desk and then one or more magnetic lifting devices can be operated to print images on the paper.

In another embodiment, the first material 1168 and the substrate 1170 can be integrated with one another. For example, the first material 1168 can be bonded to a flexible conductive substrate 1170. A large sheet of the integrated material can be generated and then laid out on a horizontal surface, such as to form a large banner. Then, the magnetic lifting device 1162 can be operated to form an image on the integrated material, such as an image on the banner. Subsequently, the banner might be displayed.

A new image might be drawn over the banner by covering up the first image or the integrated material might be recycled and used again. In another embodiment, the integrated material can be heated to remove all or a portion of it at a particular location. Thus, an image might be formed by removing the first material 1168 to expose the underlying substrate 1170.

In one embodiment, the hover height 1164 can be varied to affect how the material is dispersed from the magnetic lifting device. For example, if the magnetic lifting device is configured to deposit material over a circular area, then the hover height can be varied to increase or decrease an area of the circle of material which is deposited. Thus, the hover height 1164 and the size of the circular area may vary from location to location as the magnetic lifting device 1162 travels along its path.

In another example, the hover height might be varied to deposit multiple layers to generate a 3-D structure. For instance, a 3-D topographical map can be generated. The maximum height of the 3-D structure can depend on the maximum hover height of the magnetic lifting device.

Figure 62B:
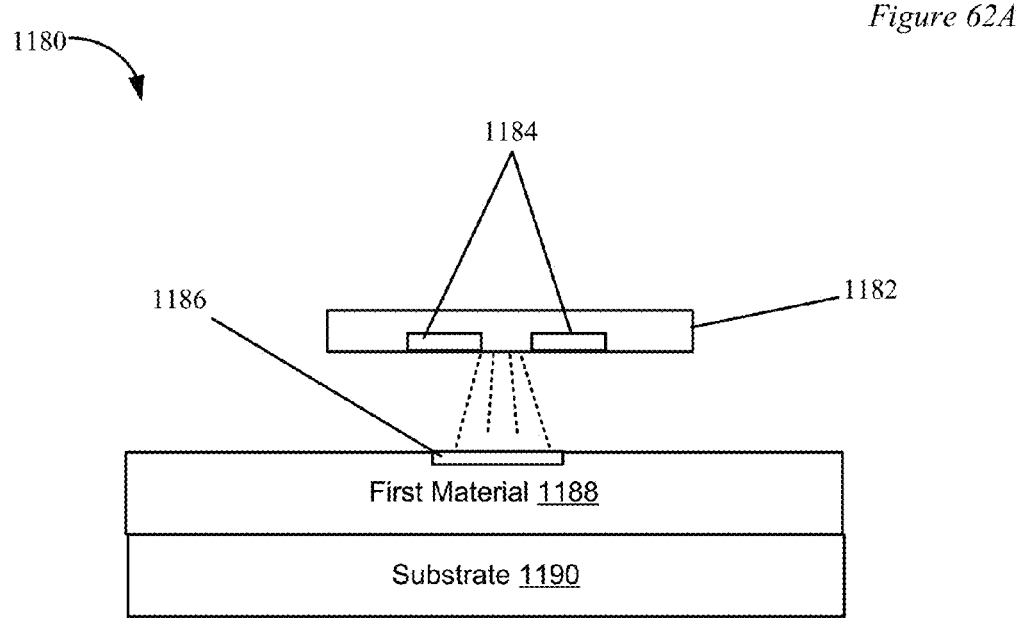

In various embodiments, the receiving material doesn't have to be flat. For example, in system 1180, as shown in FIG. 62B, the receiving material 1188 has a trench 1186 where the magnetic lifting device 1182 deposits material into the trench. The magnetic lifting device generates lift via its interaction with substrate 1190.

In one embodiment, the material which is deposited can have magnetic properties and the magnetic lifting device can include magnetic field generators, such as 1184 which are configured to interact with the material. The magnetic field generators can be controllable and can be integrated into or separate from the elements used to generate magnetic lift or propulsion. When separate, the magnetic field generators may be separately controllable.

Using the magnetic field generator, the material which is deposited can be manipulated in some manner. For instance, the magnetic field generators may be used to generate a force which pushes a deposited material into the trench as shown in FIG. 62B. In another example, the magnetic field generators can be used to alter of a direction of the material which is deposited while it is flight to control where it lands and/or the shape in which it lands.

In one embodiment, the deposited material can have ferromagnetic, diamagnetic or paramagnetic properties. For example, as described above, the deposited material can be an ink. The receiving medium 1188 can permeable or may be non-permeable to the deposited material. Thus, a magnetic field generator may be used to push a material along a surface or into a surface depending on its permeability to the deposited material. For example, the magnetic field generator can be used to push ink into paper or push a material along a surface until it is confined to a particular location.

The magnetic field generators 1184 can be located above the deposited material, i.e., because they are coupled to a hovering device 1182. However, the magnetic field generators can also be located below the deposited material, such a mounted below a desk. In this instance, the magnetic field generators can be used to manipulate the deposited material, such as pulling towards the surface and into cracks or other features or moving it along a surface. If the conductive substrate is ferromagnetic, an attractive force can be generated in the substrate when exposed to the magnets of the magnetic lifting device. The attractive force can pull a deposited material with magnetic properties towards and into a surface of the receiving medium. It may also pull the magnetic lifting device towards the surface of the receiving medium which is balanced by the repulsive forces due to eddy currents.

Other mechanisms can be provided which affect a receiving medium or a material deposited on the receiving medium. For example, a cutting mechanism, such as a sharpened blade, a laser cutter or torch cutter, may be provided on the magnetic lifting device which cuts the receiving medium and/or any deposited material. In another example, a cooling or heating mechanism can be provided which cools or cures the material placed on the receiving mechanism. For example, using inductive heating in the conductive substrate generated from the magnetic lifting device, it may be possible to cure a material or form a heat activated bond between two materials which are above the substrate.

The cutting capabilities can be used for other applications. For example, the magnetic lifting devices can be used to cut material used to make a large sail. In yet other example, the magnetic lifting devices may be used to cut metal on a ship, such as to dismantle a ship or repair a ship.

Magnet Configurations and Performance Comparisons

Figure 63:
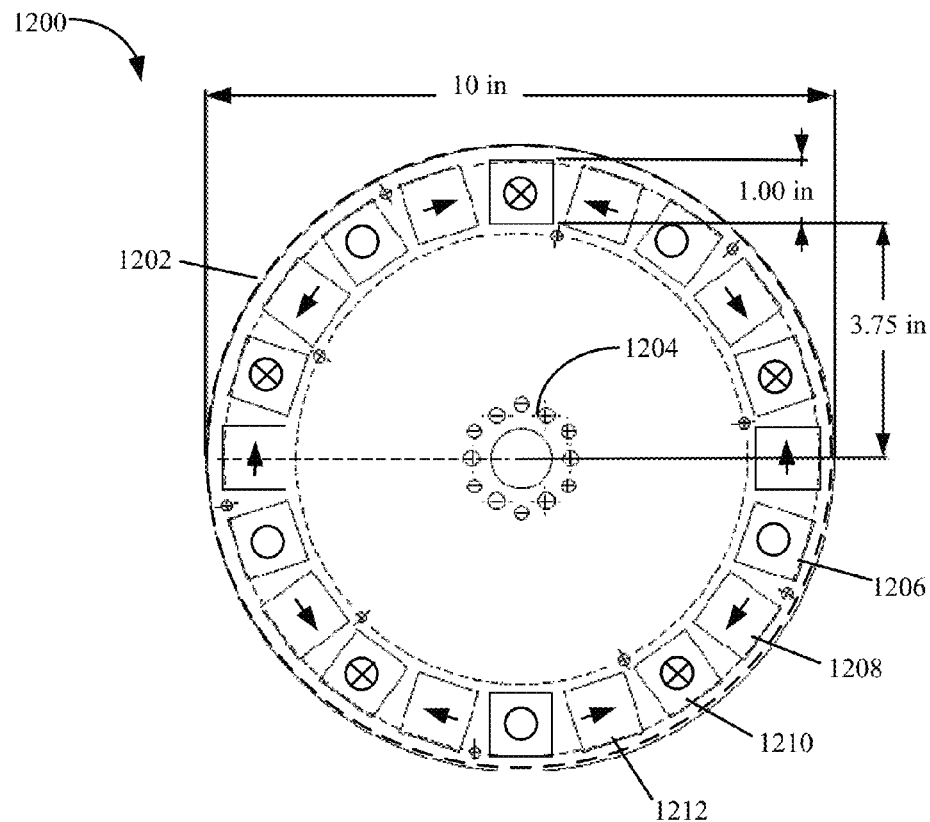
FIGS. 63 and 64 are top and perspective views of a STARM including cubic magnets arranged in a circular pattern in accordance with the described embodiments.

In this section, various magnet configurations which can be used in STARMs are described with respect to FIGS. 63-117. Prior to describing the magnet configurations some terminology is discussed. Typically, a permanent magnet is created by placing the magnet in an outside magnetic field. The direction of the outside magnetic field is at some orientation relative to the geometry of the permanent magnet which is being magnetized. The direction of the outside magnetic field relative to the geometry of the permanent magnet when it is magnetized determines the poles of the permanent magnet where the north and south poles describe the polarity directions of the magnet.

In the examples below, a STARM will have an axis of rotation. A first group of magnets can be referred to as "poles." Poles can have a polarity direction which is approximately parallel to the axis of rotation of the STARM. Although, in some embodiments, magnets can be secured in the STARM such that there is an angle between the polarity direction of the magnet and the axis of rotation of the STARM. In addition, as described above, mechanisms can be provided which allow an orientation of a permanent magnet to be dynamically changed on a STARM.

A second group of magnets can be referred to as "guides." The guides can be secured in a STARM such that the angle between the polarity direction of the guides and the axis of rotation is approximately ninety degrees. However, the angle between the guide magnets and the axis of rotation can also be offset by some amount from ninety degrees. When pole magnets are secured in a STARM with alternating polarity directions, the magnetic field lines emanating from the north pole of one pole magnet can bend around to enter into the south pole of an adjacent pole magnet and the magnetic field lines emanating from the south pole of one pole magnet can bend around to enter into the north pole of an adjacent magnet. Typically, the guide magnets can be placed between the poles. The "guide" magnets can guide the path of the magnetic fields that travel between the pole magnets.

The combination of pole magnets and guide magnets can be secured in a STARM to form a configuration of polarity regions. On a STARM, this configuration can be referred to a polarity arrangement pattern. In some of the examples below, a polarity arrangement pattern of the STARM can be formed from a first polarity arrangement pattern which is repeated. For example, the polarity arrangement pattern can be formed from a first polarity arrangement pattern which is repeated two, three, four, five times, etc. In other embodiments, the polarity arrangement pattern of a STARM can be formed from a first polarity arrangement pattern and a second polarity arrangement pattern where the first polarity arrangement pattern or the second polarity arrangement pattern is repeated one or more time.

A polarity region in a polarity arrangement pattern can have a common polarity direction. The polarity region can be formed from one or more magnets polarized in the common direction associated with the polarity region. In the examples which follow, single magnets, such as one inch cubic magnets, are described as forming a polarity region. However, multiple magnets of a smaller size can be used to form a polarity region. For example, a one inch cube polarity region can be formed from eight one half inch cubed magnets or sixteen one quarter inch cube magnets all arranged in the same direction. Thus, the examples below are provided for the purposes of illustration only and are not meant to be limiting.

An overall polarity arrangement pattern generated on a STARM using permanent magnets can form a magnetic field with a particular shape and density of magnetic field lines. The magnetic field is three dimensional in nature and can be quite complex. The strength of the field at different locations can depend on the volume distribution of magnets and their associated strength.

Magnetic fields are generated when current is moved through a wire. For example, current passing through a wire coil generates a magnetic field which approximates a bar magnet. A magnet constructed in this manner is often referred to as an "electromagnet." In various embodiments, the magnetic field shapes and density of magnetic field lines from an arrangement of permanent magnets can be approximated by using arrangements of wires and passing current through the wires. Thus, the example of permanent magnets is provided for the purposes of illustration only and is not meant to be limiting.

A STARM can have a top side and a bottom side. When eddy currents are generated, a bottom side can face the conductive substrate where eddy currents are induced by the rotation of the STARM. Often, when permanent magnets are used, the permanent magnets can have at least one flat surface. As examples, cubic shaped magnets have six flat surfaces, whereas, cylindrically shaped magnets have two flat surfaces which are joined by a curved surface. In some embodiments, the at least one flat surface on each of the permanent magnets on a STARM can be secured on a common plane. The common plane can reside close to the bottom side of the STARM.

In alternate embodiments, a STARM can be curved or angled. For example, the STARM can be convex or concaved shape and/or include other curved portions. The bottom of magnets of the STARM can be arranged to follow the bottom surface of the STARM including curved surfaces. The magnets can have flat bottoms, such as cubic magnets. However, in other embodiments, the magnets can be formed in curved shapes to help confirm to the curvature of the STARM.

As an example, a hover engine can be configured to operate within a pipe or a trough where the inner surface of the pipe includes a conductive substrate. The STARM of the hover engine can be bowl shaped and bottom of the magnets on the STARM can be arranged to follow outer surface of the bowl shape. When a STARM is placed next to a curved surface, a larger proportion of the magnets on the STARM can be closer to the inner surface of the pipe as compared to if the magnets were arranged in a common plane, such along the bottom of a flat disk.

Next, some magnet and STARM configurations are described. FIG. 63 shows a STARM 1200. The STARM 1200 has a ten inch outer diameter. Twenty one inch cube magnets are arranged around the circumference of a circle. In particular, one inner radial side of each of the twenty one inch cube magnets is approximately tangent to a 3.75 inch radius circle.

The inner radial distance provides a small gap between each magnet. The gap between magnets increases as the radial distance increases. A minimum inner radial distance allows the magnets to approximately touch one another. The inner radial distance can be increased, which for the same amount of magnets increases the minimum gap between the magnets.

A structure of about 0.25 inches thick is provided between the outer radial edge of the magnets and the outer diameter 1202 of the STARM. In one embodiment, the center of the STARM can include a number of mounting points, such as 1204. The mounting points can be used to secure the STARM 1200 to a rotatable member, such as a rotatable member extending from a motor.

The polarity arrangement pattern of the STARM includes ten pole magnets and ten guide magnets. The polarity arrangement pattern is formed from a first polarity arrangement pattern as exemplified by magnets 1206, 1208, 1210 and 1212. In this example, the first polarity arrangement pattern is repeated four times. In other embodiments, the first polarity arrangement pattern can be used once on a STARM or can be repeated two, three four times, etc. Further, more than one ring of magnets can be provided, which utilize the first polarity pattern. For example, the first polarity pattern can be repeated twice in an inner ring and then four times in an outer ring as shown in FIG. 63.

In the example above, the volume of each pole and guide magnet is the same. In other embodiments, the volume of the pole magnets and the guide magnets can vary from magnet to magnet while still maintaining the overall polarity arrangement pattern. For example, the volume of the pole magnets can be half the volume of the guide magnets. In another example, the volume of the pole magnets can be double the volume of the guide magnets.

The shape of pole and guide magnets is cubic with a one cubic inch volume for each magnet. In other embodiments, the volume of each polarity region can be maintained but a different shape can be used. In yet other embodiments, the polarity arrangement pattern can be maintained but different volume size can be used for each polarity region. For example, a single cubic magnet, with a 0.125 inch, 0.25 inch, 0.5 inch, 0.75 inch, 1 inch, 2 inch, 3 inch, 4 inch, 5 inch or more side can be used to provide each polarity region.

When twenty smaller cubic magnets are used, it is possible to arrange them around a smaller radius circle. When twenty larger cubic magnets are used, a larger radius circle is required. When the first polarity arrangement pattern is repeated more times and the magnet size is the same as in FIG. 63, a larger radius STARM is required. When the first polarity arrangement pattern is repeated less times and the magnet size is the same, a smaller radius STARM can be used. However, the magnets can also be arranged around the same radius but with a larger gap between magnets.

In FIG. 63, the pole and guide magnets which form the polarity arrangement pattern are arranged around a circle. In other embodiments, the magnets can be arranged around other shapes, such as a square or an oval. Some examples of using the first polarity arrangement pattern but arranging the magnets around a different shape are described with respect to the Figures which follow.

In the FIG. 63, the bottoms of the twenty magnets are arranged in a plane which is near the bottom of the STARM 1200. The area of the bottom of the magnets is approximately twenty cubic inches and the volume of the magnets is approximately twenty cubic inches. In various embodiments, the area of the bottom the magnets closest to the bottom of STARM 1200 divided by the Volume$^{2/3}$ is greater than or equal to one, i.e., Area/Volume$^{2/3} \geq 1$.

For STARM 1200, the Area/Volume$^{2/3}$ equals about 2.71. In other embodiments, this ratio can be greater than or equal to two. In yet other embodiments, the ratio can be greater or equal to three. In further embodiments, this ratio can be greater than or equal to four. In yet other embodiments, this ratio can be greater than or equal to five.

Figure 64:
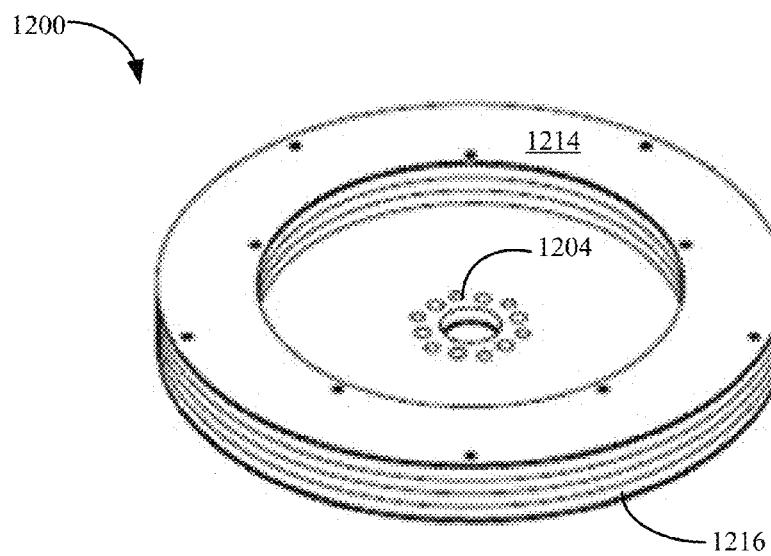

In FIG. 64, STARM 1200 is shown secured in an enclosure with top piece 1214 and a bottom piece 1216. The enclosure is formed from a number of the layers. In this example, layers of aluminum and polycarbonate plastic are used where layers 1214 and 1216 are formed from aluminum. Other materials are possible and these are provided for the purposes of illustration only.

In one embodiment, the center region of the STARM 1200 can provide a large enough space such that a motor can fit in this region. In other embodiments, a motor can be mounted above the top side 1214, such that a top side of the magnets is beneath the motor. In yet other embodiments, a motor can be mounted to the side of the STARM 1200 and a transmission mechanism can be provided, such as a mechanism including belts and gears, to transfer a torque used to turn STARM 1200. If the STARM 1200 is bowl shaped, then the motor might fit partially or entirely below a top lip of the bowl.

In FIG. 64, a model was built and tested experimentally. In addition, the results were simulated using Ansys Maxwell. A comparison of the experimental and numerical results is shown in FIG. 83. A number of other designs were also simulated. These designs are described with respect to FIG. 65-76. In addition, numerical results are compared to one another in FIGS. 85 and 86. Finally, the numerical results predict eddy current patterns which are induced from the rotating the STARM. Some examples of these eddy current patterns for a number of different designs are illustrated in FIGS. 77 to 82.

Figure 65:
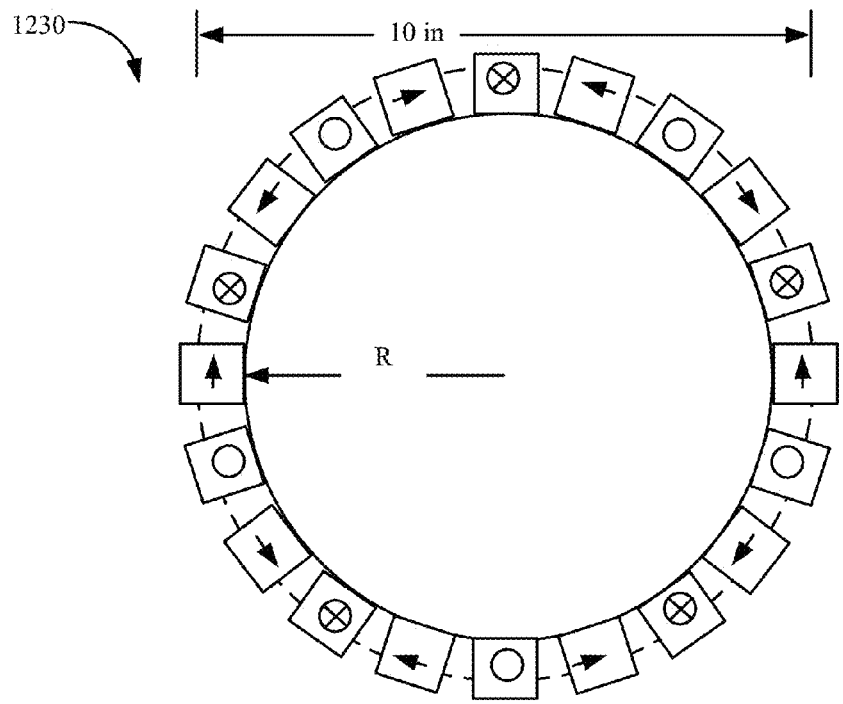
FIGS. 65 and 66 are top views of magnet configurations and polarity alignment patterns of magnets arranged in a circular pattern in accordance with the described embodiments.
Figure 86:
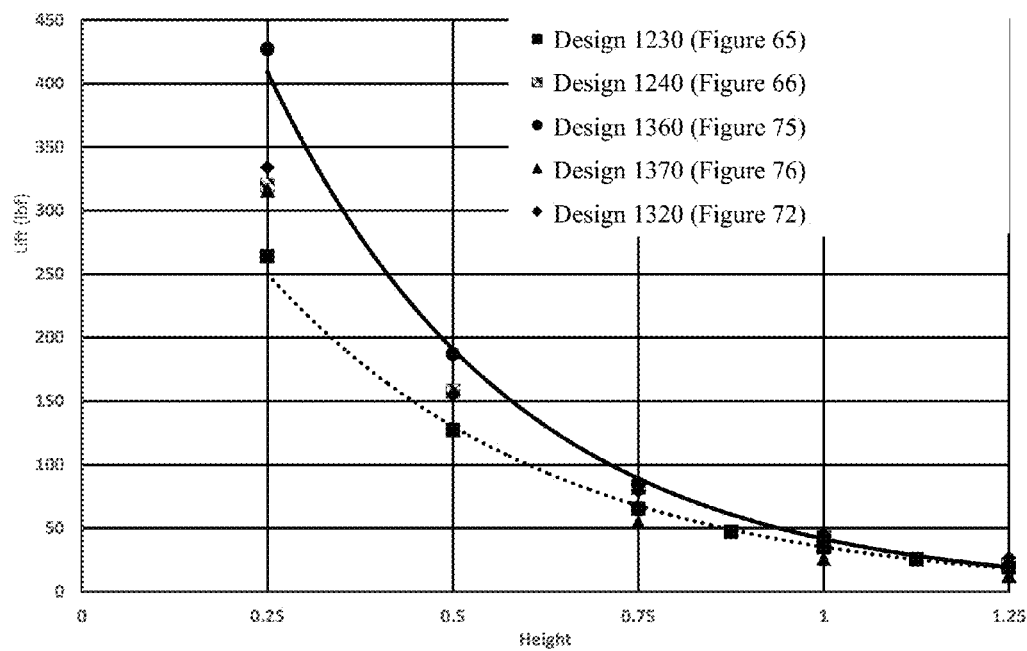

In FIG. 65, a variation 1230 of the design 1200 in FIG. 63. In 1230, the number of magnets is twenty and the magnet volume is twenty cubic inches. The number of magnets is arranged around a larger circle as compared to design 1200. In particular, the radius of the circle is 4.25 inches instead of 3.75 inches. The increased circle radius results in a larger spacing between adjacent magnets. In one embodiment, design 1230 is configured in a STARM with an outer diameter of eleven inches. A numerical prediction of lift for this design is shown in FIG. 86.

Figure 66:
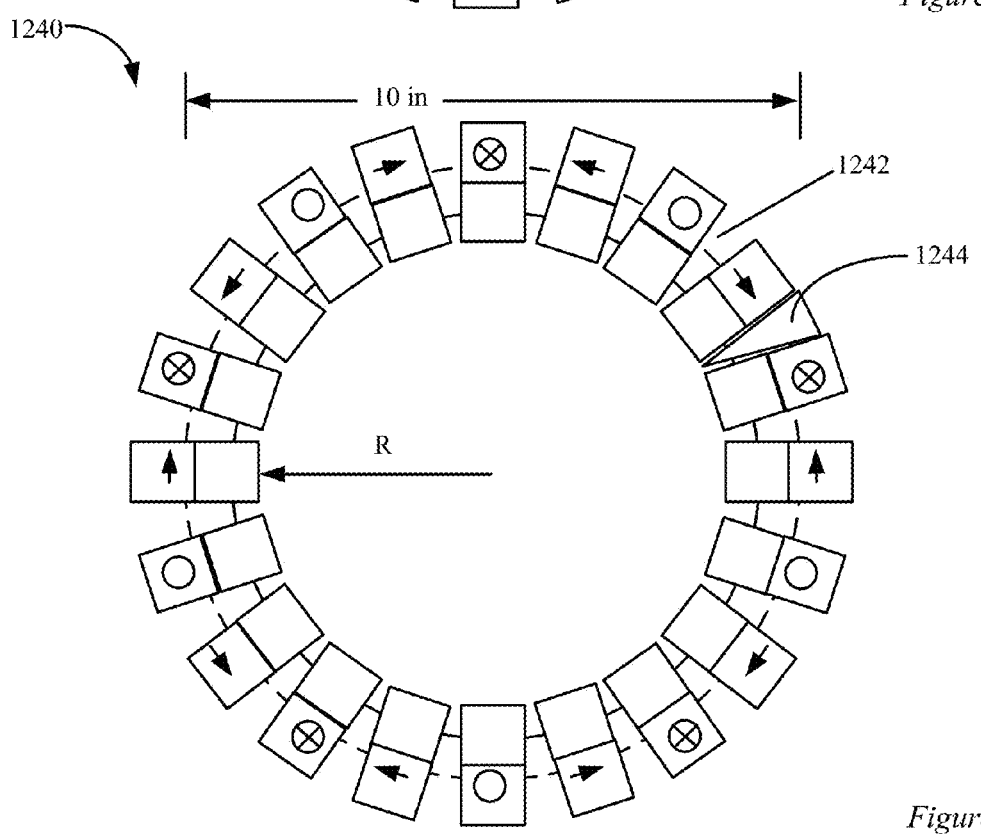

A second variation 1240 of design 1200 is shown in FIG. 66. In 1240, the number of magnets is twenty and the magnet volume is twenty cubic inches. However, magnets with half the height are used. The magnets are two inches by 1 inch by ½ inch (L×W×H). The magnets are arranged with the same starting position as shown in FIG. 63. However, each of the magnets extend radially outward an extra inch. To accommodate the additional radial length of the magnets, the radial distance of a STARM can be increased. A numerical prediction of lift for this design is shown in FIG. 86.

The bottom area of the magnets is forty cubic inches. The area divided by the total volume$^{2/3}$ is about 5.43. In alternate embodiments, while maintaining a constant volume, this ratio can be increased by lowering the height of the magnets and extending their radially length. For example, in FIG. 66, the height of the magnets can be lowered to ⅓ inches and the length can be extended to three inches radially. For this design, the bottom area of the magnets is sixty square inches and the area divided by total volume$^{2/3}$ is about 8.14.

In 1240, a gap 1242 is shown between each magnet. In one embodiment, a magnet, such as triangle shaped magnet 1244 can be inserted in the gap. In one embodiment, the polarity of the gap magnet can be selected to match the polarity of the adjacent guide magnet or pole magnet. For example, the polarity of the adjacent guide magnet can be selected for all of the gap magnets or the polarity of the adjacent pole magnet can be selected for all the gap magnets. In another embodiment, two triangular shaped magnets can be placed in the gaps where one of the magnets' polarities matches the adjacent pole magnet and the other matches the adjacent guide magnet. In yet another embodiment, the twenty magnets can be custom shaped such that the magnets fit together with minimal gaps.

Figure 67:
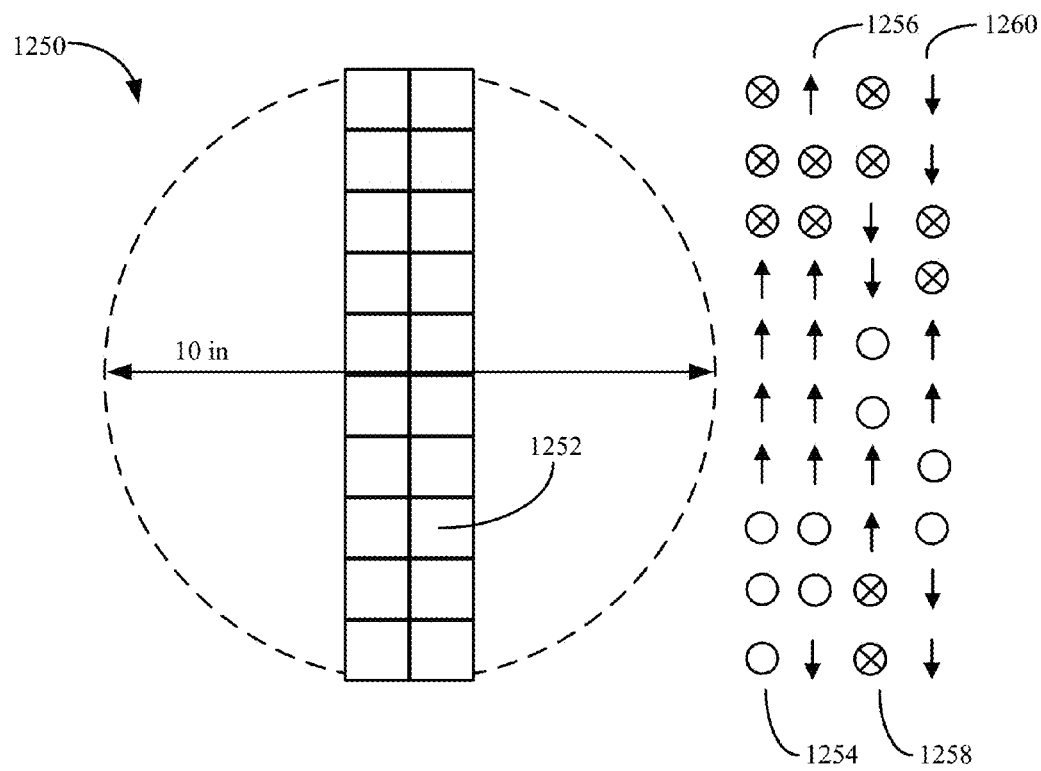
FIGS. 67 to 71 are top views of magnet configurations and associated polarity alignment patterns which include magnets that span across the axis of rotation of a STARM in accordance with the described embodiments.

In FIG. 67, a different magnet arrangement 1250 with a number of different polarity arrangement patterns is shown. In 1250, twenty, one cubic inch magnets, such as 1252, are provided which span an axis of rotation of a STARM. The twenty magnets are arranged in a two by ten array. The magnets are arranged to induce two large eddy currents. The two induced eddy currents generally extend inwards towards the axis of rotation which is in the center of the circle.

Four different polarity arrangement patterns, 1254, 1256, 1258 and 1260, that produce the two eddy current pattern are shown. For the conditions simulated, pattern 1254 generated the most lift. However, significant lift is predicted for the other patterns. Pattern 1258 was predicted to generate the least amount of lift.

In one embodiment, a ferrite top was added to the design and simulated. In general, a material with a high magnetic permeability can be utilized. Some examples of these materials have been previously described. The numerical simulations predicted an increase in lift when a ferrite top is added to design 1250.

Figure 78:
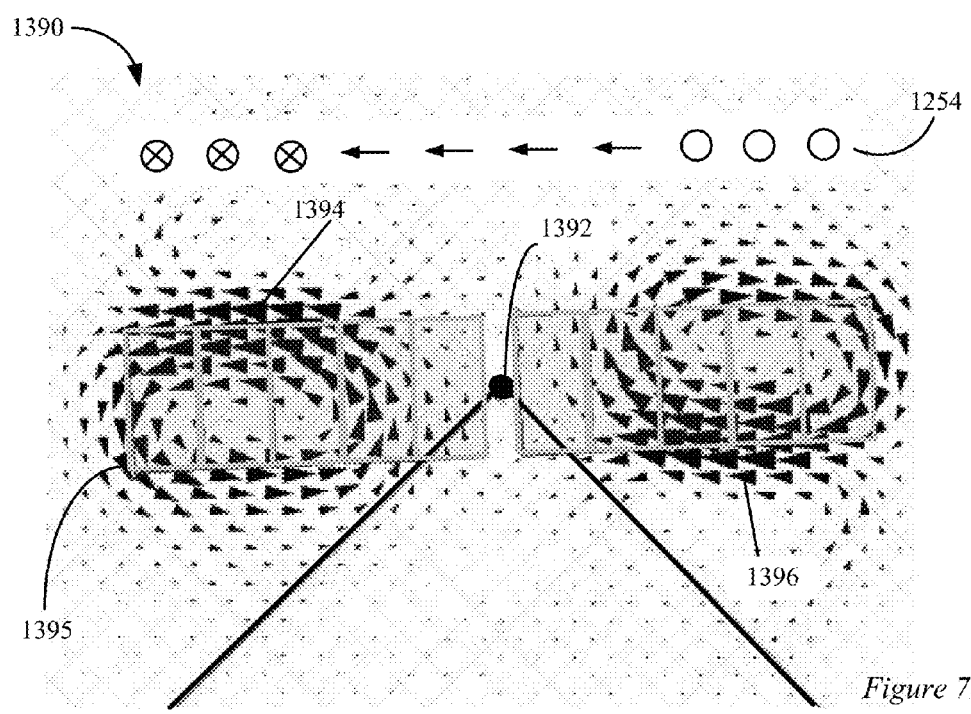
FIG. 78 illustrates predicted eddy current patterns for a magnet configuration including magnets arranged in linear arrays which extend across an axis of rotation of a STARM.
Figure 85:
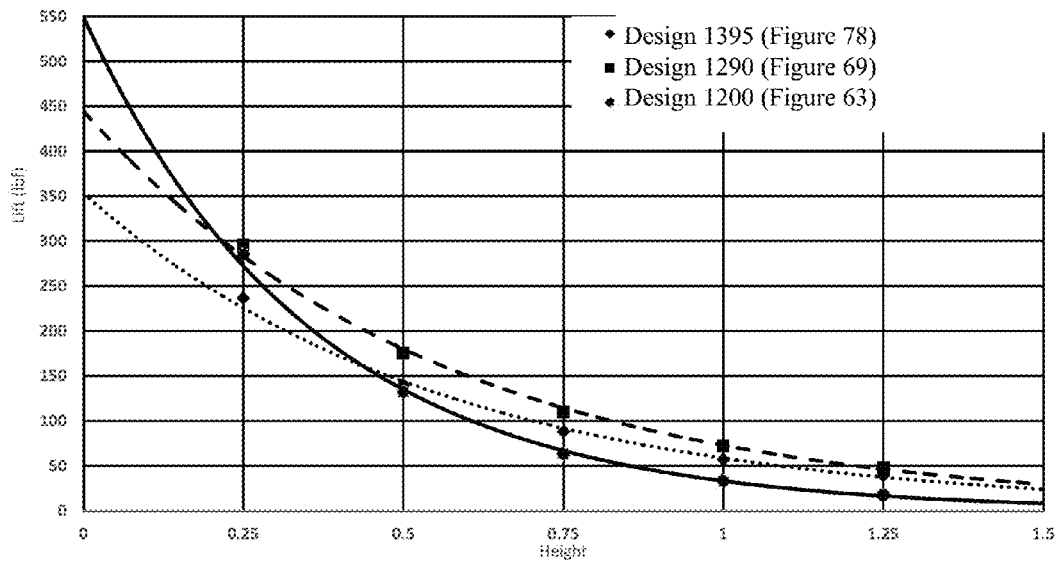
FIGS. 85, 86 and 87 are plots of numerical predictions of lift versus height for eight different magnet configurations.

In another embodiment, a space can be introduced above the axis of rotation. This space can allow for an attachment of a rotational member to the STARM. Eddy currents patterns which are predicted for this design (with the spacing at the center) are shown in FIG. 78 and a prediction of lift for this design is shown in FIG. 85. The predicted eddy current patterns in FIG. 78 are similar to the eddy current patterns for design 1250.

In the example above, one cubic inch magnets don't have to be employed. For example, three magnets can be used to form polarity arrangement pattern 1254 where first and second magnets at the ends are three inches by two inches by one inch and a third magnet in the center is four inches by two inches by one inch. When fewer magnets are used, the assembly process may be simplified.

In FIG. 67, a total volume of guide magnets to pole magnets varies from two thirds (patterns 1254 and 1258) to 1.5 (patterns 1256 and 1262). The ratio of the volume of guide magnets to pole magnets can be varied outside of this range to optimize the lift generated for a particular volume of magnets and polarity arrangement pattern. In this example, the area of the bottom of the magnets is twenty inches and the volume is twenty inches. Like the design previously described with respect to FIG. 66, the area of the bottom of the magnets can be increased while the volume is held constant by reducing the height of the magnets and spreading them out over a larger area.

Figure 68:
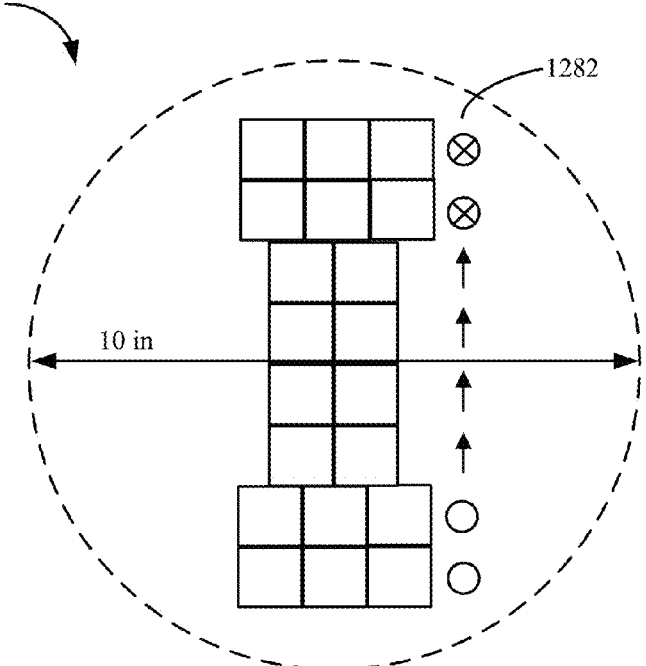

An alternate 1280 to design 1250 is shown in FIG. 68. The magnet volume is held constant between the designs. Further, the guide magnet to pole magnet ration is the same as polarity arrangement pattern 1254, i.e., forty percent. However, the distance the design extends from the axis of rotation in the center of the circle is reduced.

In design 1280, the magnets extend about four inches from the axis of rotation as compared to the design 1250 in FIG. 67. Further, the number of magnets per row is no longer constant. A reduction in the maximum distance the magnets extend from the centerline may allow the design to be formed on a smaller radius STARM. The numerical simulations predicted a similar amount of lift for designs 1250 and 1280.

Figure 69:
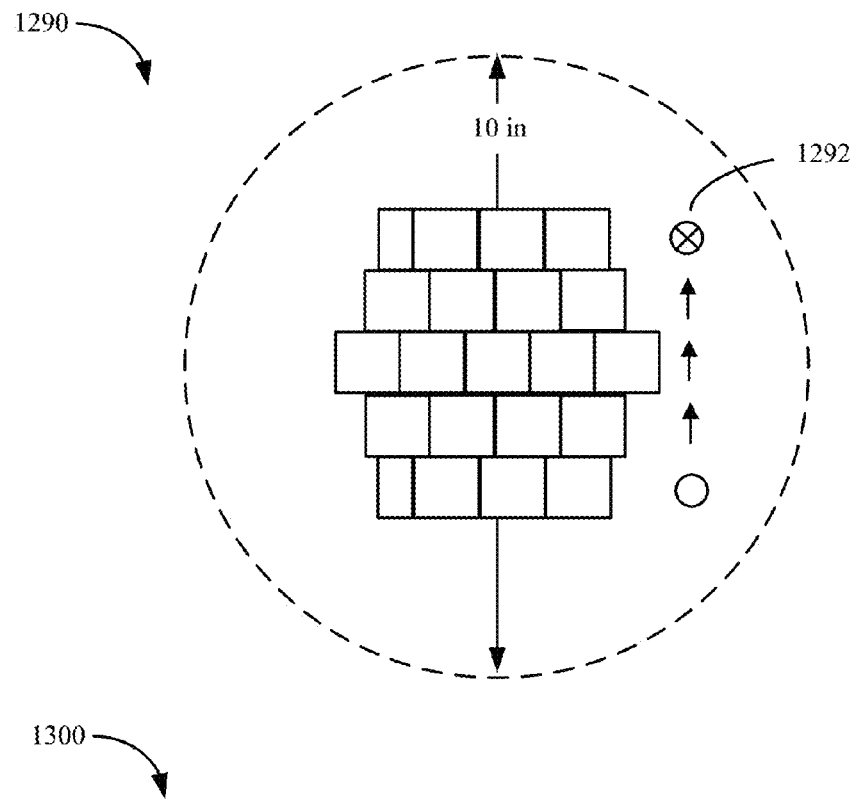

Yet another alternate to designs 1250 and 1280 is shown in FIG. 69, the number of rows is reduced to five. Five rows enable the magnets to fit in approximately a three inch radius circle. A circle with a twenty inch area has a radius of 2.52 inches, which is the smallest radius which can be used. Thus, design 1290 is approaching this limit while employing rectangular shaped magnets.

Figure 79:
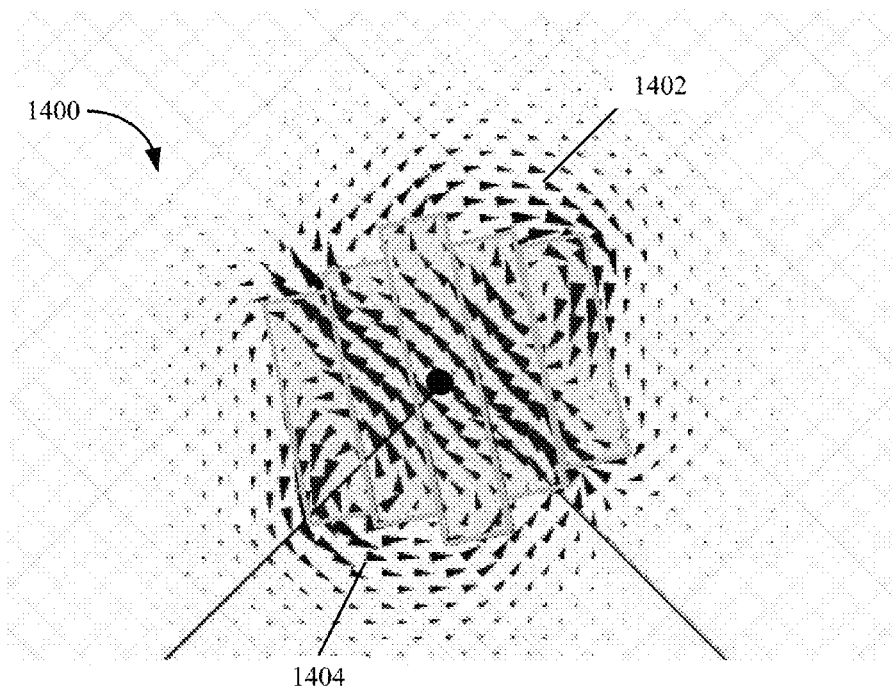
FIG. 79 illustrates predicted eddy current patterns for the magnet configuration shown in FIG. 69.

The polarity arrangement pattern 1292 is used for design 1290. Two poles and a single guide magnet polarity are used. The ratio of guide magnet volume to pole magnet volume is 1.86. A prediction of the eddy current patterns for design 1290 is shown in FIG. 79 and a prediction of the lift is shown in FIG. 86.

Figure 70:
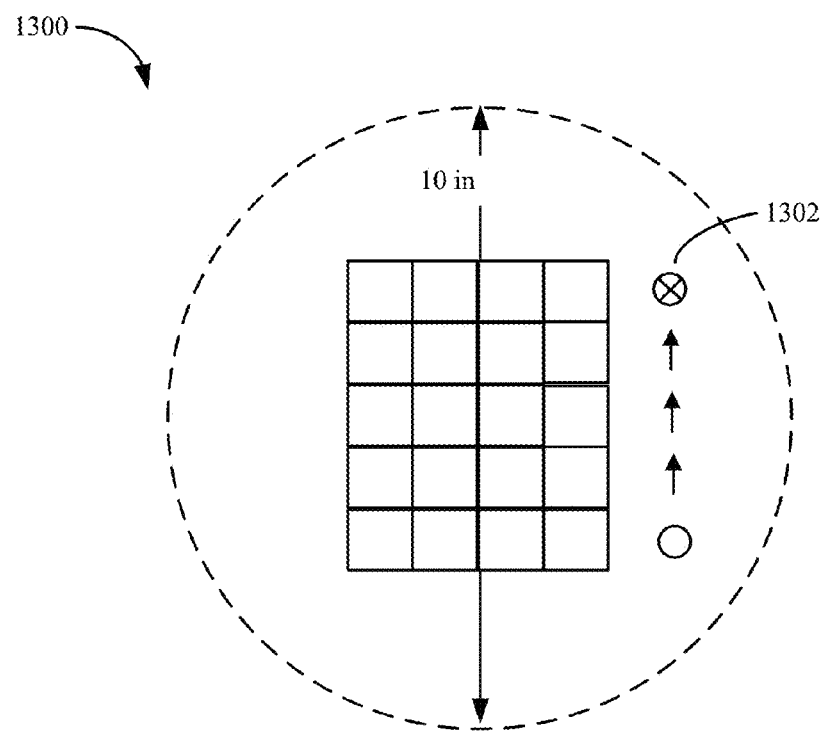
Figure 71:
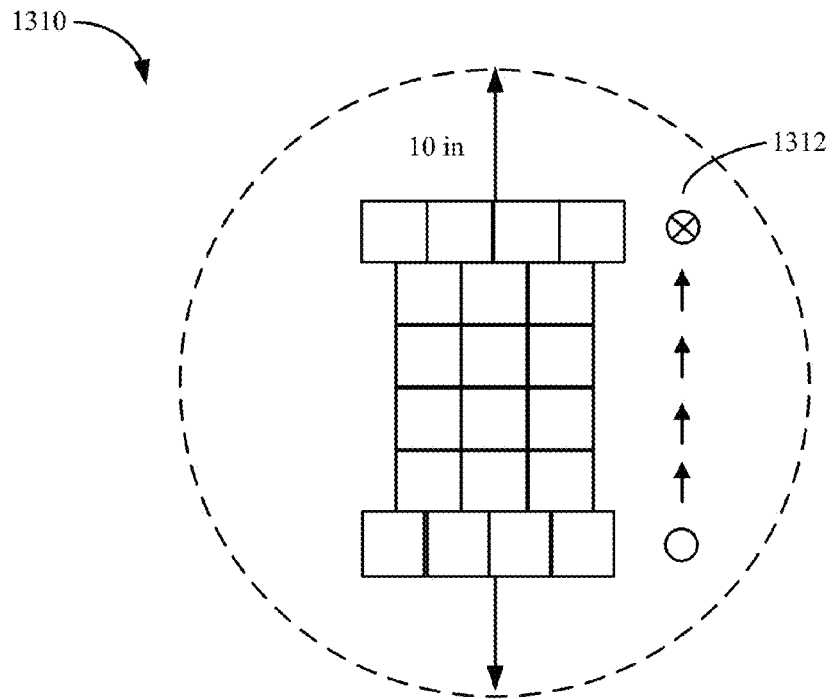

Yet another alternate 1300 to designs 1250, 1280 and 1290 is shown in FIG. 70. In design 1300, a five inch by four inch array of magnets is used. The polarity arrangement pattern 1302 is employed. The ratio of the guide magnet volume to the lift magnet volume is about 1.5. The lift and eddy current patterns predicted for design 1300 are similar to design 1290.

In FIGS. 69 and 70, in one embodiment, a small space in the magnet configurations can be provided near the axis of rotation to allow a rotation member to extend through the space and attach to the structure of the STARM. In another embodiment, a structure can be provided which extends over the top and sides of the magnets and a rotational member can be secured to this structure.

In FIG. 70, three rows of guide magnets and two rows of pole magnets are used. In design 1310 in FIG. 71, four rows of guide magnets are used and two rows of pole magnets are used. The volume of the magnets in the pole magnet rows is different than the volume of magnets in the guide magnet rows (four cubic inches as compared to three cubic inches). The addition of the extra row of magnets didn't significantly affect lift predictions for design 1310 as compared to design 1300 shown in FIG. 70.

Figure 72:
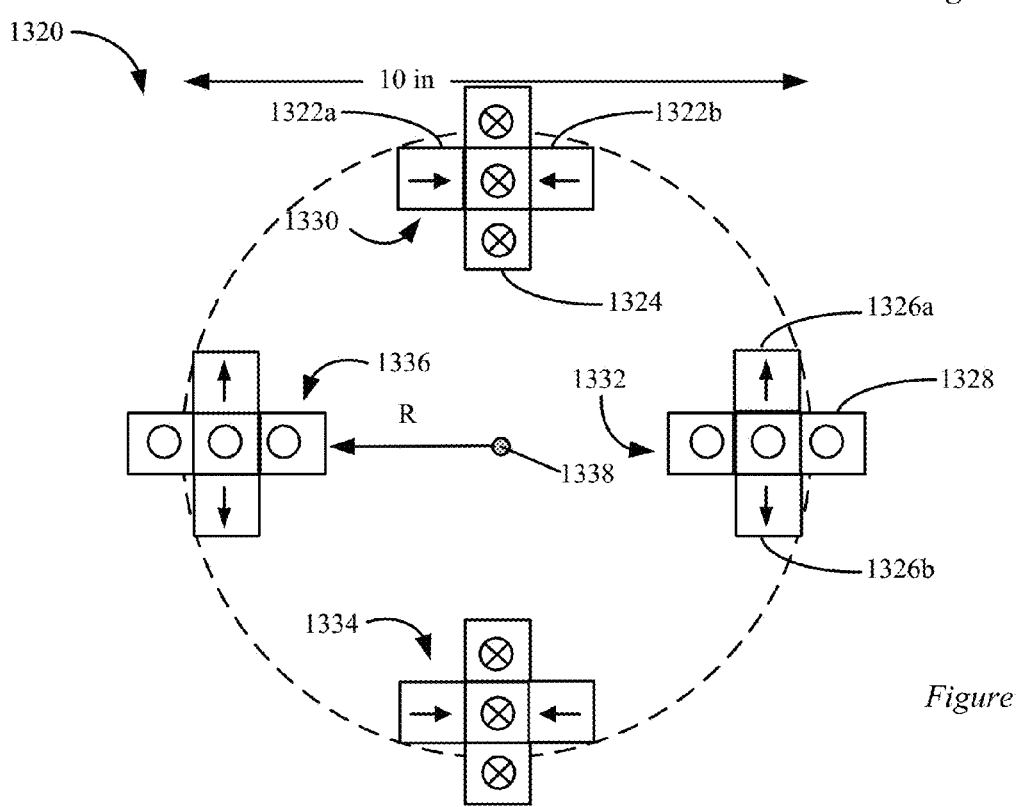
FIGS. 72 to 74 are top views of magnet configurations and associated polarity alignment patterns which include magnets arranged in cluster in accordance with the described embodiments.

Another magnet configuration 1320 is shown in FIG. 72. Again, twenty one inch cube magnets are shown. The magnets are arranged in four clusters, 1330, 1332, 1334 and 1336, each with five cubic inches of magnets. Each cluster includes pole and guide magnets.

As an example, cluster 1330 includes a pole section 1324 with three cubic inch magnets. The magnets in the pole section are arranged in along a radial line. The pole section 1324 is orientated to point into the page. Two guide magnets 1322a and 1322b point towards the center of the pole. The ratio of the guide magnet volume to pole magnet volume is 2/3.

Cluster 1332 includes pole section 1328. The pole section includes three one inch cube magnets aligned along a radial line from the axis of rotation 1338. The polarity of the magnets in the pole section 1328 is out of the page, i.e., the open circles represent a north poles and the circles with "X" inside represent a south pole. Two guide magnets 1326a and 1326b are provided. The polarity of the guide magnets is away from the pole section 1328.

The clusters 1330 and 1332 provide a polarity arrangement pattern. This pattern is repeated with clusters 1334 and 1336. In various embodiments, a STARM can be formed with only clusters 1330 and 1332 or the polarity arrangement pattern can be repeated once, twice, three, four times, etc. A prediction of the eddy currents for design 1320 are presented in FIG. 80 and prediction of lift for the design are presented in FIG. 86.

In various embodiments, the ratio of the guide magnet volume to pole magnet volume can be varied. Further, each individual cluster can be rotated by some angle. For example, the pole section can be aligned perpendicularly to a radial line from the axis of rotation 1338. In addition, the volume of magnets in each cluster can be varied. Also, the radial distance of the magnets from the center axis of rotation 1338 can be varied.

Yet further, the shape of the pole sections, such as 1324 and 1328, can be varied. For example, the pole sections 1324 and 1328 can be formed as a single cylindrically shaped magnet with a volume of three cubic inches, such as a one inch high cylinder with a radius of about a 0.98 inches or a ½ inch high cylinder with about a 1.38 inch radius. In the example of design 1320, the guide magnets in each cluster are arranged along a line. In other embodiments, the guide magnets don't have to be arranged along a line. The shape of the guide magnets can also be varied.

Figure 73:
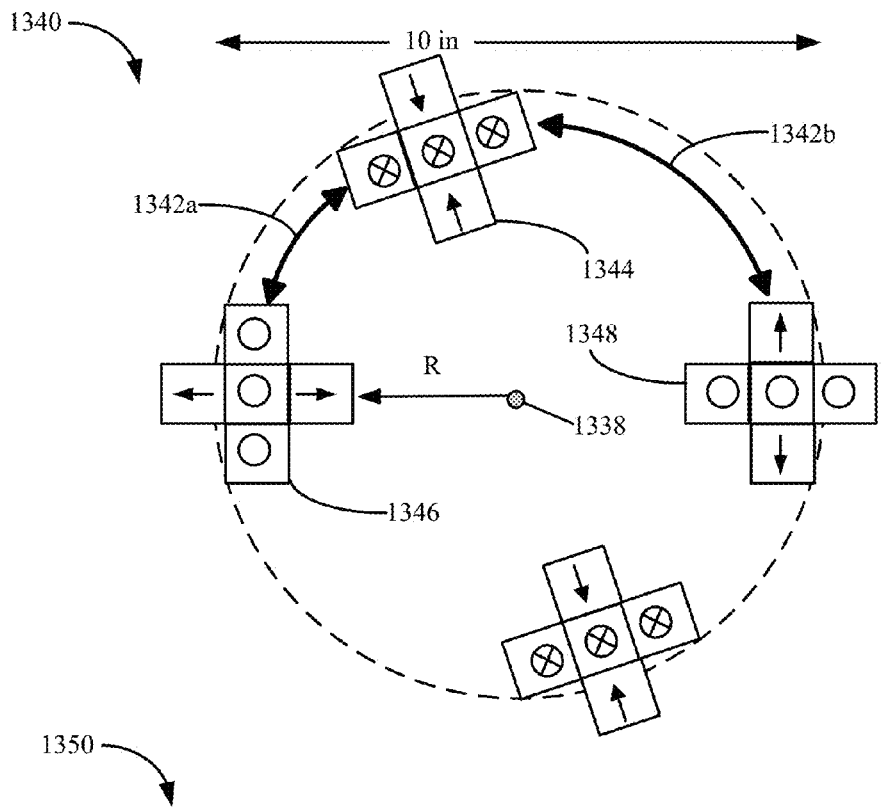

A variation 1340 of design 1320 is shown in FIG. 73. In 1340, the clusters, such as 1344 and 1346, are rotated ninety degrees as compared to design 1320 such that the pole sections in each cluster are arranged perpendicularly to a radially line from the axis of rotation 1338. In addition, the distances between clusters, such as the distance 1342a between clusters 1344 and 1346 or the distance 1342b, can be varied.

In design 1320 in FIG. 72, the distances were equal. In this example, distance 1342a is less than distance 1342b. Simulations indicated that bringing adjacent clusters together can result in an interaction between the eddy currents produced by the clusters. For the conditions simulated, this interaction produced an increase in overall lift as compared to when the clusters were equally spaced as shown in FIG. 72. The interactions are non-linear. Thus, this result may not hold for all conditions.

Figure 74:
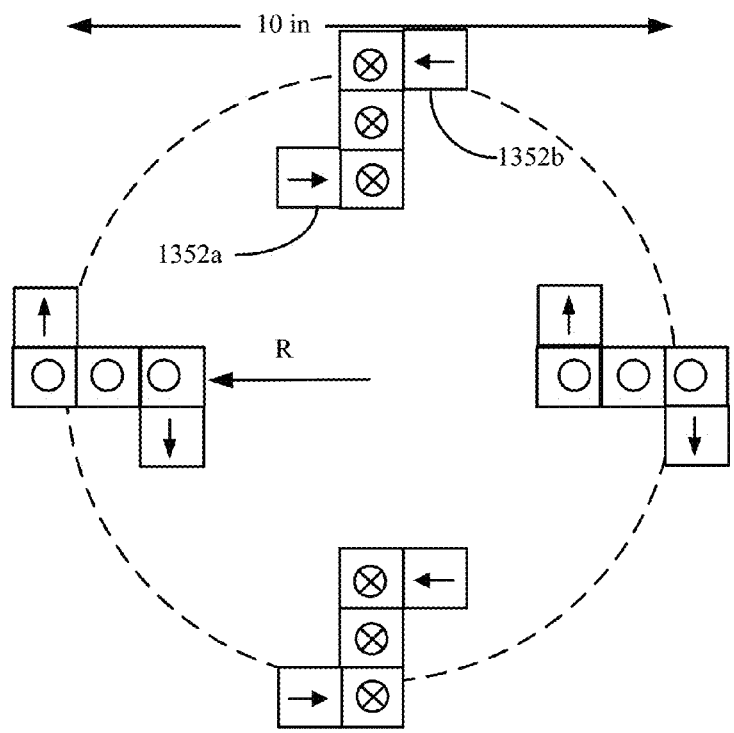

Another variation 1350 of design 1320 is shown in FIG. 74. In design 1350, like design 1320, the pole sections are arranged along a radial line from the axis of rotation. However, the guide magnets are no longer arranged along a single line. In particular, the guide magnets 1352a and 1352b are arranged at the ends of the pole sections. Simulations predicted that this polarity arrangement pattern provide about the same amount of lift as design 1320.

Figure 75:
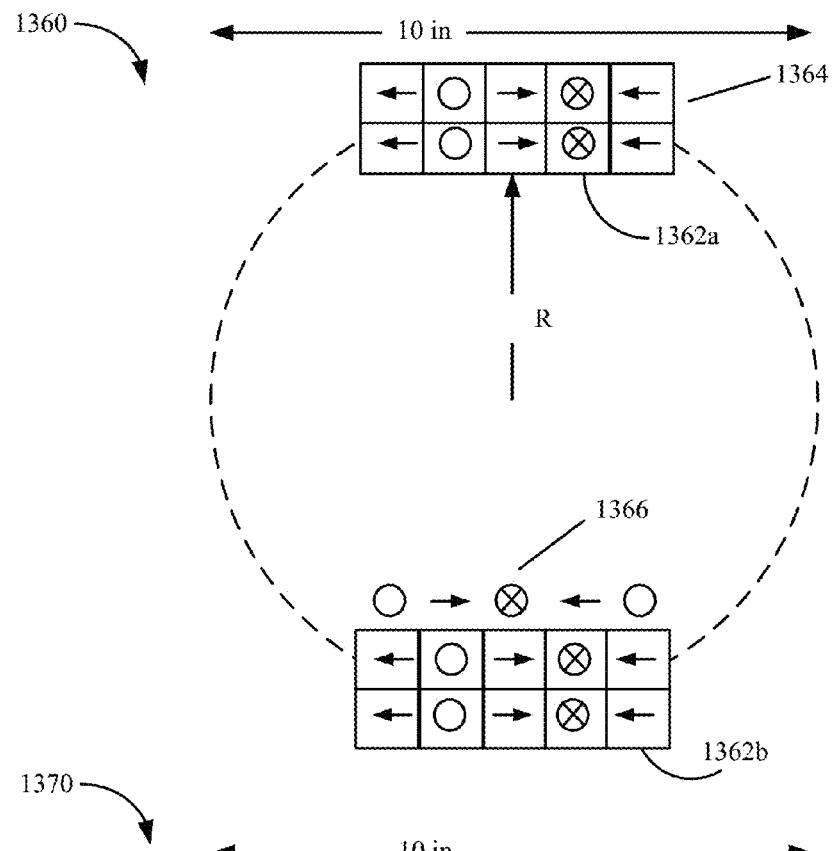
FIGS. 75 and 76 are top views of magnet configurations and associated polarity alignment patterns which include magnets arranged in linear arrays in accordance with the described embodiments.

Yet another magnet configuration is described with respect to FIGS. 74 and 75. In this configuration, the magnets are clustered and arranged in a line where the amount of clusters can be varied. The designs 1360 and 1370 in FIGS. 75 and 76 each include twenty cubic inches of magnets. In design 1360, the magnet volume is divided into two rectangular clusters of ten cubic inches each, 1362a and 1362b. In design 1370, the magnet volume is divided into four clusters, 1372a, 1372b, 1372c and 1372d, each with five cubic inches of magnets in each cluster.

A single cluster of twenty cubic inches of magnets can be provided. This design might be incorporated on a STARM with a single arm or a circular STARM with a counter weight to balance the weight of the magnets. In general, one, two, three, four or more clusters can be distributed over a STARM.

Two polarity arrangement patterns 1364 and 1366 are shown. These arrangements can be repeated on each cluster. Pattern 1364 includes two pole regions. Pattern 1366 includes three pole regions. In pattern 1364, the ratio of guide magnet volume to pole magnet volume is 1.5. In pattern 1366, the ratio of guide magnet volume to pole magnet volume is about 2/3. The ratio of the bottom area of the magnets (20 square inches) relative to the Volume$^{2/3}$ of the magnets is about 2.71. Again, like the other designs, this ratio can be varied.

In various embodiments, the ratio of guide magnet volume to pole magnet volume can be varied for patterns 1364 and 1366. In addition, the radial distance from the center axis of rotation can be varied. The radial distance affects the moment of inertia. Further, the relative velocity of the magnets relative to the substrate varies with RPM of the STARM and the radial distance. Thus, the radial distance can be selected to obtain a desired relative velocity which is compatible with the RPM output capabilities of the motor and is compatible with packaging constraints.

Figure 76:
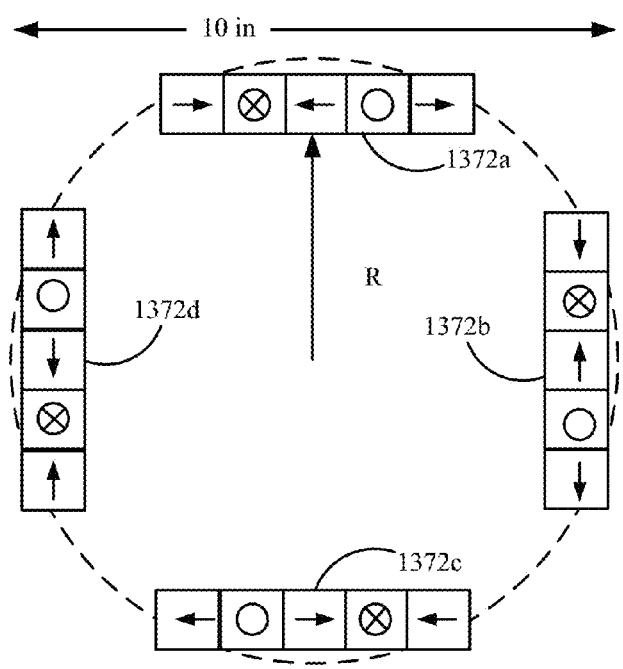

In FIGS. 75 and 76, the magnets in each cluster are arranged in rectangles and are configured to touch one another. In various embodiments, the aspect ratio of the length relative to the width of the rectangular clusters can be varied as is shown in FIGS. 75 and 76. Further, spacing can be provided between the magnets in a polarity region or between different polarity region in the polarity arrangement patterns 1364 and 1366. The spacing might be used to allow structure which secures the magnets. Further, the magnets don't have to be arranged to form a rectangle. For example, the magnets can be arranged in arc by shifting the magnets relative to one another while allowing a portion of each adjacent magnet to touch. In general, many different types of cluster shapes can be used an example of a rectangle is provided for the purposes of illustration only.

Next some eddy current patterns for some of the different magnet configurations are illustrated in FIGS. 77 to 82. In the Figures, the arrows indicate a direction of current on the surface of a conductive substrate. The relative magnitude of the current is indicated by a size of the arrows. The eddy current patterns were generated using a finite element analysis to solve Maxwell's equations. The materials and their physical properties are modeled in the simulation.

The simulations were performed using Ansys Maxwell. The simulations used a ½ inch copper plate. The distance from the surface was 0.25 inches. The eddy current patterns remained similar when height was varied. However, the strength of the eddy currents increased as the height above the surface decreased. Peak currents observed for the simulations varied between about three to eight thousand amps per cm$^2$ at a 0.25 in height above the surface. The current decreased with depth into the copper.

The RPM value used for the simulations was 3080 RPM except for results shown in FIG. 79. In FIG. 79, a value of 6000 RPM was used. The reasons for using a different RPM value are discussed in more detail with respect to FIGS. 85 and 86.

Figure 77:
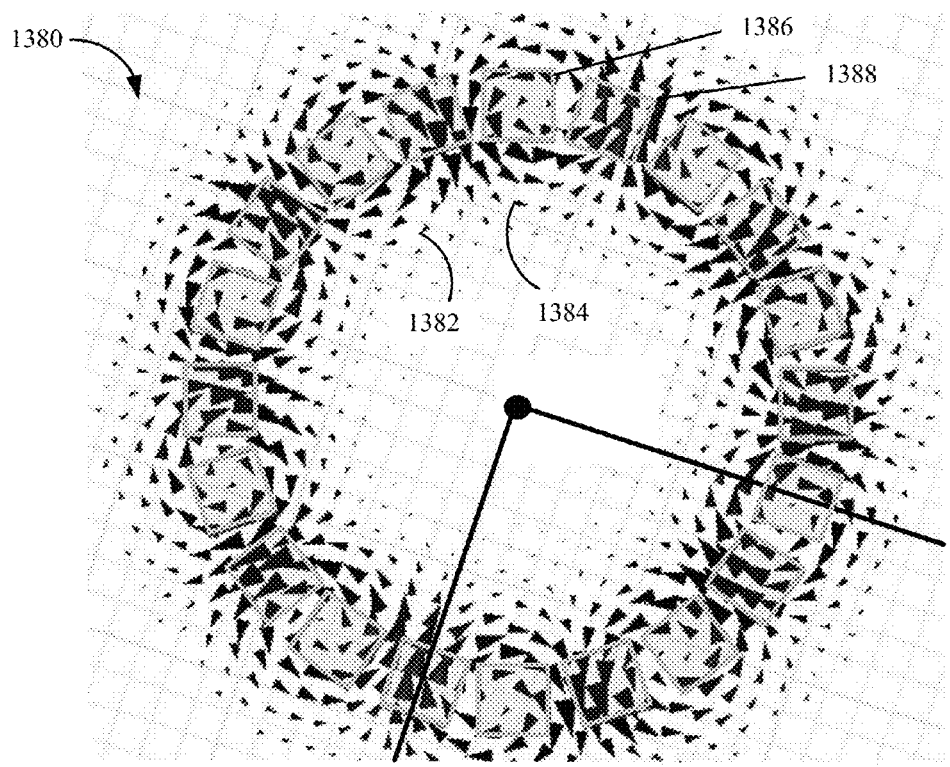
FIG. 77 illustrates predicted eddy current patterns for the magnet configuration shown in FIG. 63.

In FIG. 77, the magnet configuration and polarity arrangement pattern described with respect to FIG. 63 is employed. The polarity arrangement pattern includes ten poles and ten guide magnets. Ten eddy currents, such as 1382 and 1384, are generated to form eddy current pattern 1380.

An eddy currents each form around a pole and guide magnet pair, such as 1386 (pole) and 1388 (guide). The eddy currents spin in alternating directions. The current strength varies around the circumference of the eddy current where the strongest currents occur where the eddy currents meet and interact with one another. For each pair, the strongest current sets up under a guide magnet, such as 1388.

The simulations indicated in this configuration that the poles generate negative lift and the guide magnets provide lift. When lift from the guide magnets is greater than the pull from the pole magnet, a net lift is generated. Without being bound to a particular theory, it is believed the enhanced current strength due to the eddy current interacting, which passes under the guide magnets, enhances the lift which is generated.

Pattern 1380 is a snap shot at a particular time. In the simulation, the STARM and the magnets rotate according to the proscribed RPM value. Thus, the eddy currents such as 1382 and 1384 don't remain stationary but follow the magnets around as the magnets rotate according to the RPM rate.

In FIG. 78, an eddy current pattern for a variation 1395 of design 1250 in FIG. 67 is shown. The design 1395 includes a small gap near the axis of rotation 1392. As described above, the gap can be used to mount a rotational member to a STARM. In this design the STARM structure doesn't have to be cylindrical. For example, a box shaped design may be used to carry and secure the magnets. Thus, the structure used for the STARM may be reduced for this configuration as compared to a circular magnet configuration.

The polarity arrangement pattern 1254 is used. The polarity arrangement pattern includes two pole sections. The two pole sections generate two large eddy currents 1394 and 1396. The simulations predicted that positive lift was generated from the guide magnets in the polarity arrangement pattern and negative lift was generated from the pole magnets. The lift predictions for the configuration as a function of height are shown in FIG. 85.

In FIG. 79, an eddy current pattern 1400 for the design 1290 in FIG. 69 is shown. The simulation predicts design 1290 produces two eddy currents, 1402 and 1404. The current from the two eddy currents merge near the axis of rotation while passing under the three guide magnets in the center. The simulations predict the positive lift is generated from the current passing under these guide magnets. Again, the simulations predict a negative lift or pull being generated from the pole magnet sections.

Figure 80:
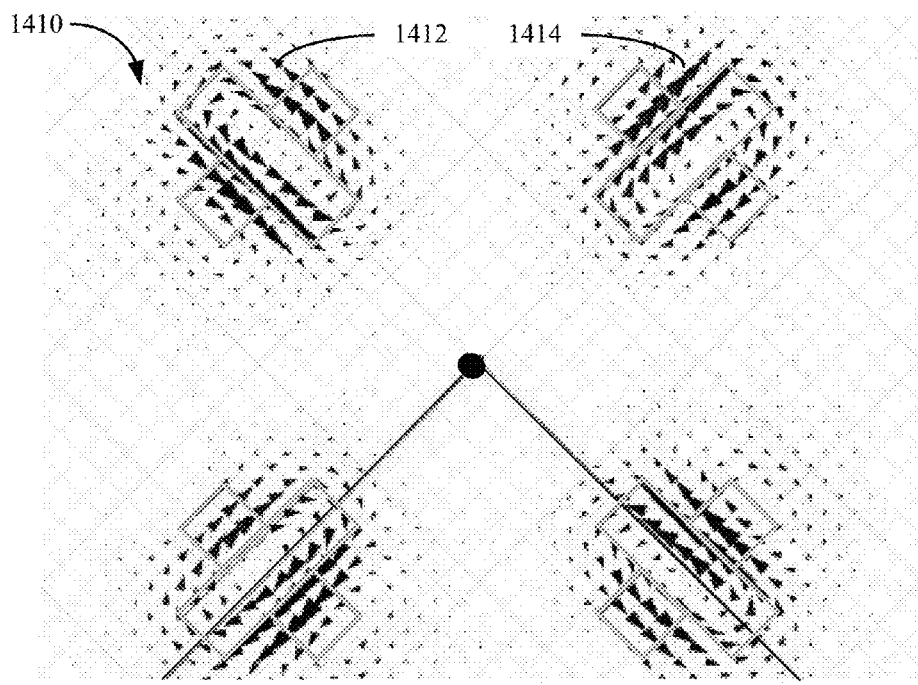
FIG. 80 illustrates predicted eddy current patterns for the magnet configuration shown in FIG. 70.

In FIG. 80, an eddy current pattern 1410 for the design 1320 in FIG. 72 is shown. The simulation predicts design 1320 produce four eddy currents, such as 1412 and 1414. An eddy current forms around each cluster, which circulates around the pole sections. The simulations predict the positive lift is generated from the current passing under the guide magnets which abut the pole section in each cluster. Again, the simulations predict a negative lift or pull being generated from the pole sections in each cluster.

Figure 81:
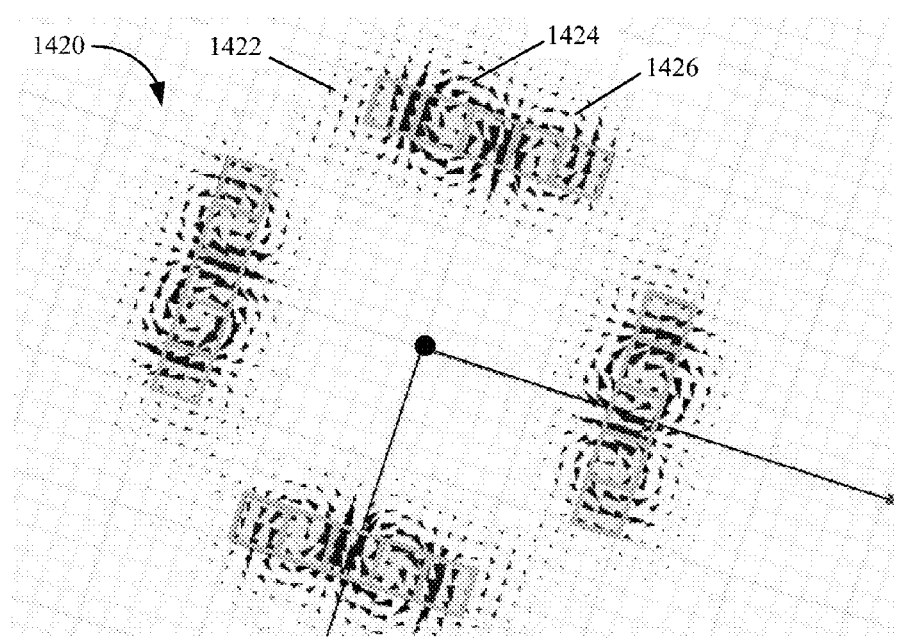
FIG. 81 illustrates predicted eddy current patterns for the magnet configuration shown in FIG. 76.
Figure 82:
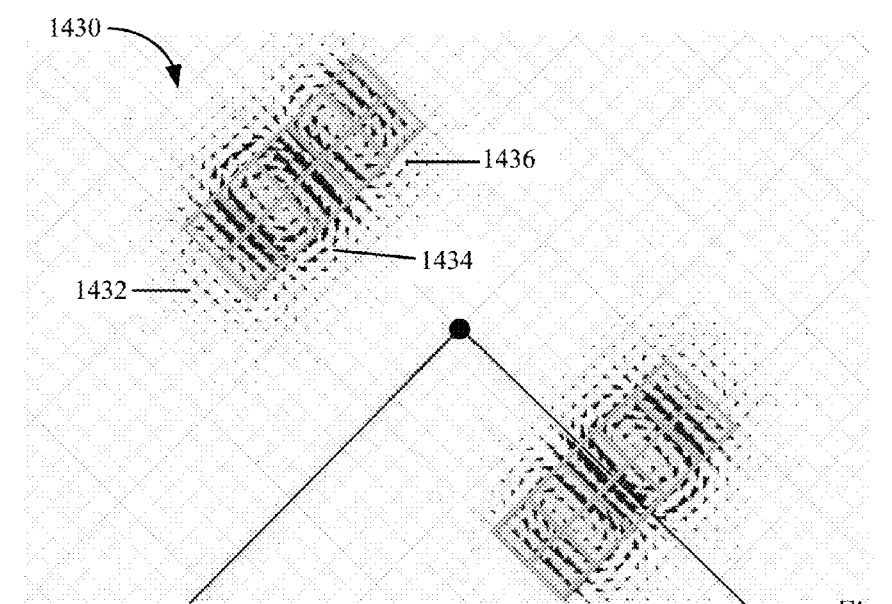
FIG. 82 illustrates predicted eddy current patterns for the magnet configuration shown in FIG. 75.
Figure 83:
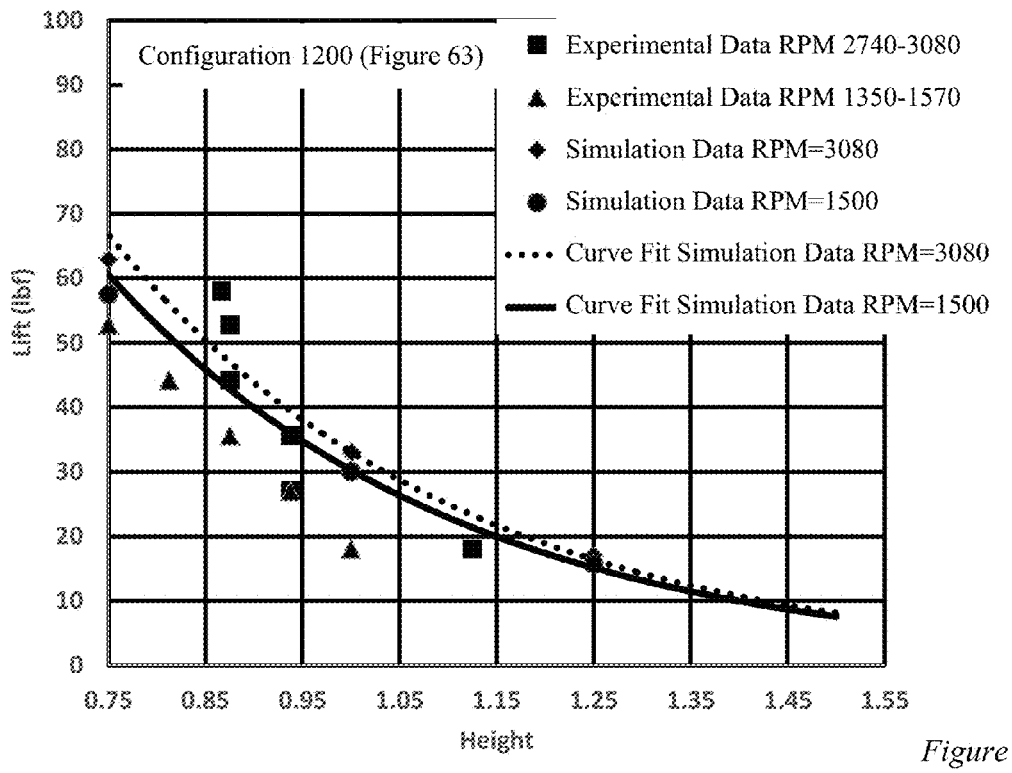
FIGS. 83 and 84 are plots of lift versus height which compare numerically predicted data and experimental data.

In FIGS. 81 and 82, eddy current patterns 1420 and 1430 for the designs 1360 and 1370 in FIGS. 75 and 76, respectively, are shown. The simulations predict three main eddy currents are formed for each cluster, such as 1422, 1424 and 1426 or 1432, 1434 and 1436. The magnets rotate counter clockwise and the lead eddy currents, 1422 and 1432, are weaker than the two eddy currents, which form under each rectangular cluster.

In each cluster, the strongest eddy currents set up under the guide magnets. The simulations predict the positive lift is generated from the current passing under the guide magnets. Again, the simulations predict a negative lift or pull being generated from the pole sections.

The two designs 1360 and 1370 use the same volume of magnets. However, as shown in FIG. 86 more lift is predicted for design 1370, which uses two clusters, as compared to design 1360. Without being bound to a particular theory, it is believed that the design in FIG. 82 strengthens and concentrates more current underneath the guide magnets in the cluster which generates more lift.

Figure 84:
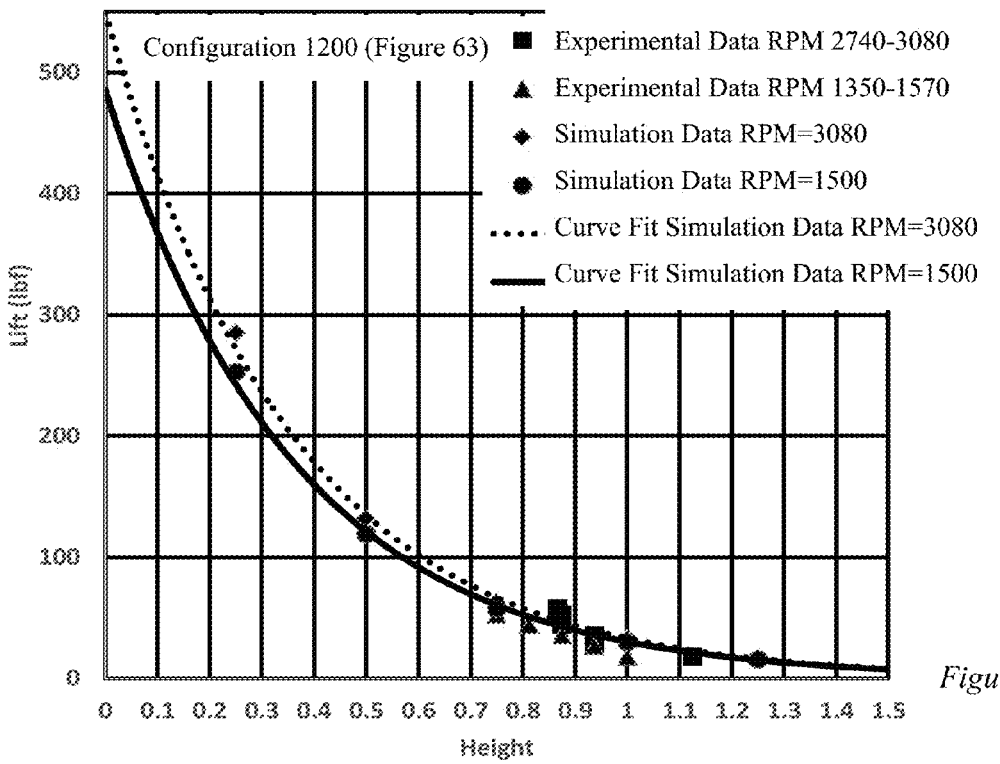

Next, with respect to FIGS. 83 and 84, lift predictions derived from simulation of the design in FIG. 63 are compared to experimentally measured data. Next, the lift predictions derived from simulations are compared for the designs shown in FIGS. 64, 65, 66 and 77-82.

To obtain the experimental data, the STARM shown in FIGS. 63 and 64 is coupled to a QSL-150 DC brushless motor from Hacker Motor (Ergolding, Germany). The motor was powered by batteries. The batteries used were VENOM 50C 4S 5000MAH 14.8 Volt lithium polymer battery packs (Atomik RC, Rathdrum, Id.). A structure was built around the motor and batteries. A vehicle including the batteries, motor, STARM and structure weighed 18 lbs. A Jeti Spin Pro Opto brushless electronic speed controller (Jeti USA, Palm Bay, Fla.) was used to control the current supplied to the motor and hence its RPM rate.

The vehicle was started in a hovering position. The height, RPM and other measurements were taken. Then, additional weight, in various increments, was added. The additional weight lowered the hover height of the test vehicle. Height measurements were made at each weight increment. In a first test, the initial RPM rate was 3080 with the test vehicle unloaded and then decreased as weight was added. In a second test, the RPM rate was initially 1570 with the test vehicle unloaded. Table 1 below shows the experimentally measured data for test #1 and test #2. The table includes the total vehicle weight including the payload. The RPM of the motor. The amps drawn and voltage. These quantities were used to generate power consumption. Finally, the hover height of the vehicle was measured by hand. The height is shown to remain constant at a number of different height increments. The constant height was attributed to inaccuracies in the hand measurements.

TABLE 1

Experimentally Measured Data using Design 1200 in FIG. 63

| Weight including Payload (lbs) | RPM | Amps | Volts | Power (W) | Height (in) |
|---|---|---|---|---|---|
| Test #1 | | | | | |
| 18 | 3080 | 12.1 | 61.6 | 745 | 1.125 |
| 27 | 3000 | 15.4 | 60.8 | 936 | .9375 |
| 35.6 | 2915 | 19.5 | 60 | 1170 | .9375 |
| 44.2 | 2855 | 22.7 | 59.4 | 1348 | .875 |
| 52.8 | 2780 | 26.8 | 58.6 | 1570 | .875 |
| 58 | 2740 | 29.4 | 58.1 | 1708 | .8667 |
| Test #2 | | | | | |
| 18 | 1570 | 10.3 | 49.4 | 509 | 1 |
| 27 | 1480 | 13.9 | 49.3 | 685 | .9475 |
| 35.6 | 1420 | 17.4 | 49.3 | 858 | .875 |
| 44.2 | 1390 | 20.8 | 49.2 | 1023 | .8125 |
| 52.8 | 1350 | 24.4 | 49.1 | 1198 | .75 |

To access the accuracy of the simulations of the STARM design in FIG. 63, a constant RPM value was selected and then the distance from the bottom of the magnets to a ½ inch copper plate is varied. FIG. 83 shows a comparison of the numerical simulations with the experimental data from tests number one and two between a height of three quarters of an inch and one and one quarter of an inch. The numerical simulations are curve fit with an exponential. The curve fits are represented by the dashed and solid lines.

The simulations were generated at heights of 0.25 inches, 0.5 inches, 0.75 inches, 1 inch and 1.25 inches. The curve fits were extrapolated to heights of zero inches and to 1.5 inches. In FIG. 84, the experimental data and simulated data is shown from a height range of zero to one and one half inches.

Figure 87:
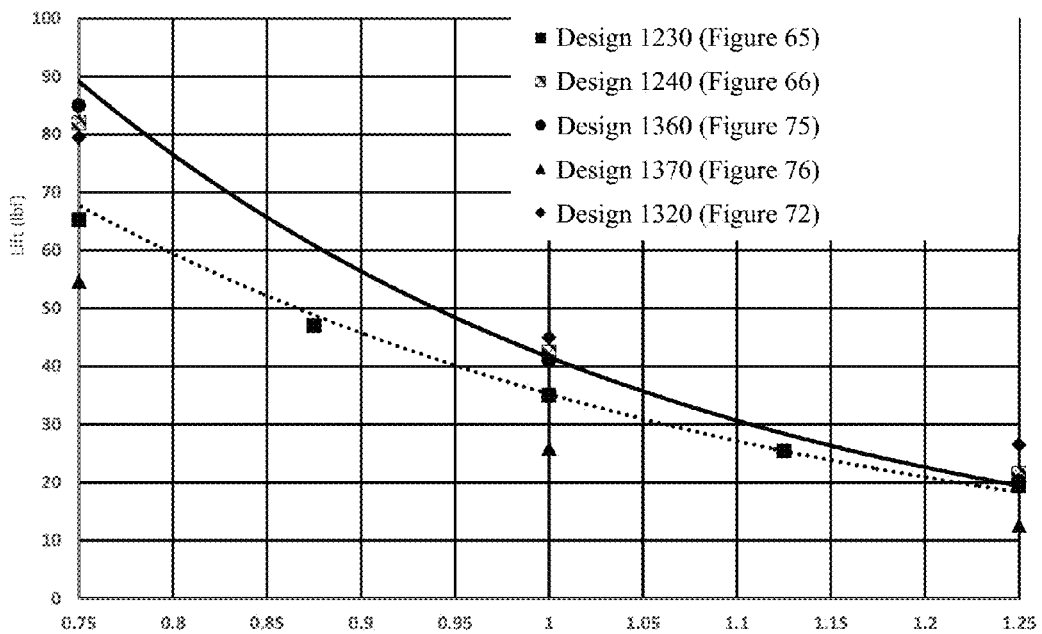

Next with respect to FIGS. 85, 86 and 87, the designs in FIGS. 64, 65, 66 and 77-82 are described. To compare designs, an average velocity of the bottom of the magnets relative to the top surface of the conductive substrate is considered. In some of the designs, this value was held constant. The average velocity of the magnets relative to the surface can be estimated as an average distance of the bottom of the magnets to the axis of rotation times the RPM rate converted into radians.

The average velocity was calculated because at higher velocities, the lift tends to increase and the drag tends to decrease as a function of the velocity of the magnets relative to the surface. In FIG. 85, the average distance from axis of rotation to the bottom of the magnets was about 2.81 inches for design 1395, 1.56 inches for design 1290 and 4.25 inches for design 1200.

All of the simulations were run at 3080 RPM except for design 1290, which was run at 6000 RPM. The RPM value was increased because the average distance was so much lower for this design and hence the average velocity was much lower than other designs when an RPM of 3080 was selected. Based upon these RPM values, the average velocity of design 1395 is 75.2 feet/s, the average velocity of design 1290 is 81.7 feet/s and the average velocity of design 1200 is 114.2 feet/sec.

For the designs in FIGS. 86 and 87, the average distance from the axis of rotation is 4.75 inches and the RPM value is 3080. Thus, the average velocity relative to the surface for the five designs is the same and is 127.6 feet/s. FIGS. 86 and 87 show the same designs. However, in FIG. 87, the height range and lift ranges are narrowed so that the differences between the designs can be discerned.

The numerical results were generated at 0.25, 0.5, 0.75, 1 and 1.25 inches. Some of the numerical results were curve fit using an exponential equation. In FIG. 85, design 1290 is predicted to generate the most lift above 0.75 inches. Below 0.25 inches, the curve fits predict design 1200 will generate more lift. Design 1290 generates more lift at the greater height values than the other designs even with a lower average velocity of the bottom of the magnets relative to the surface as compared to the other designs.

In FIGS. 86 and 87, the predicted lift as a function of height is presented for five designs. The curve fit with the solid line is an exponential fit of the data for design 1360 in FIG. 75 which includes two linearly arranged clusters of magnets with ten cubic inches of magnets per cluster. The curve fit with the dotted line is an exponential fit of the circularly arranged magnets for design 1230 in FIG. 65.

Figure 88:
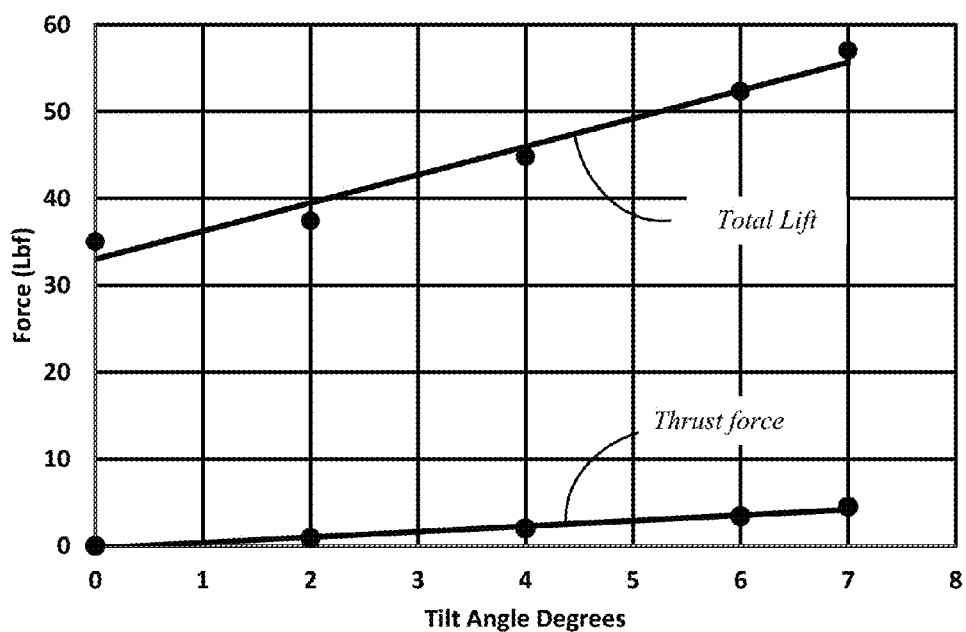
FIGS. 88 and 89 are plots of numerical predictions of lift and thrust force as a function of tilt angle for the magnet configuration 1290 in FIG. 69.

The five designs in FIGS. 88 and 87 each use the same volume of magnets of the same strength. The magnets are arranged such that the average velocity of the magnets relative to the surface is the same. The lift predictions for the different magnet arrangements vary from arrangement to arrangement. The performance between designs varies between heights. For example, the predicted lift for design 1360 is largest of the five designs at 0.25 and 0.5 inches. However, at 1 inch and 1.25 inches, designs 1320 and 1240 are predicted to generate more lift.

Figure 89:
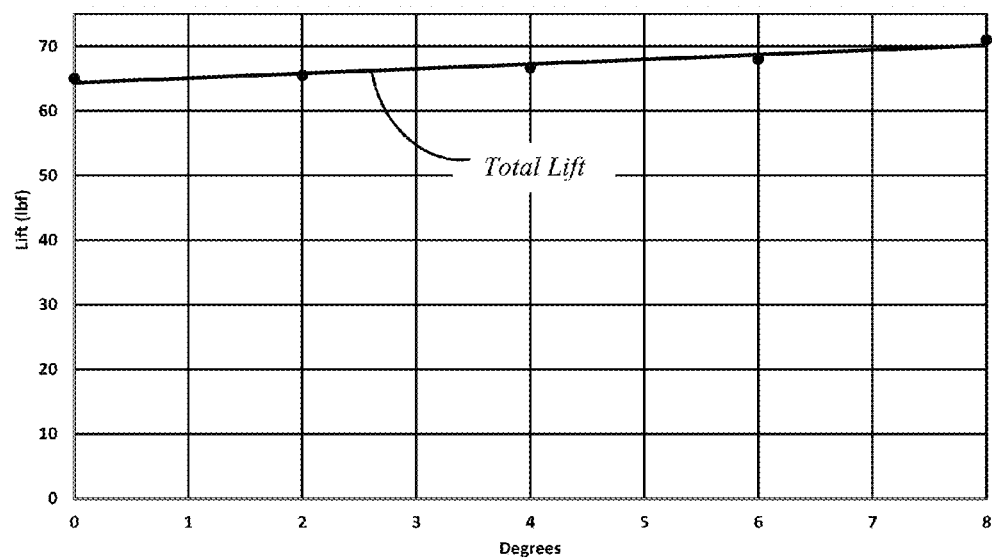
Figure 90:
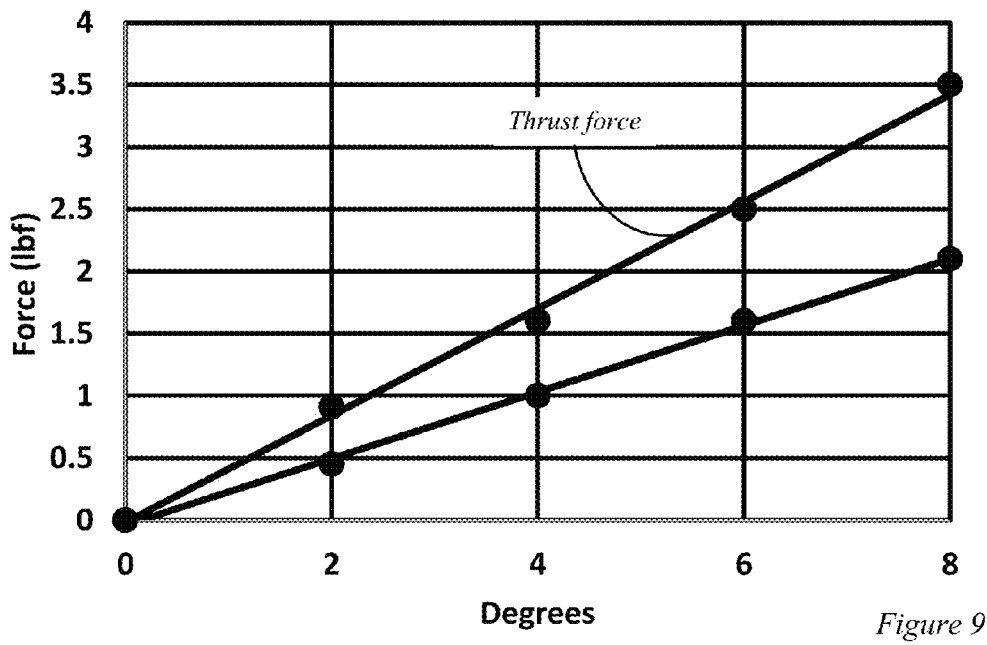
FIGS. 90 to 104 are illustrations of magnet configurations, which utilize eight cubic inches of magnets, and the associated polarity alignment patterns and eddy currents patterns in accordance with the described embodiments.

Next, with respect to FIGS. 88, 89 and 90, lift predictions and thrust predictions are made as a function of tilt angle of the STARM. In FIG. 88, predictions of total lift and thrust force as a function of tilt angle are shown for design 1200 shown in FIG. 63. In FIG. 89, the predicted total lift as a function of tilt angle is shown for design 1290 in FIG. 69.

In FIG. 90, the predicted thrust force as a function of tilt angle for design 1290 in FIG. 69 is shown. For design 1290, the thrust force varies as the magnet configuration rotates relative to the surface. It oscillates between a minimum and maximum value. The maximum and minimum values for each tilt angle are shown in the Figure.

In FIG. 88, the tilt angle is varied between zero and seven degrees. A one inch height above the surface of the tilt axis is simulated where the STARM is rotated at 3080 RPM. Thus, the distance of part of the STARM to the surface of the substrate is greater than one and the distance of part of the STARM is less than one. However, the average distance from the bottom of the STARM to the substrate is one inch. In FIGS. 89 and 90, the tilt angle is varied between zero and seven degrees. A one inch height above the surface of the axis of rotation is again simulated where the STARM is rotated at 6000 RPM.

In FIGS. 88 and 89, the total lift is predicted to increase with tilt angle. The effect is greater for design 1200 as compared to design 1290. In some embodiments, a STARM can be fixed at angle greater than zero to take advantage of the greater lift which is generated. At the tilt angles considered, the total lift appears to increase linearly with angle.

In FIGS. 88 and 90, the thrust force increases with tilt angle. At the tilt angles considered, the thrust force increases linearly with angle A greater thrust force is predicted design 1200 in FIG. 88 as compared to design 1290 in FIG. 90 even though a larger total lift is predicted for 1290 as compared to design 1200. Thus, in some embodiments, design 1200 might be selected for generating thrust whereas design 1290 might be selected for generating lift. As described above with respect to FIG. 37, STARMs can be specialized to generate lift or thrust forces. Based upon these simulations, some designs may be more suitable for generating lift forces and other designs may be more suitable for generating thrust forces.

Figure 91:
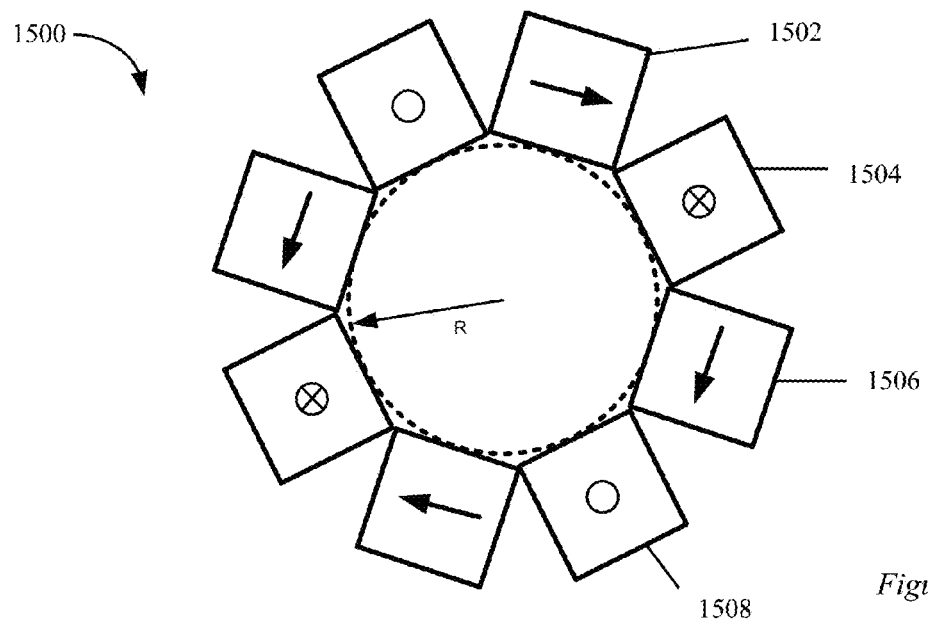

Next, with respect to FIGS. 91-105 some magnet configurations using eight cubic inches of magnets are described. In FIG. 91, magnet configuration 1500 is shown. The magnet configuration includes the polarity alignment pattern shown in magnets 1502, 1504, 1506 and 1508 repeated once. It is formed from eight one inch cube magnets. The magnet configuration 1500 includes four pole magnets and four guide magnets. The polarity alignment pattern, which is repeated, is the same as the one shown in FIG. 63 for design 1200. Thus, variations described with respect to FIG. 63 can be adopted. The ratio of the bottom area of the magnets to the total volume$^{2/3}$ is two.

Simulations were generated using the magnet configuration 1500. The simulations were carried out over a ½ inch copper plate at 6000 RPM at various heights. In the following figures, eddy current patterns from the simulations are shown. A height of 0.25 inch above the surface is utilized.

Figure 92:
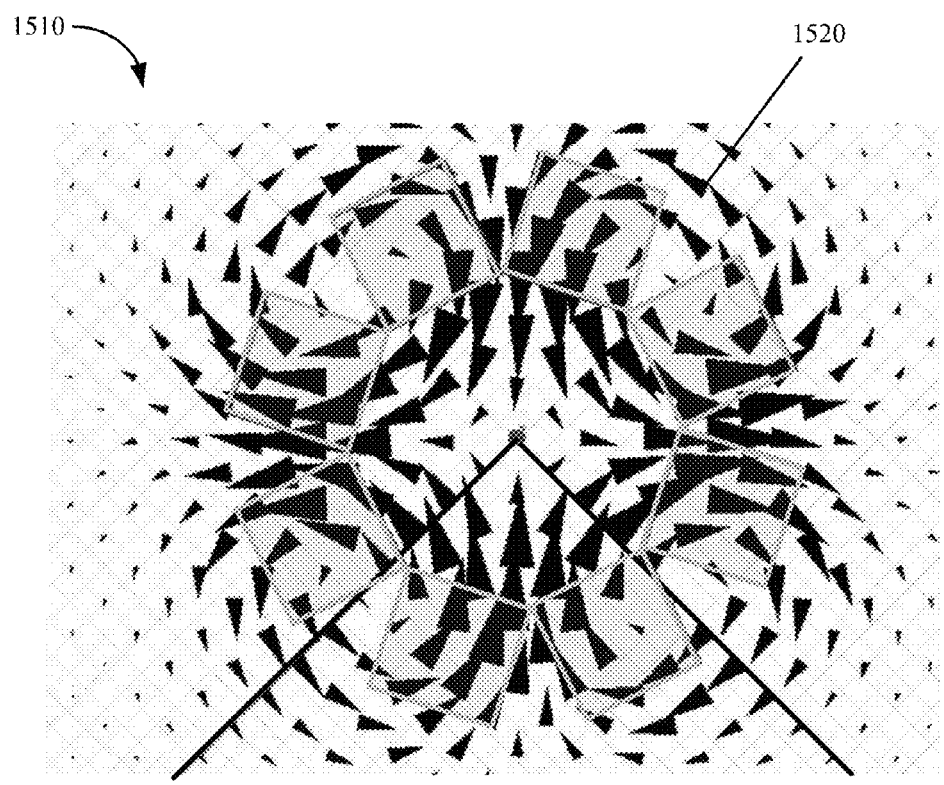

In FIG. 92, the eddy current patterns 1510 from the simulation are shown. The polarity arrangement pattern is the same is in FIG. 91. Four eddy currents, such as 1520, are predicted. The eddy currents each include a guide magnet and a pole magnet. For example, eddy current 1520 includes guide magnet 1502 and pole magnet 1504. The strongest current primarily sets up under the guide magnets, such as 1502 and 1506.

Figure 93:
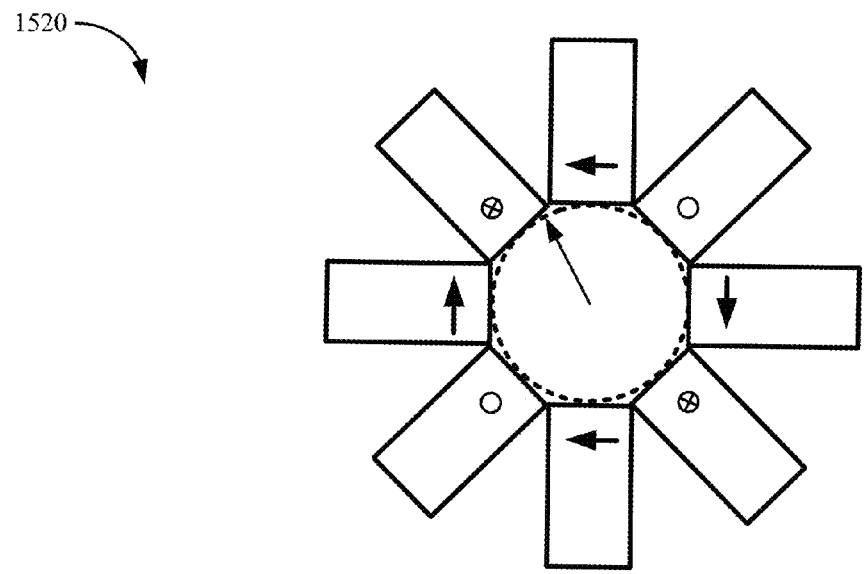

In FIG. 93, the magnet polarity arrangement pattern is the same as in FIG. 91. The magnets are 0.5 inch high by two inches long by one inch wide. Thus, the bottom area of the magnets is sixteen. Thus, the ratio of the area of the bottom of the magnets to the total volume$^{2/3}$ is 4.

Figure 94:
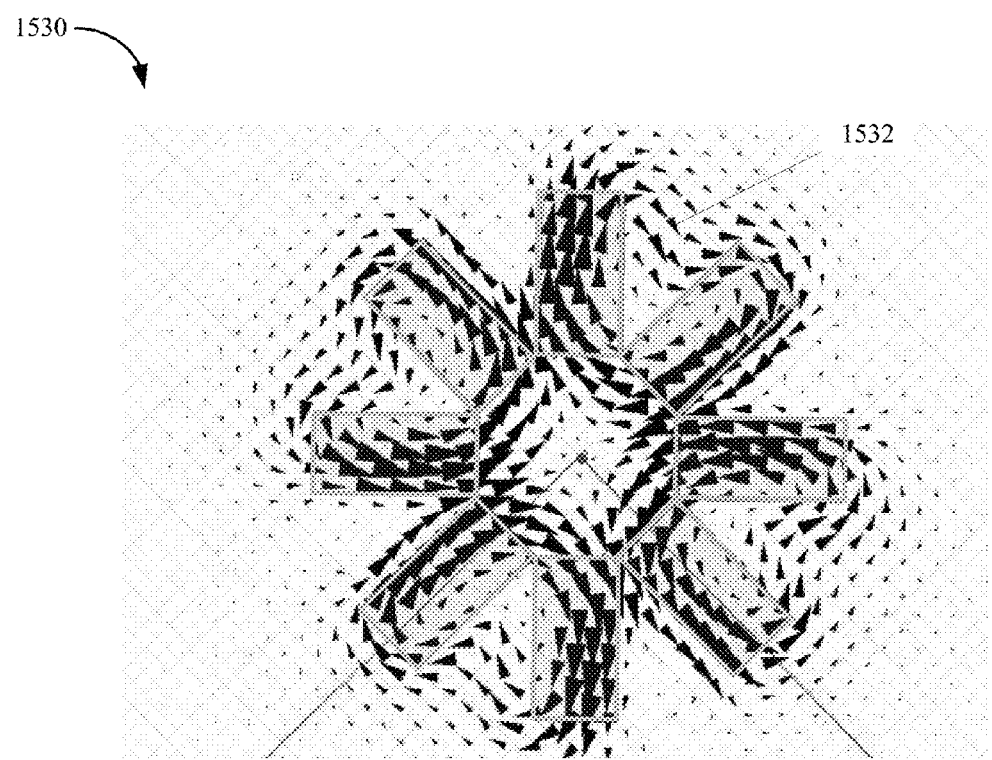

The predicted eddy current pattern 1530 is shown in FIG. 94. The polarity arrangement pattern in FIGS. 93 and 94 are the same. Four eddy currents, such as 1532, are predicted. The eddy currents with the lengthened magnets provide a clover leaf shape.

Figure 95:
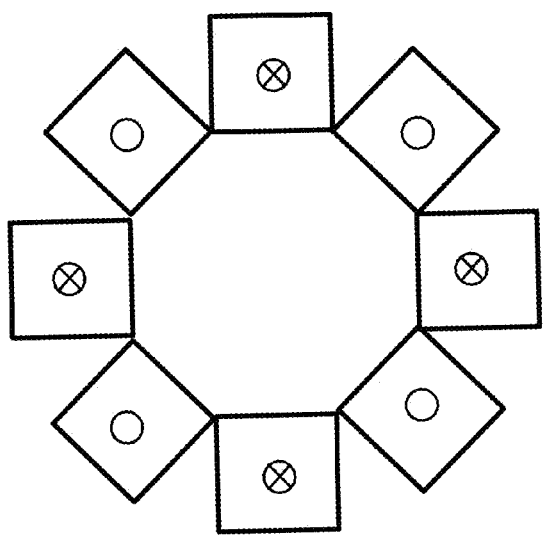
Figure 96:
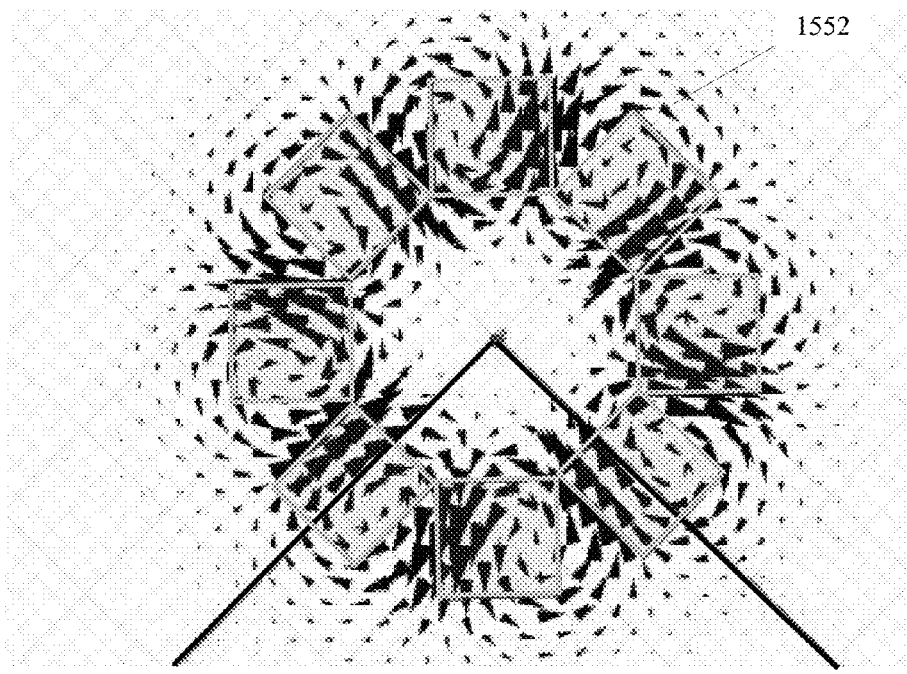

In FIG. 95, a configuration 1540 of eight cubic inch magnets is arranged in the same configuration as FIG. 91. However, the polarity arrangement pattern is different. In 1540, an alternating North-South distribution of magnet poles is used. Thus, the ratio of the guide magnet volume to the pole magnet volume is zero. The eddy current pattern 1550 is shown in FIG. 96. Eight eddy currents, such as 1552, are predicted, i.e., one for each pole magnet.

Figure 97:
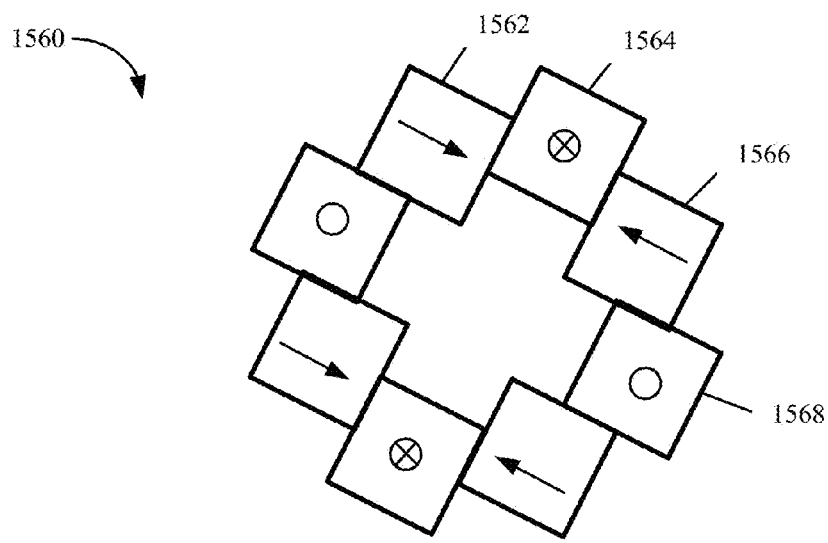

In FIG. 97, a configuration 1560 of eight cubic inch magnets is arranged such that a portion of each of two sides of each magnet is contact with an adjacent magnet. The polarity arrangement pattern shown in magnets 1562, 1564, 1566 and 1568 provides two guide magnets 1562 and 1566 which are aligned along a line and have a polarity direction which points to the pole magnet 1564. This pattern is repeated once.

Figure 98:
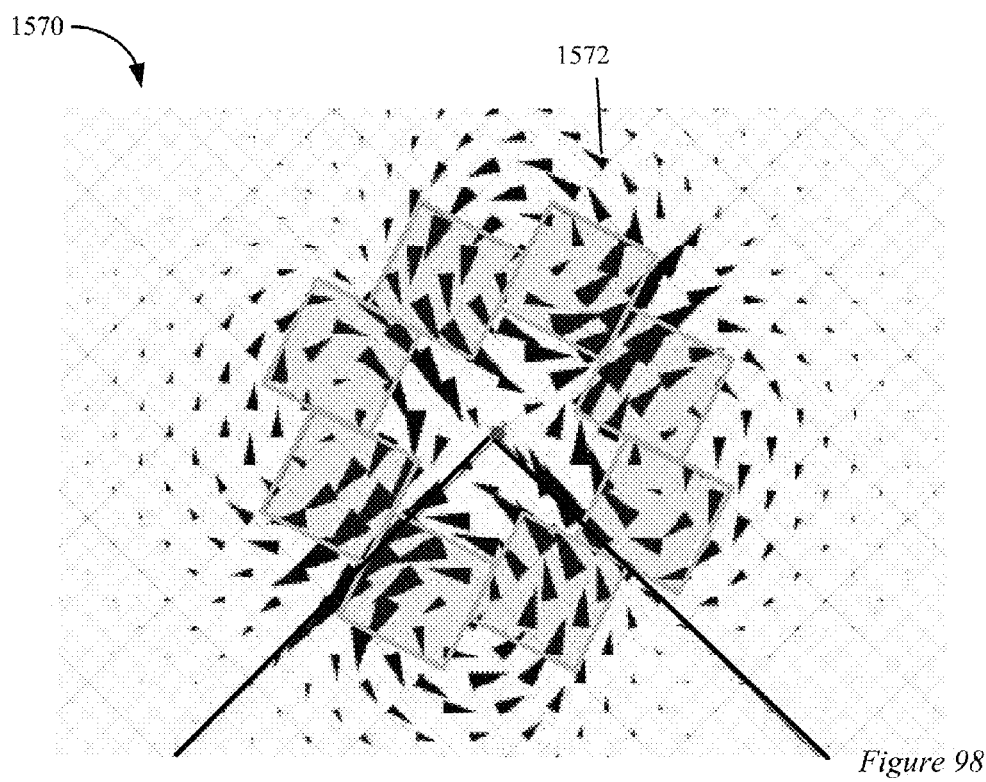

The eddy current pattern 1570 is shown in FIG. 98. Four eddy currents, such as 1552, are predicted. Each eddy current includes a guide magnet and a pole magnet pair.

Figure 99:
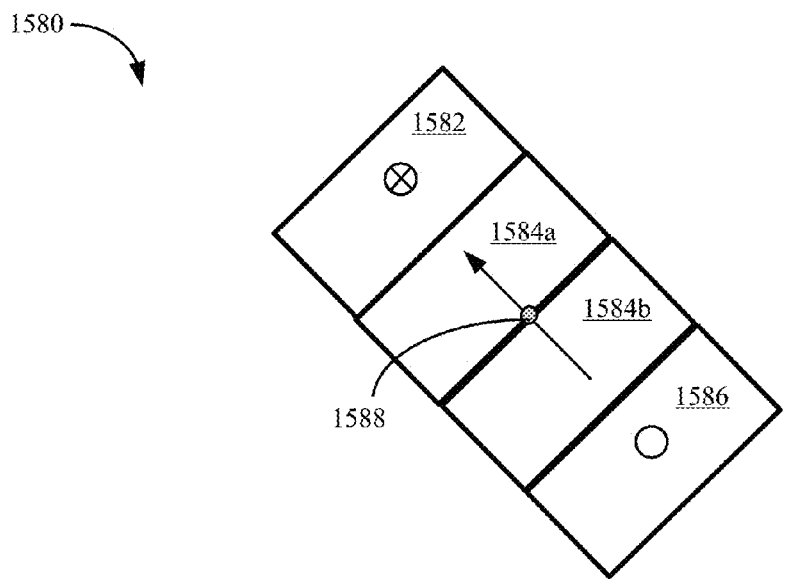

In FIG. 99, a configuration 1580 including a four magnet array of two inch by one inch by one inch magnets is shown. The magnet array spans the axis of rotation 1588. The polarity arrangement pattern includes pole magnets, 1582 and 1586 on each end. Between the pole magnets a guide magnets 1584*a* and 1584*b* are provided. The guide magnet polarity points from pole magnet 1586 to pole magnet 1582.

Figure 100:
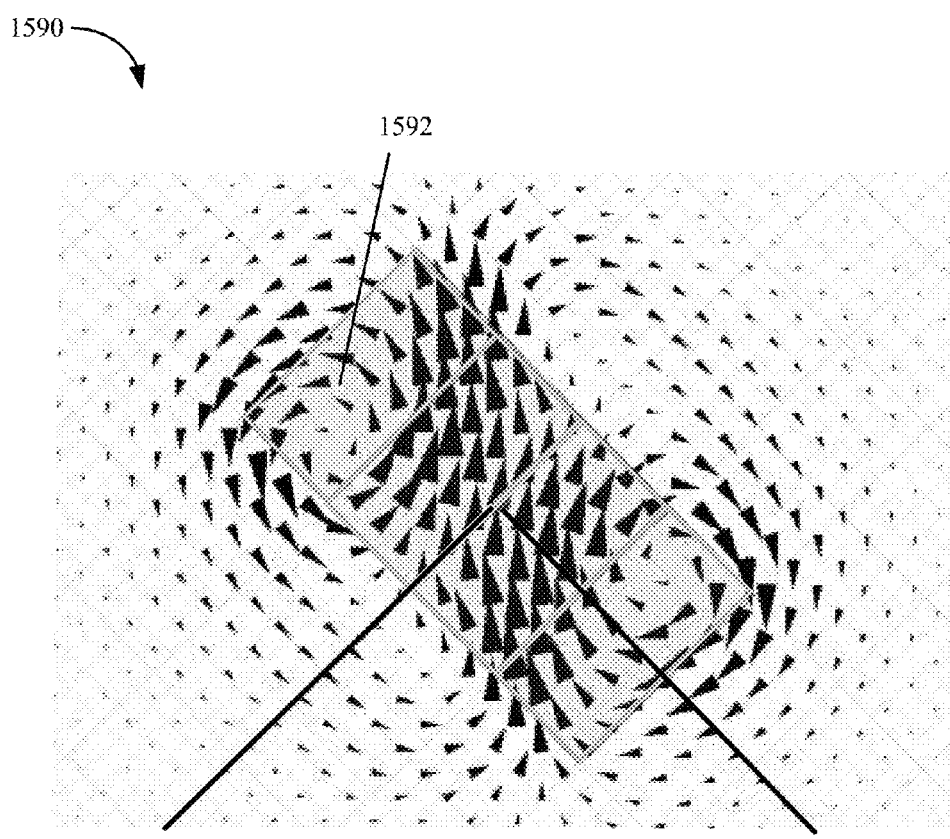

The eddy current pattern 1590 is shown in FIG. 100. Two eddy currents, such as 1592, are predicted. The two eddy currents interact with one another to provide strong current under the guide magnets in the center of the array.

Figure 101:
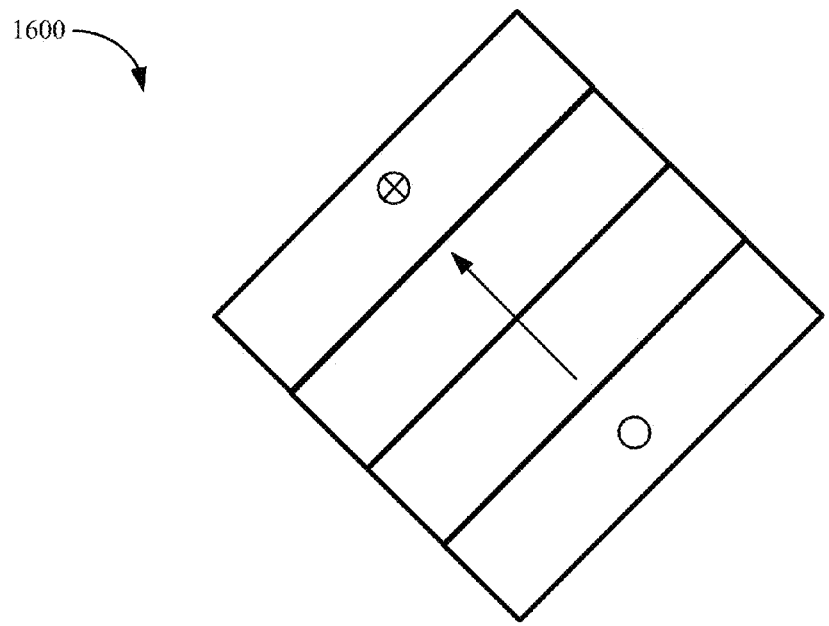

In FIG. 101, a configuration 1600 of four magnets is shown. The magnets in the array are one half inch high by four inches long by one inch wide. Thus, the volume is eight cubic inches as in the previous designs. The polarity arrangement pattern is the same as in FIG. 99.

Figure 102:
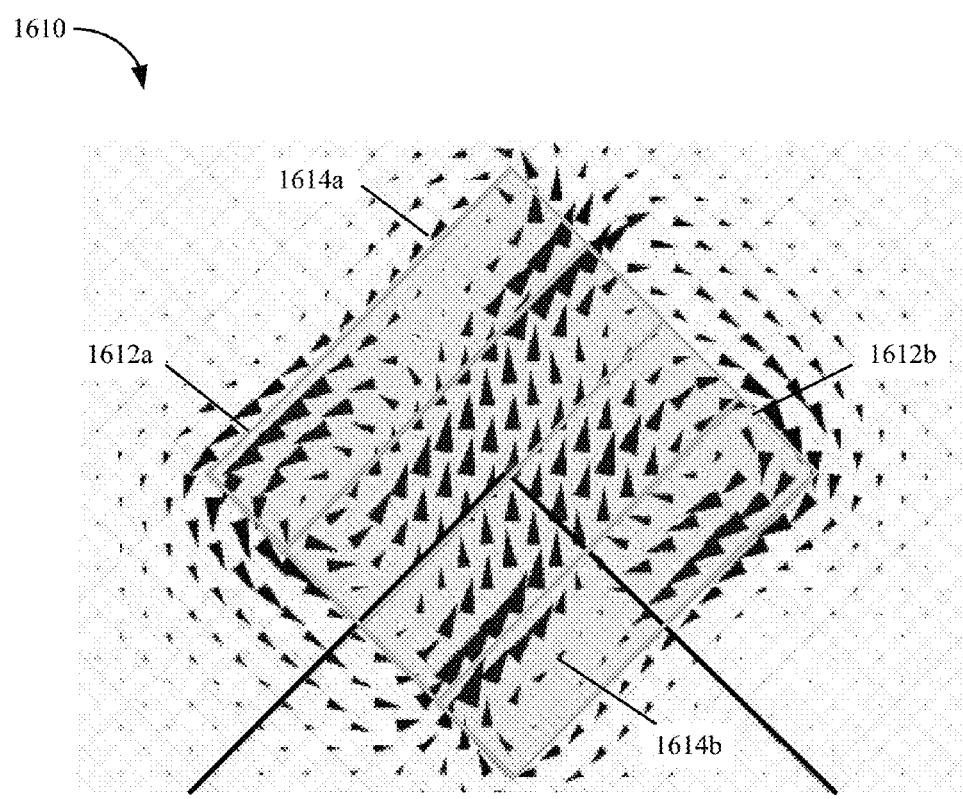

The eddy current pattern 1610 is shown in FIG. 102. Two main eddy currents 1612*a* and 1612*b* are predicted. Possible secondary eddy currents 1614*a* and 1614*b*, which are somewhat integrated with the main eddy currents are shown. Again, a large amount of current is generated under the guide magnets in the center of the configuration 1600.

Figure 103:
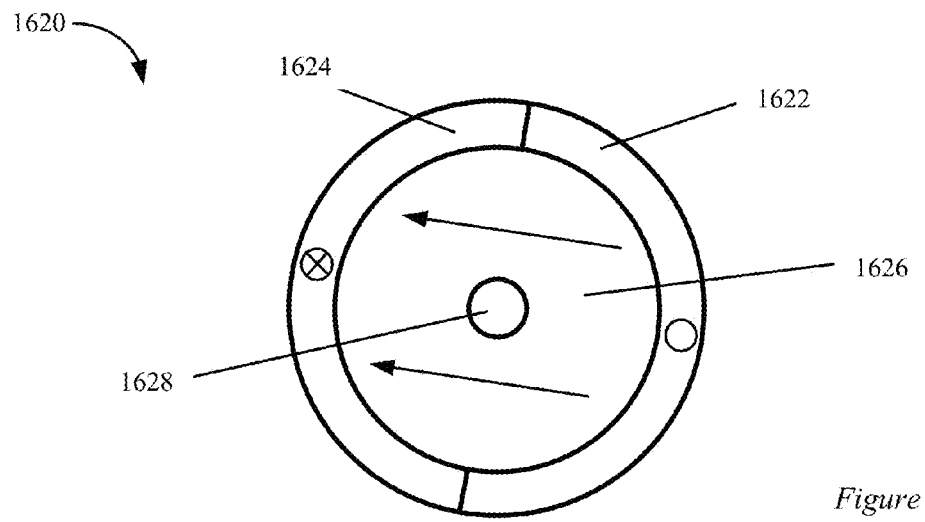

In FIG. 103, a configuration 1620 a configuration of three magnets arranged in a disk is shown. The volume of the three magnets is eight cubic inches. The center magnet 1626 is disk shaped and includes an aperture 1628. The aperture 1628 can allow a rotational member to be mounted through the center magnets. Magnets 1622 and 1624 surround the disk 1626 to form a ring. The polarity alignment pattern assigned to the three magnets is similar to the pattern shown in FIGS. 99 and 101.

In alternate embodiment, all of the magnets can be assigned to be a guide magnet with the polarity of magnet 1626. Then, a single disk magnet can be employed. This polarity alignment pattern can also be used for design 1580 in FIG. 99 and design 1600 in FIG. 101. Using only guide magnets, lift is predicted. However, the predicted lift is less than when a combination of guide magnets and pole magnets is used.

In various embodiments, the arc length of magnets 1622 and 1624 can be smaller such that the magnets no longer form a ring. For example, the arc length of magnets 1622 and 1624 can be ninety degrees as opposed to the one hundred eighty degrees, which is shown. In addition, the radial width of the magnets, 1622, 1624 and 1626, can be made larger or smaller. In another embodiment, aperture 1628 can be made smaller, larger or removed.

Figure 104:
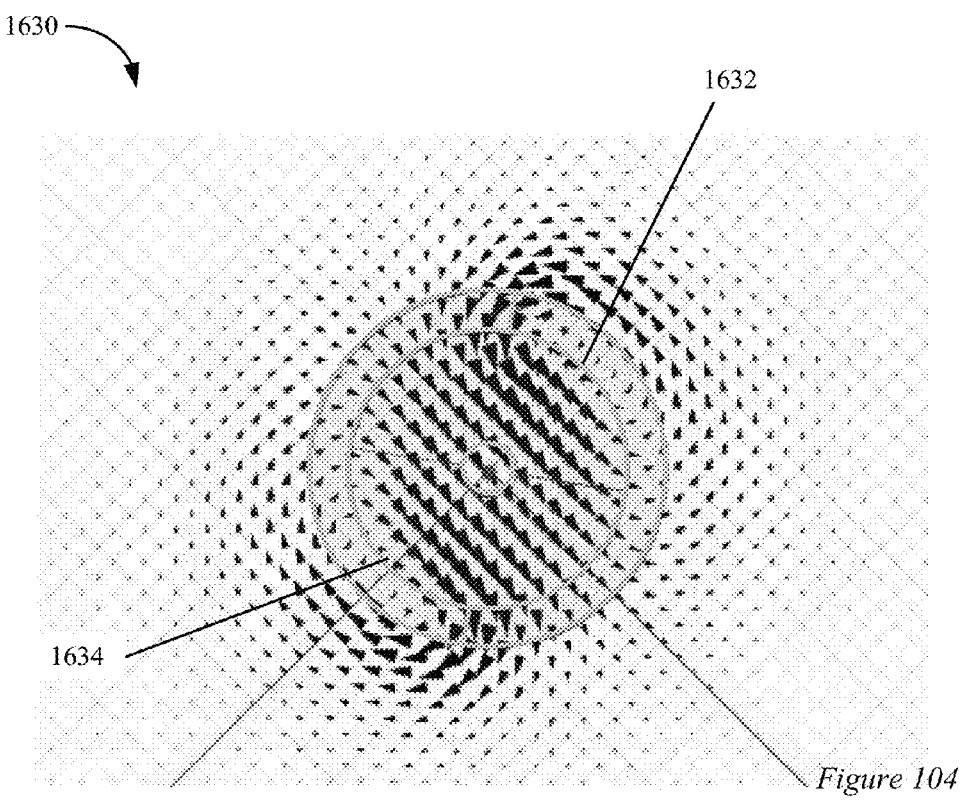

In FIG. 104, the eddy current pattern 1630 predicted for the design is illustrated. Two eddy currents 1632 and 1634 are predicted. The two eddy currents interact to generate a region of concentrated current under disk shaped magnet 1626. The lift predicted for this design was less than the lift predicted for design 1580 in FIG. 99 and design 1600 in FIG. 101 for the one condition considered.

Figure 105:
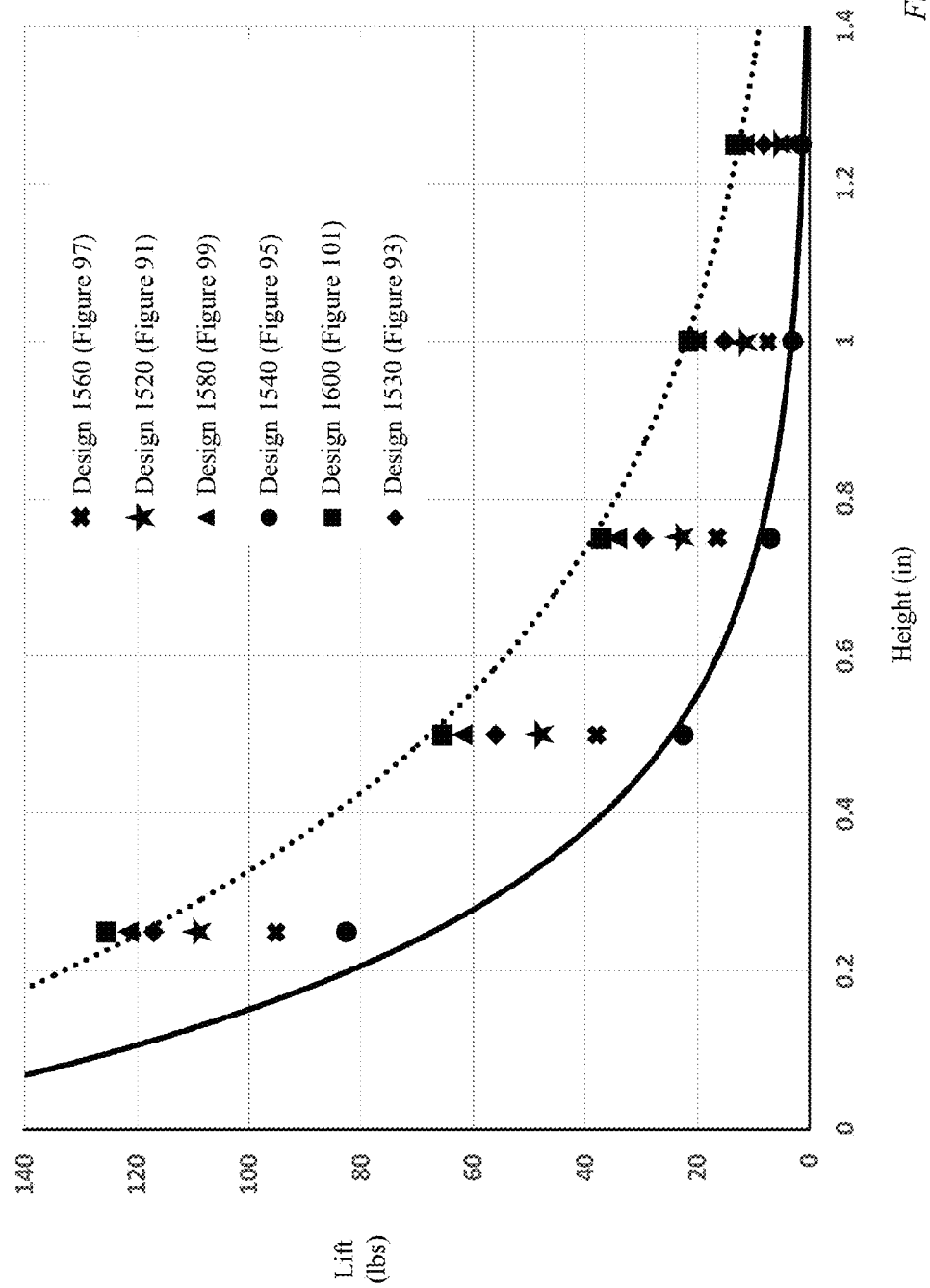
FIG. 105 is a plot of numerical predictions of lift versus height for various magnet configurations which utilize eight cubic inches of magnets in accordance with the described embodiments.

In FIG. 105, predictions of lift versus height for a) design 1560 in FIG. 97, b) design 1520 in FIG. 91, c) design 1580 in FIG. 99, d) design 1540 in FIG. 95, e) design 1600 in FIG. 101 and f) design 1530 in FIG. 93 are compared. The designs all use eight cubic inches of magnets. The simulations were carried out heights of 0.25, 0.5, 0.75, 1 and 1.25 inches above a ½ inch thick copper plate at 6000 RPM.

Exponential curve fits are shown for design 1600 and design 1540. These two designs provide an upper and lower limit to the lift predictions. Design 1540 uses eight magnets arranged in a circle using only poles arranged to alternate.

Figure 106:
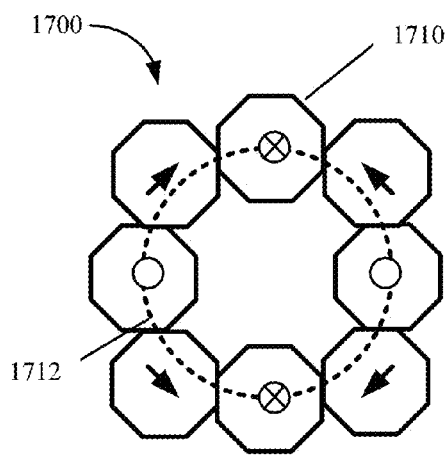
FIG. 106 is an illustration of a magnet configuration which uses octagonally shaped magnets in accordance with the described embodiments.

Next, some alternate embodiments of magnet configurations and polarity alignment patterns are discussed with respect to FIGS. 106 to 113. In FIG. 106, a magnet configuration 1700, which is formed from octagonally shaped magnets, such as 1710 is shown. The center of four of the magnets is aligned around a circle 1712. The remaining four magnets are fit in the gap between these four magnets. The magnets are placed such that two sides of each magnet contact two adjacent magnets. The polarity alignment pattern includes two guide magnets and two pole magnets. The pattern is repeated once and is similar to the pattern previously described above.

Figure 107:
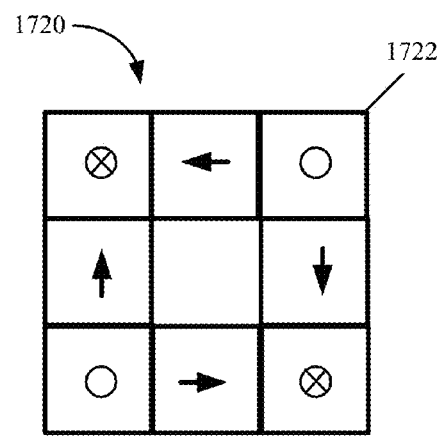
FIGS. 107 and 108 are illustrations of square magnet configurations and associated polarity alignment patterns in accordance with the described embodiments.

In FIG. 107, a magnet configuration 1720, which is formed from rectangularly shaped magnets, such as 1722 is shown. The magnets are arranged to form a square with a space in the middle. The polarity alignment pattern includes two guide magnets and two pole magnets. The pattern is repeated once and is similar to the pattern previously described above.

Figure 108:
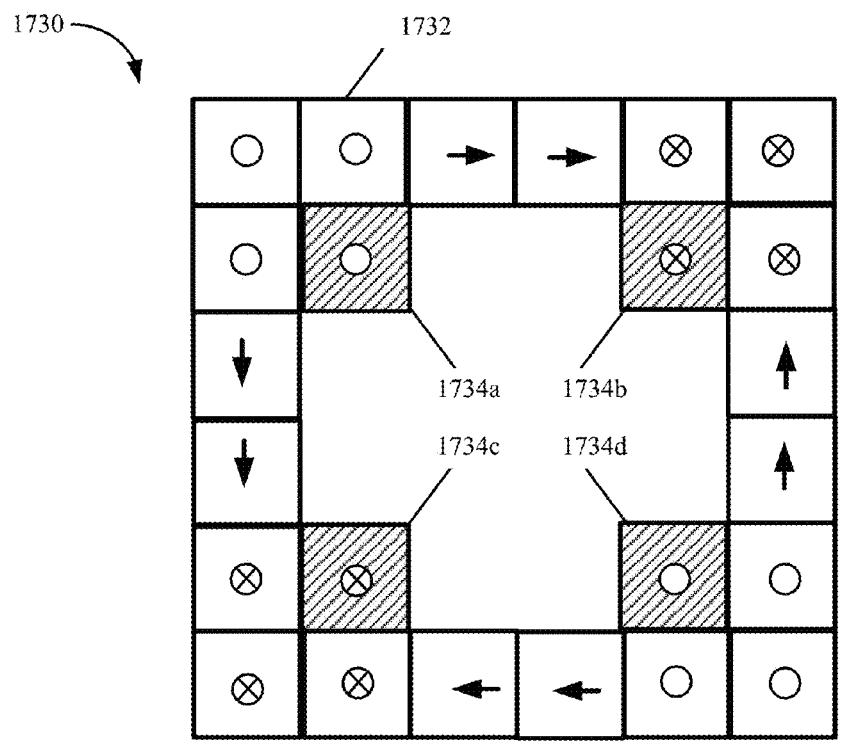

In FIG. 108, a magnet configuration 1730, which is formed from rectangularly shaped magnets, such as 1732 is shown. The magnets are arranged such that the outer perimeter is a square. In one embodiment, twenty four magnets are employed. In another embodiment, magnets 1734a, 1734b, 1734c and 1734d can be removed to provide a larger space within the configuration. As described above, this space may be used to accommodate a motor. In this example, twenty magnets are used.

The polarity alignment pattern includes two guide regions and two pole regions. The pattern is repeated once and is similar to the pattern previously described above. In a first embodiment, which includes magnets 1734a, 1734b, 1734c and 1734d, the ratio of the guide magnet volume to pole magnet volume is 0.5. In a second embodiment where magnets 1734a, 1734b, 1734c and 1734d are removed, the ratio of the guide magnet volume to pole magnet volume is ⅔.

Figure 109:
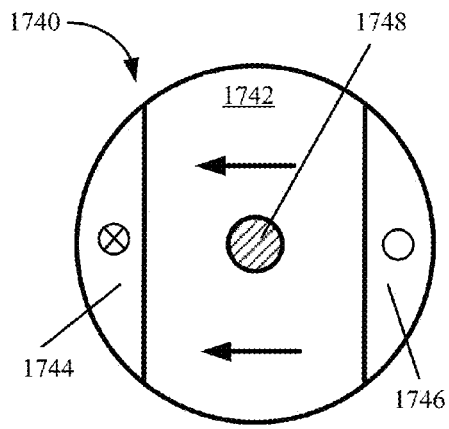
FIG. 109 is an illustration of a magnet configuration and polarity alignment pattern that is arranged to form a disk in accordance with the described embodiments.

In FIG. 109, a magnet configuration 1730, which is disk shaped, is shown. The disk can be formed from three magnets 1742, 1746 and 1748. An aperture 1748 can be provided in the center of magnet 1742 or magnet 1742 can be solid. As an example, a disk which is one inch in height has a volume of twenty cubic inches and an aperture radius of ½ inch has an outer radius of about 2.47 inches. In various embodiments, the total volume, height of the disk and aperture radius can be varied.

The polarity alignment pattern includes two pole magnets 1744 and 1746 and a center magnet with a single polarity in between the two pole magnets. This polarity alignment pattern has been described above with respect to various designs. The ratio of guide magnet volume to pole magnet volume can be varied and the design 1740 is shown for the purposes of illustration only.

Figure 110:
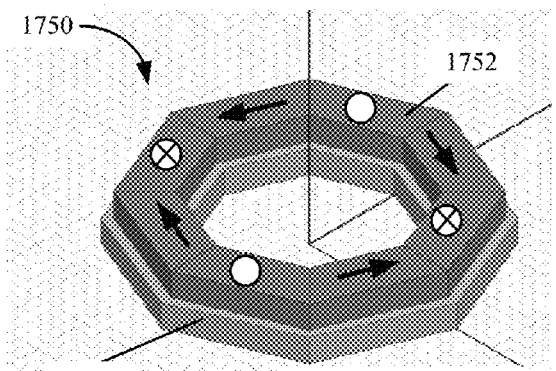
FIGS. 110 and 111 are illustrations of magnet configurations and polarity alignment patterns, which utilize trapezoidally shaped magnets in accordance with the described embodiments.

In FIG. 110, magnet configuration 1750 is shown. The magnet configuration uses trapezoidally shaped magnets, such as 1752, which fit together to form a ring. The magnets are enclosed in frame 1754, which can be a structural component of a STARM. The polarity alignment pattern includes two guide magnet regions and two pole magnet regions. The pattern is repeated once and is similar to various previously described designs.

Figure 111:
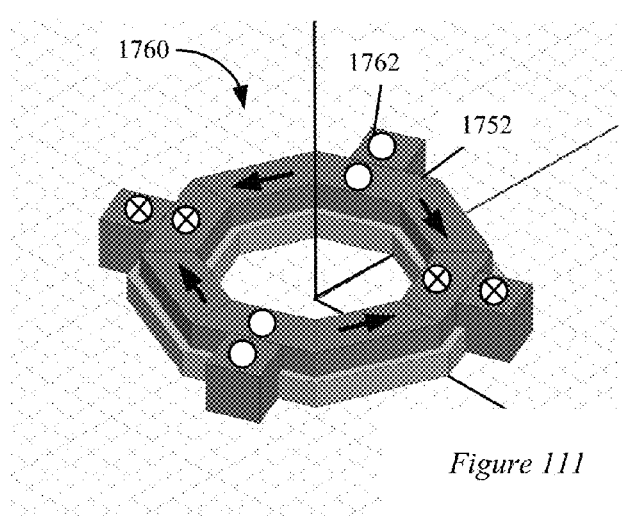

In FIG. 111, a magnet configuration 1760 is shown. Configuration 1760 is a variation of design 1750. In particular, four additional cubic shaped magnets, such as 1762, have been added adjacent to each of the four pole regions. These cubic shaped magnets decrease the ratio of the guide magnet volume to the pole magnet volume.

Figure 112:
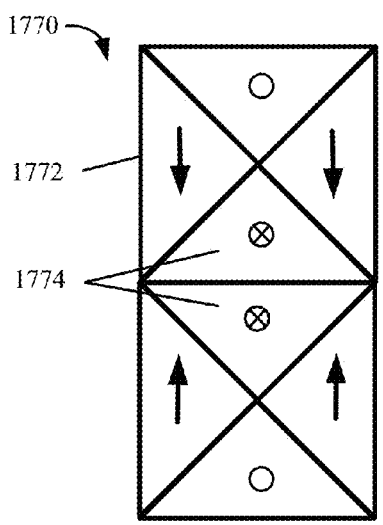
FIG. 112 is an illustration of a magnet configuration and polarity alignment pattern which utilizes triangular shaped magnets in accordance with the described embodiments.

In FIG. 112, a magnet configuration 1770 which uses triangular shaped magnets is used. Eight triangular shaped magnets are shown. The magnets are arranged to form a rectangular box. In one embodiment, a cubic magnet can be used for the two triangular shaped magnets. The polarity for each magnet is shown. The pattern includes two pole regions and two guide regions. The pattern is repeated once.

Figure 113:
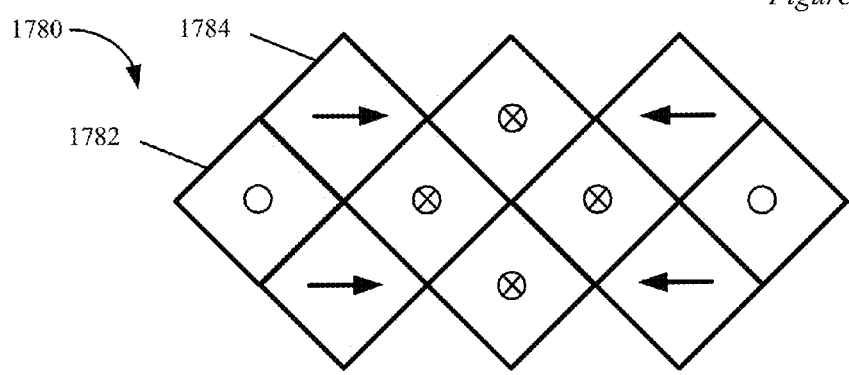
FIG. 113 is an illustration of a magnet configuration and polarity alignment pattern which utilizes rectangularly shaped magnets where a portion of the magnets are magnetized with a polarity direction across a diagonal of the magnet in accordance with the described embodiments.

In FIG. 113, a magnet configuration 1780 is shown. The polarity arrangement pattern is similar to the pattern in FIG. 112 except rectangularly shaped magnets are used. The guide magnets, such as 1784, are magnetized across the diagonal as opposed to being perpendicular to the face of magnets as shown in previous examples.

Flight Data

In this section, flight data including performance from two vehicles is presented. First, a description of the vehicles is presented then the test results are shown. FIG. 114 is a bottom view of vehicle 1800. In FIG. 114, the vehicle 1800 includes four hover engines, 1804a, 1804b, 1804c and 1804d. The hover engines are of equal size and use similar components, i.e., similar motor, number of magnets, STARM diameter, etc. The dimensions of the vehicle 1800 are about 37.5 inches long by 4.5 inches high by 18.5 inches wide. The weight of the vehicle unloaded is about 96.2 pounds.

Each hover engine includes a STARM, such as 1825, with a motor (not shown) and engine shroud 1818 with a gap between the shroud 1818 and STARM 1825 to allow for rotation. The STARM 1825 is connected to the motor via connectors 1822. The motor, which mount below the STARMs in the drawing, provides the input torque which rotates the STARM. In alternate embodiments, a single motor can be configured to drive more than one STARM, such as 1825.

The STARMs, such as 325 are 8.5 inches in diameter. The STARMs are configured to receive sixteen one inch cube magnets. Thus, the total volume of the magnets on the vehicle is sixty four cubic inches. The sixteen magnets on each STARM were arranged in a circular pattern similar to what is shown in FIG. 63. The polarity arrangement pattern is similar to what is shown in FIG. 63 except the pattern including two guide magnets and two pole magnets is repeated one less time.

Neodymium N50 strength magnets are used. The magnets each weigh about 3.6 ounces (force). Therefore, the total magnet weight for one hover engine is about 3.6 pounds (force).

In one embodiment, the motors can be a q150 DC brushless motor from Hacker Motor (Ergolding, Germany). The motor has a nominal voltage of 50 Volts and a no load current of 2 Amps. The weight is about 1995 grams. The speed constant is about 52.7/min. The RPM on eta max is about 2540. The torque on eta max is about 973.3 N-cm. The current on eta max is about 53.76 Amps.

The hover engines each have a shroud, such as 1818. The shroud 1818 partially encloses the STARM, such that a bottom of the STARM is exposed. In other embodiment, the shroud can enclose a bottom of the STARM. A tilt mechanism 1812 is coupled to the shroud 1818 of each hover engine. The tilt mechanism 1812 is coupled to a pivot arm 1810. The hover engines 1804a, 1804b, 1804c and 1804d are suspended beneath a support structure 1802. The pivot arms, such as 1810, extend through an aperture in the support structure.

The motors in each hover engine can be battery powered. In one embodiment, sixteen battery packs are used. The batteries are VENOM 50C 4S 5000MAH 14.8 Volt lithium polymer battery packs (Atomik RC, Rathdrum, Id.). Each battery weighs about 19.25 ounces. The dimensions of the batteries are 5.71 inches by 1.77 inches by 1.46 inches. The minimum voltage is 12 V and the maximum voltage is 16.8 V.

The sixteen batteries are wired together in four groups of four batteries and each coupled to motor electronic speed controllers, such as 1806a and 1806b via connectors 1816a and 1816b to four adjacent battery packs. The four batteries in each group are wired in series in this example to provide up to about 60 V to the electronic speed controllers. Connectors 1816c and 1816d each connect to four batteries and an electronic speed controller. Two electronic speed controllers are stacked behind 1806a and 1806b. Thus, four brushless electronic speed controllers, one for each motor, are used. The electronic speed controllers are Jeti Spin Pro 300 Opto brushless Electronic Speed Controllers (Jeti USA, Palm Bay, Fla.).

During the test, a data logger was connected to one of the motors. The data logger was used to record amps, voltage and RPM of the motor. The data logger is an elogger v4 (Eagle Tree Systems, LLC, Bellevue, Wash.). The data recorded during the test is presented below in Table 2.

For the test, the unloaded weight of vehicle #1 at the time of zero seconds is 96.2 pounds. As described above, the vehicle includes four hover engines. The voltage, amps and RPM are measurements from one of the hover engines. The height is measured from the bottom of the magnets on a STARM in one of the hover engines to the surface of the copper test track. The copper test track is formed from three, ⅛ inch thick, sheets of copper.

| Test Vehicle #1 (FIG. 114) | | | | | | |
|---|---|---|---|---|---|---|
| Time (sec) | Total weight (lbs) | Power (Watts) | Voltage (Vohs) | Current (Amps) | RPM | Hover Height (mm) |
| 0 | 96.2 | 855 | 64.64 | 13.22 | 3195 | 24.4 |
| 19.6 | 184 | 1479 | 62.93 | 23.50 | 3020 | 19.9 |
| 33.8 | 273.2 | 2141 | 61.22 | 34.97 | 2848 | 15.5 |
| 46.9 | 362.4 | 2836 | 59.62 | 47.58 | 2689 | 14.2 |
| 57.7 | 450.4 | 3381 | 58.22 | 58.07 | 2549 | 11.9 |
| 69.2 | 499.6 | 3665 | 57.42 | 63.82 | 2486 | 10.7 |
| 83.3 | 550 | 4092 | 56.46 | 72.48 | 2394 | 11 |
| 95.5 | 579.6 | 4316 | 55.92 | 77.18 | 2361 | 8.2 |
| 103.3 | 609.2 | 4418 | 55.60 | 79.47 | 2329 | 7.5 |
| 110.7 | 629.4 | 4250 | 55.71 | 76.30 | 2355 | 7.9 |
| 118.7 | 649.7 | 4363 | 55.27 | 78.95 | 2314 | 7.3 |

In a second vehicle (not shown), a chassis was formed from plywood. The vehicle dimensions were 46 inches by 15.5 inches by 5 inches. The vehicle weighed seventy seven pounds unloaded. Two hover engines with STARMs of fourteen inches in diameter were used. The hover engines were secured in place and a mechanism, which allowed the hover engines to be tilted, was not provided.

Each STARM included thirty two cubic inch magnets arranged in a circular pattern similar to what is shown in FIG. 63. The polarity arrangement pattern is similar to FIG. 63 as well. However, the polarity arrangement pattern including the two guide magnets and two pole magnets is repeated more times as compared to FIG. 63.

Two Hacker motors are used (one for each STARM). Hacker motors model no. QST-150-45-6-48 with a $K_V$ of 48 were used to power each STARM. Each hacker motor is coupled to one of the STARMs and an electronic speed controller.

For this vehicle, Jeti Spin Pro 200 Opto brushless Electronic Speed Controllers (Jeti USA, Palm Bay, Fla.) are used. The same battery type as described above for the first test vehicle was used. However, only eight batteries were used for the second vehicle as compared to the first test vehicle. The batteries are two divided into two groups of four and wired in series to provide a nominal voltage of about 60 Volts to each motor.

A test was conducted where the second vehicle was allowed to hover in free flight unloaded and then plate weights were added to the vehicle. The plates were weighed before the test began. The vehicle was operated over three-⅛ inch thick pieces of copper.

The current, voltage and RPM, for one of the motors, was measured in flight using the Eagle system data logger. The distance of the bottom of the magnets to the copper, referred to as the hover height, was measured by hand. Test results for the flight are shown in Table 3 as follows.

TABLE 3

| Flight test data for vehicle #2 Test Vehicle #2 | | | | | | |
|---|---|---|---|---|---|---|
| Time (sec) | Total weight (lbs) | Power (Watts) | Voltage (Volts) | Current (Amps) | RPM | Hover Height (mm) |
| 0 | 77 | 1853 | 61.3 | 30.2 | 2942 | 26.9 |
| 10 | 165 | 3333 | 58.8 | 56.7 | 2820 | 22.3 |
| 17.1 | 254 | 4700 | 56 | 84 | 2686 | 18.3 |
| 23.1 | 343 | 5944 | 52.6 | 113 | 2525 | 14.6 |

Embodiments of the present invention further relate to computer readable media that include executable program instructions for controlling a magnetic lift system. The media and program instructions may be those specially designed and constructed for the purposes of the present invention, or any kind well known and available to those having skill in the computer software arts. When executed by a processor, these program instructions are suitable to implement any of the methods and techniques, and components thereof, described above. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A vehicle comprising:
a first hover engine, a second hover engine, a third hover engine and a fourth hover engine, each of the first, the second, the third and the fourth hover engines having,
an electric motor including a winding, a first set of permanent magnets and a first structure which holds the first permanent magnets wherein an electric current is applied to the winding to cause one of the winding or the first set of permanent magnets to rotate;
a second structure, configured to receive a rotational torque from the electric motor to rotate the second structure,
the second structure holding a second set of permanent magnets wherein the second set of permanent magnets are rotated to induce eddy currents in a substrate such that the induced eddy currents and the second set of permanent magnets interact to generate forces which cause the vehicle to hover above and/or translate from location to location along the substrate;
one or more speed controllers coupled to the first hover engine, the second hover engine, the third hover engine and the fourth hover engine;
a chassis;
a first actuator coupled to the chassis and the first hover engine wherein the first hover engine is rotatable relative to the chassis, the first actuator including a first controller configured to receive first commands from a guidance, navigation and control (GNC) system and in response to the first commands generate a first force which causes the first hover engine to rotate relative to the chassis;
a second actuator coupled to the chassis and the second hover engine wherein the second hover engine is rotatable relative to the chassis, the second actuator including a second controller configured to receive second commands from the GNC system and in response to the second commands generate a second force which causes the second hover engine to rotate relative to the chassis;
a third actuator coupled to the chassis and the third hover engine wherein the third hover engine is rotatable relative to the chassis, the third actuator including a third controller configured to receive third commands from the GNC system and in response to the third commands generate a third force which causes the third hover engine to rotate relative to the chassis;
a fourth actuator coupled to the chassis and the fourth hover engine wherein the fourth hover engine is rotatable relative to the chassis, the fourth actuator including a fourth controller configured to receive fourth commands from the GNC system and in response to the fourth commands generate a fourth force which causes the fourth hover engine to rotate relative to the chassis;
wherein the first, the second, the third and the fourth hover engines are each independently rotatable relative to the chassis and one another;
the GNC system communicatively coupled to the first controller, the second controller, the third controller and fourth controller and an inertial measurement unit (IMU), the GNC system configured to receive sensor data from the IMU, generate a guidance solution which includes an orientation and velocity of the vehicle as a function of time, generate control commands to send to the first, second, third and fourth actuators to implement the guidance solution; and
an on-board electric power source that supplies the electric current to the first hover engine, the second hover engine, the third hover engine and the fourth hover engine and the first actuator, the second actuator, the third actuator and the fourth actuator.

2. The vehicle of claim 1, wherein the on-board electric power source are one or more batteries.

3. The vehicle of claim 1, further comprising one or more speed controllers, electrically disposed between the on-board electric power source and the first, the second, the third and the fourth hover engines, configured to control the electric current received by the motors to control a rotation rate of the motors.

4. The vehicle of claim 3, wherein the GNC system is communicatively coupled to the one or more speed controllers and configured to communicate with the one or more speed controllers to control a rotation rate of each of the motors.

5. The vehicle of claim 1, further comprising four electronic speed controllers, each electrically disposed between one of the hover engines and the on-board electric power source, each electronic speed controller configured to control the electric current received by one of the motors to control a rotation rate of the one of the motors.

6. The vehicle of claim 1, wherein the guidance solution further includes a hover height as a function of time and wherein the GNC system is further configured to control one or more of a tilt position of each of the four hover engines or a lift output of each of the four hover engines to control the hover height as the function of time.

7. The vehicle of claim 1, wherein the guidance solution further includes an acceleration rate as a function of time and wherein the GNC system is further configured to control one or more of a tilt position of each of the four hover engines to generate the acceleration rate as the function of time.

8. The vehicle of claim 1, wherein the GNC system is further configured to control the first, second, third and fourth actuators to rotate the vehicle in place while the vehicle remains in approximately over a first position on the substrate.

9. The vehicle of claim 1, wherein, while the vehicle is hovering in a stationary position, the GNC system is further configured to control the first, second, third and fourth actuators, to move the vehicle in a first linear direction and then to move the vehicle in a second linear direction perpendicular to the first linear direction without rotating the vehicle to move in the second linear direction.

10. The vehicle of claim 1, wherein the GNC system is configured to communicate, via a wired or wireless communication interface, with a mobile control unit.

11. The vehicle of claim 10, wherein the GNC system is configured to receive a directional input command from the mobile control unit and in response generate control commands for each of the first, second, third and fourth actuators to implement to the direction input command.

12. The vehicle of claim 1, wherein the first hover engine is configured to tilt around a first rotation axis relative to the chassis, wherein the second hover engine is configured to tilt around a second rotation axis relative to the chassis, wherein the third hover engine is configured to tilt around a third rotation axis relative to the chassis and wherein the fourth hover engine is configured to rotate about a fourth rotation axis relative to the chassis.

13. The vehicle of claim 12, wherein the first rotation axis is orientated at an angle of ninety degrees relative to the second rotation axis, the first rotation axis is orientated at an angle of ninety degrees relative to the third rotation axis, wherein the first rotation axis is parallel to the fourth rotation axis and wherein the second rotation axis is parallel to the third rotation axis.

14. The vehicle of claim 12, wherein the first rotation axis is orientated at an angle relative to the second rotation axis, the first rotation axis is orientated at one hundred eighty degrees minus the angle relative to the third rotation axis, wherein the first rotation axis is parallel to the fourth rotation axis and wherein the second rotation axis is parallel to the third rotation axis.

15. The vehicle of claim 12, wherein one or more of the first hover engine is configured to rotate through at least an angle range of twenty degrees about the first rotation axis, the second hover engine is configured to rotate through at least an angle range of twenty degrees about the second rotation axis, the third hover engine is configured to rotate through at least an angle range of twenty degrees about the third rotation axis or the fourth hover engine is configured to rotate through at least an angle range of twenty degrees about the fourth rotation axis.

16. The vehicle of claim 1, wherein a single magnet configuration of the second set of permanent magnets including a volume of magnets and a polarity arrangement pattern is used on each of the first, second, third and fourth hover engines.

17. The vehicle of claim 1, wherein a first magnet configuration of the second set of permanent magnets including a first volume of magnets and a first polarity arrangement pattern is used on the first hover engine and a second magnet configuration of the second set of permanent magnets including a second volume of magnets and second polarity arrangement pattern is used on the second hover engine.

18. The vehicle of claim 1, further comprising a fifth hover engine and a fifth actuator coupled to the chassis and configured to rotate the fifth hover engine relative to the chassis.

19. The vehicle of claim 1, further comprising a fifth hover engine secured in a fixed orientation relative to the chassis.

20. The vehicle of claim 19, wherein the fifth hover engine is configured to output more lift than either of the first hover engine, the second hover engine, the third hover engine or the fourth hover engine.

21. The vehicle of claim 1, further comprising a fifth actuator, the fifth actuator configured to rotate the first hover engine and the first actuator relative to the chassis.

22. The vehicle of claim 1, wherein the substrate is inclined.

23. The vehicle of claim 22, wherein the GNC system is configured to control the first, second, third and fourth actuators to hover the vehicle in a stationary position on the inclined substrate.

24. The vehicle of claim 1, wherein the IMU includes accelerometers and is configured to send acceleration data in the sensor data to the GNC system.

25. The vehicle of claim 1, wherein the IMU includes gyroscopes and is configured to send rotation data from the gyroscopes in the sensor data to the GNC system.

26. The vehicle of claim 1, wherein the guidance solution further includes an angle orientation of the vehicle as a function of time and wherein the GNC system is further configured to control one or more of a tilt position of each of the four hover engines or a lift output of each of the four hover engines to control the angle orientation of the vehicle as the function of time.

27. The vehicle of claim 1, wherein GNC system is further configured to control the first, second, third and fourth actuators to rotate and translate the vehicle simultaneously along the substrate.

* * * * *